June 12, 1956 T. A. KESTELL 2,749,562
MACHINES FOR SHAPING UPPERS OVER LASTS
Filed Dec. 24, 1954 49 Sheets-Sheet 1

Inventor
Thomas A. Kestell
By his Attorney
Thomas J. Ryan.

June 12, 1956  T. A. KESTELL  2,749,562
MACHINES FOR SHAPING UPPERS OVER LASTS
Filed Dec. 24, 1954  49 Sheets-Sheet 4

Inventor
Thomas A. Kestell
By his Attorney
Thomas J. Ryan

Inventor
Thomas A. Kestell
By his Attorney

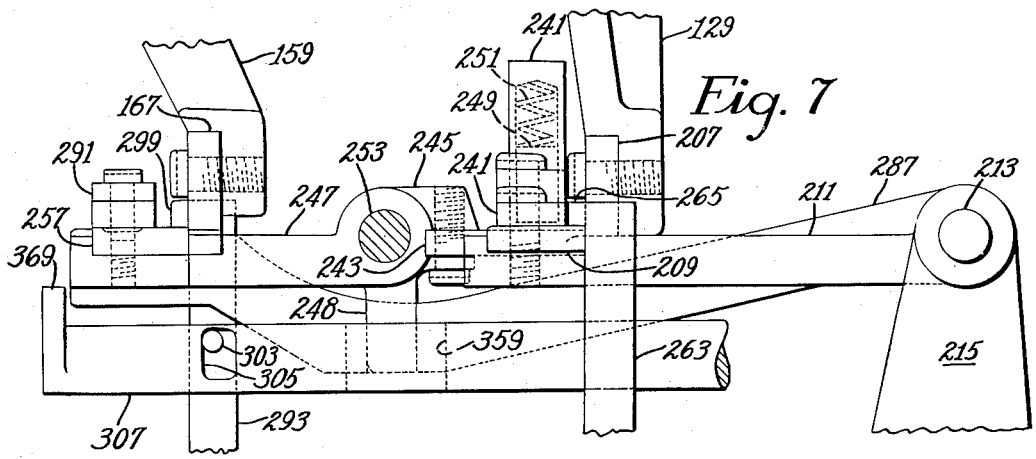
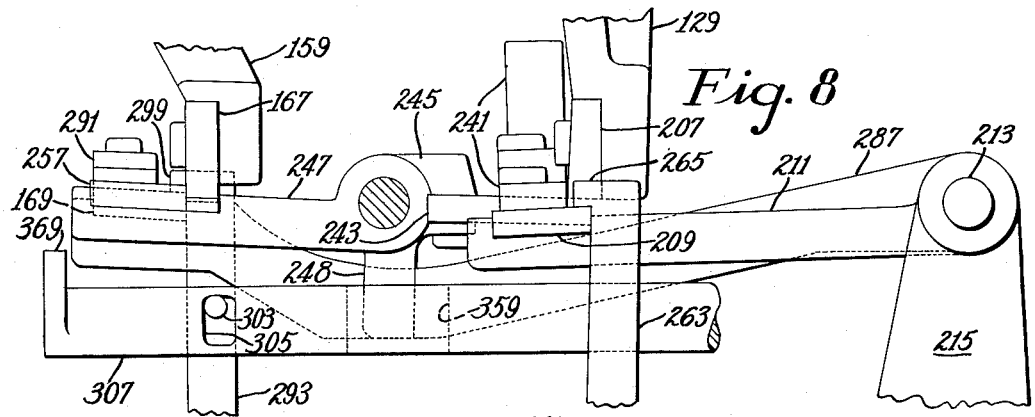
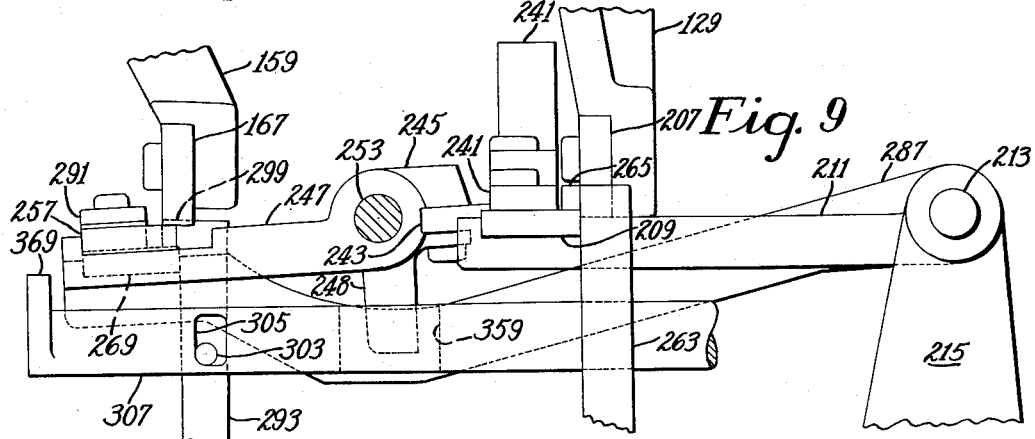

June 12, 1956     T. A. KESTELL     2,749,562
MACHINES FOR SHAPING UPPERS OVER LASTS
Filed Dec. 24, 1954     49 Sheets-Sheet 8
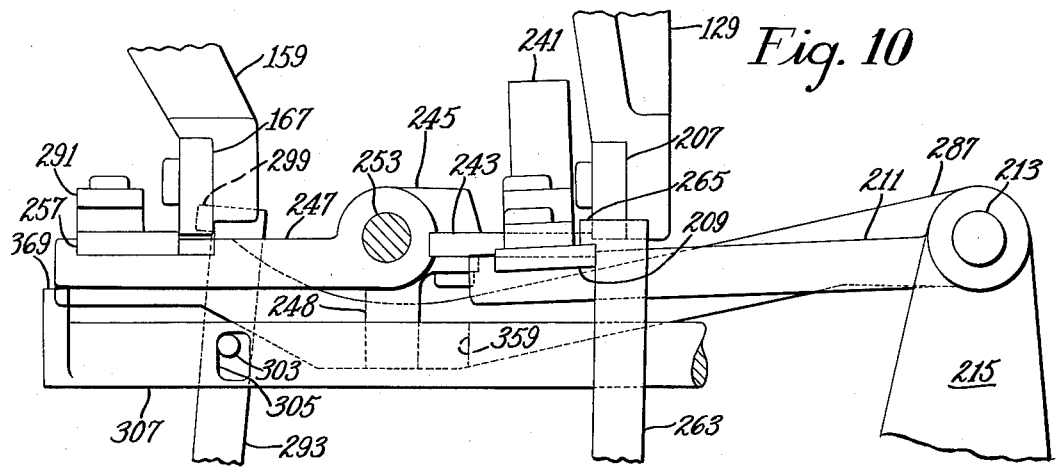
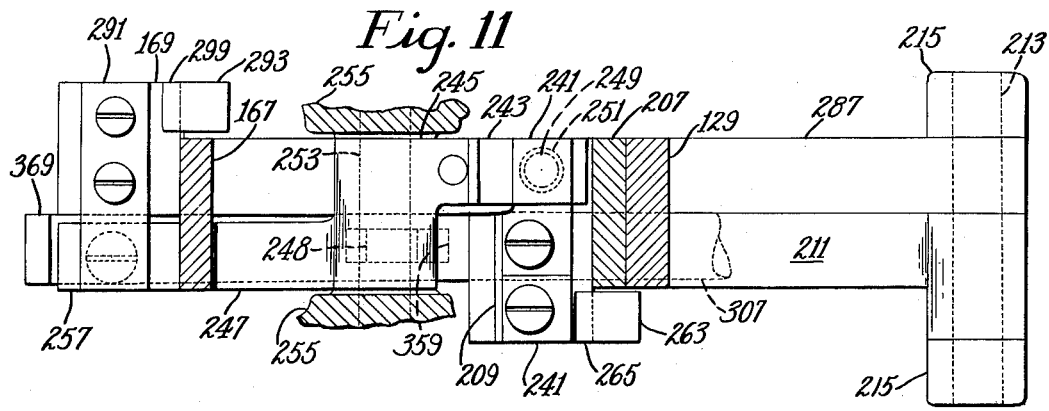
*Inventor*
Thomas A. Kestell
By his Attorney
Thomas J. Ryan Inventor
Thomas A. Kestell
By his Attorney

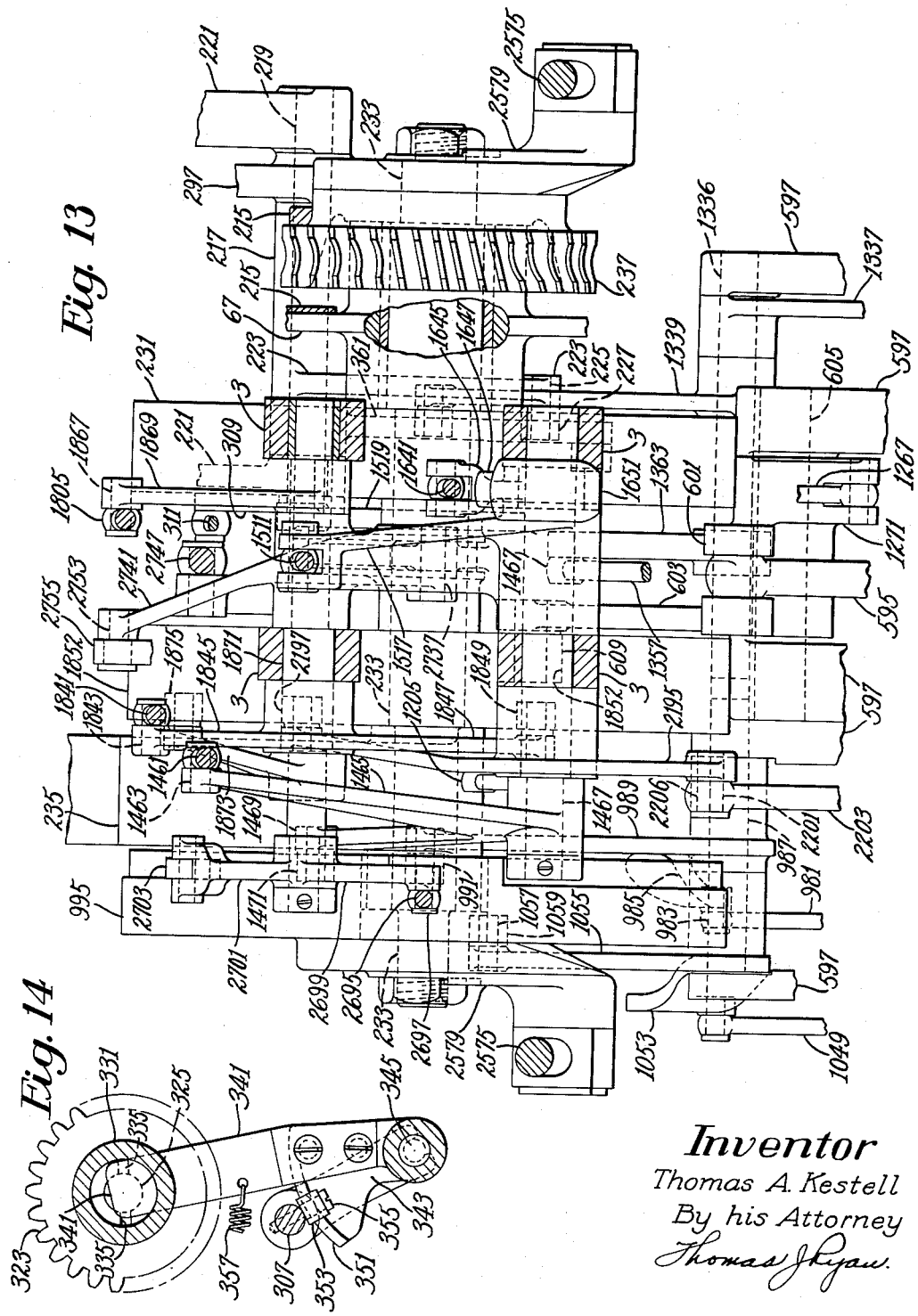

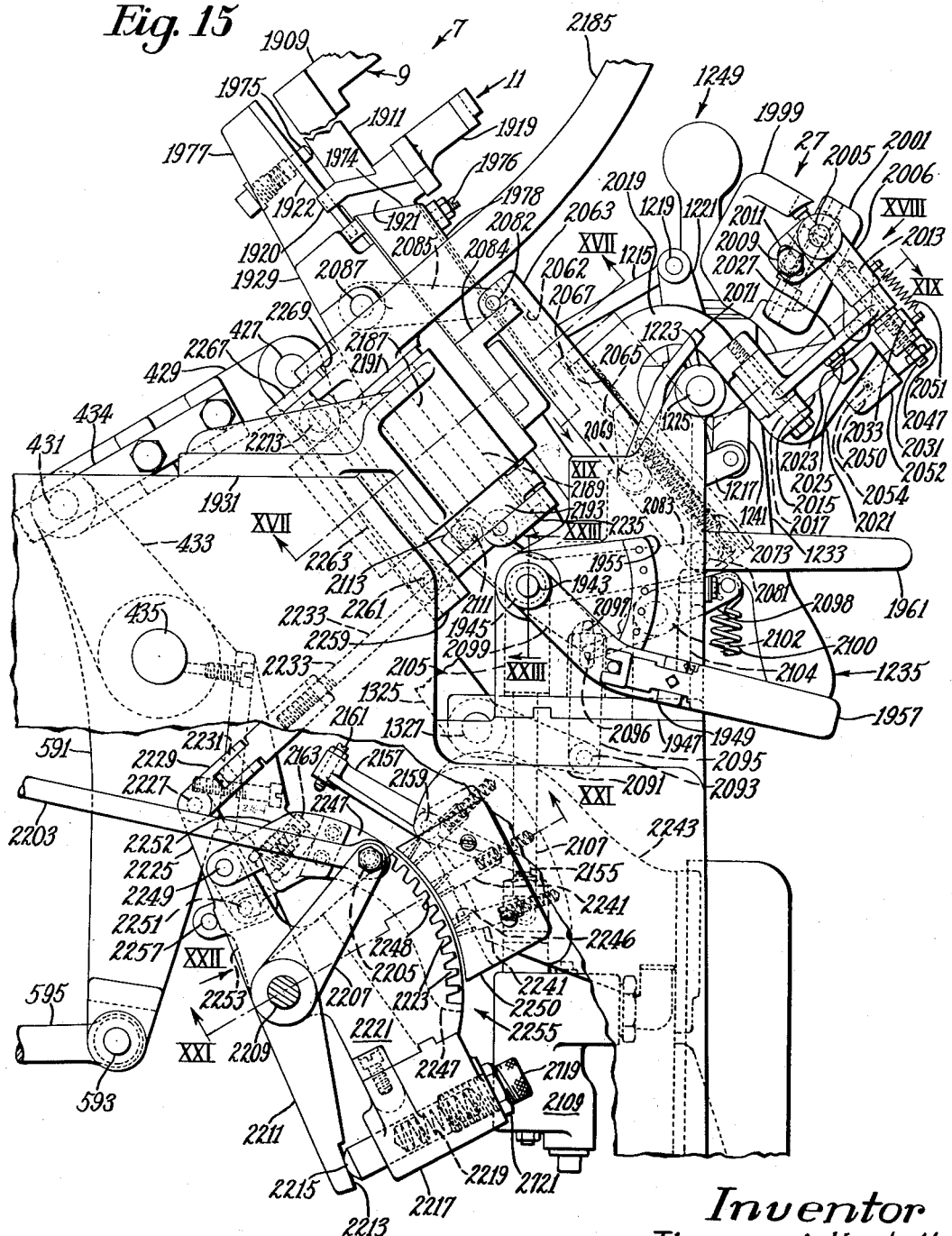

June 12, 1956     T. A. KESTELL     2,749,562
MACHINES FOR SHAPING UPPERS OVER LASTS
Filed Dec. 24, 1954     49 Sheets-Sheet 12

*Inventor*
Thomas A. Kestell
By his Attorney

June 12, 1956  T. A. KESTELL  2,749,562
MACHINES FOR SHAPING UPPERS OVER LASTS
Filed Dec. 24, 1954  49 Sheets-Sheet 14

*Inventor*
Thomas A. Kestell
By his Attorney

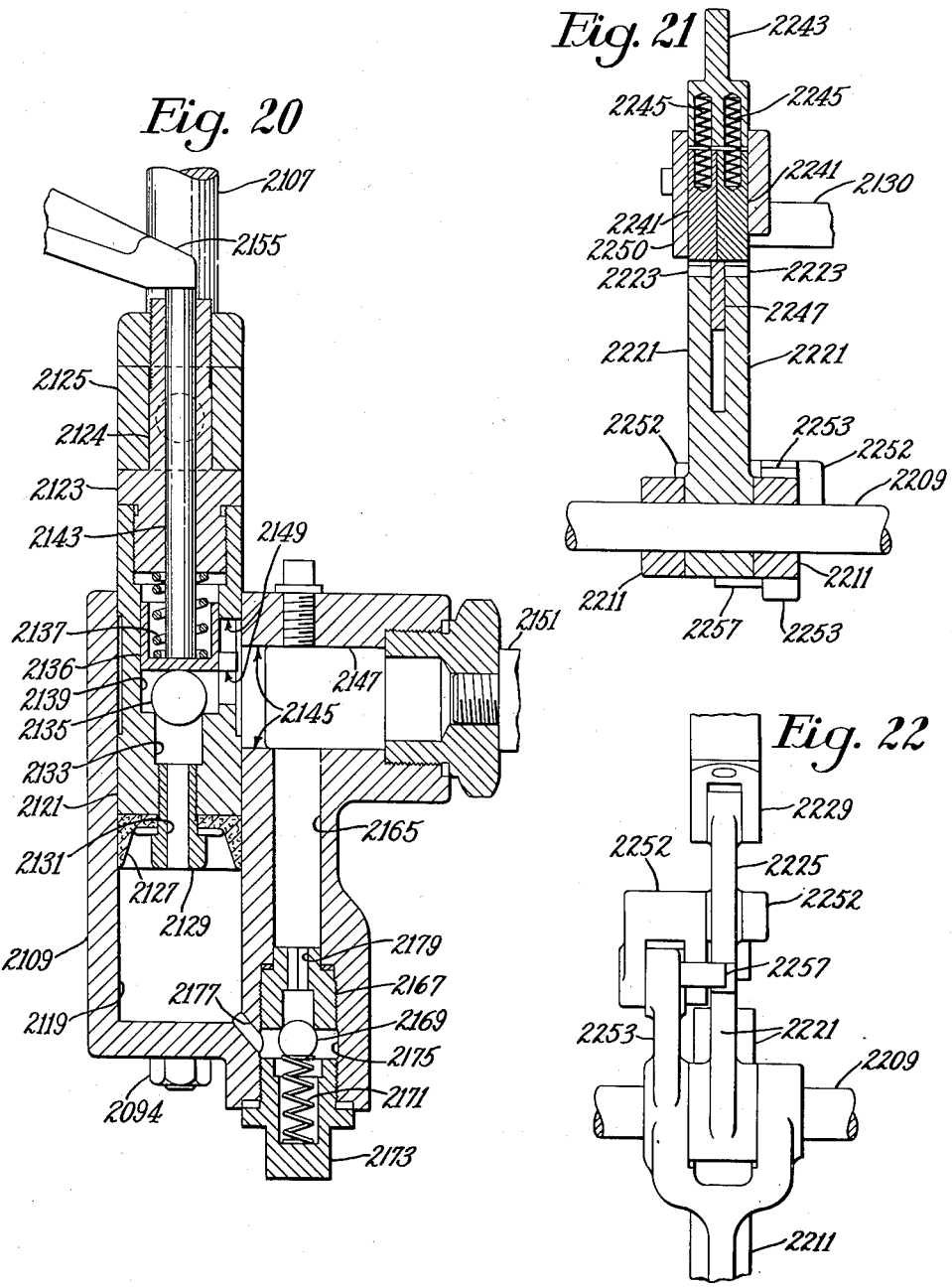

June 12, 1956 T. A. KESTELL 2,749,562
MACHINES FOR SHAPING UPPERS OVER LASTS
Filed Dec. 24, 1954 49 Sheets-Sheet 16
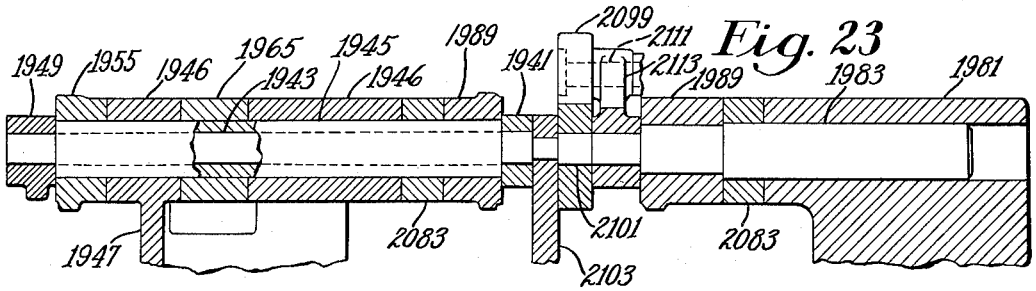
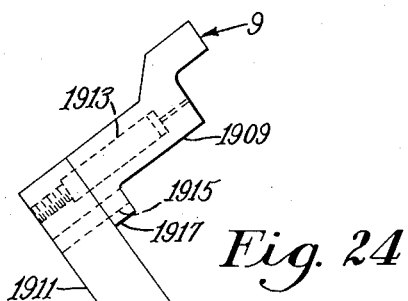
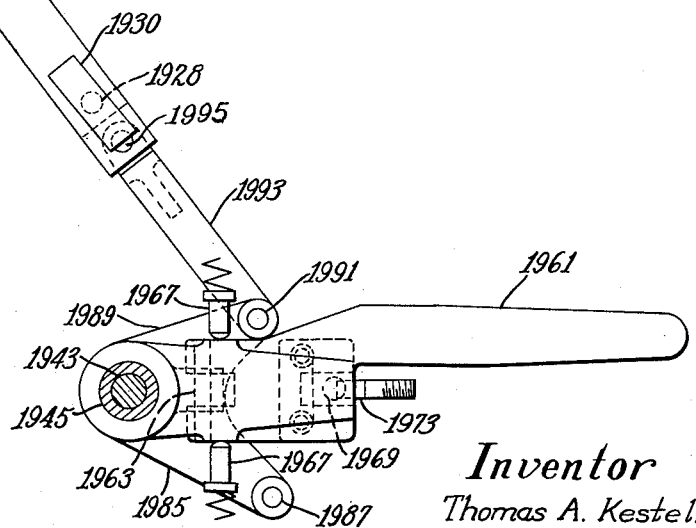
Inventor
Thomas A. Kestell
By his Attorney
Thomas J Ryan June 12, 1956     T. A. KESTELL     2,749,562
MACHINES FOR SHAPING UPPERS OVER LASTS
Filed Dec. 24, 1954     49 Sheets-Sheet 17
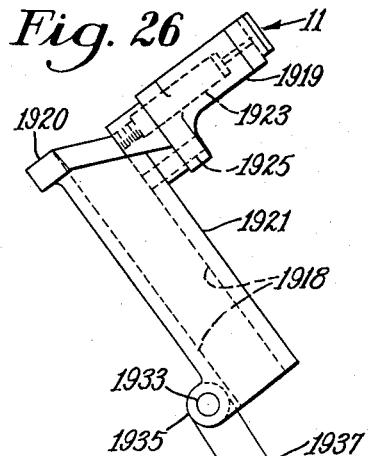
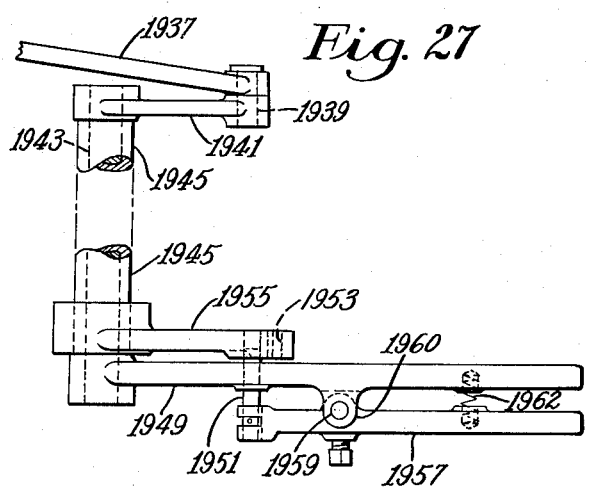
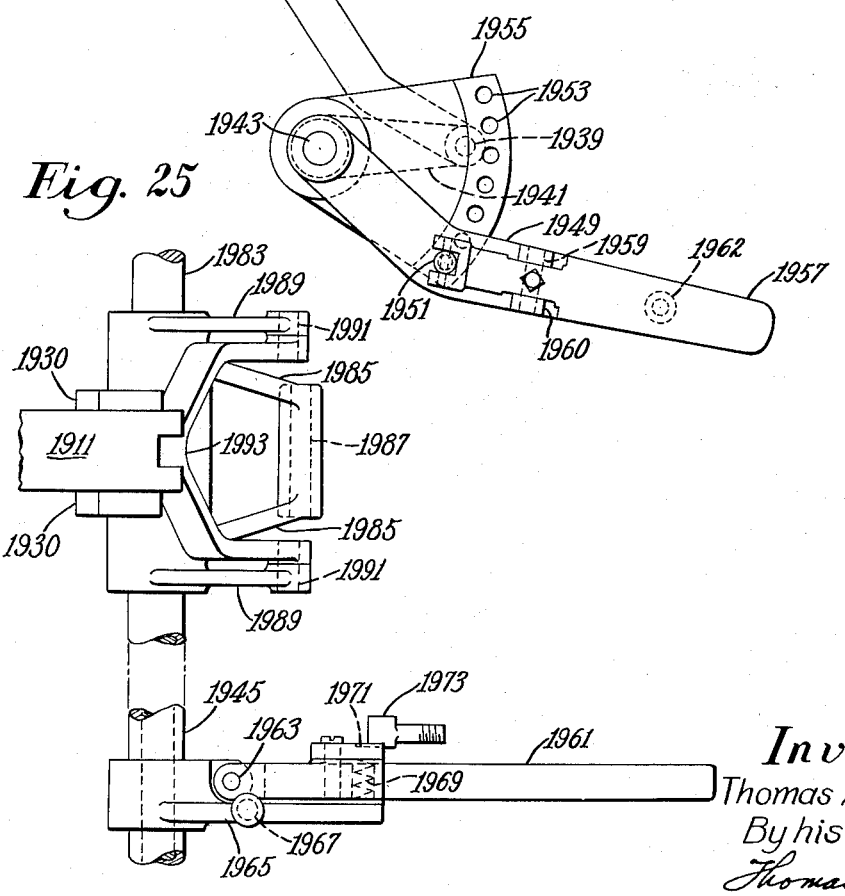
Inventor
Thomas A. Kestell
By his Attorney June 12, 1956 T. A. KESTELL 2,749,562
MACHINES FOR SHAPING UPPERS OVER LASTS
Filed Dec. 24, 1954 49 Sheets-Sheet 18

Inventor
Thomas A. Kestell
By his Attorney
Thomas J. Ryan.

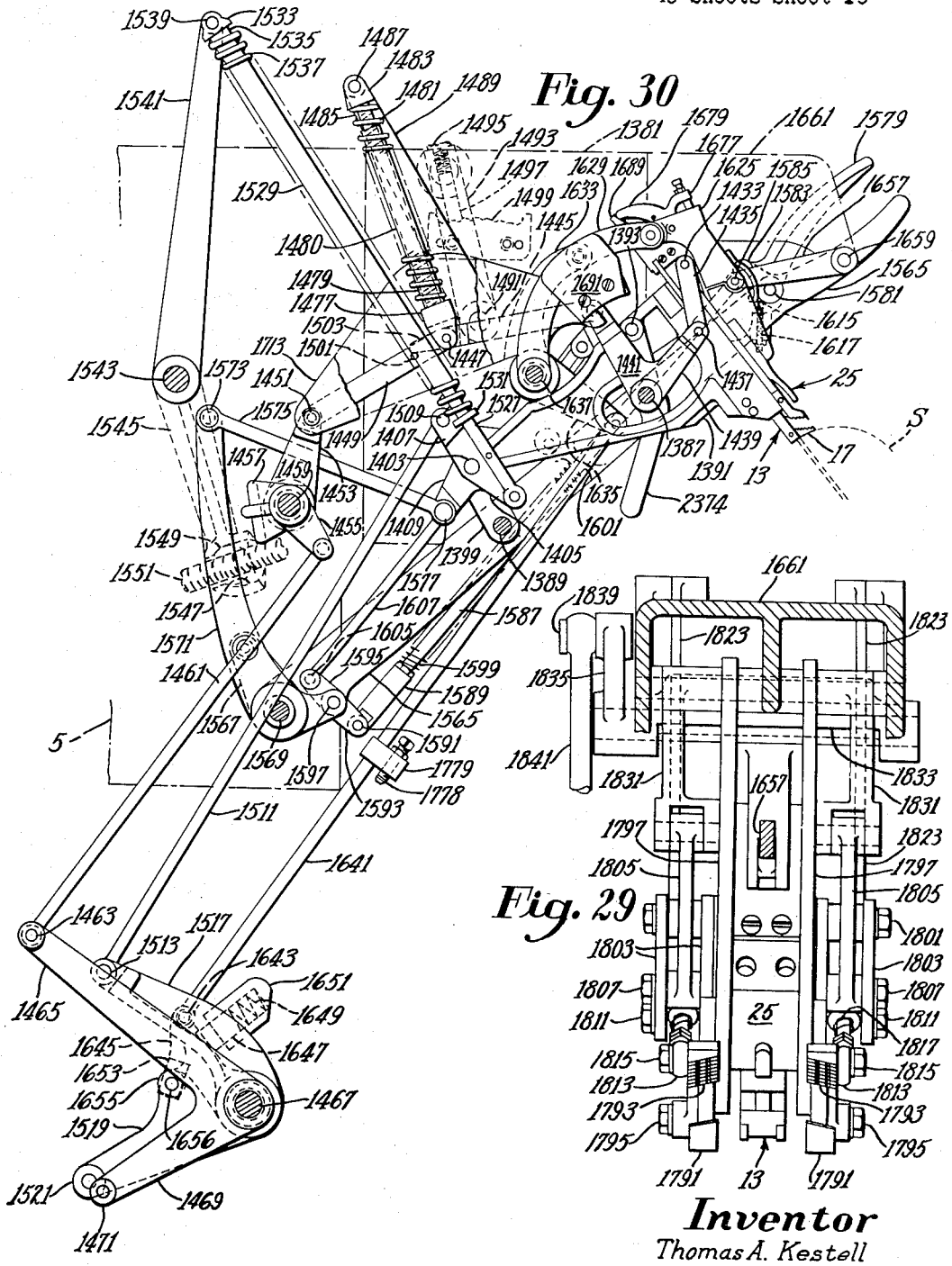

June 12, 1956 T. A. KESTELL 2,749,562
MACHINES FOR SHAPING UPPERS OVER LASTS
Filed Dec. 24, 1954 49 Sheets-Sheet 20

Inventor
Thomas A. Kestell
By his Attorney
Thomas J. Ryan

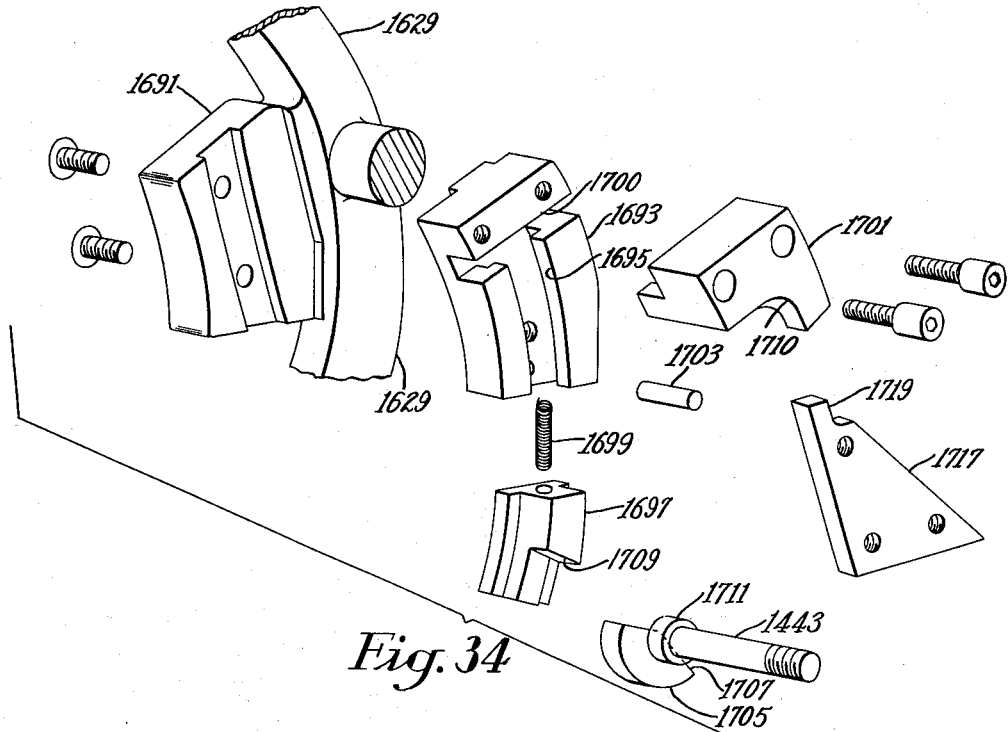
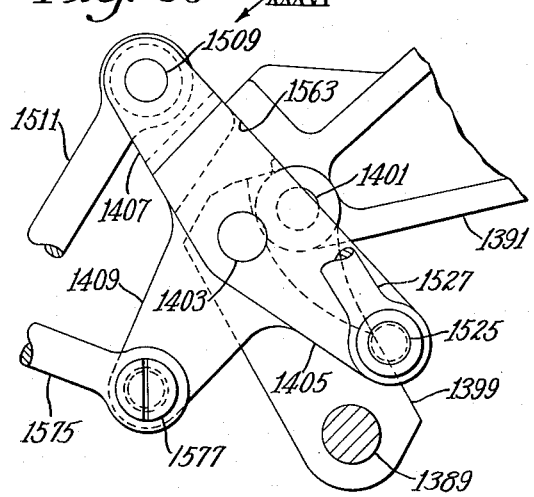
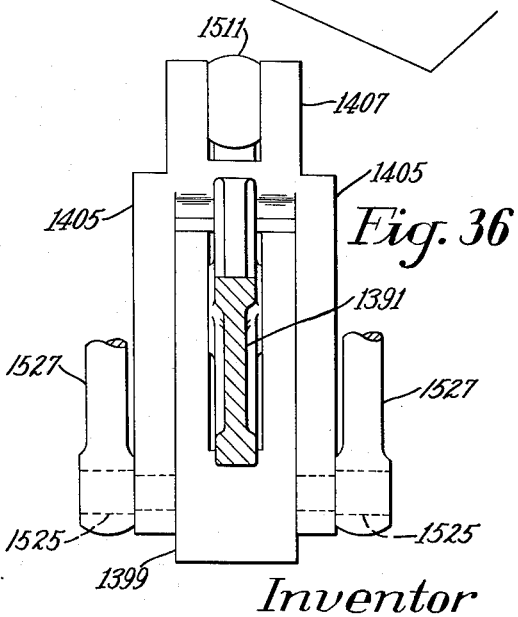

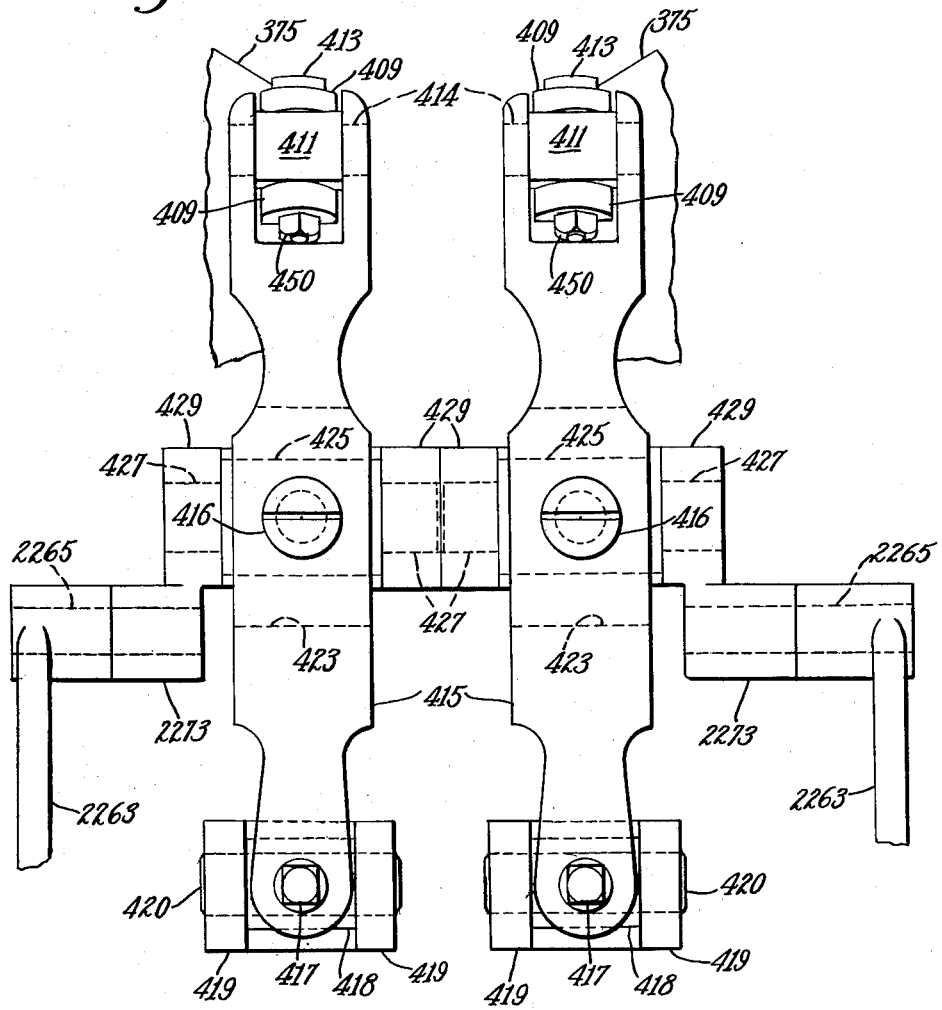

June 12, 1956  T. A. KESTELL  2,749,562
MACHINES FOR SHAPING UPPERS OVER LASTS
Filed Dec. 24, 1954  49 Sheets-Sheet 24

Inventor
Thomas A. Kestell
By his Attorney
Thomas J. Ryan

June 12, 1956     T. A. KESTELL     2,749,562
MACHINES FOR SHAPING UPPERS OVER LASTS
Filed Dec. 24, 1954     49 Sheets-Sheet 26

*Inventor*
Thomas A Kestell
By his Attorney

June 12, 1956  T. A. KESTELL  2,749,562
MACHINES FOR SHAPING UPPERS OVER LASTS
Filed Dec. 24, 1954  49 Sheets-Sheet 27
Fig. 42
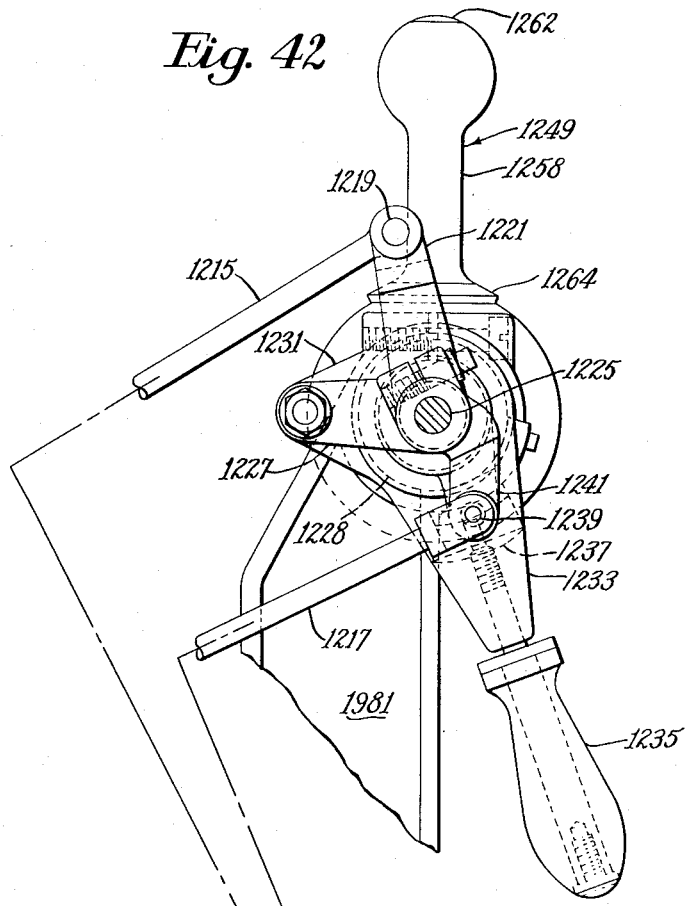
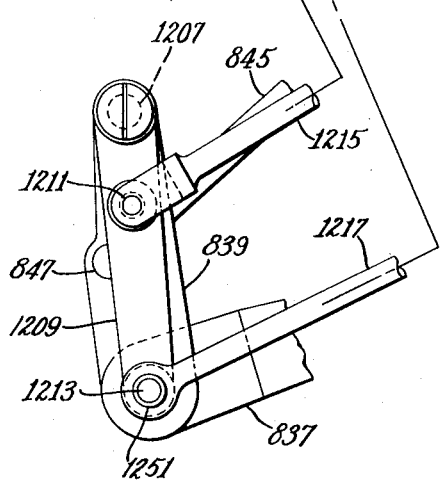
*Inventor*
Thomas A. Kestell
By his Attorney June 12, 1956  T. A. KESTELL  2,749,562
MACHINES FOR SHAPING UPPERS OVER LASTS
Filed Dec. 24, 1954  49 Sheets-Sheet 30

Inventor
Thomas A. Kestell
By his Attorney
Thomas J Ryan

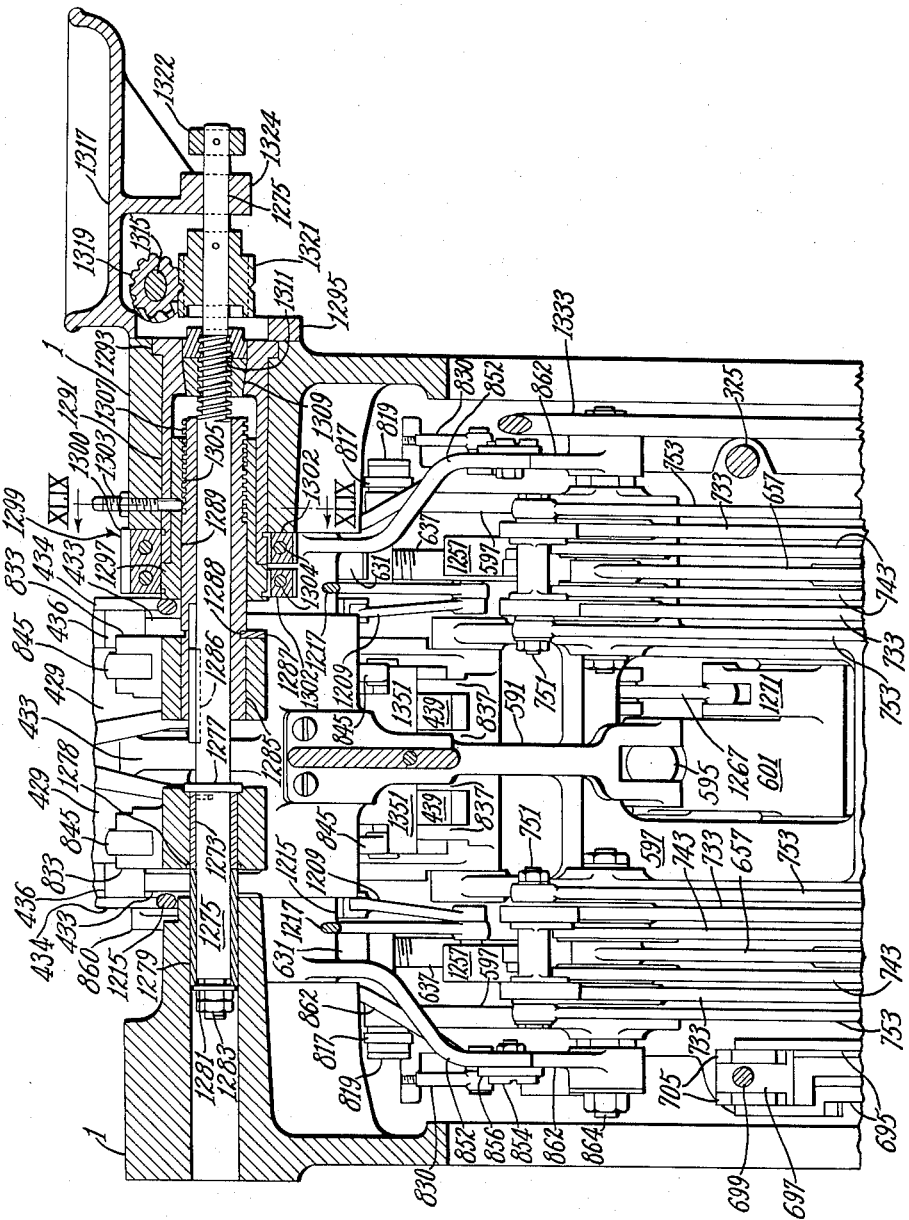

*Inventor*
Thomas A. Kestell
By his Attorney

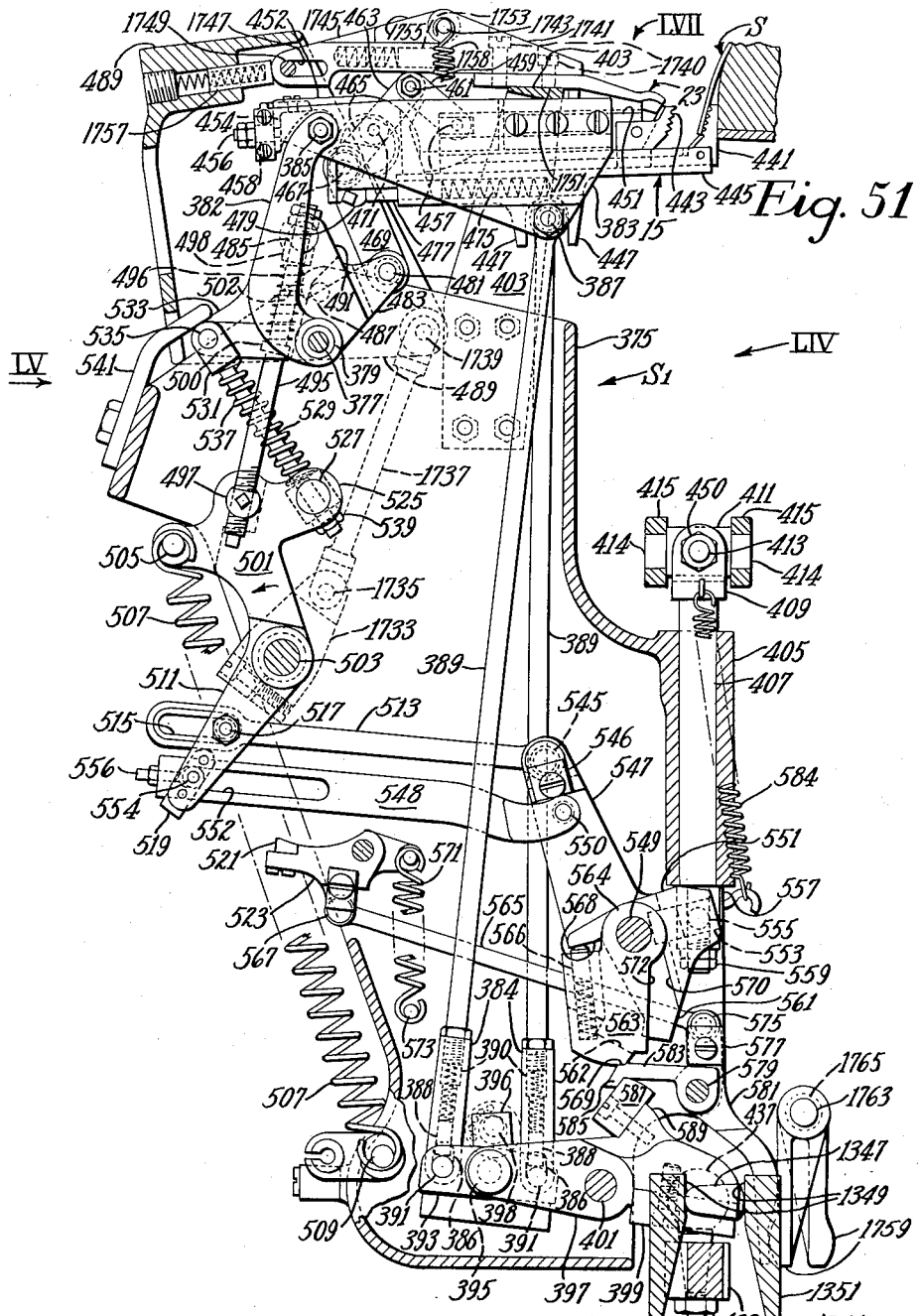

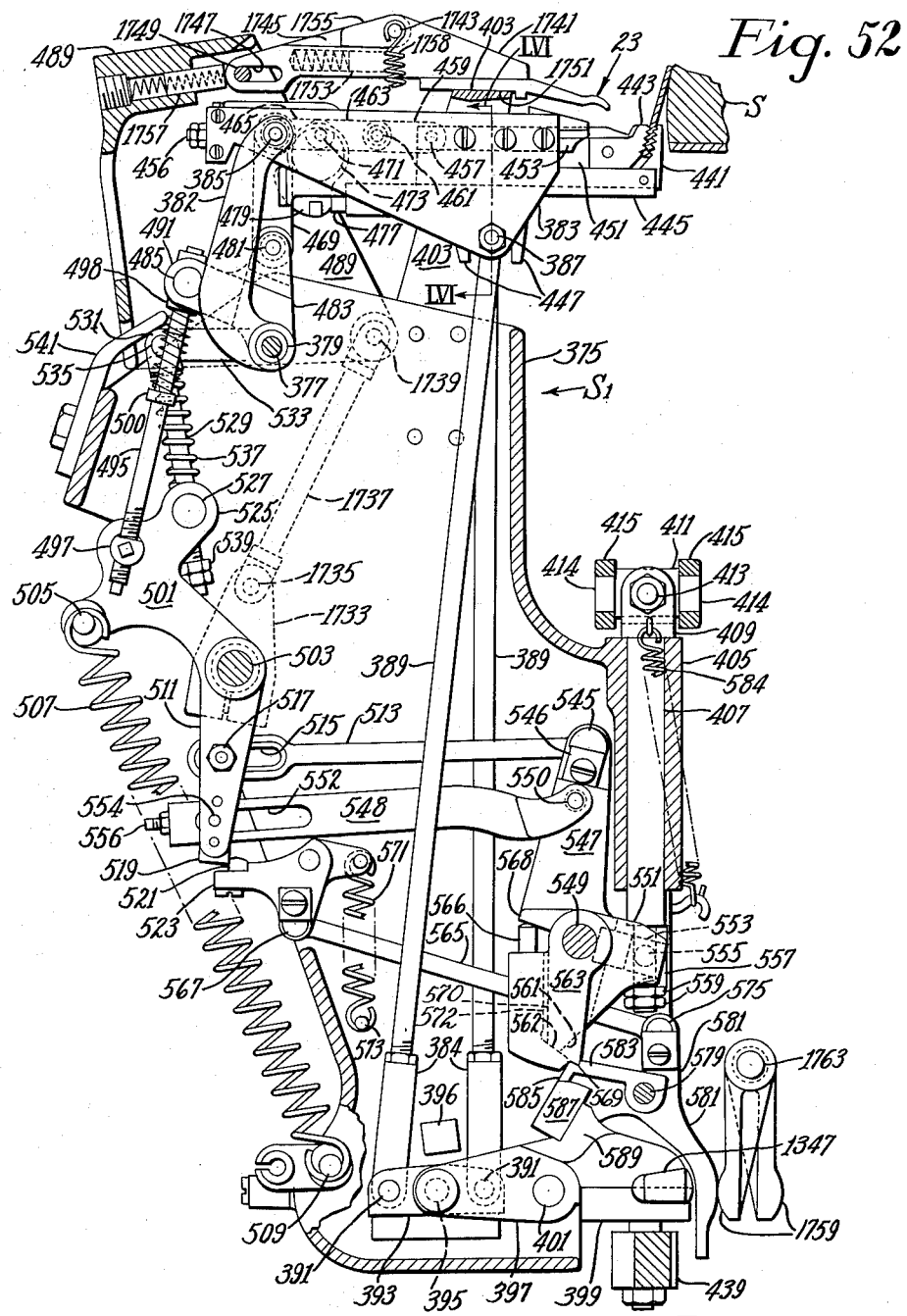

June 12, 1956  T. A. KESTELL  2,749,562
MACHINES FOR SHAPING UPPERS OVER LASTS
Filed Dec. 24, 1954  49 Sheets-Sheet 37

Inventor
Thomas A. Kestell
By his Attorney
Thomas J. Ryan

June 12, 1956 — T. A. KESTELL — 2,749,562
MACHINES FOR SHAPING UPPERS OVER LASTS
Filed Dec. 24, 1954 — 49 Sheets-Sheet 38

*Inventor*
Thomas A. Kestell
By his Attorney
Thomas J. Ryan

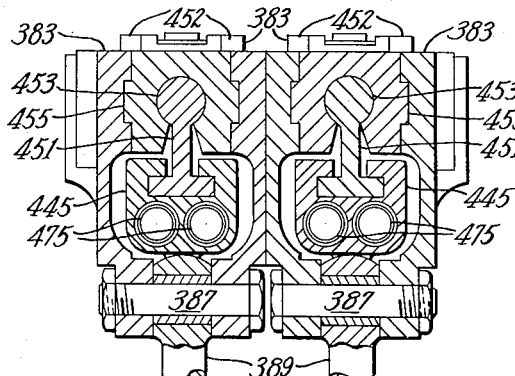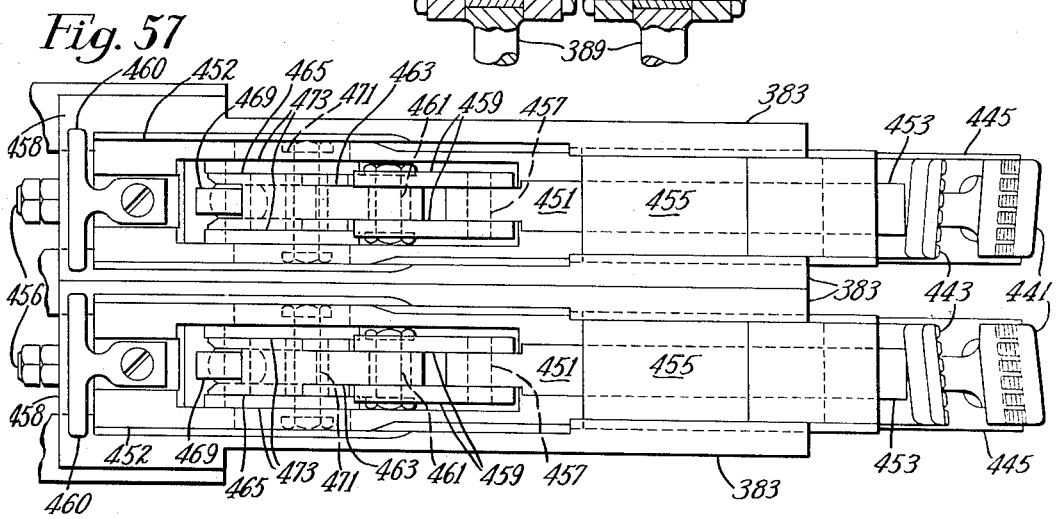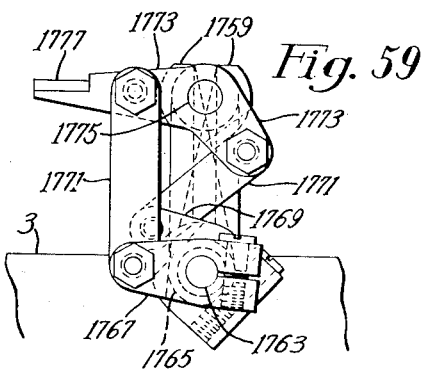

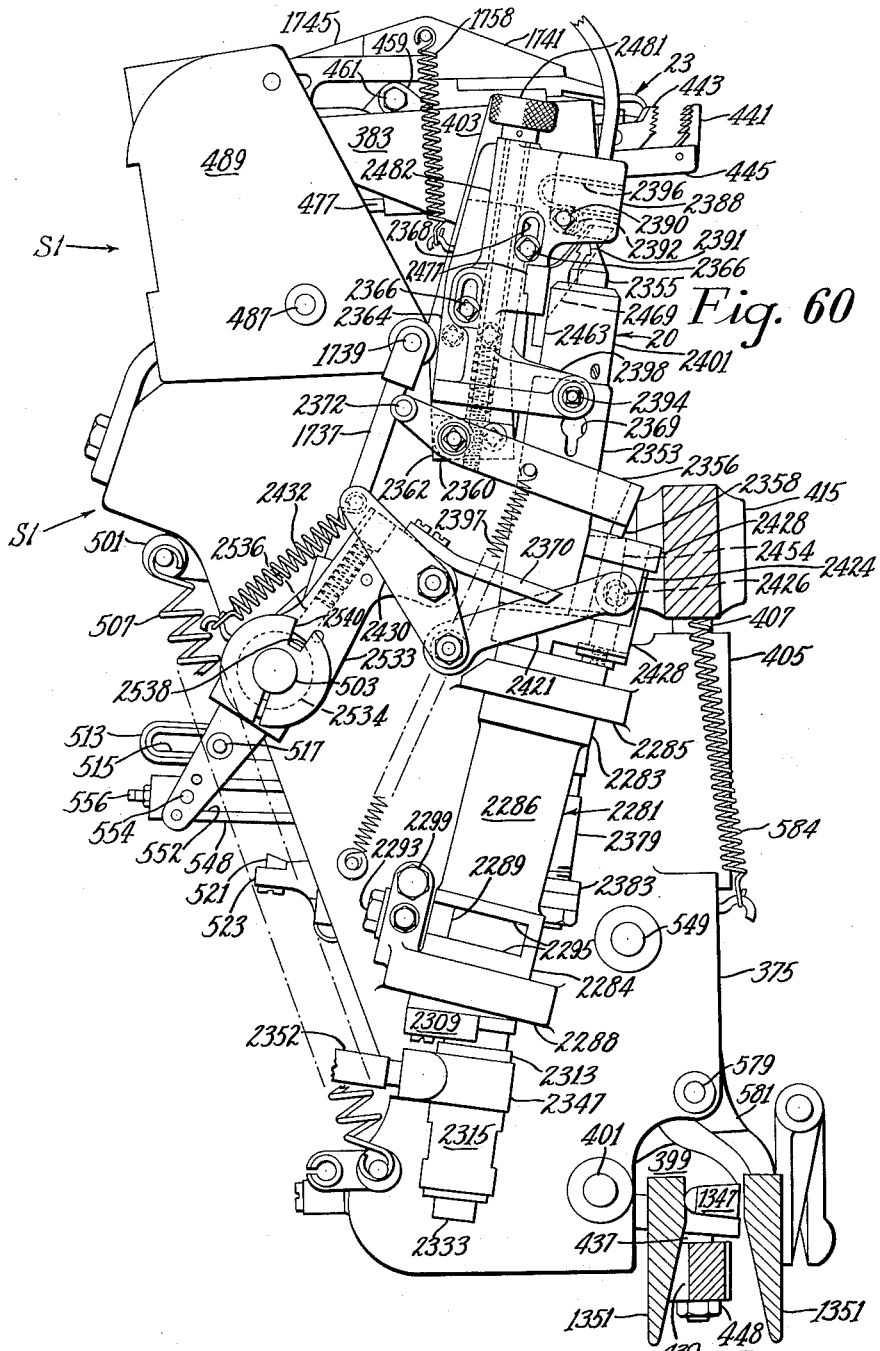

June 12, 1956  T. A. KESTELL  2,749,562
MACHINES FOR SHAPING UPPERS OVER LASTS
Filed Dec. 24, 1954  49 Sheets-Sheet 41
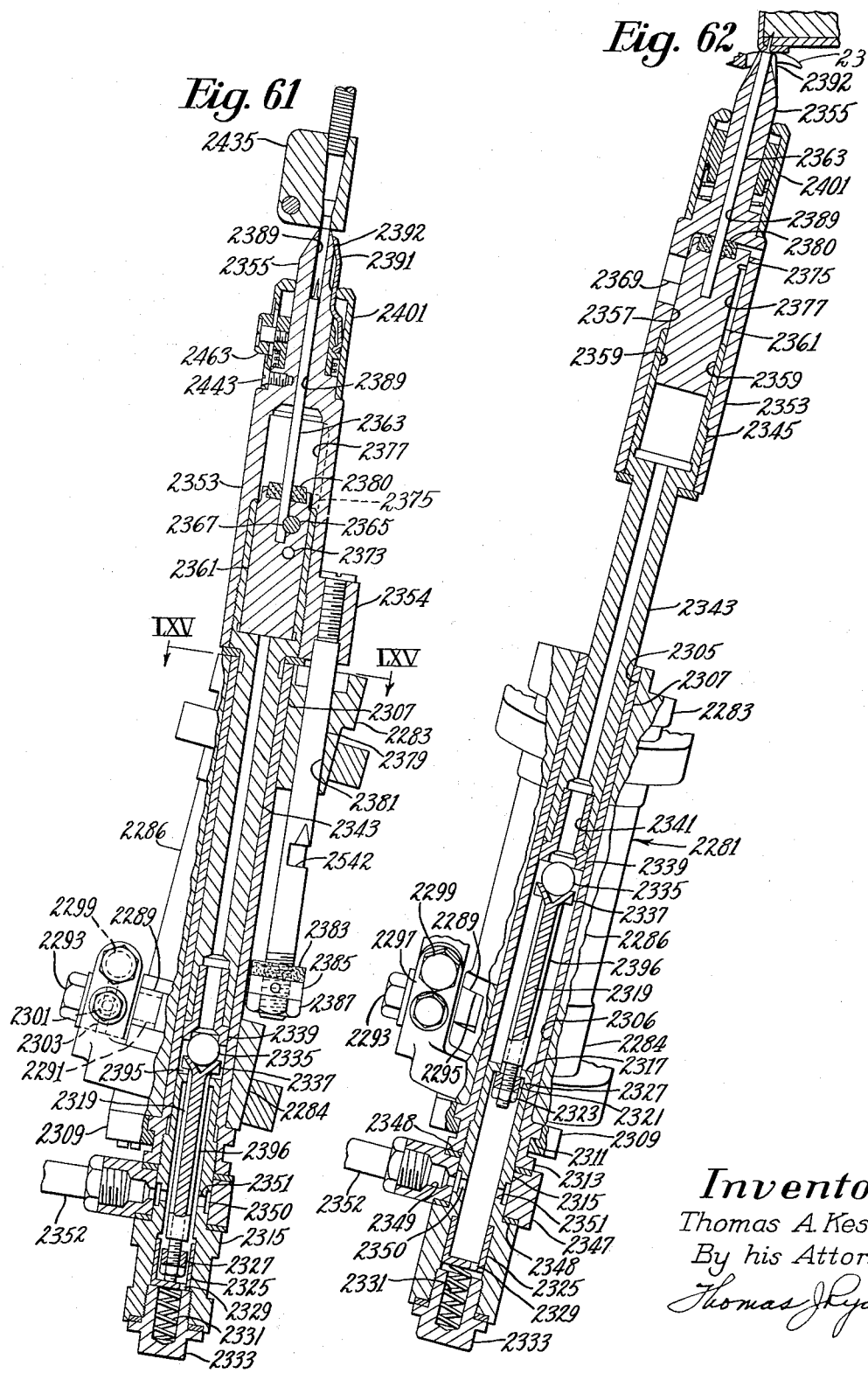
*Inventor*
Thomas A. Kestell
By his Attorney
Thomas J. Ryan June 12, 1956 T. A. KESTELL 2,749,562
MACHINES FOR SHAPING UPPERS OVER LASTS
Filed Dec. 24, 1954 49 Sheets-Sheet 42
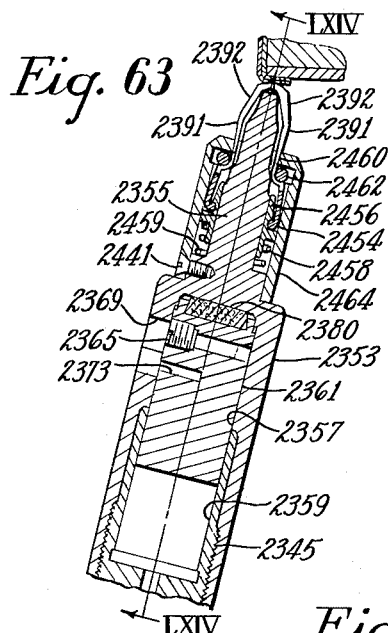
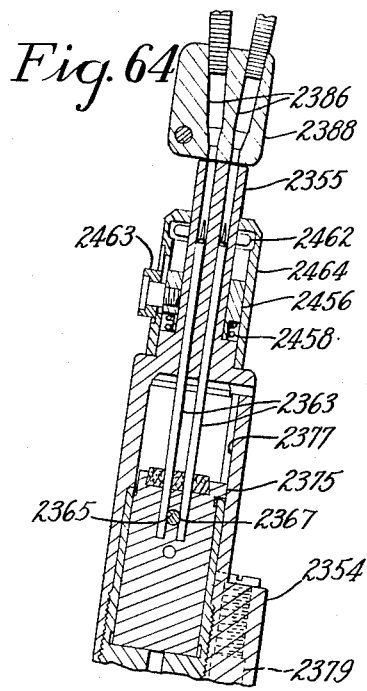
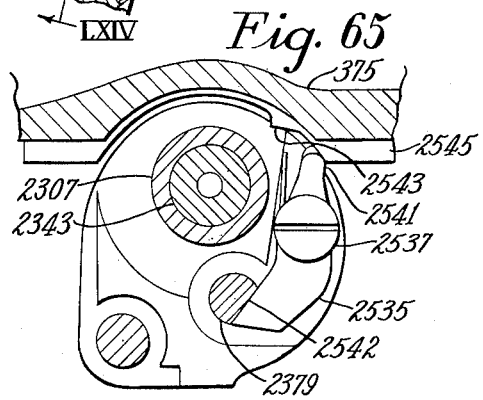
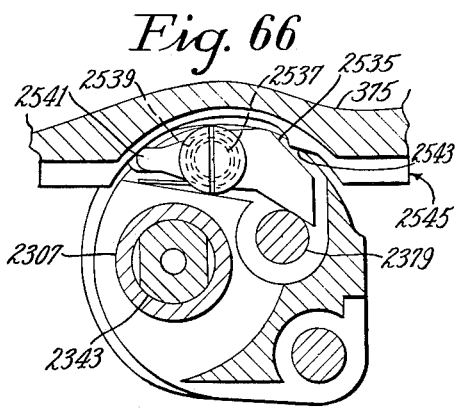
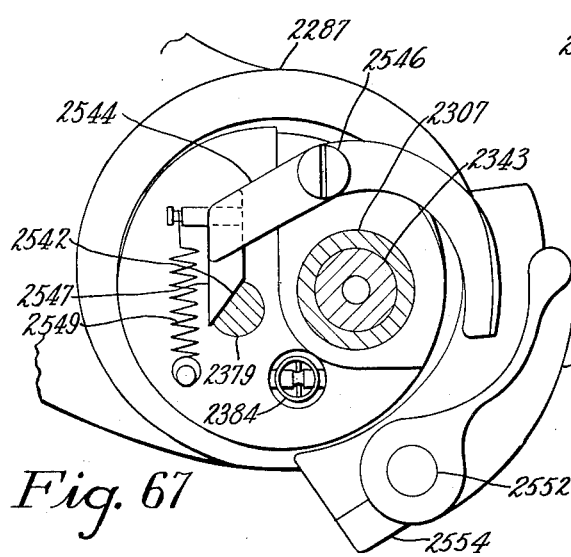
Inventor
Thomas A. Kestell
By his Attorney June 12, 1956     T. A. KESTELL     2,749,562
MACHINES FOR SHAPING UPPERS OVER LASTS
Filed Dec. 24, 1954     49 Sheets-Sheet 43
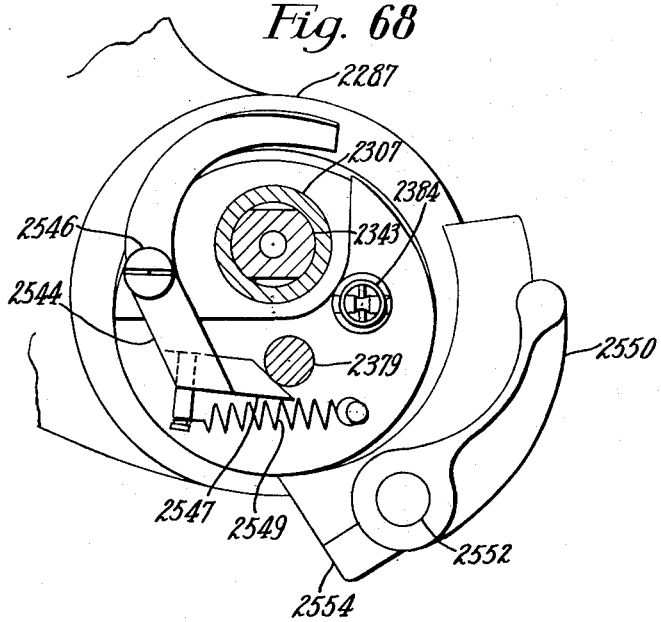
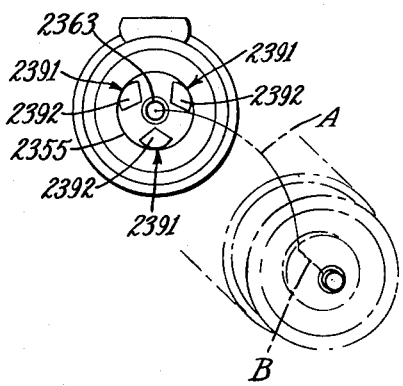
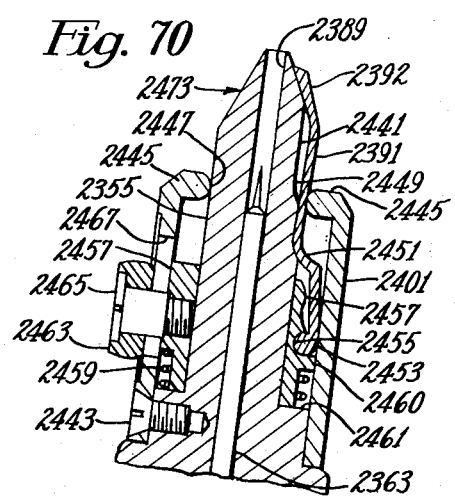
*Inventor*
Thomas A. Kestell
By his Attorney

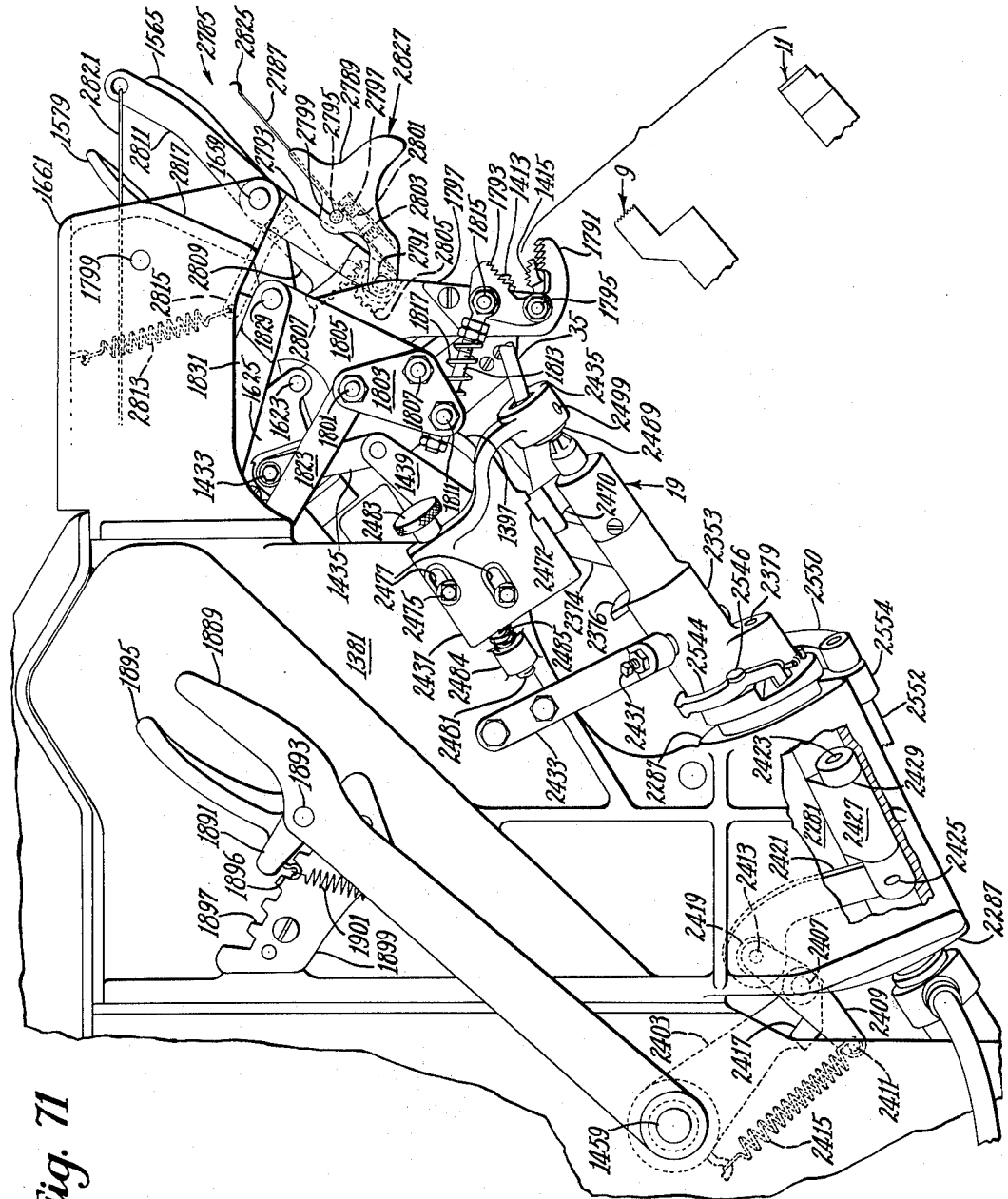

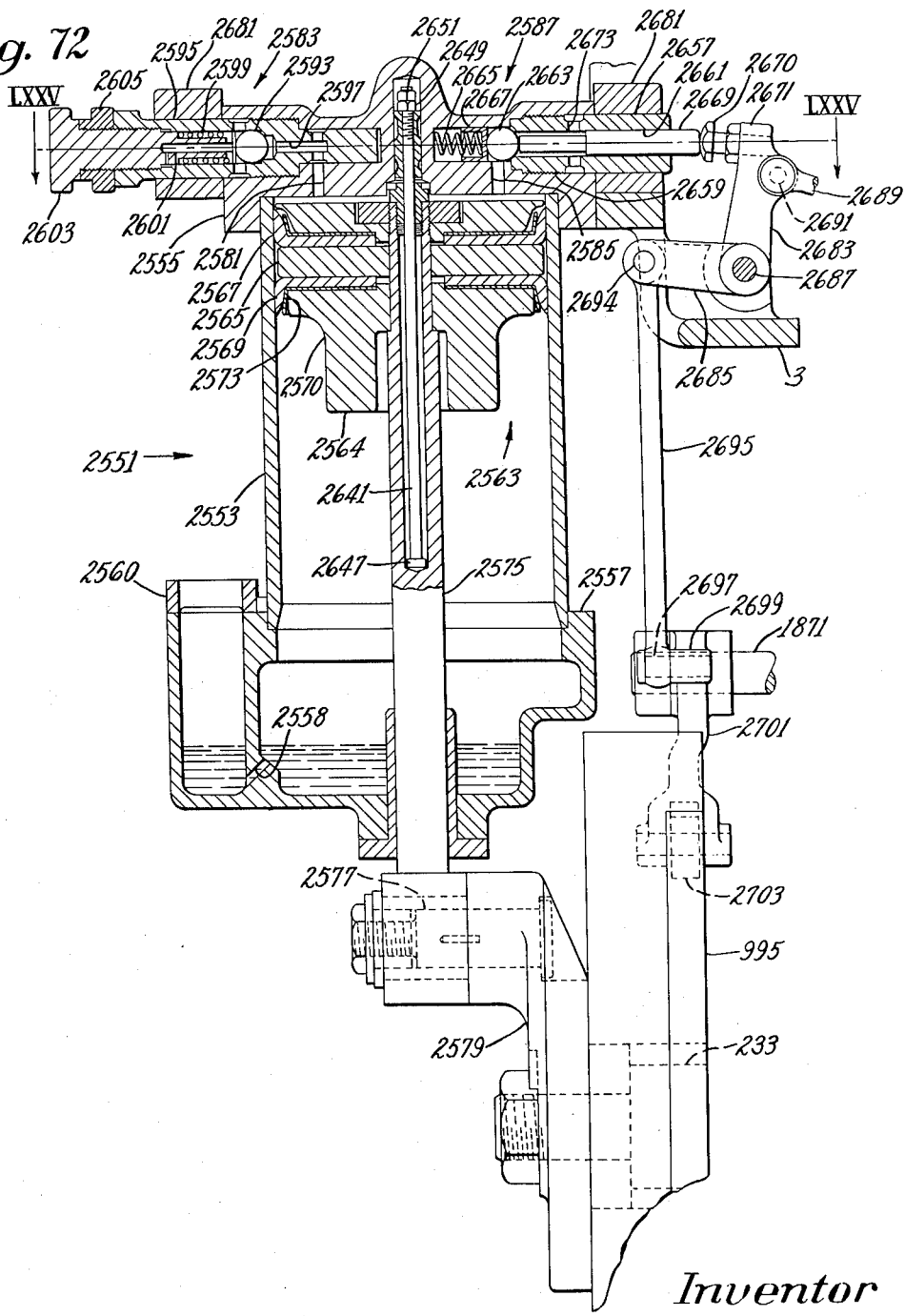

June 12, 1956  T. A. KESTELL  2,749,562
MACHINES FOR SHAPING UPPERS OVER LASTS
Filed Dec. 24, 1954  49 Sheets-Sheet 46
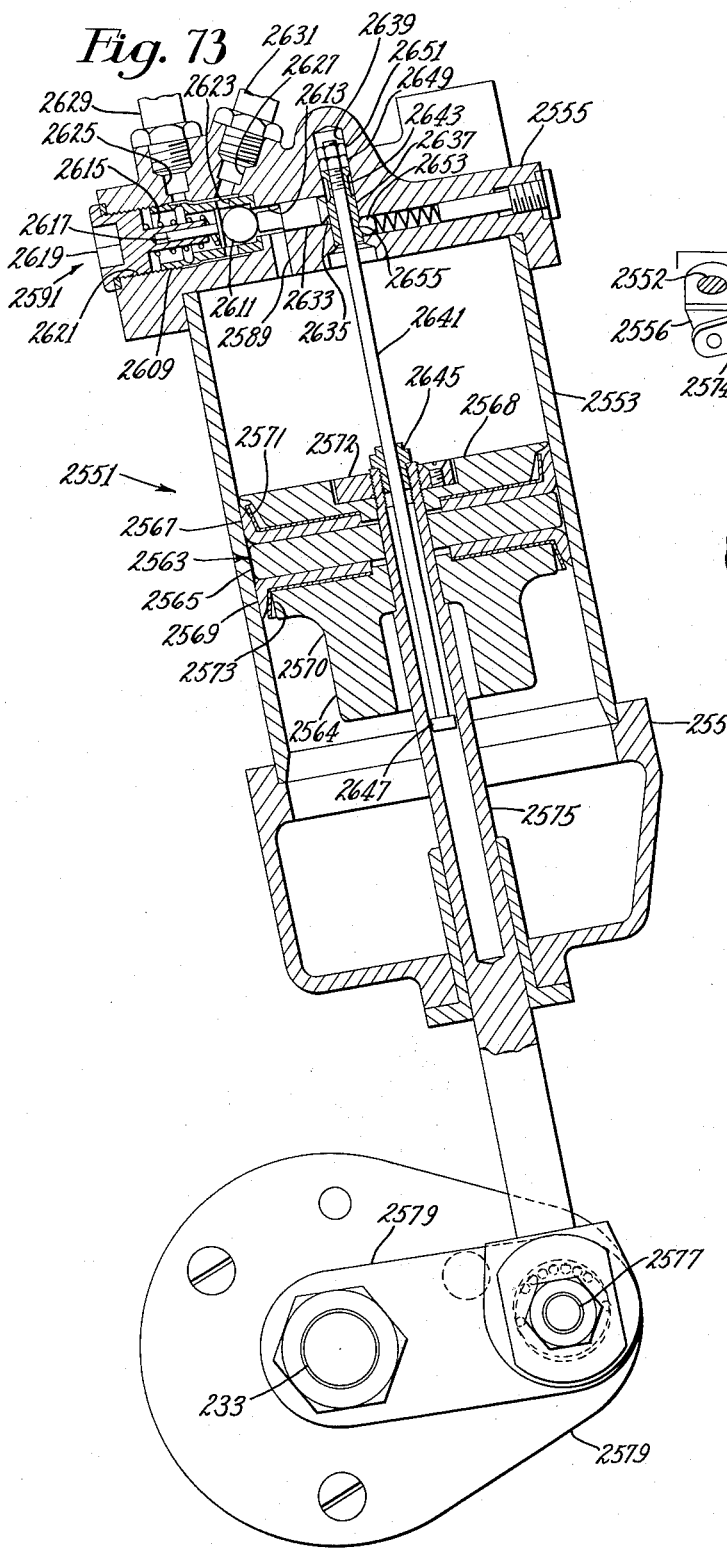
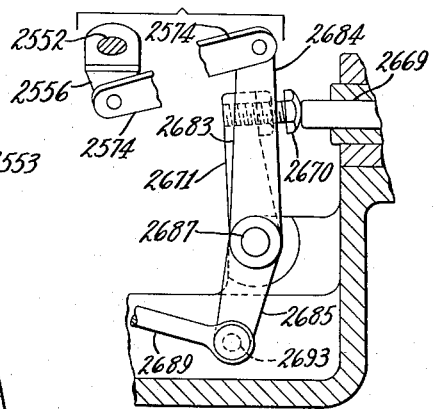
*Inventor*
Thomas A. Kestell
By his Attorney
Thomas J. Ryan Inventor
Thomas A. Kestell
By his Attorney
Thomas J. Ryan 2,749,562

MACHINES FOR SHAPING UPPERS OVER LASTS

Thomas Aubrey Kestell, Leicester, England, assignor to United Shoe Machinery Corporation, Flemington, N. J., a corporation of New Jersey Application December 24, 1954, Serial No. 477,561

91 Claims. (Cl. 12—10.4)

This invention relates to machines for shaping uppers over lasts and is herein illustrated as embodied in a pulling over machine of the so-called "inverted type." It will be understood, however, that various features of the invention are not limited to use in a pulling over machine of that particular type or to embodiment in the exact mechanical constructions herein illustrated.

Various objects of the invention include the provision of improved means for facilitating the introduction of the marginal portion of the upper materials between the open jaws of the upper gripper and tensioning devices; novel and improved units each comprising upper tensioning grippers, wiping or overlaying members, and fastener inserting devices for tensioning the upper at the toe end and at the opposite sides of the forepart of a last, for laying the lasting margin of the upper materials inwardly over the bottom of an insole on the last and for securing the lasting margin of the tensioned upper to the last in these respective locations; novel and improved means for operating the grippers, overlaying members and the fastener inserting devices, improved means for clamping the upper materials against the opposite sides of the last and for supporting the last during the operation of the fastener inserting devices; novel and improved fastener inserting devices movable from fastener receiving to fastener inserting positions, and an improved drive mechanism for operating the machine which includes novel means for turning the machine over by hand.

With the above and other objects and features of the invention in view, the herein illustrated machine is a pulling over machine of the so-called "inverted" type which, in common with machines of that general description, has a support for a last having an upper and insole assembled thereon, with the plane of the shoe bottom inclined at an angle of approximately 50° to the horizontal and facing away from the operator of the machine. For pulling the upper over the last, the machine is provided with a main toe gripper and two pairs of side grippers for operating, respectively, on each of the opposite sides of a shoe, the toe gripper preferably being fixed against movement in a direction extending lengthwise of a shoe in the machine and thereby serving as a stop against which the toe end of the last may be placed for locating the shoe in the machine in a direction extending lengthwise of its last. Associated with the toe gripper and with each of the two side grippers on each side of the shoe is an overlaying member, or wiper which is operable to lay the lasting margin of the tensioned upper materials inwardly over an insole on the bottom of the last and a fastener inserting device which is adapted, after receiving a fastener, such as a tack, to move to a fastener inserting position and to insert the fastener into the upper materials and the last.

In order to prevent movement of the last during the operation of the overlaying members and to support the shoe against the action of the fastener inserting devices, the herein illustrated machine is also provided with a heel rest adapted to be moved yieldingly into engagement with the heel end of the shoe and thereafter locked in position, and a pair of side clamps adapted to be moved yieldingly into engagement with the upper materials at the opposite sides of the shoe to clamp these materials against the last and means are provided for thereafter locking these side clamps in clamping position. As is common in machines of the type here under consideration, the herein illustrated machine is arranged to operate in a cycle having two definite stages, during the first of which the upper materials at the toe end and at the opposite sides of the last are seized by the toe and side grippers and are subjected to a tensioning pull for shaping the upper over the last, the machine then coming to a stop with the several grippers exerting their respective pulls on the upper materials. Before starting the machine again for the second stage of the operating cycle, during which the overlaying members are caused to lay the lasting margin of the upper materials inwardly over the insole on the bottom of the last and the fastener inserting devices are operated to insert fasteners for holding the upper in position on the last, the operator is afforded the opportunity of varying the intensity of the pull exerted by each of the different grippers and also of properly locating the upper on the last by suitable movements of the toe and/or side grippers, such locating of the upper materials including the so-called "throat opening" and "tip straightening" movements of the upper relatively to the last. To facilitate such relative movement of the upper over the last, the machine is provided with means for relieving the tension applied on the upper materials by one or more of the grippers.

With the view of facilitating the introduction of the lasting margin of the upper materials between the open jaws of the toe gripper, the herein illustrated machine is provided, in accordance with a feature of the invention, with novel and improved auxiliary toe grippers which are operated automatically by power means to subject the upper to a preliminary pull prior to the closing of the jaws of the main toe gripper. As a result of this preliminary pull, the upper materials at the toe end of the shoe are pre-stretched and are drawn into the open jaws of the toe gripper, thus eliminating the need for the usual hand or bench pincering of the upper at the toe end of the shoe before it is presented to the machine. Subsequently, when the jaws of the toe gripper have been closed during an early part of the first stage of the operating cycle of the machine, the jaws of the auxiliary toe gripper are opened and retracted to a remote position out of the way of the main toe gripper as it is operated to tension the upper materials over the toe end of the last. Preferably, and in the herein illustrated machine, these auxiliary toe grippers are arranged for movement by the operator to a still further retracted position in which they operate idly, when it is desired to dispense with their action.

In order to accommodate different upper materials, the mechanisms for operating the toe gripper and the side grippers are adjustable to vary the intensity of the pull applied and, in accordance with features of this invention, these gripper operating mechanisms are so arranged that the pull applied for any given adjustment remains substantially constant irrespective of variations in the "tightness" of the upper materials from shoe to shoe. Thus, in the case of the toe gripper, the operating mechanism is actuated by means of a cam which operates through a linkage arrangement including a spring which may be adjusted to vary the intensity of the pull, and adapted by changes in the angularity of certain links thereof substantially to cancel out changes in the spring loading due to differences in the amount of movement of the toe gripper in operating on upper materials of different "tightness." In the case of the side grippers, which are also operated through a cam and adjustable springs, two fluid pressure operated devices are provided, one for the pair of side grippers on each side of the shoe, for measuring the fullness of the upper materials and for insuring that, although in pulling the upper the side grippers may move through different distances, the upper materials will always be subjected to a tensioning pull of the same intensity, as determined by the setting of the aforementioned springs. More particularly, these fluid pressure measuring devices comprise dashpots having control valves which are automatically opened and closed during the application of the pull on the upper.

As indicated above, the herein illustrated machine is provided with two side grippers for tensioning the upper on each of the opposite sides of the last and the two grippers on each side of the last are mounted on a carrier. These carriers are each mounted for rectilinear adjusting movements to carry their associated grippers toward or away from the side of a shoe in the machine and also for pivotal movement about an axis extending in a direction substantially perpendicular to the bottom of the shoe and lying midway between the two grippers. Further, the machine has mechanism by means of which the operator may effect movement of the carriers to adjust the position of the side grippers for accommodating shoes of different sizes. In order to facilitate the presentation of a shoe to the machine, the side gripper carriers are thus initially positioned so that the outer jaws of the side grippers are spaced somewhat from the opposite sides of the shoe. In accordance with a further feature of the invention the herein illustrated machine is also provided with mechanism which operates automatically, during the beginning of each operating cycle, to effect first a movement of the carriers inwardly to bring the outer jaws of the side grippers into contact with the opposite sides of the last and thereafter to withdraw the carriers to positions in which the grippers are spaced predetermined distances from the opposite sides of the last. As the outer jaws of the side grippers are in this manner brought into contact with the opposite sides of the last, the carriers are caused to swing about their pivotal axes thereby "squaring" the grippers with respect to the sides of the last. Also, if the insole is loosely assembled on the forepart of the last it will be shifted laterally and thus located in proper position on the bottom of the last by the grippers. Preferably, as is herein illustrated, means are also provided for holding the carriers in the angular positions to which they are thus swung as a result of the engagement of the gripper jaws with the sides of the last when the carriers are thereafter withdrawn and during the subsequent operation of the fastener inserting devices. The side fastener inserting devices are, as already suggested, mounted on the side gripper carriers and are adapted to be moved relatively to the carriers through predetermined paths from fastener receiving to fastener inserting positions. Hence, by thus withdrawing the carriers to positions in which the side grippers are spaced predetermined distances from the opposite sides of the last, the fasteners which are inserted by the side fastener inserting devices will be located predetermined distances from the marginal edge of the shoe bottom, regardless of variations in the size of the shoe or its exact location laterally in the machine.

With further reference to the side grippers, the two grippers which are associated with each carrier are mounted on a supporting member and these supporting members are mounted for independent yielding movements during the heightwise movement of the carrier to cause the grippers to apply a tensioning pull on the upper materials seized thereby. Preferably, and in the herein illustrated machine, the grippers are mounted on their respective supporting members for rocking, or pivotal movement about an axis extending substantially perpendicular to the direction of movement of the supporting member, during the tensioning of the upper materials, and also perpendicular to the marginal edge of the bottom of the last. Thus each gripper is free to rock about this pivotal axis so that the pull applied by the two grippers on the upper materials at each side of the last will be equalized and evenly applied to the upper materials regardless of differences in the extent of heighwise movement of each gripper. In order to facilitate the operation of the overlaying members in laying the lasting margin of the upper materials inwardly over the bottom of the insole on the last prior to the insertion of the fasteners by the fastener inserting devices, the members which support the side grippers are adapted to be moved, relatively to the carriers, in directions to withdraw the side grippers outwardly and away from the opposite sides of the last, immediately after the grippers have released the upper materials.

The overlaying, or wiping, members associated with the side grippers are operated by mechanism which also controls the opening of the side grippers so that the action of the wiping members may be accurately timed to take control of the upper materials immediately as these materials are released by the side grippers, thus minimizing the risk of the tension of the upper materials being lost. In the case of the overlaying, or wiping, member which is associated with the toe gripper, in the herein illustrated machine the movement of the toe wiping member to lay the lasting margin of the upper materials inwardly over the toe end of the shoe is effected by means of a spring which is adapted to be compressed during the pulling action of the toe gripper, and, upon the release of the upper materials by the toe gripper, a latch device is tripped to permit this spring to expand and to move the wiping member quickly in a direction to wipe the upper materials over the insole at the toe end of the last. As is usual in machines of the type here under consideration, manually operable means are provided for opening the jaws of the toe gripper and for manipulating the toe gripper. In order to prevent the operation of the toe wiping member when the jaws of the toe gripper are thus manually opened, the herein illustrated machine is provided with an additional latch means which is adapted to hold the toe wiper against movement by its associated spring when the toe gripper is being manipulated by the manually operable means.

For clamping the tensioned upper materials against the opposite sides of the last and for supporting the shoe against movement in a heightwise direction, during the operation of the fastener inserting devices, the herein illustrated machine is provided with a pair of members which are movable yieldingly into clamping engagement with the upper materials at the opposite sides of the last prior to the release of the upper materials by the side grippers. Thereafter, in accordance with a feature of this invention, these members are positively held in clamping position by means of pawl-and-ratchet mechanisms during the operation of the fastener inserting devices, thereby providing a firm and rigid support for the shoe.

As suggested above, the fastener inserting devices are each mounted on the carriers which support the toe and side grippers, respectively, and are movable relatively to these carriers from fastener receiving to fastener inserting positions. Preferably, and in accordance with a feature of this invention, in the herein illustrated machine such movements of the fastener inserting devices take place along paths that include a rectilinear portion extending generally heightwise of the shoe and an arcuate portion extending generally laterally of the shoe and the movement of the fastener inserting devices along these portions of their paths of movement are effected, respectively, by mechanical means and by fluid pressure operated means, the latter, which comprises air-operated pistons, being further adapted to operate the fastener inserting drivers after the fastener inserting devices have been moved to their fastener inserting positions. In order to hold the fastener inserting devices in their fastener inserting positions, latch means are provided which, after the fasteners have been inserted, are released to free the fastener inserting devices for return to their fastener receiving positions.

The herein illustrated machine is driven from a source of power, such as an electric motor, through a drive mechanism including a clutch, a brake, and suitable gearing by means of which the cam shaft for operating the grippers, wipers and fastener inserting devices is rotated through substantially a half turn and then is brought to a stop to provide the usual dwell period. After the operator of the machine has made whatever adjustments he deems necessary in the position of the upper on the last and/or in the intensity of the pull applied by the toe and/or side grippers, the machine is again started and the cam shaft completes its full turn. Alternately, the operator, by suitable control means associated with the aforementioned gearing, may cause the cam shaft to be driven reversely back to its starting position, if he desires to release the upper materials without completing the pulling over operation and without the insertion of fasteners. In order to facilitate the turning of the aforementioned cam shaft by hand, as may be desirable when making certain adjustments of the various operating elements of the machine, the herein illustrated machine is, in accordance with a feature of the invention, provided with a manually operable member which is normally disconnected from the cam shaft but which is movable to an operative position in which it is connected to the cam shaft. With a view of avoiding possible injury to the operator, means associated with the drive mechanism are provided, for preventing the movement of this manually movable member to its operative position, when the cam shaft is connected to the source of power by the clutch. Similarly, means are provided for preventing the operation of the clutch mechanism to connect the source of power to the cam shaft when the aforementioned manually movable member is in its operative position.

The above and other objects and features of the invention will appear in the following detailed description of the preferred embodiment which is illustrated in the accompanying drawings, and will be pointed out in the claims.

Figure 5:
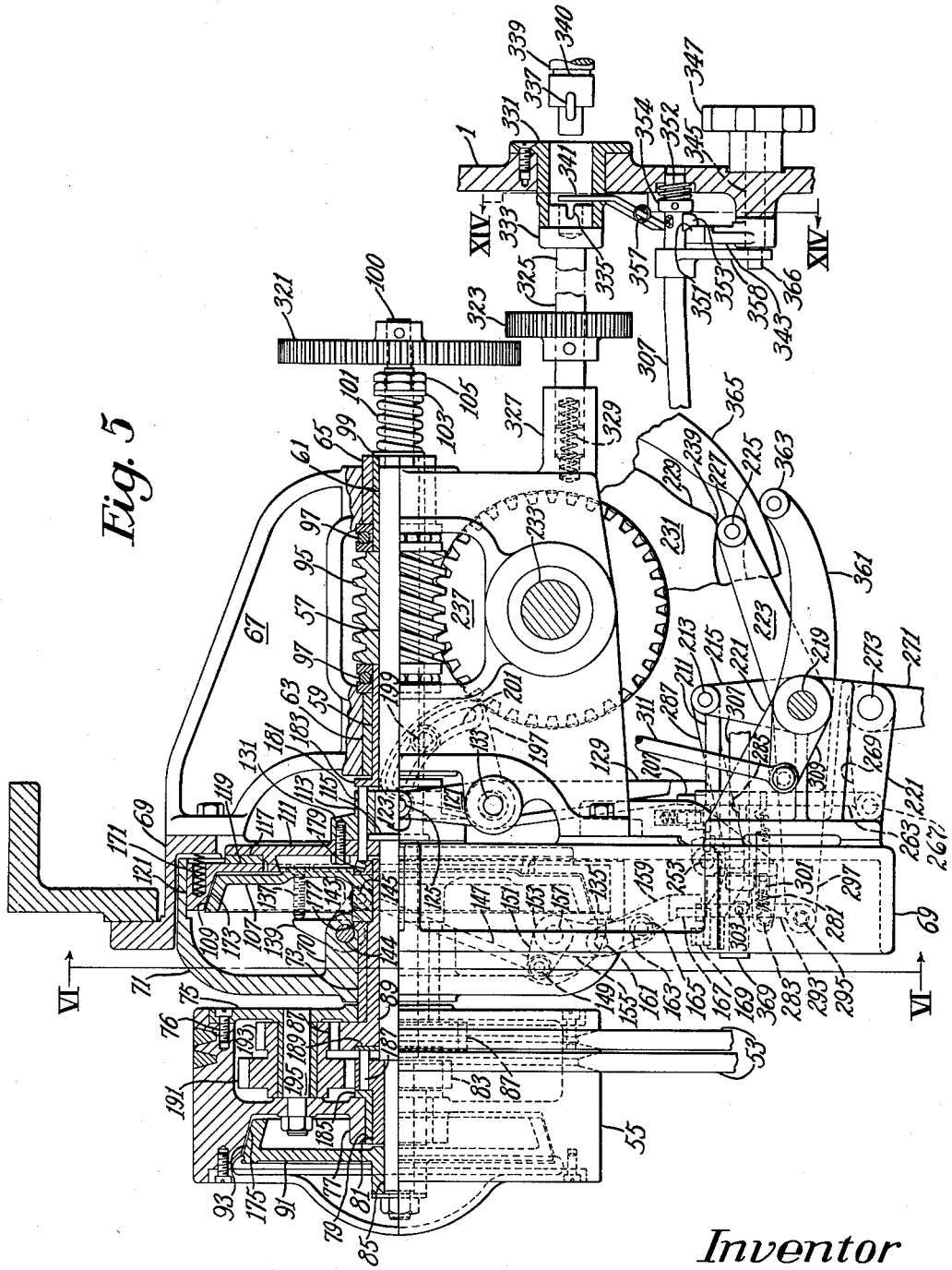
Fig. 5 is a view in side elevation, partly in section and with parts broken away, of clutch mechanism and parts associated therewith with which the machine is provided.
Figure 12:
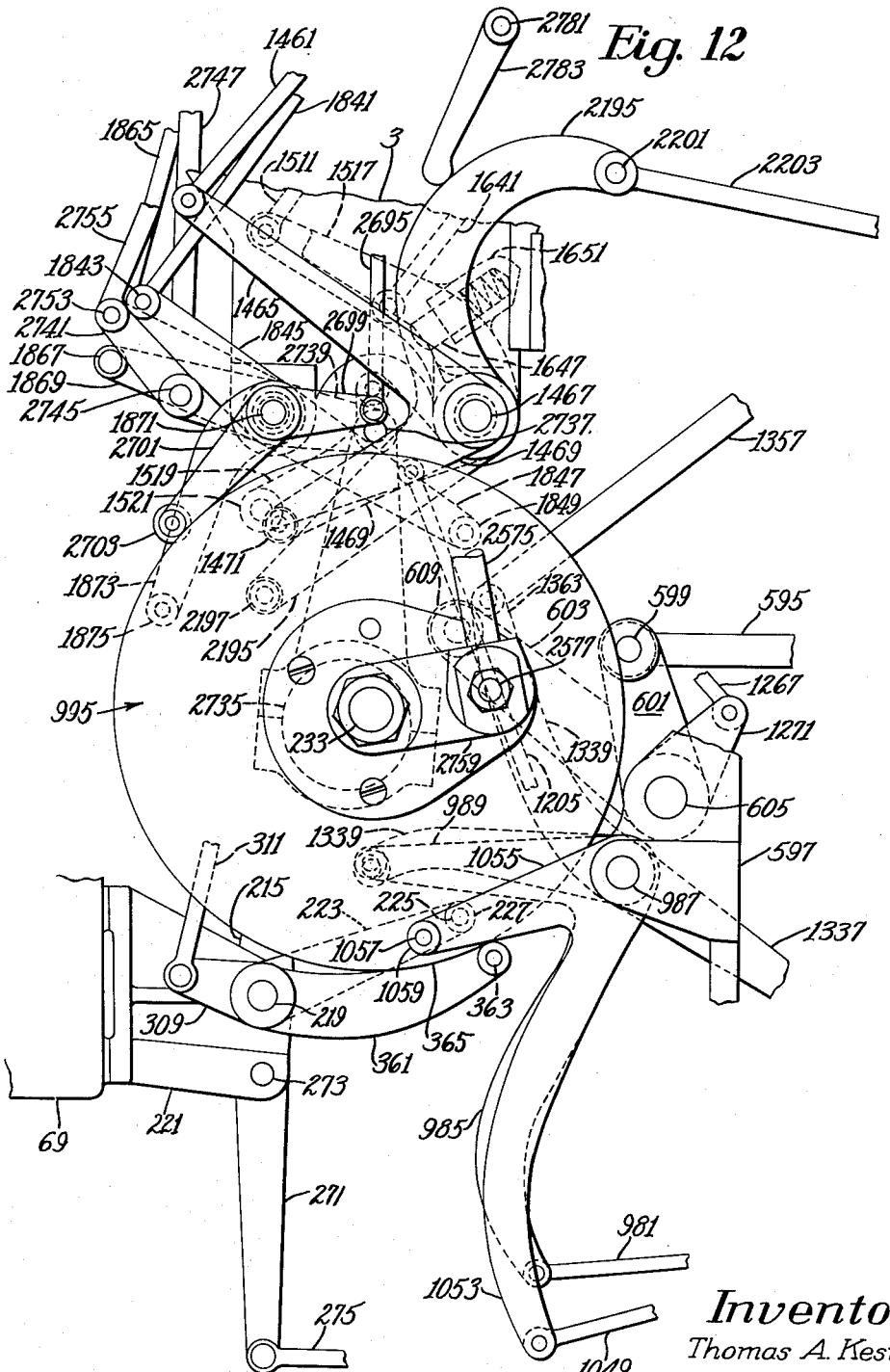
Figure 16:
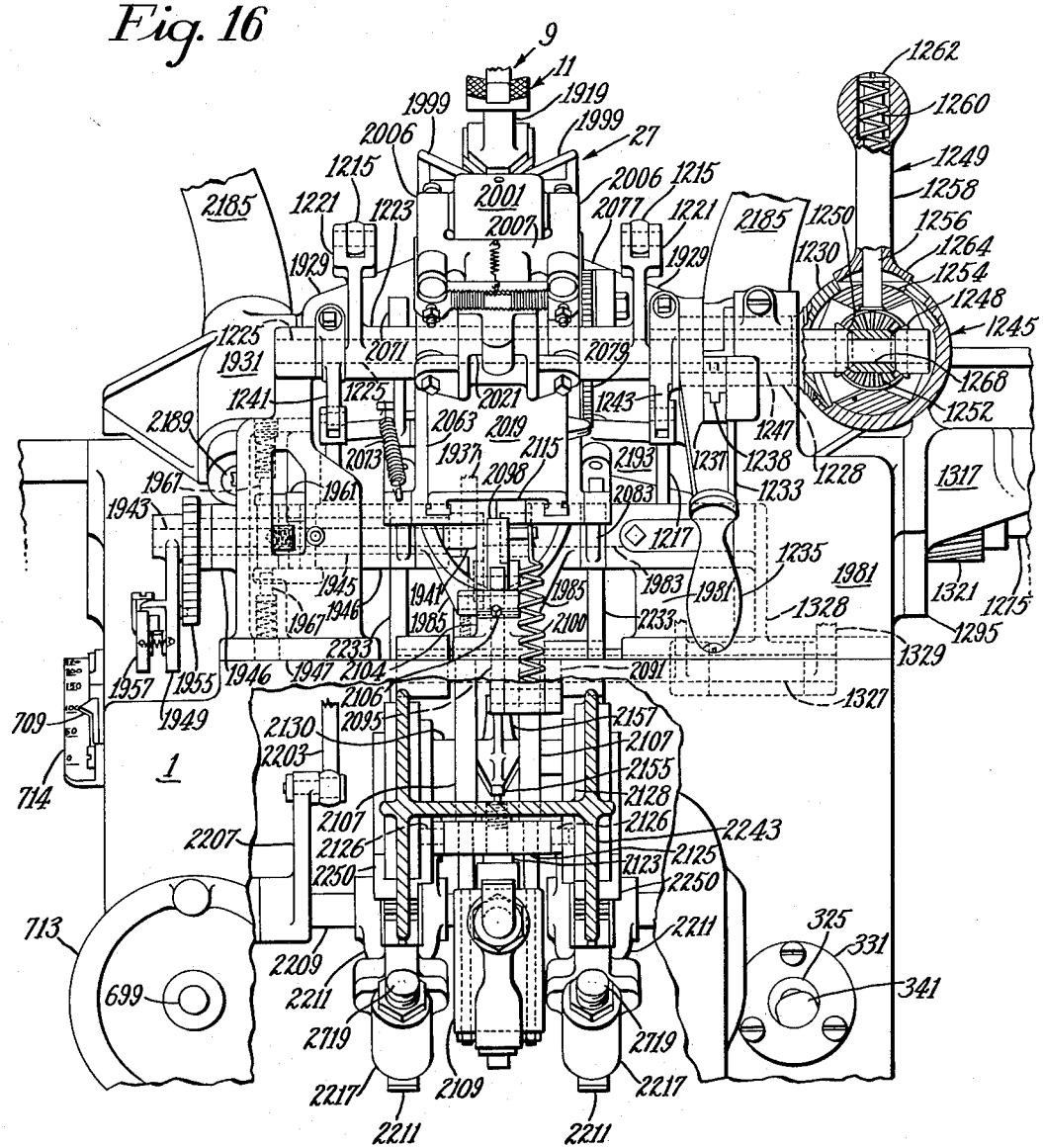
Figure 17:
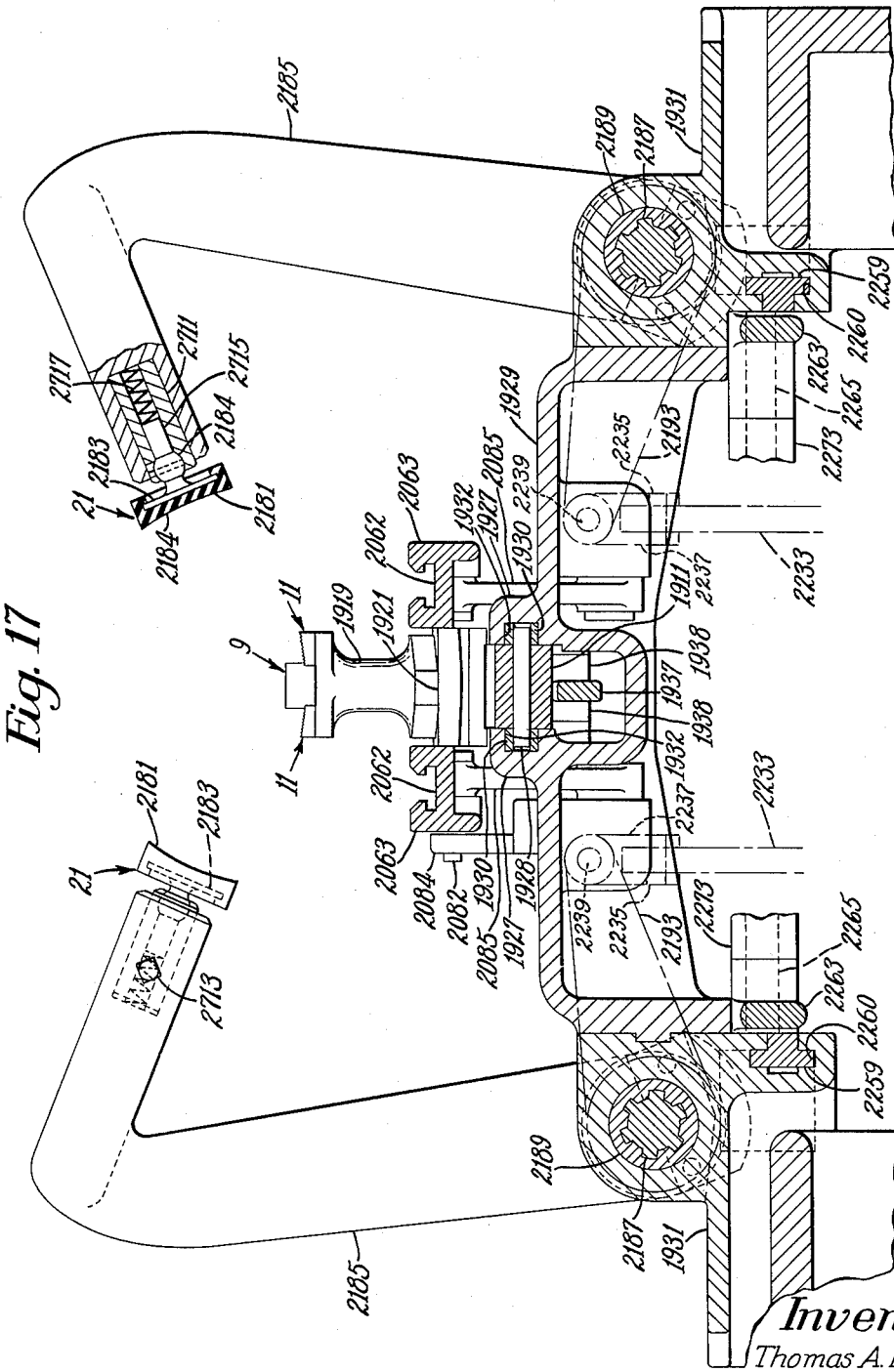
Figure 18:
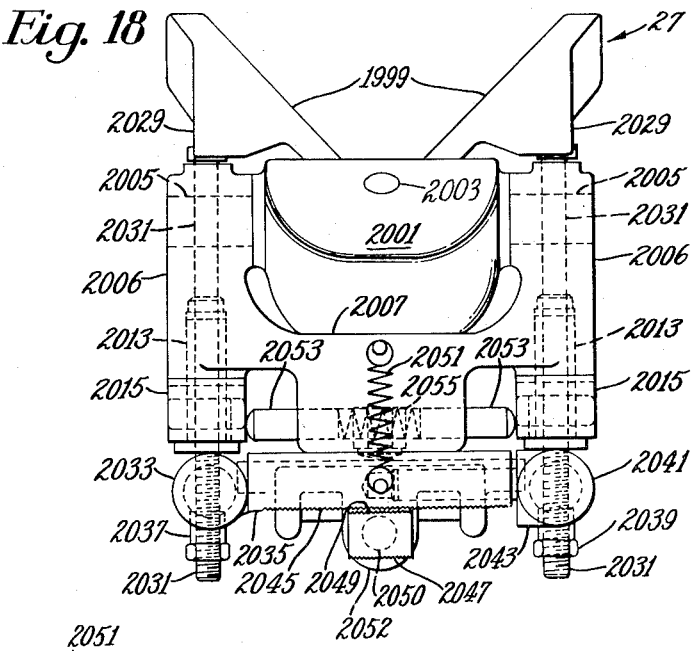
Figure 19:
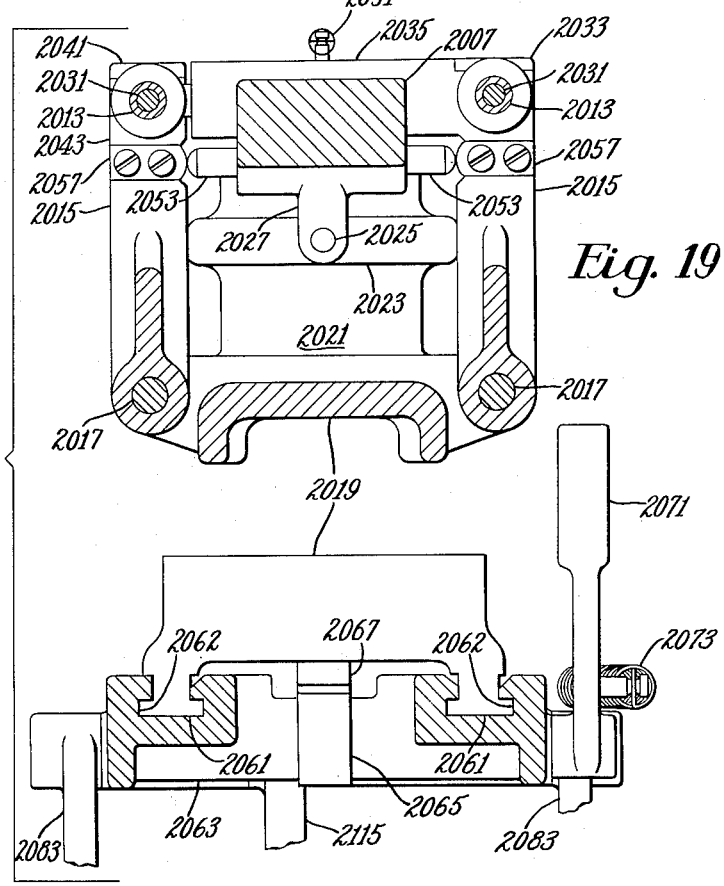
Figure 28:
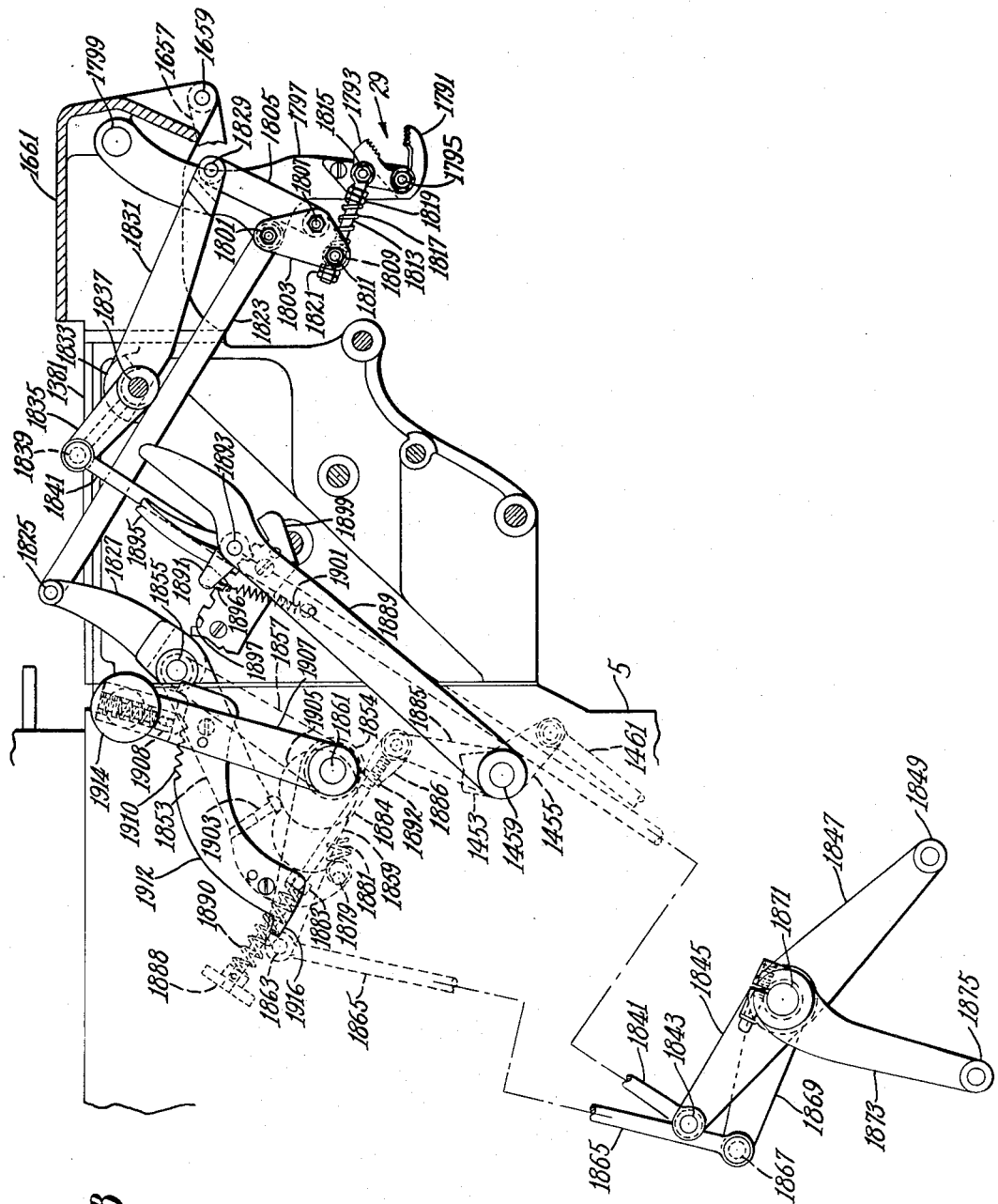
Figure 31:
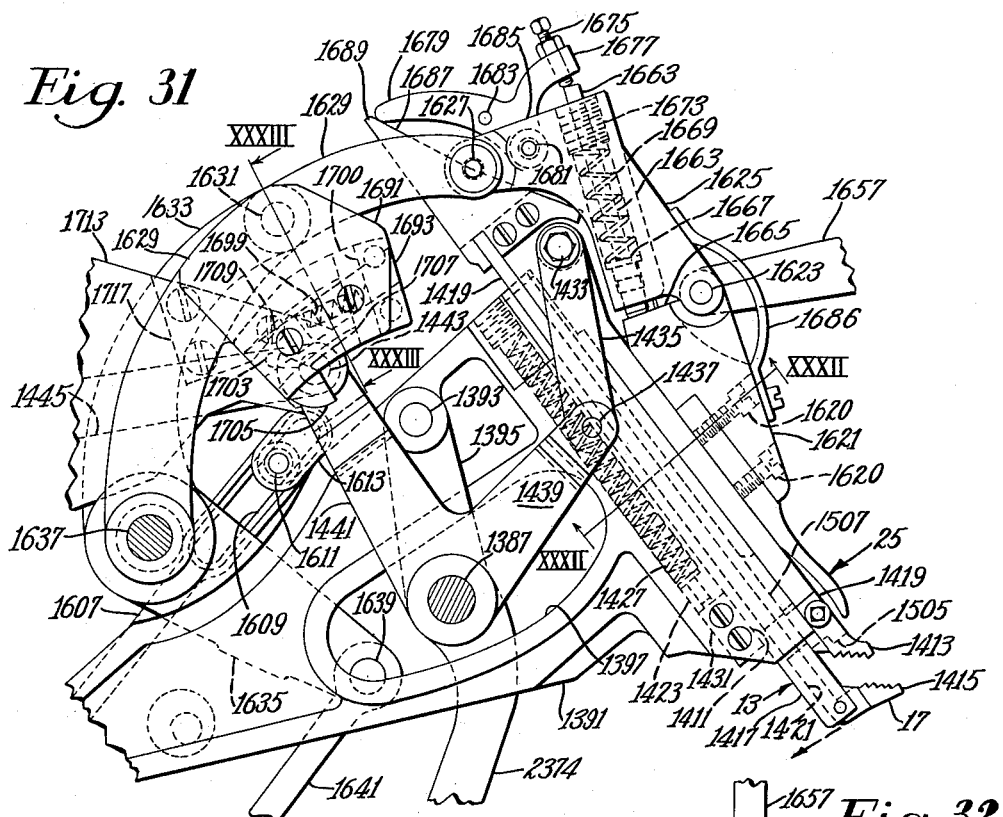
Figure 33:
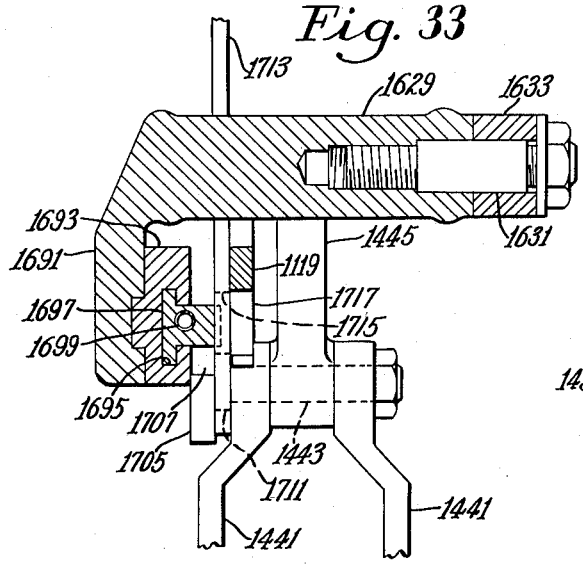
Figure 32:
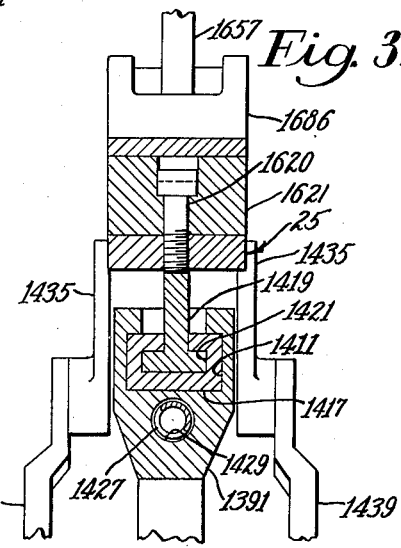
Figure 37:
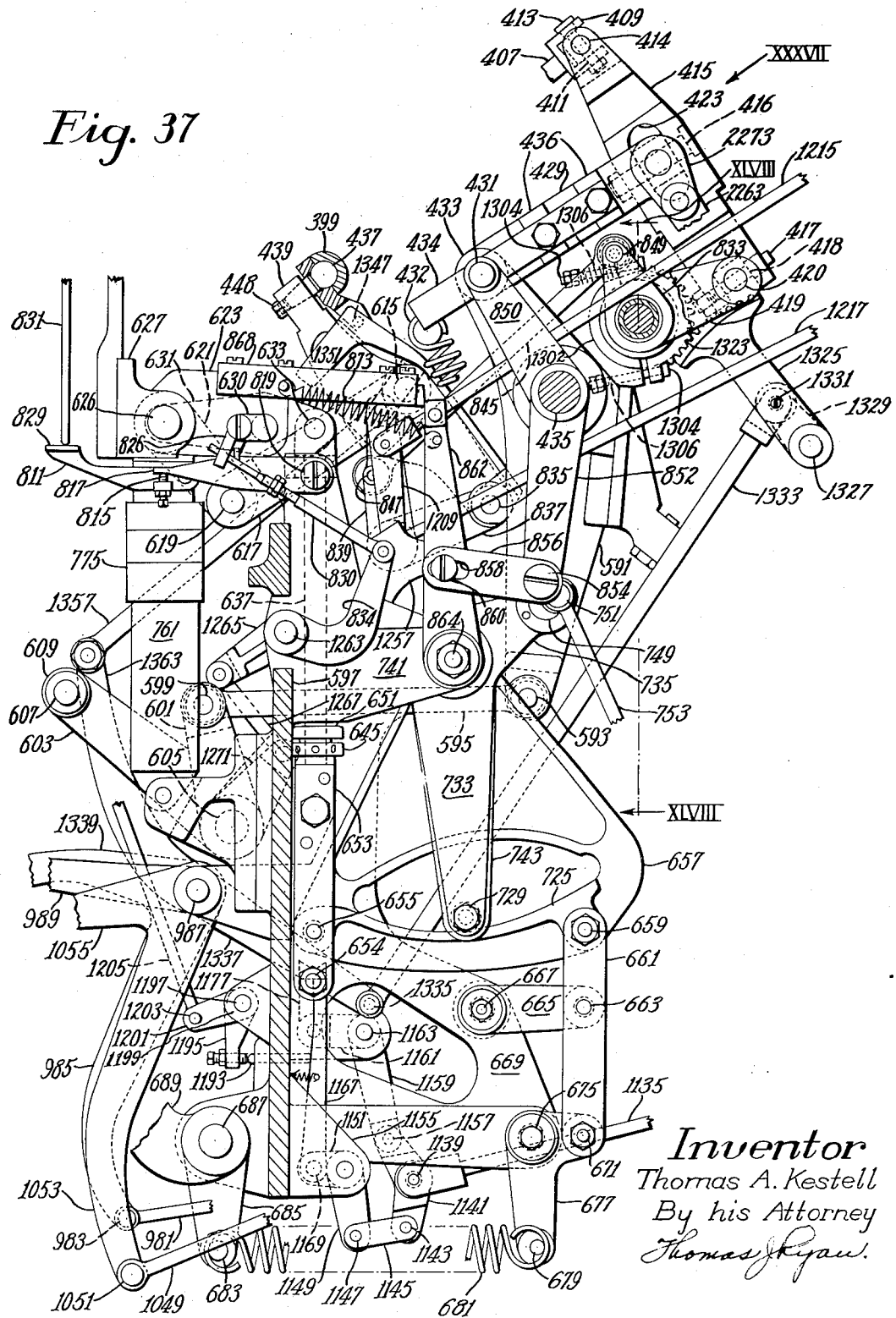
Figure 38:
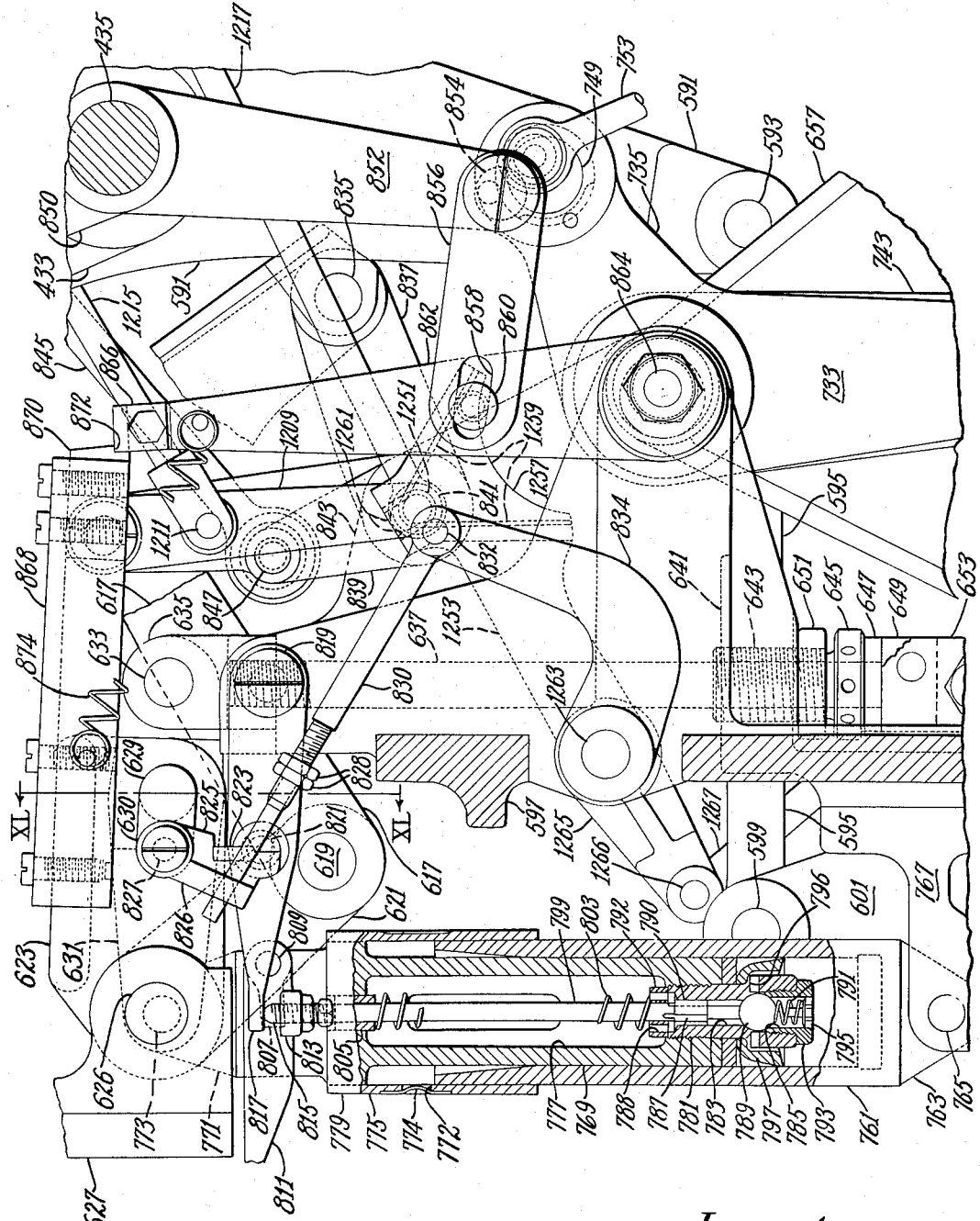
Figure 39:
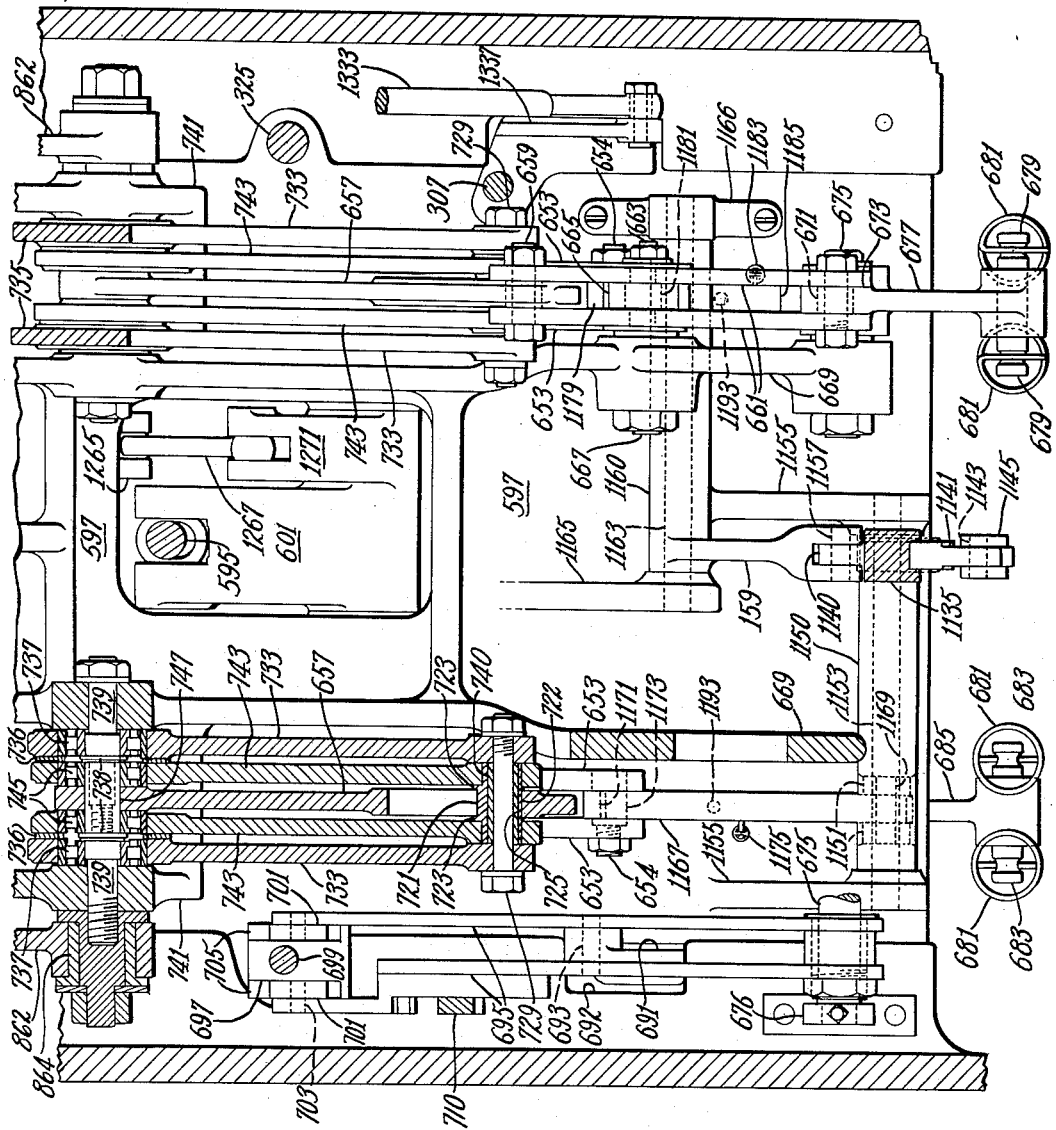
Figure 40:
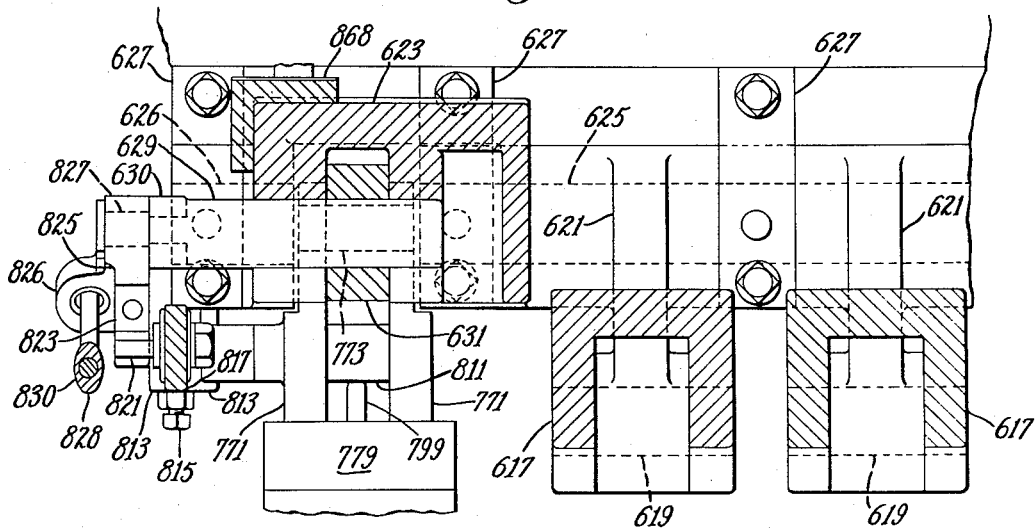
Figure 41:
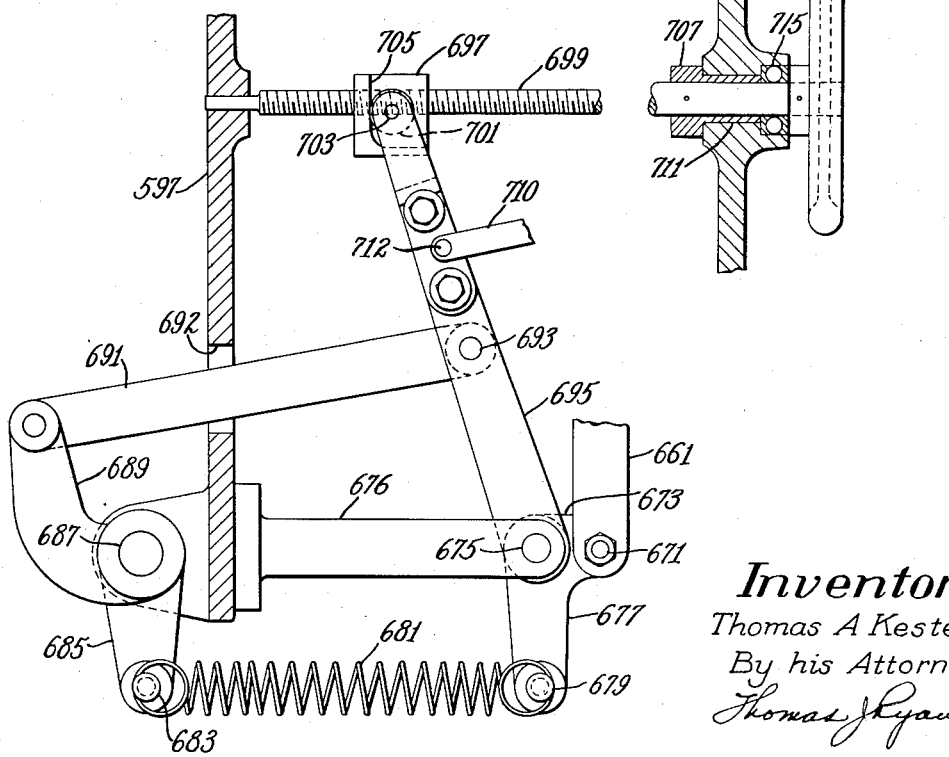
Figure 43:
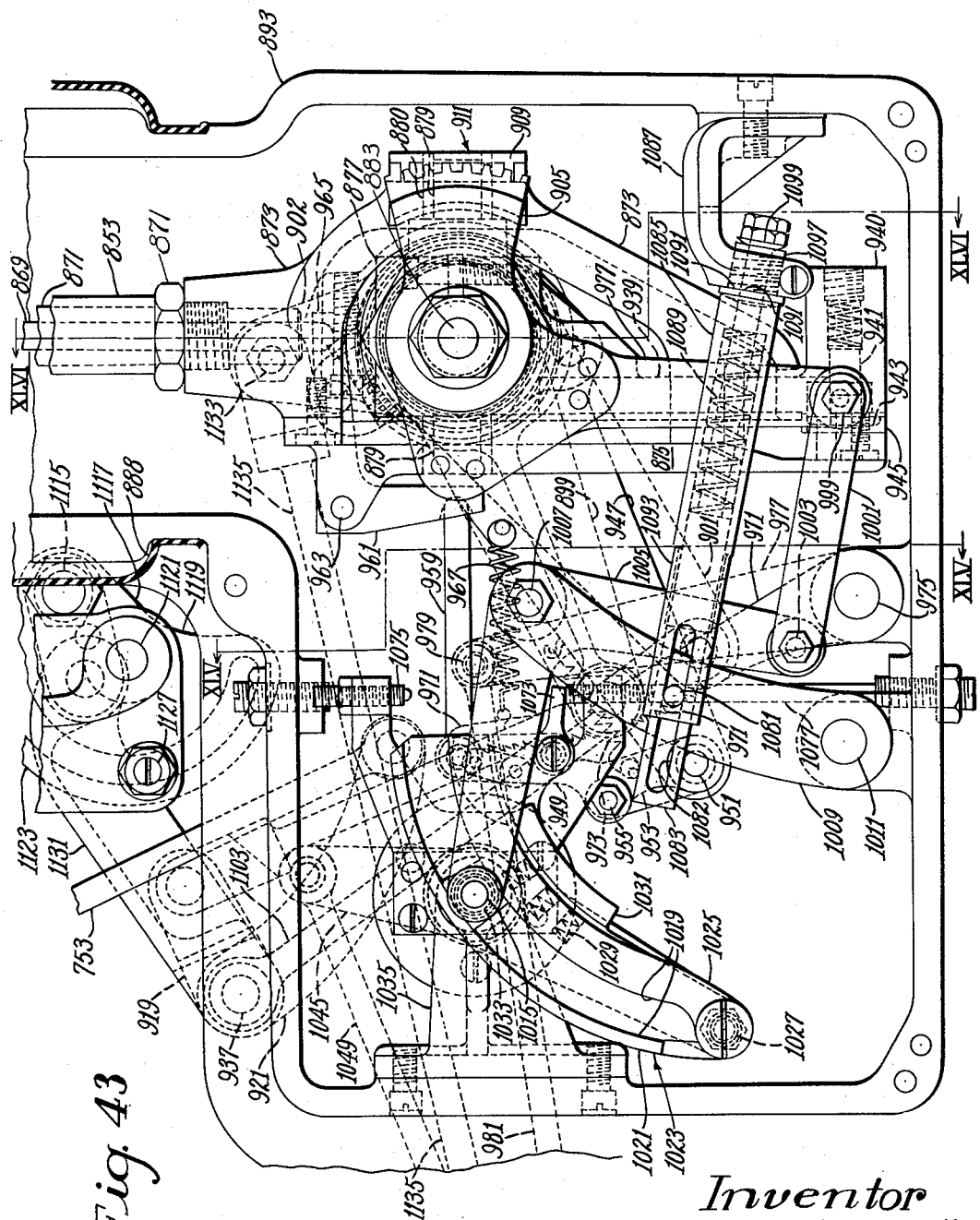
Figure 44:
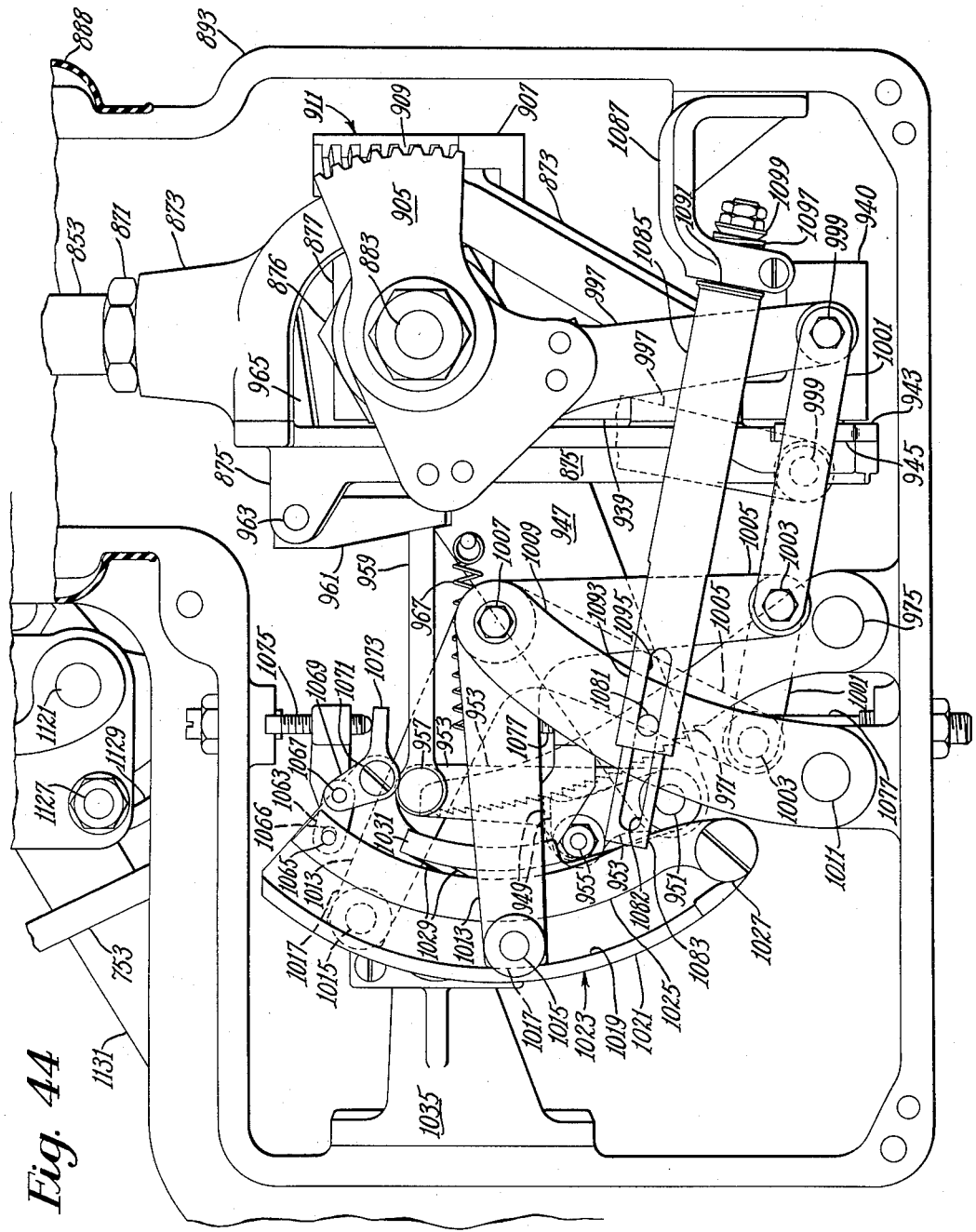
Figure 46:
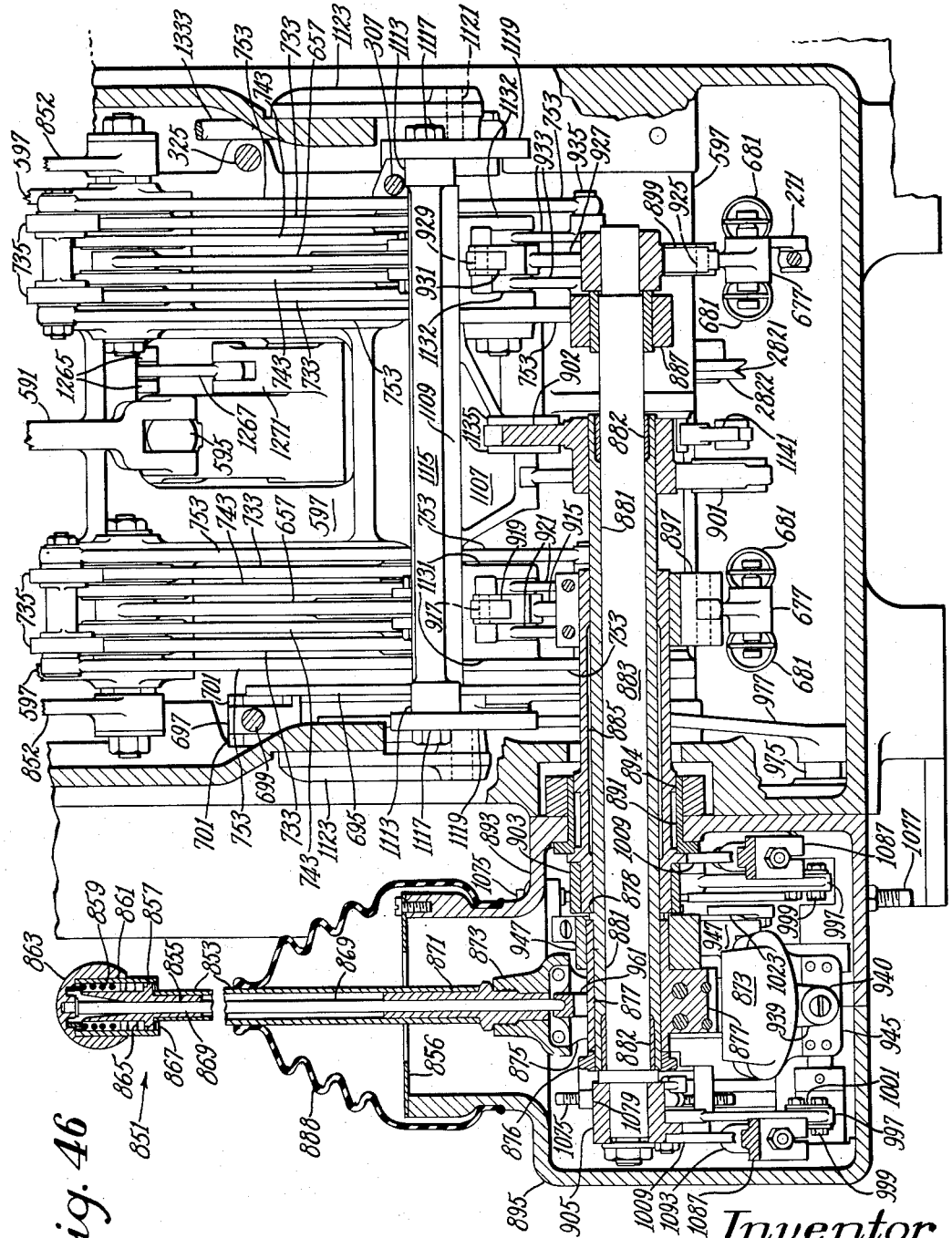
Figure 47:
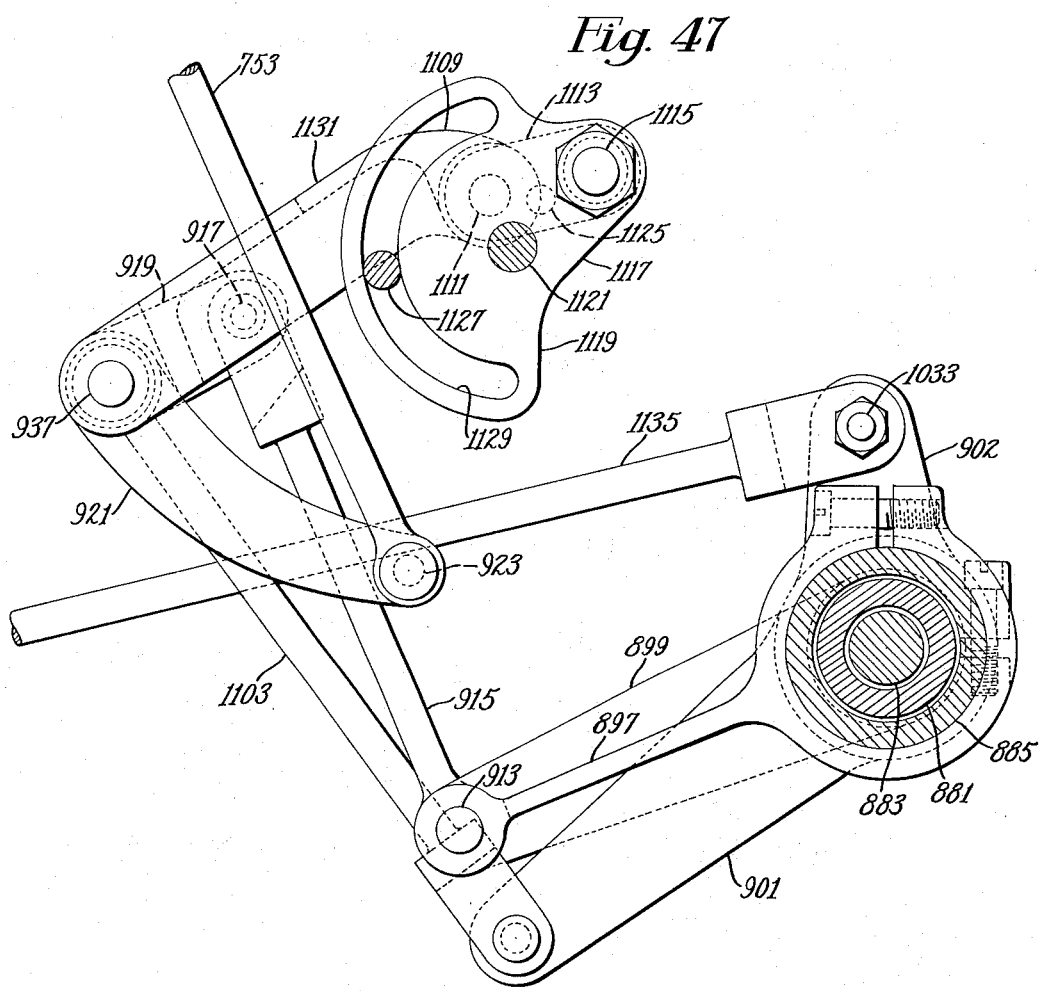
Figure 50:
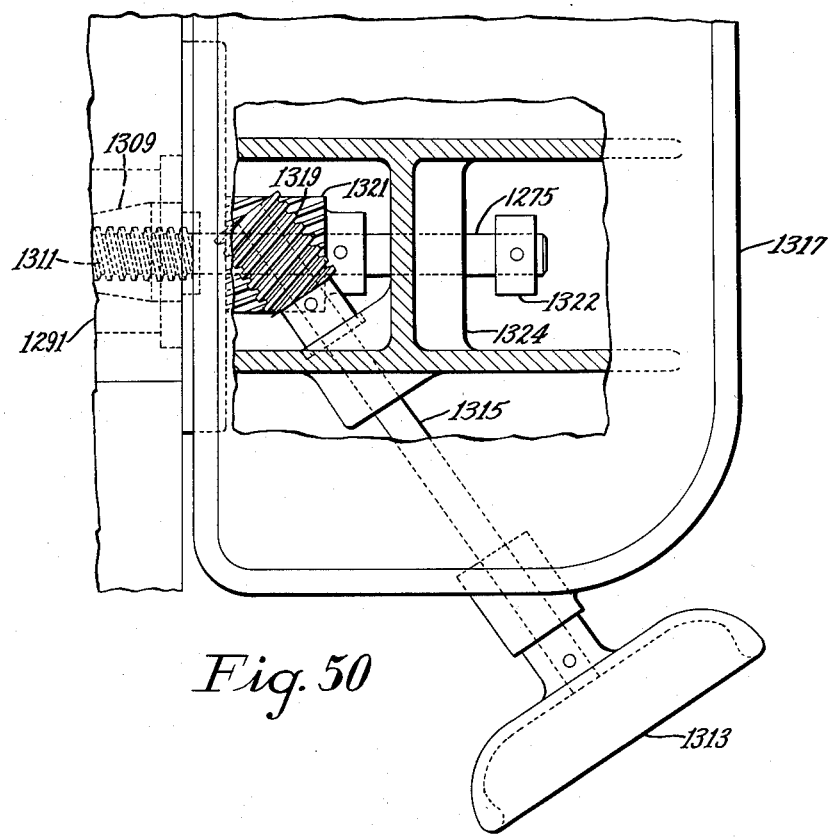
Figure 49:
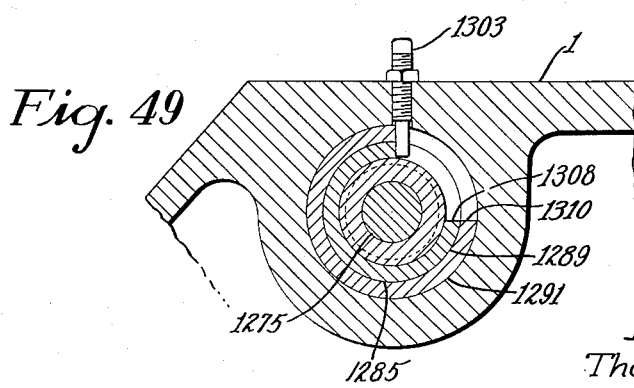
Figure 53:
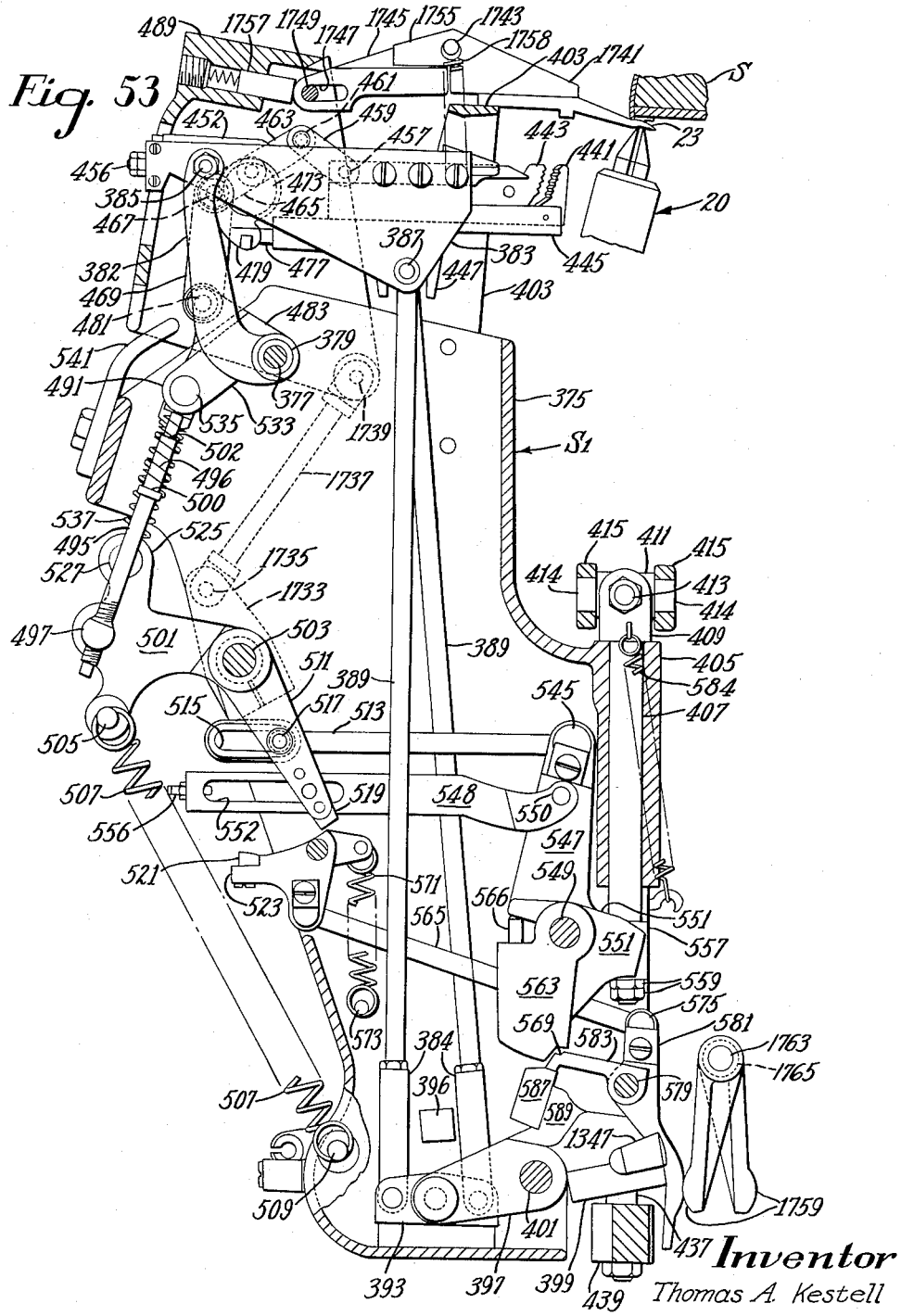
Figure 54:
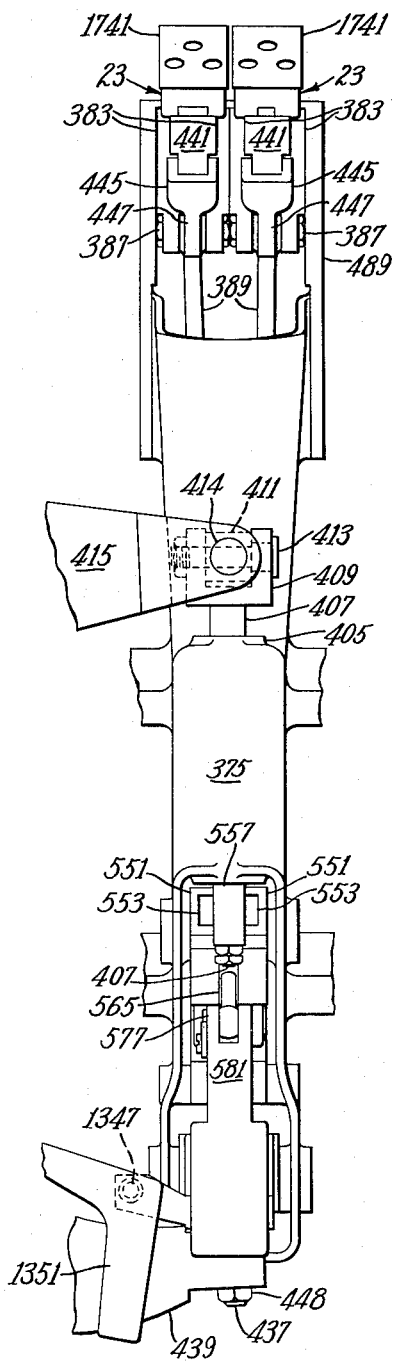
Figure 55:
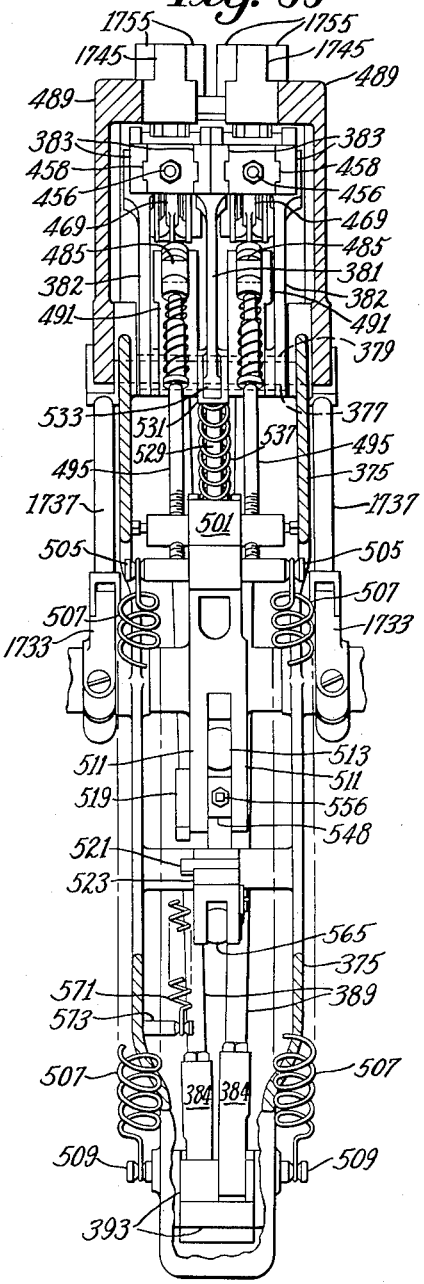
Figure 75:
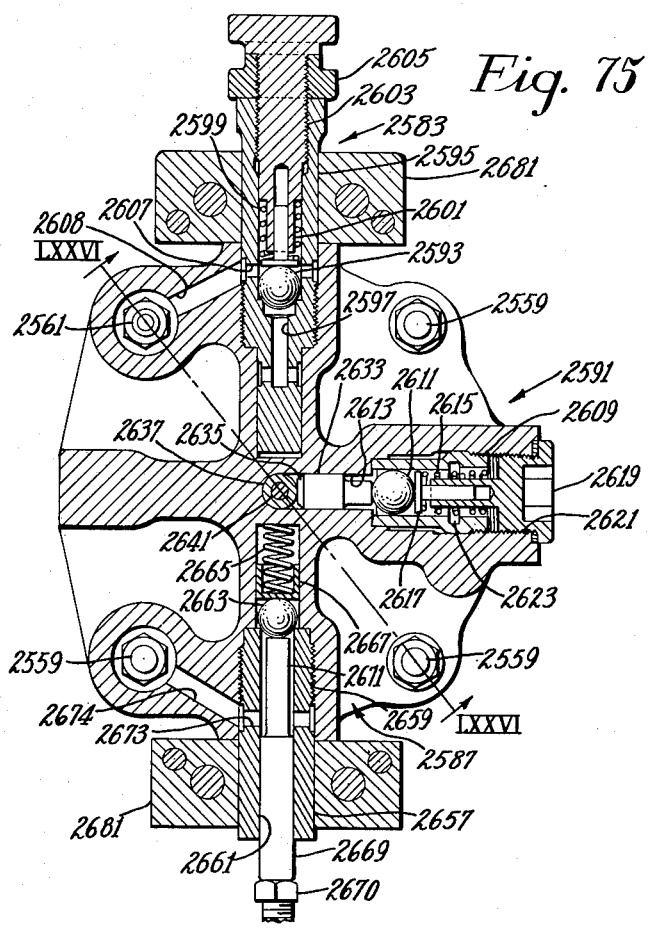
Figure 76:
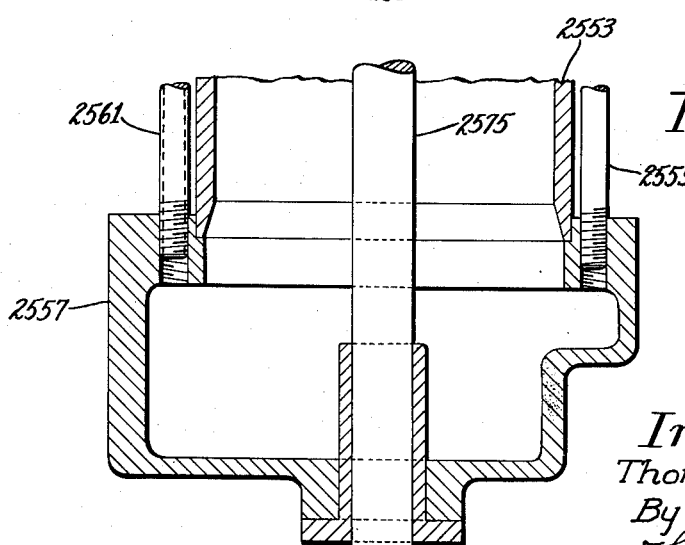
Figure 77:
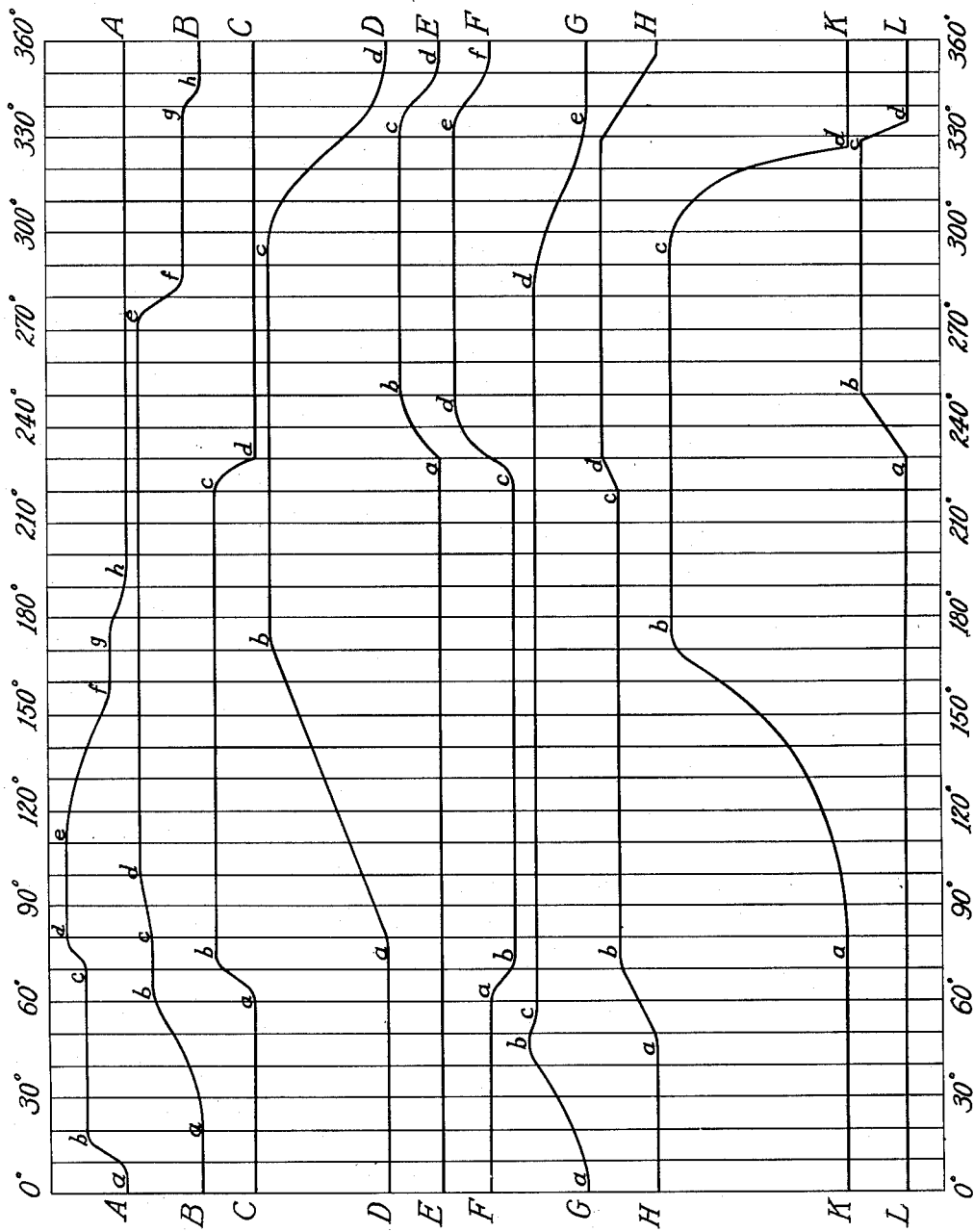
Figure 78:
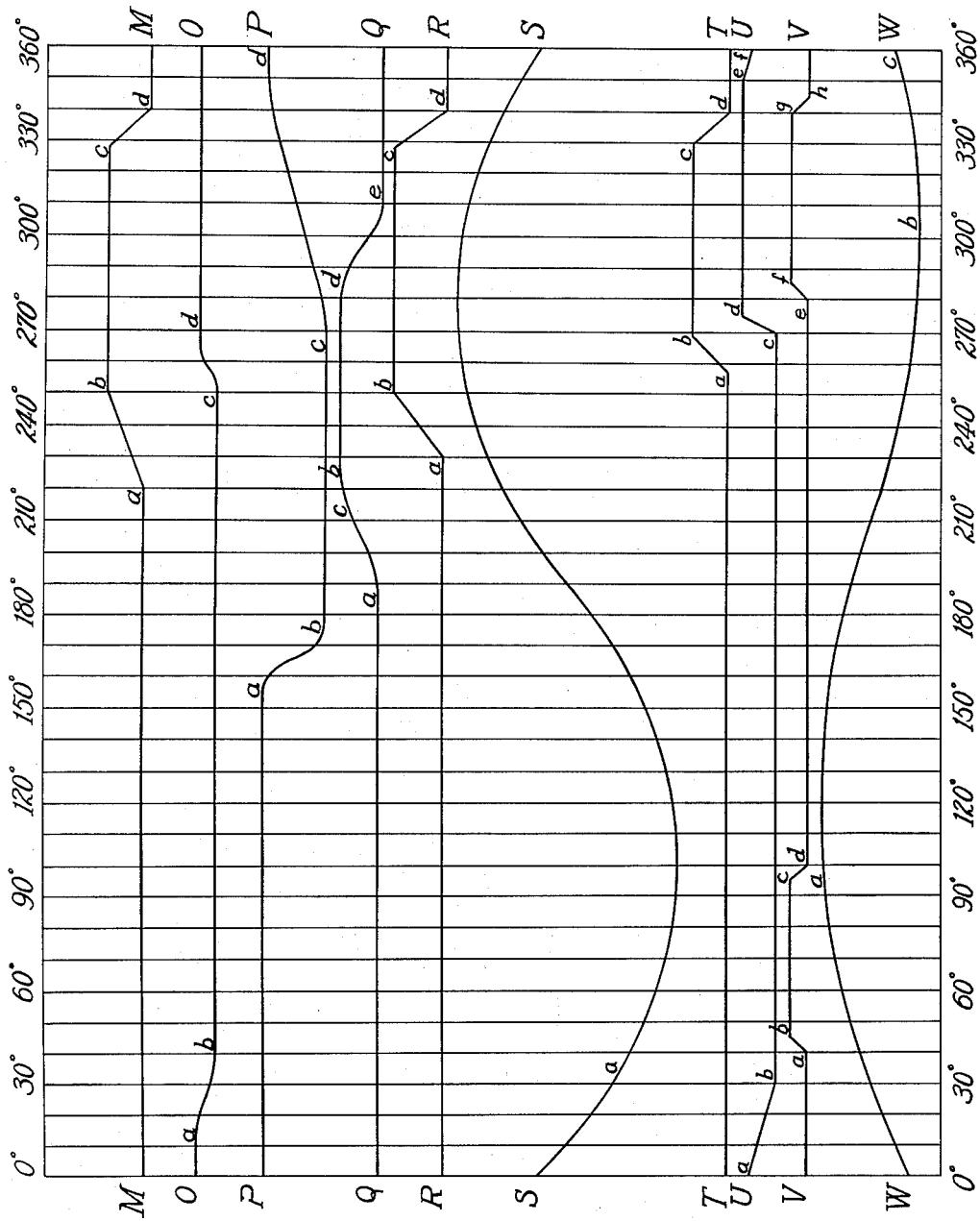

Figs. 7 to 10 inclusive are detail views (in left hand side elevation) showing a trip mechanism associated with the clutch mechanism in different positions, Fig. 7 showing the parts in positions they occupy prior to the initiation of a cycle of operations of the machine, Fig. 8 showing the parts in positions they occupy on depression of a treadle for initiating driving of the machine in a "forward" direction, Fig. 9 showing the parts in positions they occupy on actuation of a member for initiating driving of the machine in a "reverse" direction (if so desired) at the end of the first stage of a cycle of operations of the machine, and Fig. 10 showing the parts in positions they occupy on engagement of a hand driving arrangement with which the machine is provided;

Fig. 11 is a plan view of the parts shown in Fig. 7;

Fig. 12 is a view in side elevation of a cam shaft, cams and cam levers with which the illustrated machine is provided;

Fig. 13 is a plan view of parts shown in Fig. 12;

Fig. 14 is a view in section taken on the line XIV—XIV in Fig. 5 and looking in the direction of the arrows;

Fig. 15 is a view in side elevation of a portion of the machine showing a shoe support, heel rest, side clamping devices and mechanism associated therewith, certain parts being shown broken away for clarity;

Fig. 16 is a view in front elevation of parts seen in Fig. 15, showing also adjusting mechanism associated with side grippers of the illustrated machine, with certain parts being broken away and others shown in section;

Fig. 17 is a view in section substantially on the line XVII—XVII in Fig. 15;

Fig. 18 is a plan view of the heel rest, looking in the direction of the arrow XVIII in Fig. 15;

Fig. 19 is a sectional view on the line XIX—XIX in Fig. 15;

Fig. 20 is a view in vertical section of a hydraulic locking device for the heel rest;

Fig. 21 is a sectional view taken on the line XXI—XXI in Fig. 15;

Fig. 22 is a view looking in the direction of the arrow XXII in Fig. 15;

Fig. 23 is a sectional view taken on the line XXIII—XXIII in Fig. 15;

Fig. 24 is a view in side elevation of a portion of the shoe support and of parts associated therewith;

Fig. 25 is a plan view of parts shown in Fig. 24;

Fig. 26 is a view, similar to Fig. 24, of another portion of the shoe support and of parts associated therewith;

Fig. 27 is a plan view of parts shown in Fig. 26;

Fig. 28 is a view in side elevation of auxiliary toe grippers with which the illustrative machine is provided, showing also actuating mechanism therefor;

Fig. 29 is a front view, partly in vertical section, of the auxiliary toe grippers and parts immediately associated therewith, this view showing also a main toe gripper of the machine;

Fig. 30 is a view in side elevation of the main toe gripper, an associated upper-wiping device, and of operating mechanism therefor;

Fig. 31 is a view in side elevation of certain parts seen in Fig. 30 but drawn to a larger scale than in that figure;

Fig. 32 is a sectional view taken on the line XXXII—XXXII in Fig. 31;

Fig. 33 is a sectional view taken on the line XXXIII—XXXIII in Fig. 31;

Fig. 34 is an exploded view of a latching arrangement associated with the operating mechanism for the toe gripper and its associated wiping device;

Fig. 35 is a view in side elevation of a portion of the machine seen in Fig. 30 but drawn to a larger scale than that figure;

Fig. 36 is a view looking in the direction of the arrow in Fig. 35;

Fig. 37 is a view in side elevation of mechanism with which the illustrative machine is provided for causing the side grippers to exert a pulling action on the upper, the side gripper units being omitted for the sake of clarity;

Fig. 37A is a view looking in the direction of the arrow XXXVII in Fig. 37;

Fig. 38 is a view in side elevation showing a portion of the mechanism included in Fig. 37 but drawn to a larger scale than in that figure, certain parts of the mechanism being shown broken away and other parts in vertical section;

Fig. 39 is a view in front elevation, with parts in vertical section, of a lower portion of the mechanism shown in Fig. 37 but drawn to a larger scale than that figure;

Fig. 40 is a sectional view, taken on the line XL—XL in Fig. 38, of parts at the left hand side of the machine;

Fig. 41 is a view, partly in left hand side elevation and partly in vertical section, of means for adjusting the tension of spring means associated with the mechanism shown in Fig. 37;

Fig. 42 is a view in side elevation of mechanism for adjusting the side grippers in directions extending lengthwise of a shoe positioned in the machine, and including certain parts seen also in Fig. 37;

Fig. 43 is a view in side elevation of mechanism associated with a "joystick" control with which the illustrated machine is provided for effecting adjustment to the pulling action of the side grippers at the end of a first stage of a cycle of operations of the machine, the parts being shown in positions they occupy prior to the commencement of the first stage of the cycle of operations of the machine, and a side cover normally enclosing the mechanism being removed for the sake of clarity;

Fig. 44 is a view generally similar to Fig. 43 but showing the parts in positions they may occupy after a certain displacement of the "joystick" control has been made after the conclusion of the first stage of a cycle of operations of the machine;

Fig. 45 is a sectional view taken on line XLV—XLV in Fig. 43;

Fig. 46 is a sectional view taken on the line XLVI—XLVI in Fig. 43, but drawn to a smaller scale than that figure, and including not only parts shown in Fig. 43 but also other parts associated therewith;

Fig. 47 is a view in side elevation of a portion of the mechanism shown in Fig. 43, parts being omitted for the sake of clarity;

Fig. 48 is a sectional view (on the line XLVIII—XLVIII in Fig. 37) of mechanism with which the illustrative machine is provided for adjusting (prior to the commencement of a cycle of operations of the machine) the positions occupied by units comprising the side grippers and the associated side wiping devices and side tacking devices at each side of the machine in a direction extending widthwise of a shoe supported in the machine and includes means for automatically moving the units in said direction during the operation of the machine on the shoe;

Fig. 49 is a sectional view taken on the line XLIX—XLIX in Fig. 48;

Fig. 50 is a plan view, partly in section, of a portion of the adjusting mechanism shown in Fig. 48;

Fig. 51 is a view in front elevation of the side gripper unit at the left hand side of the machine, this view also including the associated side wiping device but omitting the associated tacking devices for the sake of clarity, the parts being shown in positions they occupy (relatively to a carrier of the unit) prior to the commencement of the first stage of a cycle of operations of the machine;

Fig. 52 is a view similar to Fig. 51 but showing the parts in positions they may occupy in pulling an upper at the end of the first stage of a cycle of operations of the machine;

Fig. 53 is a view similar to Figs. 51 and 52 but showing the parts in positions they occupy when side tacking devices associated with the side grippers are inserting tacks into the work;

Fig. 54 is a side view of the gripper unit shown in Fig. 51 looking in the direction of the arrow LIV in that figure;

Fig. 55 is a view of the gripper unit shown in Fig. 51 looking in the direction of the arrow LV in that figure, certain trip parts being omitted;

Fig. 56 is a sectional view, taken on the line LVI—LVI in Fig. 52;

Fig. 57 is a view, looking in the direction of the arrow LVII in Fig. 51, of the side grippers, the associated wiping devices having been removed for the sake of clarity;

Fig. 58 is a detail view, in side elevation, of trip mechanism associated with the side gripper units;

Fig. 59 is a view of parts seen in Fig. 58, looking in the direction of the arrow LIX in that figure;

Fig. 60 is a view in front elevation of the side gripper unit at the left hand side of the machine (looking in the direction of the arrow LX in Fig. 2) showing a tacking device associated with the side gripper unit;

Fig. 61 is a view in section of one of the side tacking devices (having a single driver) shown in tack-receiving position;

Fig. 62 is a view in section of the tacking device shown in Fig. 61 but in tack-inserting position;

Fig. 63 is a view in section of a portion of one of the side tacking devices having a pair of drivers shown in tack-inserting position;

Fig. 64 is a view in section taken on the line LXIV—LXIV in Fig. 63 and looking in the direction of the arrows, with the parts in tack-receiving position;

Fig. 65 is a view in section of one of the side tacking devices (taken on the line LXV—LXV in Fig. 61 and looking in the direction of the arrows) showing a latch device associated with the tacking device, the parts being shown in positions which they occupy when the tacking device is in tack-inserting position;

Fig. 66 is a view similar to Fig. 65 but with the parts shown in positions which they occupy when the tacking device is in tack-receiving position;

Figs. 67 and 68 are views similar to Figs. 65 and 66 respectively, but showing a latch device associated with the toe end tacking device;

Fig. 69 is a view, looking at the nozzle end of one of the tacking devices, indicating the path followed by the nozzle portion in moving from tack-receiving to tack-inserting positions;

Fig. 70 is a detail view, in elevation, of one of a plurality of tack-retaining fingers associated with the tacking devices;

Fig. 71 is a view in side elevation of the toe tacking device and parts associated therewith, the view also showing auxiliary toe grippers and a tip-line gage with which the illustrative machine is provided;

Fig. 72 is a view in vertical section of one of two air compressing devices and valves associated therewith with which the illustrated machine is provided for supplying the tacking devices with compressed air, the parts being shown in positions which they occupy at the end of a compression stroke and being seen from the front of the machine;

Fig. 73 is a view in vertical section (as seen from the left hand side of the machine) of the air compressing device shown in Fig. 72 and another valve associated therewith, the parts being shown in positions which they occupy at the commencement of a cycle of operations of the machine;

Fig. 74 is a detail view (from the front) of a valve actuating arrangement associated with another air compressing device provided at the opposite side of the machine;

Fig. 75 is a sectional view taken on the line LXXV—LXXV in Fig. 72;

Fig. 76 is a detail view, in transverse section (on the line LXXVI—LXXVI in Fig. 75) of a lower portion of the air compressing device shown in Fig. 72; and Figs. 77 and 78 are two portions of a chart showing the timing of the action of cam-controlled instrumentalities of the illustrative machine.

GENERAL DESCRIPTION OF THE MAIN FRAME AND OPERATIVE INSTRUMENTALITIES OF THE MACHINE

The illustrated machine has a main frame comprising a base casting 1, an intermediate casting 3 secured upon the base casting, and a column 5 supported on the intermediate casting.

Figure 4:
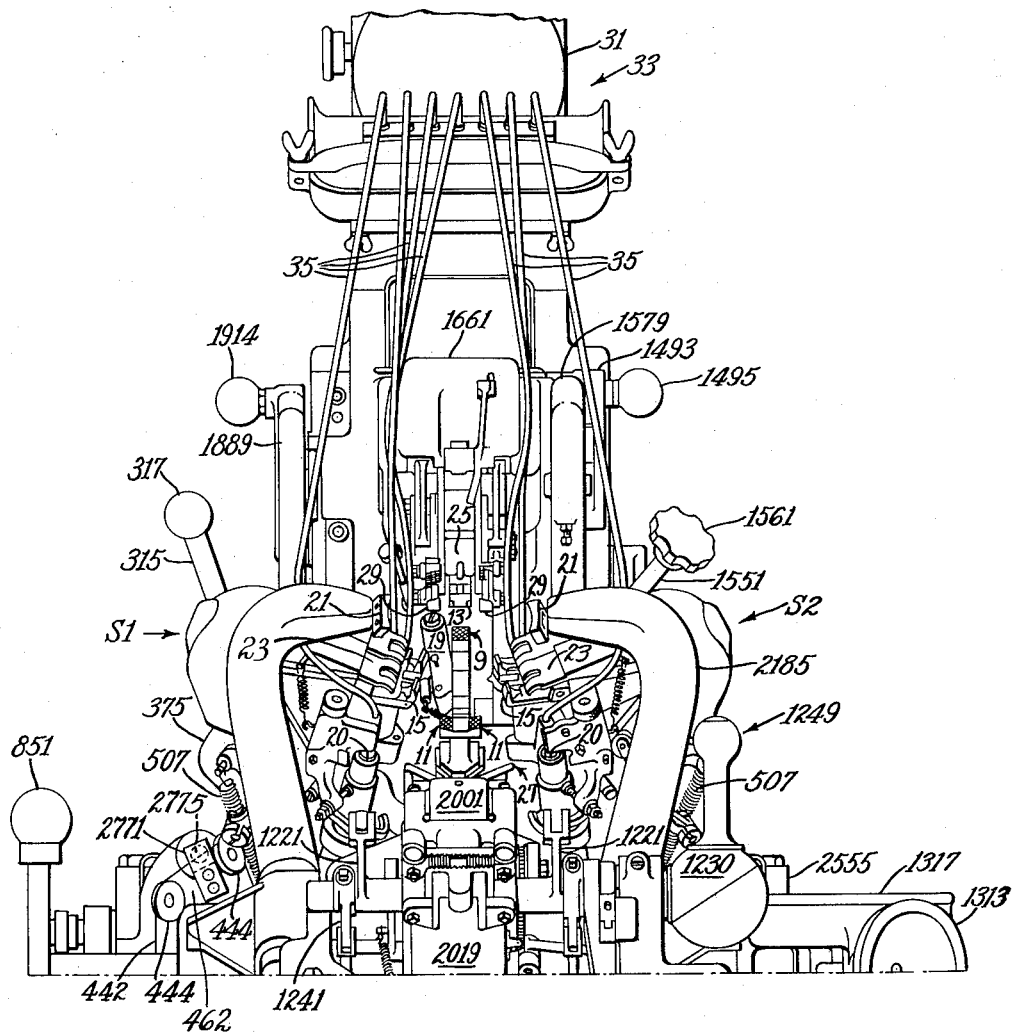

A last having thereon a loose upper and a shoe bottom member, e. g., an insole, is supported for a pulling over operation on the upper by a shoe support, indicated generally by the reference character 7, which is arranged to support the shoe with the general plane of the shoe bottom inclined at an angle of approximately 50° to the horizontal, the shoe bottom facing away from the operator and the toe end of the shoe being higher than the heel end. The shoe is positioned with the toe end some 45" from the ground level in a position easily to be observed by the operator whether he be tall or short. The shoe support 7 comprises three shoe-bottom-engaging elements, one of which, indicated generally at 9 in Figs. 4 and 24, occupies a relatively stationary, but adjustable, position (considered in a direction extending lengthwise of a shoe supported in operative position in the machine), and is arranged to engage the shoe bottom at a locality adjacent the toe end of the forepart. The other two shoe-bottom-engaging elements, indicated generally by the refernec number 11 (Figs. 4, 15 and 26), are spaced apart widthwise of the shoe and are adjustable, together, in directions extending lengthwise thereof to suit the shoe support for shoes of different sizes, the adjusting means and the means of mounting the members being hereinafter described. The elements 11 are arranged to engage the forepart of the shoe bottom member at a locality at about the ball portion of the shoe bottom.

For pulling the upper down to the last the illustrated machine is provided with gripping devices comprising a toe gripper 13 and two pairs of side grippers 15 (one pair for each side of the shoe) the shoe S being positioned in the machine in a direction extending lengthwise of the shoe by engagement of the toe end of the last with a front face 17 of the toe gripper (see Fig. 30). Prior to the pulling of the upper down to the last by the operation of the gripping devices just referred to, a pair of auxiliary toe grippers, indicated generally by the reference character 29 (see Fig. 28) with which the illustrated machine is provided, are arranged at the beginning of a first stage in a power cycle of operations of the machine automatically to seize the marginal portions of the upper materials at localities on both sides of the main toe gripper 13 and to impart a toeward pull to the "loose" upper to take out some of the looseness thereof along the sides of the upper, and to pull the heel or counter portion of the upper snugly against the heel end of the last. The auxiliary toe grippers are furthermore arranged to present the marginal portion of the upper (extending between the auxiliary toe grippers) of the shoe, between the open jaws of the main toe gripper 13. The action of the auxiliary toe grippers is thus intended to take the place of (and hence to dispense with) a separate operation which is usually carried out on an upper loosely placed upon a last prior to presenting the shoe to a pulling over machine, such additional operation being known in the shoe manufacturing trade as an "assembling" operation and being performed usually by means of a bench pincer (for example of the kind disclosed in the specification of British Letters Patent No. 25,921/11, United States Patent No. 1,139,613 —Wentworth), or a hand pincer.

As is customary in pulling over machines the cycle of operations of the illustrative machine is arranged to take place in two stages, the machine being automatically brought to rest at the end of the first stage of the cycle of operations after the upper materials have been pulled down to the last by the grippers 13 and 15 and while the grippers are still hanging on to the upper materials. During the first stage of the cycle of operations, before the grippers pull down on the upper materials, a heel rest, indicated generally by reference character 27, is arranged to be moved upwards and rearwards of the machine (i. e., away from the operator) to engage the heel end of the shoe, the heel rest being capable of moving sideways as it engages the shoe to cause the heel rest to be self-accommodating with respect to the heel end of the shoe, any sideways movement of the heel rest taking place against the action of light "centralizing" springs only so that there is little danger of the heel and of the shoe being displaced sideways out of the desired position in which it has been located by the operator. The heel rest is arranged to be locked, before the end of the first stage of the cycle of operations of the machine, in shoe-engaging position (both against sideways movement and against movement lengthwise of the shoe away from the heel thereof) as will be hereinafter described. During the pause in the power cycle of operations of the machine, the operator, before he initiates the second stage of the cycle, has opportunity to adjust the pulling action of the grippers if he deems that necessary to ensure that the upper is correctly pulled down to the last and lies correctly thereon. If he is satisfied with the pulling action of the grippers he initates the second stage of the power cycle of operations of the machine during which marginal portions of the upper which are wiped inwardly beneath the shoe bottom member, as the grippers release their hold on the upper, by means of wiping devices, comprising a toe wiper 25 (Fig 30) and side wipers 23 (Fig. 51) associated respectively with the grippers at the toe end and sides of the shoe, are then secured to the shoe bottom member by means of tacks driven by tacking devices comprising a toe tacking device 19 associated with the toe gripper and side tacking devices 20 (of which there are provided a pair for each side of the shoe) associated with the side grippers (see Figs. 4, 60 and 71).

For sustaining the shoe against the atcion of the wiping devices and of the tacking devices, the illustrative machine is provided with a pair of clamping devices 21 (Figs. 4 and 17) arranged to engage the shoe at each side thereof as will be hereinafter explained, the clamping devices being moved into engagement with the shoe at a time shortly after the commencement of the second stage of the power cycle of operations of the machine. The clamping devices are locked in shoe-engaging position by means hereinafter described.

Tacks are delivered to the tacking devices from a tack receptacle 31 (Fig. 2) via a separating device 33 and tack-delivery tubes 35, the tack delivery being effected pneumatically as will be hereinafter described. As will be more fully described hereinafter the tacking devices are mounted, in the case of the side tacking devices, on carriers which also support the associated gripping devices and wiping devices, and, in the case of the toe tacking device, on one of two brackets supporting the toe tacking device and the tacking devices are arranged to be swung, relatively to the carriers or the bracket, from tack-receiving positions to tack-driving positions shortly after the commencement of the second stage of the power cycle of operations of the machine, tacks being delivered to the tacking devices during the first stage of the cycle. Towards the end of the second stage of the cycle of operations of the machine the operating instrumentalities are returned to their initial positions and the shoe is released for removal from the machine by the operator. At the conclusion of the second stage of the cycle of operations the machine is automatically brought to rest.

Figure 1:
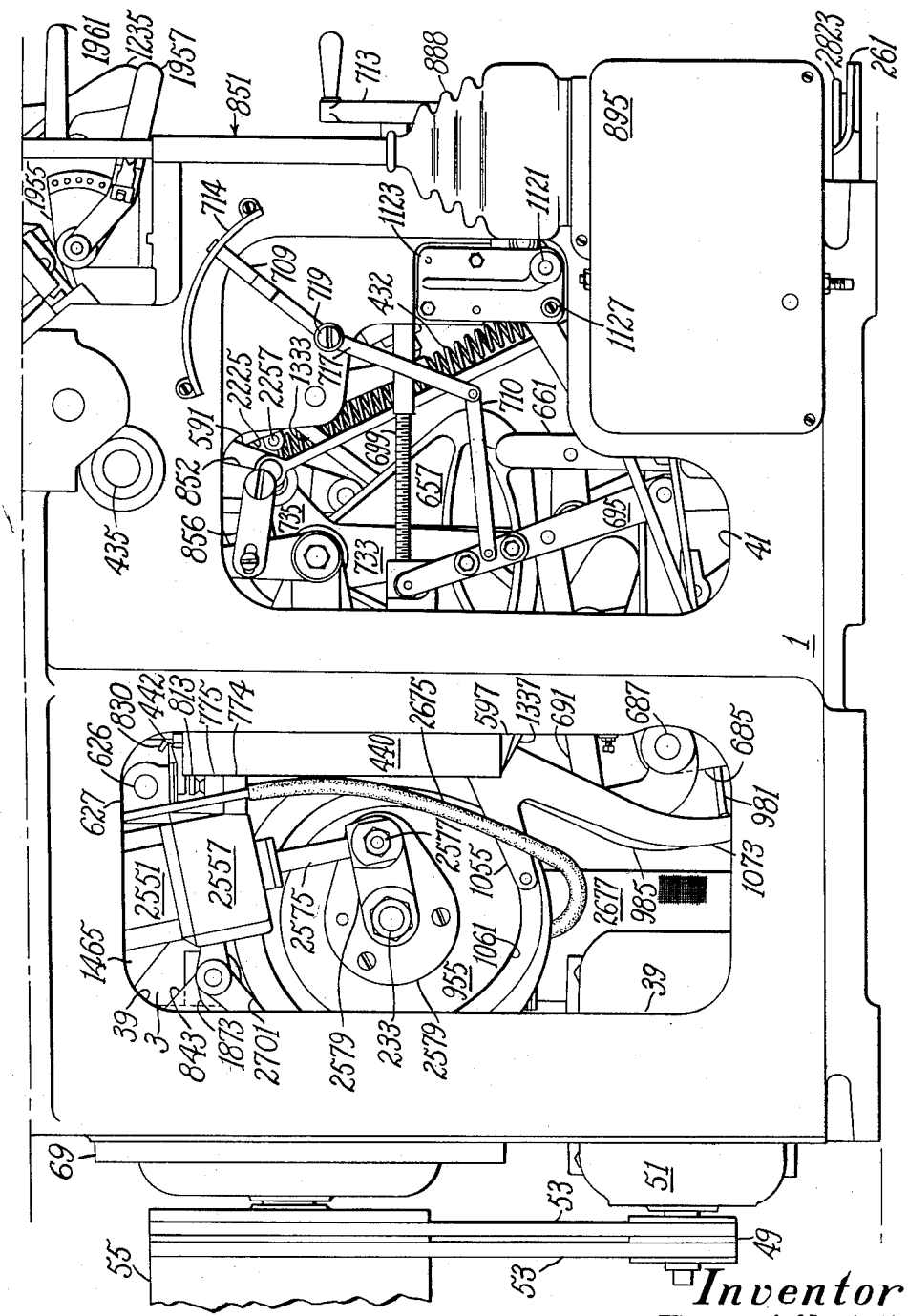
Figs. 1 and 2 are views in side elevation of lower and upper portions respectively, of a machine embodying the features of this invention, side covers associated with the lower portion being removed in Fig. 1 for the sake of clarity.

In order to provide ready access to mechanisms within the base casting 1 the latter is provided with a front aperture and side apertures 39, 41 (at each side of the machine, see Fig. 1). The side apertures are normally closed by cover plates, not shown, while the front aperture is normally covered by a cover 43 (Fig. 3) hinged at a lower portion thereof to lugs on a bracket 2243 hereinafter referred to. When the cover is swung downwardly into a horizontal position (determined by engagement of a lug 45 on the cover with the front of the base casting 1) the cover forms a convenient step on which the operator may stand for purposes of filling the tack receptacle 31 or of clearing any tack stoppage that may occur in the tack separating device 33. The cover 43 is normally maintained in its closed position by means of a spring-pressed plunger (not shown) received in a bore in the bracket 2243 and engaging a depression (not shown) in the cover.

The power-operated means for actuating the machine and clutch-controlling devices associated therewith will now be described.

MAIN CLUTCH AND DRIVING MECHANISM

Figure 3:
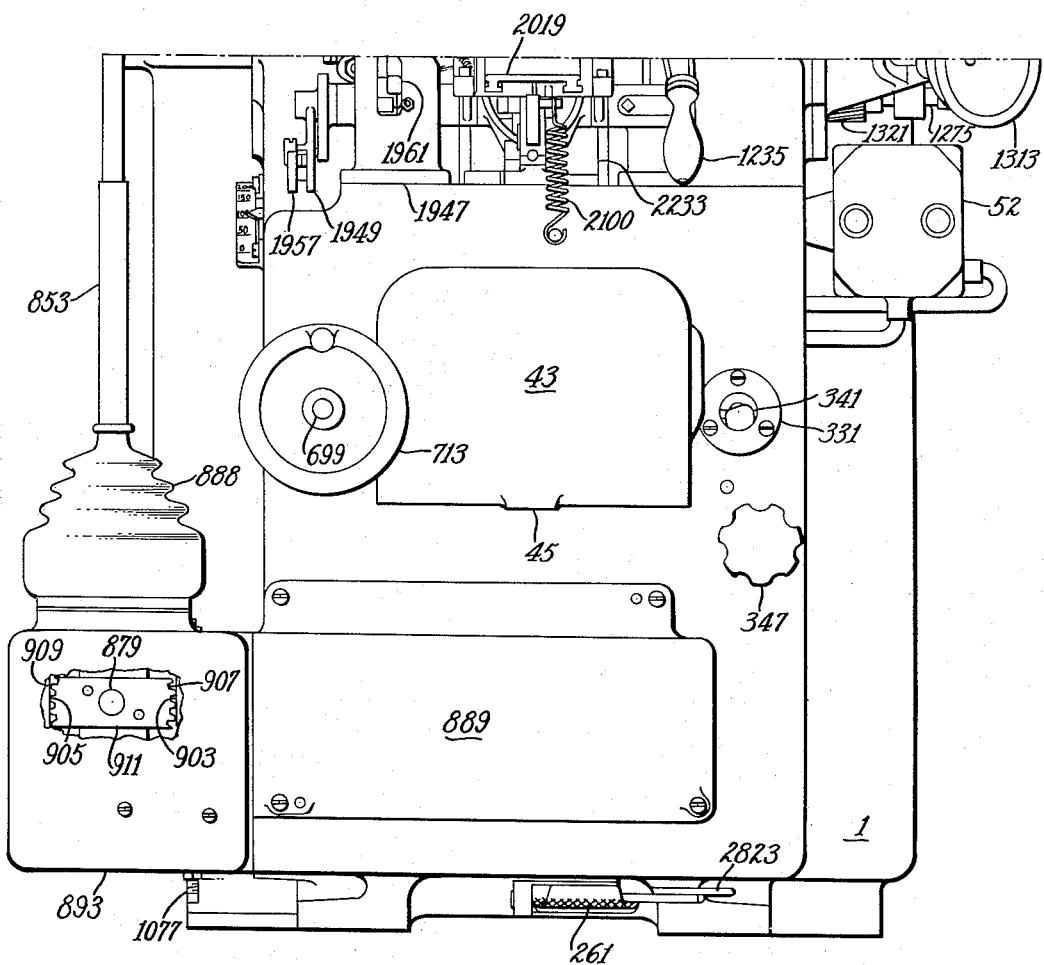
Figs. 3 and 4 are front elevational views of lower and upper portions, respectively, of the machine shown in Figs. 1 and 2.

The machine is arranged to be driven by means of an electric motor 51 (Fig. 1) secured to the base casting 1 and controlled by a switch 52 (Fig. 3). The motor shaft is provided with a double pully 49 from which the drive is taken via belts 53, to a main pulley 55 (see particularly Fig. 5). The pulley 55 is normally freely rotatable about a main drive shaft 57. The shaft 57 has sleeve-like bushings 59 and 61 splined thereon, the bushings being journaled in bearings 63 and 65 respectively and the bearings being carried by a bearing bracket 67 secured to a member 69. The member 69 is bolted to the base casting 1. A dished casting 71 is secured (by bolts, not shown) to the member 69 and has a boss 70 which carries a bearing in the form of a flanged sleeve 73 on a rearward end portion of which is freely rotatable a plate 75 secured to the pulley 55 by screws 76. A hub portion 77 of the pulley is provided with a bearing in the form of a flanged sleeve 79 freely rotatable upon a hub portion 81 of a gear wheel 83 keyed to a reduced end portion 85 of the shaft 57. A gear wheel 87 having a hub portion 89 is freely rotatable on the shaft 57 and the hub portion 89 is freely rotatable in the bearing sleeve 73 which therefore indirectly provides an additional support for the main drive shaft 57. Keyed and clamped to the end portion 85 of the shaft 57 is a clutch member 91 having a frusto-conical friction clutch face 93. Splined on to the shaft 57 is a worm 95 end thrusts of which are taken by ball bearings 97 received between the worm and the bearings 63 and 65. The fact that the worm 95 and the sleeve-like bushings 59 and 61 are splined on the shaft 57 permits endwise movement of the shaft relatively to the worm and the bushings. A washer 99 on a front end portion 100 (of reduced diameter) of the shaft 57 bears against the forward end of the bushing 61 under the action of a compression spring 101 surrounding the portion 100 of the shaft and retained thereon by means of a washer 103 and nuts 105 threaded onto the portion 100 of the shaft. The bushing 61 is thus urged into engagement with the front end face of the worm 95 and the shaft 57 is urged forwardly in the machine.

Figure 6:
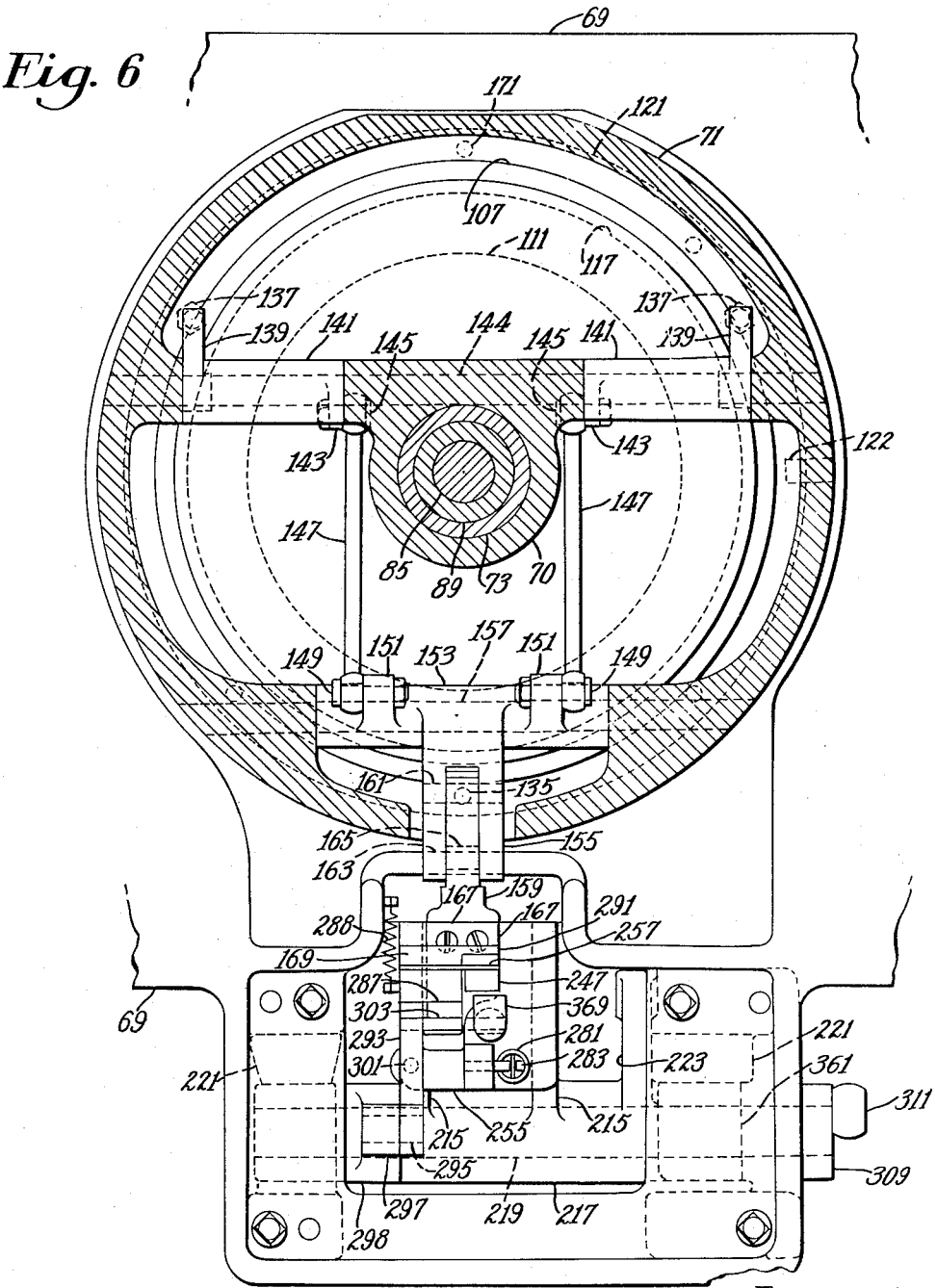
Fig. 6 is a sectional view on the line VI—VI in Fig. 5.

Clamped and keyed to a reduced forward end portion of the hub portion 89 of the gear 87 is a brake member 107 having a frusto-conical brake surface 109, a rearward face of a hub portion of the member 107 being clamped against a shoulder on the hub portion 89 by means of a clamping ring 179 threaded onto the reduced end portion of the hub portion 89. A disc 111 is bolted to a hub 113 keyed onto the shaft 57 and held against endwise movement relatively to the shaft by means of a flange 115 on the shaft received in a recess in the hub 113. The disc 111 carries a brake member 117 which, at the conclusion of the first and second stages of a cycle of operation of the machine, is arranged to engage a forward face 119 of a brake ring 121 slidably mounted (for forward and rearward movement) in a recessed front end portion of the casting 71 and thereby to hold the shaft 57 against rotation, the brake ring 121 being held against rotation relatively to the casting 71 by means of a stud 122 (Fig. 6), which extends through the casting 71 (radially of the shaft 57) into a slot extending forwardly and rearwardly of the machine in the brake ring 121. For thrusting the brake member 117 against the brake ring 121 means is provided for urging the shaft 57 rearwardly against the action of the spring 101. This means comprises a pair of frusto-conical rollers 123 (Fig. 5) journaled on studs 125 carried by a bifurcated upwardly extending arm 127 of a two-armed lever 127, 129, the rollers lying one on either side of the hub 113 and being arranged to thrust against a face 131 thereon. The lever 127, 129 is pivoted on an eccentric portion of a pin 133 journaled in the bearing bracket 67, and is controlled by trip mechanism hereinafter described. For sustaining the brake ring 121 against the rearward thrust of the brake member 117 the brake ring is arranged to engage a headed portion of a pin 135 and, in addition, adjustable set screws 137 secured in the brake ring are arranged to engage arms 139 (see also Fig. 6) extending upwardly from sleeves 141 having other arms 143 extending downwardly and forwardly in the machine. The sleeves 141 are journaled on a shaft 144 carried in alined bores in the hub portion 70 and in the casting 71. The arms 143 are connected, by means of pivot studs 145, with upper end portions of links 147, lower end portions of the links being pivotally connected, by means of pivot studs 149, with parallel arms 151 extending rearwardly from a sleeve member 153. The sleeve member is journaled on a shaft 157 secured in alined bores in the casting 71 and has a downwardly extending bifurcated arm 155 disposed centrally below the shaft 57. An arm 159 (which carries the headed pin 135 engaging a lower portion of the brake ring 121) is pivoted on a pin 161 carried by the arm 155 between the bifurcations thereof and is further connected with the arm 155 by means of a stud 163 having an eccentric portion received in a block 165 carried in a recess in the arm 159. The arm 159 has a hardened plate 167 secured to its lower end portion and this plate is normally restrained against rearward movement, such movement tending to result from the brake ring being urged rearwardly by the action of the rollers 123 or of springs 171 (received in horizontal bores in a peripheral portion of the brake ring and engaging a rear face of the member 69), by engagement of the plate with an abutment provided by a hardened plate 169 associated with trip mechanism hereinafter described. The abutment provided by the plate 169 defines the position of the lower end of the arm 159 (while the plate is in engagement with the abutment) and rotation of the eccentric stud 163 therefore adjusts the position of the arm 155 with respect to the arm 159 (the arms swinging slightly relatively to each other about the pivot pin 161) and this adjustment, through the parts above described, adjusts the position of the brake ring 121 forwardly and rearwardly in the machine. The setscrews 137 enable the brake ring to be set "square" to the axis of the shaft 57 so that the surface 109 of the brake member 107 may uniformly engage (when permitted to do so) a surface 173 on the brake ring or the face 119 may uniformly be engaged by the brake member 117 on the disc 111. When the brake member 117 is in engagement with the brake ring 121 the clutch face 93 is arranged to be held just clear of a complementary clutch face 175 formed within the pulley 55. The pulley is positioned against rearward movement relatively to the shaft 57 by means of the plate 75 engaging a forward face of the gear wheel 87 which latter is positioned by means of the sleeve 73 having running engagement with the rearward face of the hub portion of the brake member 107 and with a front face of the gear wheel 87. The sleeve 73 has a flange 177 which bears against the forward end of the boss 70 in the casting 71 and locates the sleeve in the casting. Bearing against the front face of the clamping ring 179 are rods 181 extending loosely through bores (disposed parallel to the axis of the shaft 85) in the hub 113, forward ends of the rods bearing against a flange 183 on the bushing 59 which, in turn, bears, at is forward end against the rear face of the worm 95. The pulley 55 is positioned against forward movement by means of a flange 185 on the sleeve 79 (on which the hub portion 77 of the pulley 55 rotates) engaging earward ends of rods 187, forward ends of which engage a washer 189 received within a recessed rear face of the gear wheel 87. Under idle running conditions of the pulley 55 there are known slight clearances between various ones of the locating members above described. When the shaft is allowed to move forwardly slightly, on clockwise rotation (as seen in Fig. 5) of the lever 127, 129, under the action of the spring 101, the brake member 117 is moved clear of the brake ring 121 and the clutch face 93 is moved into engagement with the clutch face 175 on the pulley 55, to drive the shaft 57 in a "forward" direction. Under these conditions the arrangement of rods and sleeves above described ensures that the "end thrust" due to the spring 101 is not taken by the ball races 97 (the worm 95 acting as a "spacer" between the ends of the sleeves 59 and 61).

Provision is also made for driving the shaft 57 in "reverse," if desired, at the end of the first stage of the operation of the machine. To this end the gear wheel 83 meshes with a gear wheel 191 having integrally formed therewith another gear wheel 193. The gear wheels 191 and 193 are freely rotatable on a shaft 195 secured in the pulley 55 and also supported by its end plate 75. The gear wheel 193 meshes with the gear wheel 87. The arrangement of gear wheels provides an epicyclic gear train and, in order to drive the shaft 57 in a "reverse" direction, the brake ring 121 is allowed to move rearwards under the action of the springs 171 until the surface 173 frictionally holds the brake member 107 and the gear wheel 87 against rotation (at the same time freeing the brake member 117 and the shaft 57 for rotation). The gear wheel 87 being held stationary, rotation of the pulley 55 causes the gear wheel 193 to travel round the gear wheel 87 thus rotating the gear wheel 191 which, in turn, rotates the gear wheel 83 secured to the shaft 57 in a "reverse" direction for a purpose which will hereinafter become clear. Safety devices are provided for ensuring that the "forward" and "reverse" drives cannot be engaged at the same time and that the reverse drive can only be initiated during the pause which occurs at the end of the first stage of the cycle of operations of the machine. The action of the brake member 117 on the brake ring 121 may be adjusted by rotation of the eccentric pin 133, the pin being adjusted by means of an arm 197 secured thereto. The arm is held in adjusted position by means of a clamping bolt 199 extending through an arcuate slot 201 formed in the arm and threaded into a portion of the bearing bracket 67.

The trip mechanism associated with the forward and reverse drives and the interlocking safety mechanism rendering the two mutually exclusive will now be described with particular reference to Figs 5 to 11 of the drawings. The arm 129 has secured to it, at its lower end, a hardened plate 207, a lower end portion of which is engaged by a front edge face of a plate 209 to hold the lever 127, 129 in the position shown in Fig. 5 with the brake on and the clutch faces 93 and 175 disengaged. The plate 209 is secured to a rearward end portion of an arm 211 (see also Figs. 7 and 11) freely pivoted on a stud 213 carried by upper end portions of spaced arms 215 extending upwardly from a sleeve member 217 (Fig. 6) mounted for rocking movement about a shaft 219 journaled in bores in brackets 221 (Figs. 5 and 6) secured to the member 69. The sleeve member 217 has also integrally formed therewith an arm 223 carrying on a stud 225, a cam roll 227 (see also Fig. 12) which is received within a cam track 229 (Fig. 5) on a cam 231 secured to a main cam shaft 233. The cam shaft 233 is journaled in bearings carried by the bearing bracket 67 and in a bracket 235 (see Fig. 13) secured to the member 69 and the cam shaft has keyed thereto a worm wheel 237 meshing with the worm 95 (Fig. 5).

The cam track 229 has a rise 239 and a diametrically opposed rise (not shown) which, as will hereinafter appear, at the end of a cycle of operations and at an intermediate time respectively, swing the arms 223, 215 clockwise (as seen in Fig. 5) to cause the plate 209, by engagement with the plate 207, to move the lever 127, 129 anticlockwise into the position shown in Fig. 5 to apply the brake and declutch the clutch faces 93 and 175.

For urging the arm 211 clockwise (as seen in Figs. 5 and 7) to tend to maintain the plate 209 in its raised position behind the plate 207, there is secured to the plate 209 a member 241 having a portion extending transversely of the machine over a plate 243 secured to a forwardly extending arm 245 of a lever also having arms 247 and 248. The portion of the member 241 extending over the plate 243 houses a plunger 249 (Figs. 7 and 11) urged downwardly into engagement with the plate 243 by means of a spring 251 backing up the plunger. The lever 245, 247, 248 is pivotally mounted on a pin 253 carried by a bracket 255 (Fig. 6) secured to the member 69. The arm 247 extends rearwardly and carries, at its rearward end a hardened plate 257 (Figs. 7 and 11) which normally lies immediately behind, and in engagement with the hardened plate 167 secured to the arm 159. The plunger 249 acting on the plate 243 swings the lever 245, 247, 248 clockwise into a position in which the plate 257 is wedged against the plate 167 and the plate 209 and the arm 211 are yieldingly supported in the positions shown in Fig. 7.

When it is desired to run the machine in the normal manner, i. e., in a forward direction, the plate 209 is depressed, on depression of a treadle 261 (Fig. 3), by means shortly to be described, whereupon the plate 207 is able to ride over the plate 209 (Fig. 8) thus enabling the lever 127, 129 (Fig. 5) to be swung clockwise by the spring 101 acting on the shaft 57 to release the brake 117 and engage the clutch faces 93 and 175. The lever 245, 247, 248 will have been swung somewhat clockwise under the action of the spring plunger 249 on depression of the treadle to lower the plate 243 sufficiently to allow the plate 207 to ride over a front end portion of the plate 243 (Fig. 8) thus preventing anticlockwise movement of the lever 245, 247, 248 while the forward drive is in operation, i. e., at this time the plate 257 is positively held in its position behind the plate 167 thus holding the "reverse" drive positively out of action. For depressing the plate 209 there is provided a trip lever 263 having a portion 265 normally extending over the plate 209. The trip lever is pivoted, at a lower end portion thereof, by means of a pin 267 to a rearwardly extending arm 269 of a bell crank lever, another arm 271 (Fig. 5) of which extends downwardly. The bell crank lever is freely pivoted on a transverse stud 273 secured in a boss on one of the brackets 221. To a lower end portion of the arm 271 is pivotally connected a treadle-operated link 275 (Fig. 12) the link being connected to the treadle 261.

The trip lever 263 is urged rearwardly by means of a spring 281 (Figs. 5 and 6) connected with the trip lever and a pin 283 carried by a portion of the bracket 255 but rearward movement of the trip lever is limited by its engagement with a stop pin 285 (Fig. 5) projecting forwardly from the bracket 255. When the treadle 261 is depressed the trip lever 263 is lowered, thus pulling down the plate 209 clear of the plate 207 (Fig. 8) to allow the shaft 57 to move forwardly to engage the clutch faces 93 and 175 and release the brake member 117 from the brake ring 121. The shaft 233 is thus driven in a "forward" direction and, soon after the cam shaft 233 commences to rotate, the cam rise 239 moves away from the roll 227 thus causing the lever 223, 215 to be swung somewhat anticlockwise (from the position it occupies in Figs. 7 and 8) thus pushing the arm 211 rearwardly to carry the plate 209 from beneath the portion 265 of the trip lever 263 (rearward movement of which is arrested by engagement with the stop pin 285, Fig. 5) to a position beyond the plate 207. The plate 209 then rises under the action of the spring-pressed plunger 249 until it is positioned behind the plate 207, the portion 265 of the trip lever 263 then lying in front of the plate 209. It will be appreciated that Fig. 8 shows the positions of the parts immediately the treadle 261 has been depressed and before the cam shaft has started into rotation, i. e., before the rise 239 has cleared the roll 227. Toward the end of the first stage of the cycle of operations of the machine (viz., as the cam shaft 233 completes half a revolution) the cam rise opposite the rise 239 engages the roll 227 and swings the lever 223, 215 clockwise to pull the arm 211, and with it, the block 209, forwardly, such movement of the block 209, in turn, swinging the levers 129, 127 anticlockwise to move the shaft 57 rearwardly (to the position shown in Fig. 5), thus disengaging the clutch faces 93, 175 and applying the brake.

On release of the treadle 261 the trip lever 263 rises, the portion 265 riding upwardly and then rearwardly of the plate 209 into the position shown in Fig. 7 ready to trip the "forward" drive clutch on the next depression of the treadle whereupon the drive is continued until the cam rise 239 is effective to disengage the clutch and apply the brake.

The trip mechanism associated with the "reverse" drive (which, as will be made clear later, can only be engaged at the end of the first stage of the cycle of operations of the machine) comprises an arm 287 (Figs. 5, 9 and 11) also extending rearwardly from the stud 213 on which it is freely pivoted, a rearward portion of the arm 287 being held up by a spring 288 (Fig. 6) and being provided with the plate 169 hereinbefore referred to. The plate 169 has secured to it a finger 291 which overlies the plate 257 (and is normally spaced above the plate as shown in Fig. 7). The plate 169 also normally lies immediately behind the plate 167 on the arm 159 thus (with the plate 257) restraining the arms 159, 155 against clockwise movement under the thrust of the springs 171 on the brake ring 121 acting through the parts 139, 143, 147 and 151. For moving the plate 169 (and with it the finger 291 and the plate 257) downward to carry the plates 169 and 257 out of engagement with the plate 167 and thereby to allow the springs 171 to urge the brake ring rearwardly so as to bring the face 173 into engagement with the face 109 while disengaging the face 119 from the friction member 117 (thus initiating a reverse drive of the shaft 57), there is provided a trip lever 293 upstanding from a pivot stud 295 carried by an arm 297 projecting rearwardly from a boss 298 secured to the shaft 219. The trip lever 293 has a portion 299 which normally overlies the front end of the plate 169 as shown in Fig. 7. The trip lever 293 is urged rearward by means of a spring-pressed plunger 301 (Figs. 5 and 6) housed in a bore in the bracket 255 and engaging a rearward face on the lever, rearward movement of the lever being limited by engagement of a pin 303 on the lever with a rear wall of a recess 305 (see also Figs. 7 to 9) in a rod 307 hereinafter referred to. The shaft 219 has secured to it an arm 309 (Fig. 5) pivotally connected with a lower end portion of a link 311. An upper end portion of the link 311 is pivotally connected, by means of a stud, with an arm (not shown) secured to a shaft 313 (Fig. 2) journaled in bores in the column 5 and having another arm 315 secured thereto, the arm 315 extending forwardly and upwardly and having a hand pad 317 secured to its upper end. Rearward pressure on the hand pad 317 depresses the link 311 thereby swinging the arms 309 and 297 anticlockwise as seen in Fig. 5, pulling down the trip lever 293 and with it the plate 169, finger 291 and plate 257 unless such movement is prevented (a) by the plate 207 on the bottom end of the arm 129 being over the plate 243 if the machine is running in the forward direction at the time the hand pad is pressed or (b) if the main cam shaft 233 is not in a position rotated 180° as compared with that shown in Fig. 12, or (c) unless the rod 307 is in a forward position shown in Fig. 10 while a hand drive (hereinafter referred to) is engaged in which case the portion 299 of the trip lever 293 lies clear of the plate 169. Downward movement of the plates 257 and 169 on rearward movement of the hand pad 317 will free the arm 159 for clockwise movement to the position shown in Fig. 9 to cause engagement of the "reverse" drive as above referred to. Soon after the cam shaft 233 commences to rotate the roll 227 will ride off the rise 239 of the cam track 229 thus swinging the arm 215 anticlockwise and moving the arm 287 and the plate 169 carried thereby rearwardly (from the position shown in Fig. 9) to release the plate 169 from the portion 299 of the trip lever 293 and allowing the plate 169 to rise behind the plate 167, under the action of the spring 288 and of the spring-pressed plunger 249 on the plate 243 carried by the lever 245, 247, 248.

Subsequent clockwise swinging of the arm 215 at the end of a half revolution of the cam shaft in a reverse direction will pull the arm 287 and with it the arm 159 forward to disengage the "reverse" drive. Downward movement of the plate 257 to initiate the "reverse" drive as above referred to raises the front end of the plate 243 on the arm 245 (from the position shown in Fig. 7 to that shown in Fig. 9) to prevent rearward movement of the plate 207, and with it the arm 129, thus preventing engagement of the "forward" drive while the reverse drive is engaged.

During anticlockwise swinging movement of the arm 215 as just above referred to the arm 211 will also be carried rearwardly but the plate 209 is prevented from rising by engagement of the arm 211 with the lower end of the plate 207. Hence as the arm 215 swings clockwise, at the end of the "reverse" drive the plate 209 again moves forward beneath the portion 265 of the trip lever 263. Similarly when, during the "forward" drive the arm 215 moves anticlockwise to free the plate 209 from the portion 265 of the trip lever 263, the arm 287 is also moved rearwardly and hence the plate 169 is carried rearwardly from beneath the portion 299 of the trip lever 293. The plate 169 is, however, prevented from rising at this time under the action of the spring 288, as a result of engagement of the top face of the arm 287 with a lower face of the plate 167. Thus, as the arm 215 again swings clockwise the plate 169 is once again carried beneath the portion 299 of the trip lever 293.

Provision is made for turning the cam shaft 233 by hand if desired and an interlock is provided whereby the hand-drive can only be brought into effect provided neither the "forward" nor the "reverse" power drives are engaged and the power drives cannot be brought into effect if a crank handle 339 for rotating the cam shaft is in operative position. Fixedly secured to the forward end of the shaft 57 (Fig. 5) is a gear wheel 321 which is arranged to be engaged by a gear wheel 323 secured to a shaft 325. A rear end portion of the shaft is journaled in a boss 327 on the bearing bracket 67, while a forward end portion of the shaft 325 is journaled in a bushing 331 received in the base casting 1. A spring 329 is received in an endwise directed bore in the shaft 325 and engages a rear wall of the boss 327 so as to urge the shaft forward to hold the gear wheel 323 normally out of engagement with the gear wheel 321. Forward movement of the shaft is limited by a flange 333 on the forward end portion of the shaft engaging the rear end of the bushing 331. The forward end portion of the shaft 325 has diametrically opposed slots 335 extending lengthwise of the shaft in which slots a key 337 in a rear end portion of the shaft of the crank handle 339 is arranged to be received. Rearward pressure on the crank handle moves the shaft 325 rearwardly to engage the gear wheel 323 with the gear wheel 321. The handle is arranged to be introduced to the flange 333 through the bore in the bushing 331. This bore is normally closed by means of a shutter 341 (Fig. 14) secured to a cam block 343 which is fixed on a shaft 345 journaled in a boss in the base casting and having a hand knob 347 (Fig. 5) on a front end portion thereof.

The cam block has a cam face 351 arranged to engage a cam roll 353 (see also Fig. 14) rotatably mounted on an eccentric stud 355 secured in a forward end portion of the rod 307 hereinbefore referred to. The rod is supported, at its rearward end in the bracket 255 and at its forward end in a bore in the base casting 1, for movement, in a direction extending axially of itself, and is held against rotation by means of an arm 358 secured to the rod having a bifurcated lower end portion which embraces a reduced portion 366 on the rear end of the shaft 345. The roll 353 is held against the cam face 351 by a compression spring 352 surrounding the front end portion of the rod 307 between a collar 354 on the rod and the base casting 1.

In addition to the recess 305 the rearward end portion of the rod 307 is provided with a heightwise extending slot 359 into which extends the depending arm 248 of the three-armed lever 245, 247, 248. The arrangement of the parts above described is such that, on rotation of the hand knob 347 to permit the handle 339 to be inserted into the slotted end portion of the shaft 325, the cam face 351 acts to move the cam roll 353 and the rod 307 forwardly in the machine (against the action of the spring 352) so that the pin 303 which is engaged by the rear wall of the recess 305 causes the trip lever 293 to be swung forward so that the portion 299 is clear of the plate 169 (Fig. 10), it being appreciated that the plate 169 lies behind the plate 257 shown in this figure, thus rendering the reverse drive trip mechanism ineffective. Forward movement of the rod 307 also brings a rear wall of the slot 359 into engagement with a rear portion of the arm 248. If now the treadle 261 is depressed, the trip lever 263 will lower the plate 209 against the action of the spring-pressed plunger 249 but the plate 243 will be maintained in a raised position by the action of the rear wall of the slot 359 on the arm 248. The plate 207 on the arm 129 therefore rides over the plate 209 into engagement with the front edge wall of the plate 243. Fig. 10 shows the parts associated with the trip mechanism in positions they occupy under these conditions. The limited movement of the arm 129 thus permitted is sufficient to disengage the brake member 117 from the brake ring 121 but insufficient to engage the clutch faces 93 and 175 to initiate a "forward" power drive of the shaft 57. The brake being "off," rotation of the handle 339, after it has been pressed rearwardly to engage the gear wheels 323 and 321 causes rotation of the shaft 57 and the cam shaft 233. For relieving the operator of the need for exerting a rearward thrust on the handle 339 to keep the gears 321, 323 engaged, a peripheral groove 340 (Fig. 5) is provided in the shaft of the handle and an edge portion of the shutter 341 is arranged to engage in this groove and to maintain the handle in place against the action of the spring 329. The arrangement above described ensures that while the handle 339 is in place, neither the "forward" nor the "reverse" power drives can be engaged. Furthermore, if an attempt be made to rotate the hand knob 347 to move the shutter 341 away from its shuttering position (to which it is urged by a tension spring 357 connected between the shutter and the base casting 1) while the "forward" drive is engaged, sufficient movement of the shutter to allow entry of the handle is prevented since the rod 307 cannot be moved sufficiently forward due to the rear wall of the slot 359 engaging the arm 248, it being understood that the plate 243 connected to the arm 245 of the lever 245, 247, 248 is held beneath the plate 207, preventing movement of the arm 248.

For preventing forward movement of the rod 307 if the "reverse" drive is in a "tripped" condition, the rod 307 has an abutment 369 on its rearward end, which abutment, when the arm 247 is rocked anticlockwise in the tripping of the "reverse" drive, lies behind the arm 247 (as shown in Fig. 9) and so prevents any substantial forward movement of the rod 307.

The operative cycle of the machine comprises a complete revolution of the cam shaft 233 but, as has been referred to above, the drive is automatically disconnected after the cam shaft has rotated 180° to stop the machine at the end of the first stage of the cycle of operations. The "reverse" drive can only be initiated following the end of this first stage of the cycle of operations (as above referred to) by reason of the fact that an arm 361 (Fig. 5) secured to the shaft 219 is provided with a cam roll 363 which engages the periphery 365 of the cam 231. Only when the cam shaft has been rotated 180° from its initial position does a recess (not shown) in the periphery 365 arrive adjacent the cam roll 363 to permit the arms 365 361, 309 to swing anticlockwise. In other words the hand pad 317 for initiating the reverse drive cannot be moved rearwardly except when the cam shaft is in its intermediate stopping position.

For ease in maintenance the clutch and main drive assembly including the cam shaft may be removed as a unit from the machine, after cam levers associated with the various cams on the cam shaft have been removed.

SIDE GRIPPERS AND SIDE WIPING DEVICES

The side grippers, wiping devices and tacking devices (hereinafter described) at opposite sides of the machine, together with part of their operating mechanism, are assembled in the form of what may be termed "side gripper units," S1 and S2, and one of these units (S1) is shown in Fig. 60. Each unit is so mounted in the machine (in a manner to be described in detail hereinafter) as to be readily removable from the machine to facilitate maintenance. The following description will be given with particular reference to the unit S1 (omitting, for the time being, a description of the tacking devices) at the left hand side of the machine but it is to be understood that the unit S2 at the opposite side of the machine is but a "mirror image" of the unit to be described in detail. Figs. 51 to 57 show the unit S1 (or parts thereof) but do not show the associated tacking devices.

Referring to Fig. 51 it will be observed that the unit S1 comprises a carrier 375 in the form of a hollow casting through an upper portion (as seen in Fig. 51) of which extends a shaft 377. On the shaft 377 is journaled a sleeve-like member 379 (see also Fig. 55) from which an arm 381 extends upwardly. Two other arms 382, similar to the arm 381, are mounted on the sleeve-like member 379 and extend parallel to the arm 381. Each of the two side grippers in the unit S1 is individually guided by a pair of plates 383, outer end portions of which are pivotally connected, by means of studs 385, to upper end portions of the arms 381, 382, the arm 381 supporting a pair of the plates 383 (one for each of the two grippers). Inner end portions of each pair of plates 383 are pivotally connected, by means of a bolt 387 (Fig. 51), to an upper end portion of a link 389, lower end portions of the two links 389 associated with the two grippers of the unit S1 being threaded into end portions 384. The end portions 384 are provided with slots 386 (extending lengthwise of the links) and through the slots extend pins 391 by which the portions 384 are pivotally connected with opposite end portions of a balancing lever 393. Plungers 388 received in bores in the end portions 384 are backed by springs 390 and engage the pins 391 thereby urging the links 389 upwardly relatively to the pins 391. The balancing lever 393 is pivoted, midway between its ends, on a pin 395 carried by one arm 397 of a two-armed lever 397, 399, this lever, in turn, being pivoted on a pin 401 secured in the carrier 375. The links 389 thus support the inner ends of the plates 383 of the grippers, the latter being additionally supported against unwanted movement lengthwise of a shoe relatively to the carrier 375 by means of an inverted U-shaped member 403 secured to the carrier 375 and embracing the outermost ones of the plates 383. Initially the arm 397 is positioned by engagement with a stop formed by a block 396 hereinafter referred to and the spring-pressed plungers 388 yieldingly hold upper edges of the plates 383 against the under side of the U-shaped member 403 which thus determines the initial heightwise positions of the grippers relatively to their carrier 375.

The carriers 375 of the units S1, S2 each have a tubular portion 405 surrounding a rod 407 and each rod 407 has a bifurcated head portion 409 embracing a trunnion block 411 (Fig. 37A) which is pivoted on the head portion 409 by means of pivot studs 413. Trunnion pins 414 extend from the blocks 411 into bores in bifurcated upper end portions of levers 415, there being one lever 415 for each of the units S1 and S2. Opposite end portions of the levers 415 are pivoted by means of pins 417 on blocks 418 which are pivoted, by means of pins 420 lying perpendicular to the studs 417, on parallel arms 419 (Fig. 37) of bell crank levers pivotally mounted in the machine as will be hereinafter described, the bell crank levers having other arms 833. The levers 415 are slotted at 423 to receive blocks 425 (see also Fig. 37A). The blocks 425 are received between bifurcated end portions of links 429 to which they are pivoted by means of pins 427. The blocks 425 are pivotally mounted with respect to the levers 415 by means of bolts 416, the axes of which are perpendicular to the axes of the pins 427. The opposite end portions of the two links 429 associated with the side gripper units S1, S2 at opposite sides of the shoe are pivotally mounted on pins 431 carried by three parallel arms 433 (see Fig. 48, only one being visible in Fig. 37). The arms 433 are spaced apart in a direction extending widthwise of the machine and extend from a single hub secured to a shaft 435. The shaft 435 is journaled in bearings in the base casting 1 and extends transversely of the machine.

The arms 399 associated with the two side gripper units are connected by means of ball-ended studs 437 (see also Fig. 51) to upper end portions of levers 439 (Fig. 37). The levers 439 are pivoted at their other end portions on pins 835 carried by bifurcated end portions of arms 837 of bell crank levers 837, 839. The centers of the ball-ended portions of the studs 437 lie on the extended axes of the rods 407 (Fig. 51) and these axes are so disposed in the machine as to lie at least substantially perpendicular to the general plane of the forepart of the shoe bottom when supported on the shoe support.

The bell crank levers 837, 839 associated with the two side gripper units S1 and S2 are journaled freely on a common shaft 841 (Fig. 38) carried in forwardly projecting lugs 843 on a bearing bracket 597 which is secured to opposite side portions of the base casting 1. This bearing bracket has several lugs some of which extend forwardly and others extend rearwardly therefrom providing supports for parts hereinafter referred to. The arms 839 and 833 are connected together by means of connecting rods 845 and pivot studs 847, 849. By swinging the bell crank levers 837, 839 and hence the bell crank levers 419, 833 (through the action of the rods 845) about their pivots the side gripper units may be adjusted in directions extending lengthwise of the last as will be explained hereinafter. The arms 433 and levers 439 are connected with means for causing the side grippers to move to tension the upper materials at the opposite sides of a shoe as will be hereinafter described.

The weight of the side gripper units S1 and S2 about the common axes of the studs 437 and rods 407 is balanced by weights 440 (Fig. 1) connected, via cables 442 passing over pulleys 444 (Figs. 1 and 2) carried by brackets 462 mounted on the machine frame, with arms 446 (Fig. 2) secured to the carriers 375 while the weight of mechanism acting about the pins 431 is at least partly balanced by the action of tension springs 432 (Figs. 1 and 37), connected between arms 434 secured to lugs 436 on the links 429 and extending rearwardly beyond the pins 431 and hooks in the base of the machine frame.

From what has been said above it will be appreciated that the side gripper units S1 and S2 may readily be removed from the machine for maintenance purposes on removal of (*a*) nuts 448 (Fig. 51) from the studs 437, (*b*) nuts 450 from the studs 413 and (*c*) tubes hereinafter referred to for delivering compressed air to the tacking devices incorporated in the side gripper units.

Each of the side grippers comprises an inner jaw 441 and an outer jaw 443 (Figs. 51 and 57) movable relatively to the inner jaw, it being understood that the terms "inner" and "outer" are used with respect to the position the jaws occupy with relation to a shoe being operated upon, i. e., the inner jaws lie nearer to the shoe. Each jaw 441 is secured to one end portion of a guide member 445 having lugs 447 extending downwardly therefrom to embrace the upper end portion of the link 389 associated with the gripper (see also Fig. 54). The member 445 has an inverted T-shaped guideway extending lengthwise of the member and in this guideway is received a lower ribbed portion of a slide 451 to one end portion of which is secured the jaw 443 (Fig. 56). The slide 451 has a part cylindrical upper rib 453 extending lengthwise of the slide, the rib 453 being received fairly loosely within a guideway in a block 455 secured between the plates 383. A tail portion 452 (Fig. 51) of each guide member 445 has a depending lug 454 which is provided with a bore (coaxial with the axis of the rib 453) which receives a stud 456. The stud 456 is carried in a block 458 secured to outer end portions of the plates 383. The slide 451 and the member 445 are thus, as it were, suspended from the blocks 455 and 458 with capacity for a limited amount of rocking movement about the axis of the rib 453 (i. e., about an axis extending substantially normal to the edge of a last in the vicinity of the locality of action of the gripper) to allow the gripper to rock somewhat about this axis, if need be, as it pulls the upper materials. Leaf springs 460, T-shaped as seen in Fig. 57, are secured to the tail portions 452 and extend over the plates 383. These springs act to centralize the grippers about the axes of the ribs 453.

The lugs 447 (Fig. 51) serve to locate the member 445 and the jaw 441 relatively to the plates 383 and means is provided for moving the jaw 443 towards and away from the jaw 441 to cause the gripper to grip or release upper material between the jaws. It will be observed that the general planes of the work-engaging portions of the jaws (which portions are serrated to enhance their gripping action on the material) lie at least substantially parallel to each other and remain so during opening and closing movements of the grippers. The grippers are designed in this manner with a view to providing for firm, even, gripping of the upper materials (irrespective of their thickness). Furthermore, in their initial open positions, a considerable space is provided between the jaws 441, 443 of each gripper thus facilitating introduction of upper material therebetween.

Considering each of the side grippers of the unit S1, an end portion of the slide 451 remote from the jaw 443 is pivotally connected, by means of a pin 457 (see also Fig. 57), with a pair of parallel links 459 connected, in turn, by means of a stud 461 with one arm 463 of a two-armed lever, the second arm, 465, of which is bifurcated to receive an upper end portion of a connecting link 469 (Fig. 51) to which it is pivotally connected by means of a pin 467 having thereon a part-spherical member (not shown) received in the upper end portion of the link, thus forming a semi-universal joint between the arm 465 and the link 469. The lever 463, 465 is pivoted on a pin 471 mounted eccentrically on a pair of flanged bosses 473 (Fig. 52) rotatable in alined bores extending transversely of the guide member 445. The bosses are restrained against rotation by the action of compression springs 475 on plungers 477 slidable in bores extending lengthwise of the member 445, the plungers engaging lugs 479 depending from the flanges on the bosses 473. The arm 463 and the links 459 provide a toggle which is broken upwardly when the jaws of the gripper are open. The jaws are closed by the exertion of an upward thrust on the connecting link 469 by means shortly to be described. The closing movement of the jaw 443 of each side gripper towards the jaw 441 takes place quickly and the impact of the jaw 443 on the upper material transmits a sudden impact to the pins 471. Under these conditions considerable frictional force is built up between the bearing surfaces of the bosses 473 and the bores in the member 445 in which they are received. This frictional force aids the springs 475 in resisting movement of the pin 471 carried by the bosses 473 in an arc of a circle about the axis of the bosses and ensures that, whatever the thickness of the upper materials between the jaws, the latter "bed" themselves into the upper so that it is firmly gripped by the jaws after which, as the lever 463, 465 is rotated fully to straighten the toggle formed by the arm 463 and the links 459, the pin 471 moves, in a direction extending away from the jaw 441, in an arcuate path about the axis of the flanged bosses 473.

For closing the gripper jaws 443 towards the jaws 441 the following mechanism is provided. The links 469 associated with the two grippers of the side gripper unit S1 are connected by means of studs 481 to arms 483 of bell crank levers fulcrumed on the sleeve-like member 379. The bell crank levers lie between the arm 381 and the arms 382 of the two grippers and have other arms 491 which are bifurcated and receive trunnion pins 485 through transverse bores in which extend upper end portions (as seen in Figs. 51 and 55) of rods 495. The trunnion pins are retained on the rods 495 by means of nuts and lock nuts threaded onto the upper end portions of the rods and compression springs 496, received between collars 498 engaging the trunnion pins 485 and flanges 500 on the rods, tend to maintain the trunnion pins in engagement with the nuts on the upper end portions of the rods 495. However, the trunnion pins may move to a limited extent (determined by engagement of the collars 498 with shoulders 502 on the rods 495) if need be during return movements of the grippers hereinafter referred to. Lower end portions of the rods 495 are secured in opposite end, portions of a pin 497 extending through an arm 501 of a lever having a second arm 511 hereinafter described. The lever 501, 511 is secured to a shaft 503 journaled in bearings in the carrier 375. The arm 501 also carries a pin 505 to which end portions of tension springs 507 are connected, other end portions of the springs being connected to pins 509 secured in the carrier 375, the springs tending to rotate the arms 501, 511 in an anticlockwise direction (as seen in Fig. 51) to close the gripper jaws and effect other movements of parts associated with the grippers later to be described, but such movement is only allowed to take place at certain times during the cycle of operations of the machine as will later become apparent. The arm 511 is bifurcated and restraint on the action of the springs 507 is imposed initially by means of a rod 513 having a slot 515 in an end portion which extends between the limbs of the bifurcated arm 511 and receives an eccentric stud 517 carried by that arm and later, after an initial movement of the arms 501, 511 has taken place to effect closing of the grippers on the upper, by engagement of a stop plate 519, secured to the arm 511, by a stop plate 521 carried by a trip lever 523 as will be hereinafter described.

The arm 501 has integrally formed therewith a bifurcated portion 525 to which is pivoted a trunnion block 527. The block 527 has a transverse bore extending through it and through this bore extends a rod 529, a head portion 531 of which is bifurcated to receive an arm 533 integral with the arm 381. The arm 533 is pivotally connected with the head portion 531 of the rod 529 by means of a pin 535. A compression spring 537 surrounds the portion of the rod 529 between the head portion 531 and the block 527, while a nut 539 threaded onto the end portion of the rod 529 remote from its head portion (and held thereon by means of a lock nut) is arranged to be engaged by the under side of the block 527 at times during the cycle of operations of the machine. Initially the lever 501, 511 is in an extreme clockwise position (as seen in Fig 51) determined by engagement of the right-hand end face of the slot 515 with the stud 517 in the arm 511, the rod 513 then being in its extreme position towards the left. Under these circumstances the nut 539 is just out of engagement with the block 527 and the spring 537 acts to hold the arms 381, 382 in a position determined by engagement of a finger 541 (secured to the carrier 375) with the arm 533, the grippers being then in the position shown in Fig. 51 with respect to the carriers 375. The end portion of the rod 513 remote from the slot 515 is pivotally connected, by means of a pin 545, to a forked end portion of an arm 547 (the pin being retained in position by means of a retaining plate 546 screwed to the arm 547). The arm 547 forms part of a bell crank lever pivoted on a pin 549 secured in the carrier 375 and having a second arm 551. The arm 551 is bifurcated (Fig. 54), the limbs having guideways extending lengthwise of the arm to receive blocks 553 forming bearings for pins 555 extending from a trunnion block 557. The trunnion block 557 is held on a lower end portion of the rod 407 (with capacity to pivot therearound) by means of a nut and lock nut 559. One end portion of a link 548 is pivotally connected, by means of a pin 550, to the arm 547. The other end portion of the link 548 is provided with a slot 552 (extending lengthwise of the link) and extends between the limbs of the bifurcated arm 511. A pin 554 carried by the arm 511 extends through the slot 552 and is initially engaged by a setscrew 556 secured in the slotted end portion of the link 548 (Fig. 51).

When the bell crank lever 547, 551 is swung clockwise (as seen in Fig. 51) by means hereinafter described, the link 548 and rod 513 are moved to the right and the setscrew 556 positively swings the lever 511, 501 anticlockwise, the springs 507 contracting somewhat. Such movement of the lever 511, 501 continues until the stop plate 519 engages the stop plate 521, by which time the toggle formed by the arm 501 (including the portion 525) and the rod 529 will have been brought into a position just beyond its straightened condition (i. e., the pin 527 will have moved just beyond an imaginary line connecting the centers of the shaft 503 and the pin 535, as shown in Fig. 52). The spring 537 will have been thereby compressed further and the arms 381, 382 will thereby be maintained in their initial positions with the finger 541 engaging the arm 533. The movement of the arm 501 just referred to is such that the toggles 459, 463 are straightened (through the action of the rods 495, arms 491 and 483 and the connecting links 469) to close the jaws 443 against the upper materials backed by the jaws 441. Under these conditions toggles formed by the links 469 and arms 483 are also straightened. When the grippers have closed on the upper the pins 467 lie coaxially with the studs 385 and also lie on the axes of the ribs 453 together with the axes of the studs 457 and 461. Furthermore, since for each of the grippers in the units S1, S2, the connection between the arm 465 and the link 469 includes a part spherical member on the pin 467, each gripper is free to rotate about the axis of the rib 453 associated therewith during the pulling action of the grippers without restraint from the gripper-closing parts just described.

While, on movement of the rod 513 to the right as seen in Fig. 51, the springs 507 tend to swing the levers 511, 501 in a direction to close the gripper jaws, the link 548 is provided positively to overcome inertia of the gripper-closing parts and to provide for positive closing of the gripper jaws.

Also secured to the shaft 503 outside the carrier 375 are arms 1733, these arms being pivotally connected, by means of pins 1735, to end portions of links 1737. The other end portions of these links are pivotally connected, by means of pins 1739, to portions of a casting 489. The casting 489 is pivoted on coaxially arranged pins 487 (Figs. 51 and 60) carried by front and rear walls of the carrier 375. The side wipers 23 of each side gripper unit are secured by screws 1740 (Fig. 51) to wiper holders 1741 pivoted, by means of pins 1743, to carriers 1745.

Each carrier 1745 has an outer end portion provided with a slot 1747 which receives a pin 1749 secured in the casting 489. Each wiper has an under face 1751 by which it is supported on the top of the U-shaped member 403. A spring-pressed plunger 1753 received in a bore in each carrier 1745 engages an outer face on the associated wiper holder 1741 and tends to rotate the holder anticlockwise (as seen in Fig. 51) about the pin 1743 to urge the wiper upwardly to a limit determined by a lug 1755 on the holder 1741 engaging with an upper face on the carrier 1745. Spring-pressed plungers 1757 received in bores in the casting 489 engage outer ends of the carriers 1745 and urge them to the right as seen in Fig. 51 (i. e., towards the center of the machine) to a limit determined by engagement of the outer ends of the slots 1747 with the pin 1749. Springs 1758 connected between the pins 1743 and hooks in the carrier 375 seat the under faces 1751 of the wipers 23 on the member 403.

For removing the plate 521 out of the path of the plate 519 on the arm 511 to allow the springs 507 to rotate the lever 501, 511 during the second stage of a cycle of operations of the machine there is provided a connecting rod 565 which is pivoted, at one end, on a pin 567 carried by the trip lever 523 and, at its other end, on a pin 575 carried by one arm 577 of a lever having a second arm 581. This lever is freely pivoted on a pin 579 supported in the front and rear walls of the carrier 375 and the pin 579 has an arm 583 also freely pivoted on it. The trip lever 523 has connected to it one end of a tension spring 571, the other end of which is anchored to a pin 573 secured in the carrier 375. The arm 583 has a catch portion 585 which, at times, is arranged to hook over a block 587 secured to a lug 589 on the arm 399. A block 563 is provided with lugs 564 by which it is pivoted on the pin 549. A spring-pressed poppet 566 in the block engages an under face 568 on the arm 547 and urges the block, anticlockwise as seen in Fig. 51, about the pin 549 into engagement with a notch 569 in the arm 583. A lug 561 formed integrally with the arm 551 of the bell crank lever 547, 551 has a face 570 which at times engages a face 572 on the block 563. The function of the parts just above referred to will be described hereinafter. To cause the side grippers to pull the upper the carriers 375 are moved downwardly and rearwardly in the machine (in directions parallel to the axes of the rods 407) definite distances while the grippers may move relatively to the carriers (as a result of resistance of the upper material to tensioning) against the action of "updraw" springs hereinafter referred to, such relative movement of the grippers occurring as a pivotal movement about the studs 385.

The means for causing the side grippers to move to tension the upper will now be described. Formed integrally with the hub carrying the arms 433 is a downwardly extending arm 591 (Fig. 37), a lower end portion of which is bifurcated and is connected by means of a pin 593 with a forward end portion of a connecting rod 595. The rod 595 extends rearwardly through an aperture in the bearing bracket 597. A rearward end portion of the connecting rod 595 is pivotally connected, by means of a pin 599, with an arm 601 of a lever having a second arm 603 and a third arm 1271 (see also Figs. 12, 13 and 48) hereinafter referred to. The lever 601, 603, 1271 is freely pivoted on a cross shaft 605 secured in rearwardly projecting portions of the bearing bracket 597. The arm 603 carries a stud 607 on which is rotatably mounted a cam roll 609 riding in a cam track (not shown) formed in the cam 1852 (Fig. 13).

The levers 439 (Fig. 37) carrying the ball-ended studs 437 of the gripper units are pivotally connected, between their ends, on pins 615 carried by bifurcated front end portions of links 617. Rearward end portions of the links 617 are pivotally connected, by means of pins 619, with arms 621 of bell crank levers having other arms 623. The arms 623 are of inverted U-shape as seen in transverse section (Fig. 40), providing inner and outer side walls between which extend pins 629 (having cranked outer end portions 630 hereinafter referred to) on which pins are secured levers 631, the pivots being between the ends of the levers. The bell crank levers 621, 623 associated with the two side gripper units at opposite sides of the machine are fulcrumed on a shaft 625 (Fig. 40) and two pins 626 (coaxial with the shaft) which are carried by brackets 627 secured to the intermediate casting 3 of the machine frame, the pins 626 being received in outer walls of the brackets 627 and bores formed in the outer walls of the arms 623 leaving a clear space between the walls of the arms 623 for the levers 631. The levers 631, which have an equalizing or differential action, as will appear below, are connected with mechanisms which are substantially identical, one being provided at each side of the machine. Forward end portions of the levers 631 (Fig. 38) at opposite sides of the machine are connected, by means of pivot pins 633, with heads 635 on upper ends of connecting rods 637 (spaced apart widthwise in the machine—see Fig. 48) mounted for up and down movements in bosses 641 (Fig. 38) on the bearing bracket 597, sleeves 643 being threaded into the bosses 641 and providing guides for lower end portions of the rods 637 (the diameter of the rods being slightly less than the diameter of the bores in the sleeves for a purpose hereinafter referred to). Flanges 645 on the sleeves 643 provide stops against which leather washers 647 lying on enlarged end portions 649 of the rods 637 abut to limit upward movement of the rods. By rotating the sleeves 643 in the bosses 641 the heightwise position at which upward movement of the rods 637 (under the action of springs 681 hereinafter referred to) is arrested may be adjusted. The sleeves are held in adjusted position by means of locking rings 651.

The portion 649 of each of the rods 637 has secured to it parallel depending plates 653 (spaced widthwise of the machine, see Figs. 37 and 39) lower end portions of the plates being connected together by means of studs 654 (Fig. 37). The plates 653 receive between them, and are pivotally connected (by means of a pin 655) to, a portion of a substantially triangular member 657, the pin 655 being adjacent to one apex of the member, and there being one member 657 for each of the side gripper units. Each member 657 is pivoted, at a locality adjacent a second apex thereof (which lies forwardly of and, when the machine is at rest prior to the commencement of the first stage of a cycle of operations as shown in Fig. 37, at substantially the same level as the first-mentioned apex) by means of a pivot stud 659 to upper end portions of a pair of parallel links 661 (see also Fig. 39). The links are pivoted, between their ends, on a pin 663 carried by an arm 665 extending forwardly from a pivot stud 667 secured in a forwardly extending portion 669 of the bracket 597. Lower end portions of the links 661 are connected, by means of a pivot stud 671, to a forwardly extending arm 673 of a bell crank lever pivotally mounted on a stud 675 secured in the portion 669 of the bracket 597. The bell crank lever has a downwardly extending arm 677 connected, by means of a pin 679, with forward end portions of a pair of heavy springs 681 (i. e., there is a pair of springs 681 associated with each side gripper unit S1, S2). The rearward end portions of the spirngs 681 at each side of the machine are coupled, by means of pins 683, to arms 685 pinned to a shaft 687 journaled in bearings in the bearing bracket 597 and having also pinned thereto a rearwardly and upwardly extending arm 689 connected with spring tension-adjusting means.

As will become clear from the description to follow the springs 681 are equivalent to the usual so-called "updraw" springs associated with the side grippers of conventional pulling over machines and the purpose of the tension-adjusting means just referred to is to provide an adjustment whereby the operator may (before causing the machine to operate on a run of work) suit the tension of the springs to the upper materials to be operated upon by the machine. This spring tension-adjusting means will be described hereinafter. The triangular members 657 associated with the side gripper units S1, S2 at the opposite sides of the machine serve as levers transmitting the action of the springs 681 to the side grippers and the triangular members are provided with variable fulcra so that, by moving the fulcra of one or both of said triangular members (and thereby altering the leverage through which the "updraw" springs act on the upper materials) at the conclusion of the first stage of the cycle of operations of the machine, the operator may modify the pulling action of the side grippers. The fulcra for the members 657 are effectively the peripheries of sleeves 721 (Fig. 39), the sleeves having flanges 723 thereon which engage opposite sides of the members 657 to restrain the members against movement laterally of the sleeves. The sleeves 721 have flats 722 formed thereon which just clear arcuate faces 725 (Fig. 37) formed on the members 657 at the lower sides of openings (in lower portions of the members) through which the sleeves extend. Each of the triangular members 657 is effectively supported by a pair of bell crank levers having arms 733, 735, the bell crank levers of each pair being spaced apart widthwise in the machine and lying at opposite sides of the triangular member with which they are associated (see Figs. 39, 46 and 48). The bell crank levers 733, 735 are fulcrumed on roller bearings 737 (Fig. 39) supported by studs 739 secured in projections 741 on the bracket 597. Lower end portions of the arms 733 of each pair of the bell crank levers are secured together by means of a bolt 729 extending through a tubular spacing member 740 which lies within the sleeve 721.

Opposite end portions of each of the sleeves 721 extending outwardly beyond the flanges 723 are pressed into bores in lower end portions of a pair of parallel links 743 (spaced apart widthwise of the machine and lying one at either side of the member 657 with which the links are associated). Upper end portions of each pair of the links are mounted on roller bearings 745 carried by a composite fulcrum stud 747 received in a transverse bore in the triangular member 657 with which it is associated at a locality adjacent the third (i. e., the upper) apex thereof. Pressed into the bores (in which are received the roller bearings 737) of the bell crank levers 733, 735 (at inner sides thereof) are flanged members 736 having internal bores of a diameter considerably larger than the diameter of head portions 738 formed at opposite ends of the stud 747, the head portions being received within the bores of the flanged members. The members 736 serve to retain the roller bearings 737 in position in the bell crank levers and also act as spacers between the hubs of these levers and the links 743. The arms 735 of each pair of bell crank levers 733, 735 are connected together by means of a flanged cylindrical bushing member 749 (Fig. 37) in which is eccentrically mounted a stud 751 to which upper end portions of a pair of parallel links 753 are pivotally connected. Lower end portions of the links 753 are connected to mechanism controlled by a joystick 851 (Fig. 46) for controlling the positions of the sleeves 721 forming the virtual fulcra for the triangular members 657 and thereby enabling the operator to adjust the pulling action of the side grippers while they are holding onto the upper materials at the end of the first stage of a cycle of operations of the machine. The connections between the joystick 851 and the links 753 will be hereinafter described.

Figure 2:
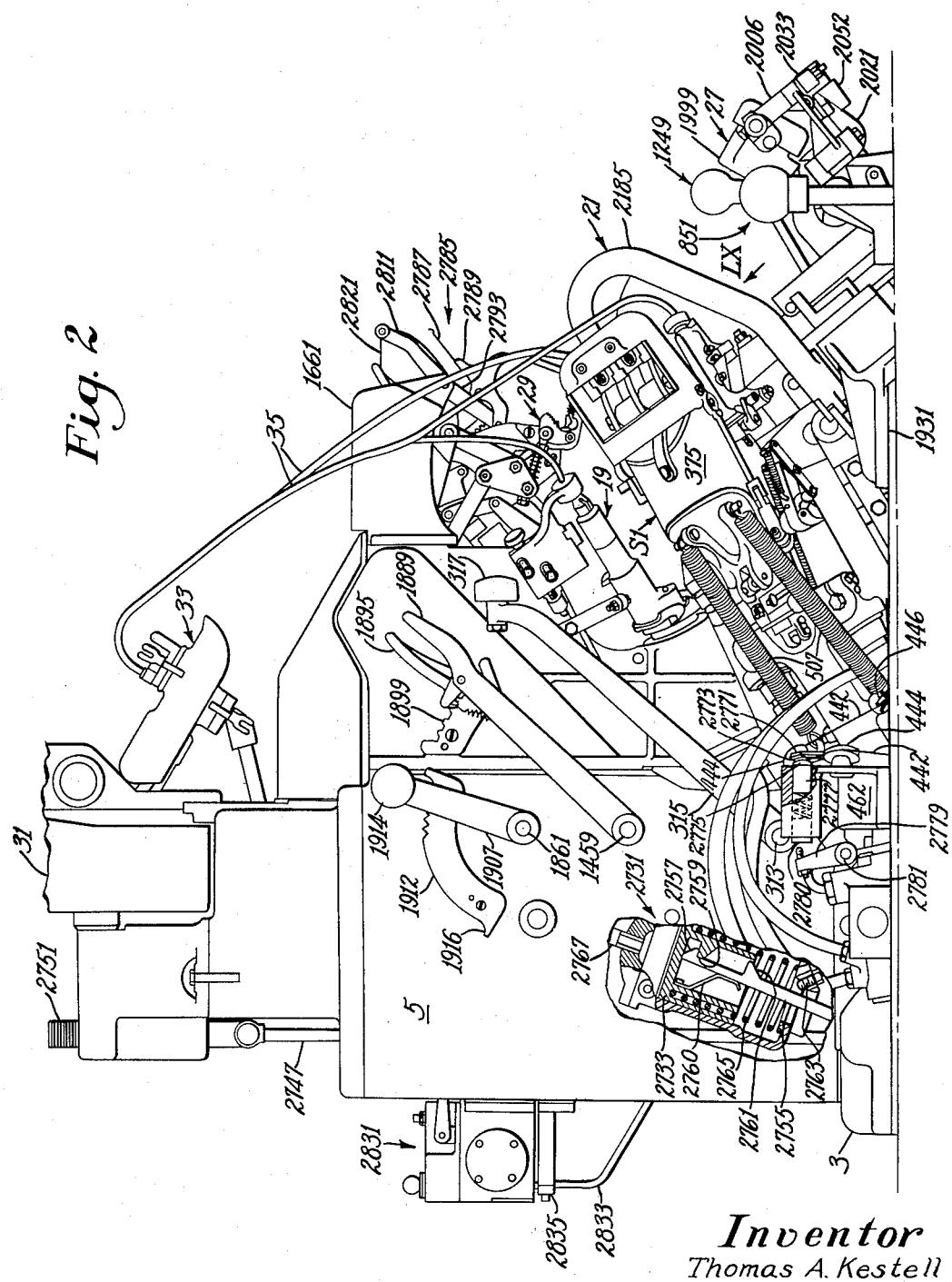

The means for adjusting the tension of the springs 681 will now be described with reference to Figs. 2, 39 and 41. It will be appreciated that the shaft 687 has secured to it two arms 685 (one associated with the pair of springs 681 at the left hand side of the machine and the other associated with a pair of springs 681 at the other side of the machine) and a single arm 689. To an upper end portion of the arm 689 is pivotally connected a rearward end portion of a link 691 which extends forward through an aperture 692 in the bracket 597 and has its forward end portion pivotally connected, by means of a pin 693, to an intermediate portion of a composite lever 695. A lower end portion of the lever 695 is pivoted on the pivot stud 675 at the left hand side of the machine, this stud being additionally supported in a bracket 676 secured to the bearing bracket 597. An upper end portion of the lever 695 embraces a block 697 threaded upon a threaded portion of a shaft 699. Rolls 701 carried by pins 703 on the bifurcated portion of the arm 695 engage flanges 705 formed on the opposite sides of the block 697, being held thereagainst by the action of the springs 681. A rearward end portion of the shaft 699 is journaled in a bore in the bearing bracket 597 while a forward end portion extends through (and has secured to it) a collar 707. The collar has a sleeve-like portion 711 journaled in a bore in a front wall of the base casting 1 and a hand wheel 713 is secured to the front end of the shaft. A thrust bearing 715 is provided between a hub of the hand wheel and the casting 1. Rotation of the hand wheel 713 causes the block 697 to move along the shaft 699 and this, through the linkage 695, 691, 689, is effective to extend the springs 681 or to allow the springs to contract, thereby setting the tension transmitted to the side gripper pulling mechanism. An indication of the degree of adjustment of this tension is given by means of an indicator comprising a pointer formed at an outer end of an arm 709 (Fig. 1) of a two-armed lever 709, 717. The lever is fulcrumed on a stud 719 carried by the base casting 1 and the arm 717 is coupled by means of a link 710 and pins 712 to an upper portion of the lever 695. The pointer moves over an arcuate scale 714 secured to the base casting 1 in a position convenient to be observed by the operator.

The illustrative machine is provided with dashpot arrangements associated with the side gripper pulling mechanisms (one for the mechanism at each side of the machine) which arrangements are connected to rearwardly extending arms of the levers 631 and these form "hydraulic locking arrangements" which are functionally somewhat similar to the mechanical locking devices 41 referred to in United States Letters Patent No. 2,552,793, granted May 15, 1951, in my name. Each dashpot arrangement comprises a cylinder 761 (see particularly Fig. 38) having a downwardly extending lug 763 through a transverse bore in which extends a pin 765 by means of which the dashpot is supported on a bracket 767 extending rearwardly from the bracket 597 to which it is secured. Within the cylinder is received a piston 769 having a pair of upwardly extending parallel arms 771 (see also Fig. 40) integral therewith and spaced widthwise of the machine. Between these arms extends a transverse pin 773 by means of which the rearward end portion of the associated lever 631 is connected to the piston. A tubular cover 775 extends downwardly from an upper end portion 779 of the piston extending above the cylinder to exclude dust from the cylinder and is provided with a filling aperture 772 normally covered by a spring clip 774.

The piston is hollow and provides a chamber 777 closed at its upper end by the portion 779 of the piston. In a lower end portion of the piston is secured a valve body 781 in which are formed upper and lower compartments 783 and 785 respectively. A ball valve 789 urged upwardly by a spring 791 (supported by a lower end cap 793 of the valve body) at times prevents communication between the compartments 783 and 785. The lower compartment 785 is in communication with the space in the cylinder 761 below the piston through passages 795 in the end cap 793 and through passages 796 in the valve body. The lower end portion of the piston is provided with a cup washer 797. For depressing the ball valve 789 against the action of the spring 791, there is provided a push rod 799 having a flange 790 above a lower end portion of reduced diameter. The flange is slidable in a bore providing the compartment 783 in the valve body and has passages 787 establishing communication between the compartment 783 and the chamber 777 through passages 788 in a collar 792 supported by an upper portion of the valve body 789. An upper portion of the rod 799 has secured to it a collar 805 which is slidable heightwise in a bore in the portion 779 of the piston. A compression spring 803 surrounds the push rod between the collar 792 and the collar 805 and tends to urge the rod upward to an extent limited as will hereinafter be described.

The upper end of the push rod 799 abuts against an under surface of a trip arm 807 secured to a pin 809 journaled in bores in the arms 771. Also secured to the pin 809 is an auxiliary trip lever 811 having a lug 813 extending transversely therefrom. Secured in the lug is a heightwise extending setscrew 815 arranged to be engaged by an under surface of a main trip lever 817. The trip lever 817 is freely pivoted on a stud 819 extending transversely from a portion of the bearing bracket 597. Substantially midway of its length the trip lever 817 has a transversely extending pin 821 secured therein, the pin being provided with flats facings upwards and rearwards. The upper flat is arranged (as will be hereinafter described), to be engaged, at times, by a lower face of a block 823 carried by a depending arm 825 of a lever having a second arm 826, the lever being pivoted on a stud 827 extending transversely from the cranked portion 630 of the pin 629. The arm 826 is arranged to be engaged, at times as will be later described, by a nut 828 adjustably threaded on a portion of a rod 830 which extends through a bore in the arm 826. The rod 830 has a head portion pivoted, by means of a stud 832, on an arm 834 secured to a cross shaft 1263. The cross shaft is journaled in the bearing bracket 597 and has a second arm 1265 secured to it. The arm 1265 is pivotally connected, by means of a pin 1266, with one end portion of a link 1267, the other end portion of which is pivotally connected to the arm 1271 formed on the cam-controlled lever 601, 603 controlling upper-pulling movements of the side grippers (Fig. 37). The auxiliary trip lever 811 has an upper face 829 (Fig. 37) arranged to be engaged by a setscrew 831 secured in adjusted position in a heightwise extending bore in the intermediate casting 3 of the machine frame. The setscrew 831 is so adjusted that, prior to commencement of the first stage of a cycle of operations of the machine, the face 829 is engaged thereby and the push rod 799 is depressed slightly to open the valve to a limited extent for a purpose hereinafter referred to.

A description will now be given of the operation of the gripper units and in this description reference will be made to the cam timing chart shown in Figs. 77 and 78 in which the line G—G represents the timing of the movements of the side gripper units towards and away from the opposite side of the last, the line H—H represents the timing of the side gripper upper-gripping and releasing movements, the line K—K represents the timing of the upper-pulling and return movements of the side grippers, the line L—L represents the timing of the "outward" and "inward" movements of the side grippers relatively to their carriers and the line M—M represents the timing movements of the wiping devices associated with the side gripper units. The closing and pulling actions of the side grippers will be described with reference to the gripper unit shown in Figs. 51–57 but it will be understood that the function of the unit at the other side of the machine is similar.

Prior to the commencement of the closing and pulling operations of the grippers the latter occupy raised positions in the machine and the head portions 409 of the rods 407 are spaced somewhat above the upper ends of the tubular portions of the carriers 375 (as seen in Fig. 51). Furthermore (*a*) the arm 397 lies in engagement with the stop block 396 which is mounted on an eccentric stud 398 carried by the carrier 375, (*b*) the downturned end portion 585 of the arm 583 lies in front of the block 587, while the lower portion of the block 563 lies in the notch 569 in the arm 583 and (*c*) the bell crank lever 547, 551 occupies its most anticlockwise position, the rod 513 holding the arms 511, 501 and 1733 in their most clockwise positions (i. e., those shown in Fig. 51) against the action of the springs 507. Shortly after the commencement of the first stage of the power-operated cycle of operations of the machine, the side gripper units are moved inwardly towards the work (see the portion *a—b* of the line G—G of the cam timing chart) by means which will be hereinafter described to cause the inner jaws of the side grippers to engage the sides of the last, Fig. 51, the grippers being thereby "squared" to the last (by swinging movement of the carriers 375 about the axes of the rods 407 and studs 437) and are then retracted (see the portion *b—c* of the line G—G of the cam timing chart) a measured amount (of the order of 1/32″) thus positioning the side grippers for the pulling operation and freeing the grippers from engagement with the last for succeeding movements of the grippers, Fig. 52. At the same time the tacking devices associated with the side grippers are positioned with respect to the edge of the last so that, when the tacks are subsequently driven, they are driven at localities bearing a constant relation to the sides of the last. Inward movement of the side grippers as above described also ensures that the toe portion of the insole (if it has not already been tacked to the last bottom in correct position) is centralized with respect to the toe portion of the last bottom. After the grippers have been thus positioned they are caused to seize the upper materials and to move to pull the upper snugly about the last in the following manner.

Referring to Fig. 51, it will be appreciated that, as the rod 407 descends, under the control of the appropriate cam track as hereinbefore described, to bring the head portion 409 into engagement with the tubular portion 405 (the timing of this portion of the movement of the rod 407 being represented by the portion *a—b* of the line H—H of the cam timing chart) the arms 511, 501 and 1733 are caused to rotate, through the action of the link 548, anticlockwise until the plate 519 on the arm 511 engages the plate 521 as above described. (Figure 52 shows the parts just above described in these positions but it is to be understood that in this figure the grippers are actually exerting a pulling action on the upper.)

During movement of the rod 407 relatively to the carrier 375 the grippers are closed on the upper and during the major portion of this movement the arm 583 is held down by the block 563 engaging in the notch 569 so that the portion 585 on the arm 583 prevents anticlockwise rotation of the lever 397, 399 (and consequently movement of the grippers) relatively to the carrier 375 and while with most settings of the tension of the "updraw" springs 681 (Fig. 37), the force exerted by these springs would probably be sufficient to maintain the stud 437 (and hence the carrier 375) in its initial such position being determined by engagement of the washer 647 (Fig. 38), on the portion 649 of the rod 637 with the flange 645) during the closing of the gripper jaws, with weak settings of the "updraw" springs 681 some movement of the stud 437 might possibly occur during the closing of the gripper jaws due to reactions exerted on the pin 549. Since it is desirable to ensure that under all circumstances the jaws are closed before pulling action of the grippers occurs an interlock arrangement is provided. This interlock arrangement at each side of the machine comprises a two-armed lever 850, 852 (Fig. 38) freely fulcrumed on the shaft 435, one arm (850) of the lever being coupled by the pin 431 (Fig. 37) to the arm 433 of the associated lever 433, 591. A lower end portion of the arm 852 (Fig. 38) carries an eccentric stud 854 by which a forward end portion of a link 856 is pivotally connected to the arm 852. A rearward end portion of the link 856 is provided with a slot 858 through which extends a stud 860 carried by an arm 862 (at a locality intermediate its ends), one end portion of the arm 862 being fulcrumed on a bearing member 864 screwed onto the stud 739 (Fig. 39). An upper end portion of the arm 862 has a hardened block 866 (Fig. 38) secured to it. Extending forwardly from the arm 623 of the bell crank lever 621, 623 is an extension 868 which carries at its forward end portion a block 870 having a notch 872 formed therein. A tension spring 874 extends between the extension 868 and the arm 862 and urges the arm 862 rearwards into the position in which it is shown in Fig. 38. At the commencement of a cycle of operations of the machine the block 866 lies in the notch 872 of the block 870 and prevents clockwise swinging movement of the bell crank lever 621, 623 and consequent downward movement of the stud 437. Only after the movement of the rod 407 relatively to the carrier (terminating in engagement of the head portion 409 with the tubular portion 405) during which the gripper jaws are closed on the upper does the block 866 move clear of the block 870 (as a consequence of engagement of the rear end of the slot 858 with the stud 860 and the resultant clockwise swinging of the arm 862) to permit tensioning movement of the gripper carrier. Furthermore, towards the end of this movement of the rod 407 relatively to the carrier 375 a lug 561 (Fig. 51) on the bell crank lever 547, 551 engages a face 562 on the block 563 and swings it clear of the notch 569 in the arm 583, the block 563 then occupying the position shown in Fig. 52. Such movement of the block 563 frees the arm 583 for upward swinging movement shortly to be referred to.

During the relative movement of the rod 407 with respect to the carrier 375, the arm 501 swings anticlockwise as above referred to and the spring 537 yields and holds the grippers in their initial positions (widthwise of the machine) with respect to the carrier 375. Furthermore, since during this portion of movement of the rod 407, the arm 1733 swings from the position shown in Fig. 51 to its position shown in Fig. 52, due to the toggle action of the arm 1733 and the link 1737 (in passing through a straightened position) negligible movement is imparted to the casting 489 supporting the wiper 23. It will be appreciated that the gripper jaw-closing movement is independent of the pulling movement of the grippers and, being completed before the commencement of the downward pull of the gripper, the jaws are well "settled down" on the upper material and are not likely to be disturbed by the pulling action of the grippers. The fact that the jaws initially provide a wide parallel-sided opening facilitates the introduction of the upper margin between the open jaws and the fact that the jaws remain parallel during the jaw-closing action of the grippers is likely to ensure that the grippers have a better purchase on the upper, irrespective of its thickness, than they would have if the jaw closing movement were obtained as a result of pivotal movement of one jaw relatively to the other.

As the block 563 moves clear of the arm 583, the head portion 409 on the rod 407 engages the tubular portion 405 of the carrier 375 carrying the side grippers and further downward movement of the rod 407 (which occurs over the interval represented by the portion a—b of the line K—K of the cam timing chart) causes the grippers to begin their upper-pulling movements, the gripper carrier 375 descending under the action of the appropriate cam track as above described. As the carrier 375 descends, the lever 397, 399 rocks (anticlockwise as seen in Fig. 51) the stud 437 being held in position by the action of the "updraw" springs 681, such movement of the lever 397, 399 causing the grippers to swing about the axes of the studs 385, in a clockwise direction (as seen in Fig. 51) to tension the upper. When the "give" has been taken out of the upper materials and further downward movement of the gripper jaws is resisted by the upper, the carrier 375, and with it the pin 401, continues to descend but resistance to movement of the gripper jaws causes the lever 397, 399 to be rocked, somewhat clockwise from its most anticlockwise position to that shown in Fig. 52, to move the stud 437 downward against the action of the "updraw" springs, relative movement occurring between the gripper jaws and the casing, such movement taking place about the axes of the studs 385. Referring to Fig. 37 it will be seen that downward movement of the stud 437 causes the lever 439 to rock anticlockwise, to rotate the bell crank lever 621, 623 in a clockwise direction (through the link 617). The initial portion of such movement of the bell crank lever 621, 623 causes the lever 631 to rock slightly anticlockwise about pivot 629 (from its position shown in Fig. 38) to lower the piston 769 with its arms 771 sufficiently to ease the pressure between the auxiliary trip lever 811 and the setscrew 831 thus allowing the spring 791 to close fully the valve 789 in the dashpot. The purpose of having the valve in the dashpot very slightly open at the commencement of the upper-pulling movement of the side grippers is to ensure that, before the ball-ended stud 437 comes under the full influence of the "updraw" springs 681, the "inertia" of the parts between the stud 437 and the dashpot is overcome. The dashpot piston moves downwardly some ⅛" before the valve is fully closed. In other words, the full action of the springs 681 is not applied suddenly to the upper, resistance to movement of the stud 437 (which effectively determines the pull exerted on the upper by the side grippers associated with that stud) being initially due to inertia of the parts from the stud 437 to the dashpot and to the viscosity of the oil in the dashpot.

Further movement of the bell crank lever 621, 623 causes the lever 631 to swing clockwise about the pivot pin 773 to move downwardly the rod 637 against the action of the springs 681 (transmitted to the rod 637 through the linkages including the triangular member 657 above described). During the movement of the rod 637, the triangular member 657 (Fig. 37) rocks about its virtual fulcrum (virtually a point on the periphery of the sleeve 721) and the fact that the rod 637 is a loose fit in the sleeve 643 prevents the rod from binding therein as a result of the swinging movement of the triangular member. After the rod 637 has been moved down a given distance, the block 823 (on the arm 825 (Fig. 38) carried by the lever 631) engages the upper flat on the pin 821 and further movement of the lever 631 about the pivot 773 rotates the trip lever 817 slightly anticlockwise to allow the valve 789 to open slightly. During further movement of the stud 437, the pivot 633 is held substantially stationary while the piston 769 is lowered in the cylinder 761 of the dashpot, a state of balance being set up, as a result of a differential action of the lever 631, in which the action of the springs 681 is transmitted to the stud 437, although movement of the piston 769 takes places relatively to the cylinder 761. (In this connection it is to be understood that the action of the springs 681 is tending to thrust the pivot 633 upwards to cause the valve 789 to close while the movement of the stud 437 due to resistance of the upper tends to open the valve.) As the cam-controlled movement of the gripper carrier 375 comes to an end, movement of the rod 830 (through the rotation of the arm 1271 of the cam lever 601, 603, Fig. 37) causes the nut 828 (Fig. 38) to engage the arm 826 and to rock the lever 825, 826 to carry the block 823 out of engagement with the upper flat on the pin 821. The spring 803 then raises the rod 799 and the spring 791 causes the valve 789 in the dashpot to close so that, at the end of the upper-pulling movement of the side grippers, the action of the springs 681 is positively transmitted to the stud 437. The "measuring" action above described ensures that, no matter whether the upper is "stretchy" or not, the springs 681 are extended a given extent and the triangular members 657 rock to a given extent for reasons similar to those set out in Patent No. 2,552,793 in connection with the movement of given extent of the levers referred to as 43 therein.

At the end of the first stage of the cycle of operations of the machine (which occurs after the cam shaft has rotated through 180°) the side grippers are hanging onto the upper with a pull determined by the setting of the spring tension-adjusting means associated with the springs 681. During the pause between the first and second stages of the cycle of operations of the machine the operator may perform adjustments to the pulling action of the side grippers by means of joystick controls hereinafter described. If, for example due to incorrect presentation of the work to the machine, the side grippers have not gripped the upper materials properly, the operator may press the hand pad 317 and initiate "reverse" drive of the cam shaft 233 restoring the instrumentalities of the machine to their initial positions and releasing the work for re-presentation to the machine. Assuming that the operator is satisfied with the pulling action of the grippers at the end of the first stage of the cycle of operations of the machine, or after he has made any such adjustments as may be required, he will depress the clutch-controlling treadle to initiate the second stage of the cycle of operations during which arms 1759 (Fig. 52) hereinafter referred to are caused to swing outwardly and engage the arms 581 associated with the two side gripper units, thereby swinging the levers 523 in directions to cause the plates 521 to ride clear of the plates 519 and free the levers 501, 511 and the arms 1733 associated therewith for rotation under the action of the springs 507, the studs 517 and pin 554 moving along the slots 515 and 552 respectively, movement of the levers 501, 511 being terminated by engagement of the studs 517 with the inner ends of the slots 515. Considering the gripper unit shown in Fig. 52, movement of the arm 501 from the position shown in Fig. 52 to the position shown in Fig. 53 effects opening of the gripper jaws by breaking the toggle formed by the arm 463 and the links 459 upwardly (the timing of the opening of the gripper jaws being represented by the portion c—d of the line H—H of the cam timing chart). As the grippers free the upper the action of the "updraw" springs 681 causes the rod 637 (Fig. 38) to be raised to the limit determined by engagement of the washer 647 with the flange 645 and, the dashpot being "locked" at this time (the valve 789 being closed), such movement is transmitted to the stud 437 which moves upwards, swinging the lever 397, 399 anticlockwise sharply to lower the grippers relatively to their carrier. Furthermore, rotation of the arm 501 to the position shown in Fig. 53 causes the upper nut 539 (Fig. 52) to be engaged by the trunnion block 527 and the arms 381, 382 to be swung anticlockwise to move the grippers outwards to positions (shown in Fig. 53) out of the way of the side tacking devices (such movement of the grippers being represented by the portion a—b of the line L—L of the cam timing chart). As the grippers release the upper, movement of the arm 1733 from the position shown in Fig. 52 to the position shown in Fig. 53 causes the wiper 23 to move in beneath the edge of the shoe bottom to wipe the margin of the upper beneath the edge of the insole and to hold the upper in pulled over position for the tacking operation, the wiping action being a yielding one under the action of the spring-pressed plungers 1753 and 1757. The movement of the wiping devices associated with the side grippers is represented by the portion a—b of the line M—M of the cam timing chart.

Toward the end of the second stage of the cycle of operations of the machine the side grippers are returned to their initial positions under the action of the appropriate cam track in the manner outlined below. During at least the first part of the return movement of the side grippers the springs 681 maintain the stud 437 at a given location, the actual location being dependent upon the amount of relative movement that occurred between the dashpot piston and cylinder during the pulling action of the grippers in the first stage of the cycle of operations of the machine. As the rod 407 is raised (the timing of this portion of movement of the rod 407 being represented by the portion c—d of the line K—K of the cam timing chart), springs 584 connected between the head portion 409 and the carrier 375 lift the carrier 375 and with it the pin 401, swinging the lever 397, 399 clockwise (thus lifting the grippers relatively to the carrier) until sooner or later the arm 397 engages the block 396 in the carrier 375. At this time the block 587 on the arm 399 has been moved to its initial position relatively to the pin 401 and the portion 585 of the arm 583 assumes its initial position in front of the block 587. As the rod 407 continues its upward movement, due to the fact that the arm 397 is in engagement with the block 396, further upward movement of the carrier 375 lifts the stud 437 and, through the parts 439, 617, 621, 623 and 631, raises the dashpot piston 769 to its initial position. Also the lever 547, 551 is rocked anticlockwise to reset the arms 511, 501 and 1733 restoring the wiper 23 and the grippers to their initial positions relatively to the carrier 375 and opening the gripper jaws (the return movement of the wipers being represented by the portion c—d of the line M—M of the cam timing chart, while the return (inward) movement of the grippers relatively to their carriers and the resetting of the jaw-opening mechanism are represented respectively by the portions c—d of the lines L—L and H—H of that chart). As the lever 547, 551 swings anticlockwise as just above described the block 563 may reseat itself in the notch 569, the block yielding if necessary against the action of the spring-pressed poppet 566 during the return movement of the parts to their initial positions shown in Fig. 51.

During the return movements of the side grippers should they meet with any obstruction to their inward movement relatively to their carriers, the springs 537 may yield thereby avoiding damage to the parts concerned.

The arms 1759 for actuating the trip levers 523 during the second stage of the cycle of operations of the machine as above referred to are secured to end portions of a shaft 1763 (Figs. 58 and 59) and a sleeve 1765 concentric with the shaft. The sleeve is freely journaled in a bore in the intermediate casting 3 of the machine frame. Rearward end portions of the shaft 1763 and sleeve 1765 have secured thereto arms 1767 and 1769 respectively. These arms are pivotally connected to links 1771 which, in turn, are pivotally connected to arms 1773 of a lever pivoted between its ends on a stud 1775 secured in the intermediate casting 3. One of the arms 1773 has formed thereon a tail portion 1777 which is arranged to be engaged by a setscrew 1778 carried by a block 1779 secured on a rod 1641 referred to below in connection with means for operating the main toe gripper, movement of the rod 1641 being effective to cause the side gripper jaws and the toe gripper jaws to release the upper. Downward movement of the rod 1641 causes the setscrew 1778 carried by the block 1779 to engage the tail portion 1777 and to rotate the arms 1773. Due to the manner of connecting the arms 1773 with the arms 1767, 1769, the shaft 1763 and sleeve 1765 are rotated in opposite directions to move the arms 1759 apart and so cause the jaws of both sets of side grippers to open through the mechanism hereinbefore described.

SIDE GRIPPERS. ADJUSTING AND POSITIONING ARRANGEMENTS

*(a) Adjustment of position of side grippers widthwise of the last*

The illustrative machine is provided with means now to be described for initially adjusting the positions occupied by the grippers in directions extending widthwise of the last. The bell crank lever 419, 833 (Fig. 37) associated with the left hand side gripper unit is rotatable on a bushing 1273 (Fig. 48) which is mounted on a shaft 1275. The lever is retained against endwise displacement relatively to the shaft by engagement with a flange 1277 on the shaft and with a flange 1278 on the bushing 1273. A sleeve-like bearing member 1279 is retained on the left hand end portion of the shaft by means of a washer 1281 and nuts 1283. The bearing member 1279 is movable endwise in a bore in a portion of the casting 1. The bell crank lever 419, 833 associated with the right hand gripper unit is rotatably mounted on a left hand end portion of a sleeve 1285 keyed to the shaft 1275 by means of a key 1286 so as to rotate therewith but to be capable of axial movement relatively thereto. The bell crank lever just referred to is retained on the sleeve 1285 against endwise movement by means of a semi-circular retaining plate 1287 secured to the bell crank lever hub and received within a peripheral groove 1288 in the sleeve. The sleeve 1285 is rotatably mounted in an intermediate sleeve 1289 which, in turn, is mounted within an outer sleeve 1291 with capacity for limited rotation relatively thereto such rotation being limited as hereinafter described. The outer sleeve 1291 is journaled in a bearing formed in the casting 1, being retained against endwise movement therein by means of a flange 1293 on the sleeve which is received within a recess in the casting 1 and is retained therein by means of a plate-like portion 1295 of a tray 1317 secured to the casting. The intermediate sleeve 1289 has a portion 1297 extending beyond the left-hand end portion of the outer sleeve and of a diameter equal to that of the latter. Surrounding these adjacent end portions of the sleeves 1289 and 1291 is a multi-part clamping ring 1299. The clamping ring 1299 comprises a semicircular member 1300 and two semicircular members 1302, one engaging the end portion of the sleeve 1289 and the other engaging the end portion of the sleeve 1291. Bolts 1304 (Fig. 37) extend through lugs on the member 1300 and the members 1302 and compression springs 1306 on the bolts are located between nuts on the bolts and the lugs on the members 1302, the springs acting to urge the members 1302 towards the member 1300 to grip the sleeves 1289 and 1291, the force with which the members grip the sleeves being adjustable by means of the nuts backing up the springs 1306. A bolt 1303 (Figs. 48 and 49) is threaded into the casting 1 and has an end portion extending through peripherally extending axially alined slots 1308, 1310 in the sleeves 1289, 1291 respectively (Fig. 49), the slots extending for some 90° around the peripheries of the sleeves. The bolt 1303 thus limits the amount of rotation of the sleeves 1289 and 1291. The intermediate sleeve 1289 has an internally threaded portion 1305 (Fig. 48) meshing with a threaded portion 1307 of the inner sleeve 1285, while a right-hand end portion of the outer sleeve 1291 has an internally threaded plug 1309 secured in it which meshes with a threaded portion 1311 of the shaft 1275. The threads on the portion 1311 of the shaft and the plug 1309 are of opposite hand to those on the portions 1305, 1307.

Prior to commencement of the first stage of a cycle of operations of the machine the clamping ring 1299 retains the sleeves 1289, 1291 against rotation. Rotation of the shaft 1275, and with it the sleeve 1285, will move the shaft relatively to the outer sleeve 1291 in one direction while the inner sleeve 1285 will move relatively to the intermediate sleeve 1289 in the opposite direction thus moving the bell crank levers 419, 833 associated with the side gripper units at opposite sides of the machine in opposite directions towards or away from each other. Such movements will effect swinging movements of the levers 415 (Figs. 37 and 37A) about the axes of the bolts 416 to cause the side gripper units themselves to move, widthwise of the shoe, towards or away from the side of the last depending on the direction of rotation of the shaft 1275, the gripper carriers 375 rocking about the ball-ended studs 437. For rotating the shaft 1275 there is provided a hand wheel 1313 (Fig. 50) secured to one end portion of a shaft 1315 journaled in bearings carried by the tray 1317. The opposite end portion of the shaft 1315 has secured thereto a worm 1319 meshing with a gear wheel 1321 secured to the right-hand end portion of the shaft 1275. The arrangement of the gears 1319, 1321 is such that engagement therebetween is maintained despite endwise movement of the shaft 1275, such endwise movement (and hence the widthwise movement of the gripper units) being limited by engagement of the boss of the gear wheel 1321 or a collar 1322 secured on the shaft with a lug 1324 of the tray 1317 through a bore in which lug the shaft extends.

Assuming that the side gripper units S1 and S2 have been positioned at the desired locations considered in directions extending widthwise of a shoe by means of the hand wheel 1313 prior to the commencement of the first stage of a cycle of operations of the machine, the side gripper units are arranged to be moved in automatically, during an early part of the first stage of a cycle of operations of the machine, to cause the inner jaws 441 of the grippers of the two gripper units to engage the sides of the last (thus "squaring" the side grippers to the side portion of the toe of the last), after which the gripper units are retracted slightly by means arranged to rotate the clamping ring 1299 to move the inner jaws just clear of the last. Prior to a pulling operation the side grippers are thus brought to positions a measured distance from the sides of the last even if the last lies somewhat closer to one gripper unit than the other and whether the last be one for a left foot or for a right foot. For this purpose the portion 1300 of the ring 1299 is provided with teeth meshing with teeth of a gear segment 1323 (Fig. 37) formed at the end of an arm 1325 secured to a shaft 1327 journaled in bearings in the bracket 1981 and a bracket 1328 (Fig. 16) secured to the base casting 1. Also secured to the shaft 1327 is an arm 1329 (Fig. 37) to which is pivotally connected, by means of a stud 1331, an upper end portion of a connecting rod 1333. A lower end portion of this rod is connected, by means of a stud 1335, to a lever 1337 secured to a cross shaft 1336 (Fig. 13) (journaled in lugs on the bearing bracket 597) to which is also secured a cam-operated lever 1339. The lever 1339 has a cam roll rotatably mounted on a stud thereon, the roll being received in a cam track (not shown) in the cam 231 (Fig. 13). The cam track just referred to is so shaped that, soon after the commencement of the first stage of a cycle of operations, the segment 1323 is caused to rotate the clamping device 1299 (see the portion a—b of the line G—G of the timing chart shown in Figs. 77 and 78) in such a direction that, by frictionally rotating the sleeves 1289, 1291 in the same direction, it causes the threaded plug 1309 and the threaded portion 1305 to be rotated to cause the shaft 1275 and inner sleeve 1285 to be moved in opposite directions to move the bell crank levers 419, 833 at opposite sides of the machine in opposite directions such that the gripper units S1, S2 are moved towards the sides of the last. On engagement of the inner jaws 441 of the side grippers with the last (which may not take place simultaneously at opposite sides of the shoe) the clamping device 1299 slips relatively to the sleeves 1285, 1291 while the lever 1339 completes its cam-controlled movement in a clockwise direction as seen in Fig. 37. Then the cam lever 1339 is moved slightly anticlockwise by the cam (see the portion b—c of the line G—G of the timing chart) to cause the gripper units to move away from the last so that the inner jaws of the grippers occupy their "measured" positions relatively to the sides of the last.

At the time when the side gripper units are moved inwardly to cause the inner jaws of the grippers to engage the side of the last the gripper units are free to rotate somewhat about axes extending substantially perpendicular to the forepart of the shoe bottom—actually about the axes of the rods 407. Thus, as the grippers engage the sides of the last the gripper units may be thereby orientated, about the axes just referred to, to cause the grippers to lie in the most advantageous positions relatively to the sides of the last—i. e. the jaws are lined up at least substantially parallel with the adjacent portions of the last. The side gripper units are restored to their initial positions, widthwise of a shoe, under the action of the cam 231 towards the end of the second stage of the cycle of operations of the machine (see the portion d—e of the line G—G of the timing chart). Prior to the initiation of the first stage of the cycle of operations of the machine the side gripper units S1 and S2 are held in initial positions, against rotation about the axes of the rods 407 just referred to and during the second stage of the cycle of operations of the machine they are arranged to be automatically returned to their initial positions about these axes assuming that they have pivoted somewhat therearound as the side grippers engage the side of the last as above referred to.

For this purpose each of the arms 399 of the side gripper units is provided with a forwardly and downwardly extending nose portion 1347 (Fig. 51) which, prior to the initiation of the first stage of a cycle of operations of the machine, lies between parallel portions 1349 of walls formed on a collecting member 1351 (see also Fig. 37). The collecting members are pivotally mounted on the pins 835, at opposite sides of the machine. Pivoted to the members 1351 is a block (not shown) connected to an end portion of a connecting rod 1357. The other end portion of the connecting rod 1357 is pivotally connected, by means of a pin (not shown), to an arm 1363 pinned to the shaft 1336 on which the cam-operated lever 1339 hereinbefore referred to is secured. The members 1351 are arranged to be swung clockwise (as seen from the left hand side of the machine) early in the first stage of the cycle of operations of the machine (see the portion a—b of the line O—O of the cam timing chart shown in Figs. 77 and 78), this swinging movement of the members occurring as the side gripper units are being moved in to cause the grippers to engage the sides of the last (see the portion a—b of the line G—G of the timing chart), to bring diverging portions 1361 (Fig. 51) of the walls opposite the nose portions 1347 which are thus freed for movement to permit the gripper units to swing about the axes of the rods 407. During the second stage of the cycle of operations of the machine the collecting members 1351 swing anticlockwise as seen in Fig. 37 (at a time represented by the portion c—d of the line O—O of the timing chart) so that one or other of the portions 1361 of each member engages the associated nose portion 1347 and, on continued swinging of the collecting member, cams the nose portion to its position between the parallel portions 1349 to restore the associated gripper unit to its initial position relatively to the axis of the rod 407, this movement being effected as a result of the cam-operated lever 1339 being swung anticlockwise. Although such movement of the gripper units occurs prior to the outward movements of the gripper units relatively to the last (compare the portions c—d and d—e of the lines O—O and G—G respectively of the cam timing chart) it will be understood that the side grippers will have moved outwardly from the last, relatively to the carriers 375, on release of the upper materials by the side grippers as above described with reference to the pulling action of the grippers, so that the rotation of the gripper units back to their initial positions will not cause the gripper jaws to engage the last. At a time represented by the portion d—e of the line G—G of the timing chart the clamping ring 1299 is caused to rotate the sleeves 1285, 1291 back to their initial positions (determined by engagement of the bolt 1303 with opposite ends of the slots 1308, 1310 in the sleeves after which the clamping ring slips on the sleeves as the cam lever completes its movement) thus returning the side gripper units to their initially adjusted positions widthwise of the last.

After the side gripper units have been "squared" to the sides of the last as a result of their inward movement towards the last during the early part of the first stage of the cycle of operations of the machine as above described and before they move to tension the upper during the first stage of the cycle of operations of the machine it is desirable, in order to ensure that the tacks are driven in the correct positions relatively to the side of the lasts, to ensure that the units do not swing away from these desired positions during the pulling of the upper and during the time that the operator is adjusting the side grippers, or during the operation of the wipers on the upper as a consequence of unequal resistance met by the two wipers associated with each unit. With this in view fingers 2771 (Fig. 2) are secured to the brackets 462 and are provided with fiber blocks 2773 against which the cables 442 connecting the side gripper units S1, S2 to the weights 440 are arranged to be gripped by fiber pads 2775 carried on forward end portions of plungers 2777 slidably received in forwardly and rearwardly extending bores in the brackets 462. Compression springs are received between the plungers 2777 and other plungers 2780 also received in the same bores, and rearward end portions of the plungers 2780 are arranged to be engaged by setscrews secured in arms 2779 secured to a cross-shaft 2781 journaled in bores in the brackets 462. The arm 2779 at the right-hand side of the machine is arranged to be engaged by a finger (not shown) secured to a cylinder head 2255 of air compressing devices (hereinafter referred to) as these devices rock about their pivots. Such engagement of the arm 2779 occurs during the first stage of the cycle of operations of the machine at a time just after the side gripper units have been "squared" to the sides of the last and causes the cables 442 to be gripped between the pads 2775 and the blocks 2773. The engagement of the finger just referred to with the arm 2779 is maintained until shortly after the commencement of the second stage of the cycle of operations of the machine. In order to maintain the grip on the cables 442 there is secured on the cross shaft 2781 an arm 2783 (Fig. 12) which is engaged by an arm of a cam lever 2195 for operating the side clamping devices as hereinafter referred to. When the cam lever 2195 is swung anticlockwise (as seen in Fig. 12) to move the side clamping devices into engagement with the shoe during an early portion of the second stage of the cycle of operations of the machine before the wipers are caused to wipe the margin of the upper inwardly beneath the shoe bottom (compare the portions a—b of the lines Q—Q and M—M of the cam timing chart shown in Figs. 77 and 78) the arm 2783 is engaged by the cam lever 2195 to hold the plungers 2777 in positions to maintain the grip on the cables 442 between the pads 2775 and the blocks 2773. The gripper units are thus held against movement about the axes of the rods 407 in one direction, the weight of the units generally being sufficient to prevent movement of the units about these axes in the opposite direction.

*(b) Joystick control for adjusting the tensioning action of the side grippers*

To enable the operator to adjust the pull of the side grippers at the end of the first stage of a complete cycle of operations of the machine either (1) to increase or decrease the pull of both sets of side grippers together or (2) to increase the pull due to the grippers at one side of the machine and to reduce the pull of the grippers at the other side of the machine to effect "throat straightening," the illustrative machine is provided with a "joystick" control for effecting movements of the sleeves 721 forming the virtual fulcra for the triangular members 657 (Fig. 39) and thereby effecting a change in the leverage through which the springs 681 react on the upper as hereinbefore referred to. For this purpose the machine is provided with the "joystick" 851 hereinbefore referred to, the joystick comprising a hollow tube 853 (Fig. 46) provided at its upper end portion with a sleeve 855 having a flange 857, a portion of the sleeve above the flange 857 being surrounded by a ball cage 859 forming a sliding bearing for a sleeve 861 secured to a knob 863. A compression spring 865 between the flange 857 and the lower end of the ball cage 859 urges the ball cage, and hence the knob 863, upwards to a limit determined by engagement of a washer 867 in the sleeve 861 with an underface of the flange 857. To the knob 863 is secured an upper end portion of a rod 869 extending down inside the tube 853. Inserted in the lower end portion of the tube 853 is a sleeve-like union 871 (see also Fig. 43) which is threaded into housing 873, the housing having a backplate 875 secured thereto. A swivel block 877 has forwardly and rearwardly extending pins 879 journaled in bushings 880 in alined bosses in the housing 873 and the back plate 875. The swivel block 877 is clamped, by means of a threaded clamping ring 876 (Fig. 46), onto a left-hand end portion (as seen from the front of the machine) of an inner sleeve 881, a right-hand end of the block abutting against a flange 878 formed on the sleeve. The sleeve surrounds a shaft 883 and is received within an outer sleeve 885. A right-hand end portion of the shaft 883 extends beyond the right-hand end of the inner sleeve 881 and is journaled in a bearing 887 carried by a boss projecting rearwardly from a plate 889 (Fig. 3) secured to a lower portion of the main casting 1 and covering a rectangular aperture in the front thereof. The shaft 883 is also supported by bearings 882 provided in the opposite end portions of the inner sleeve 881 and the inner sleeve is, in turn, journaled in bearings formed in opposite end portions of the outer sleeve 885. The outer sleeve 885 is journaled in a bearing bushing 891 serving to support one part (893) of a two-part box-like casting 893, 895 to a second boss 894 formed on the plate 889. The casting 893, 895 houses a considerable amount of mechanism associated with the "joystick" 851. To a right-hand end portion of the outer sleeve 885 is secured an arm 897 (Figs. 46 and 47) while to the right hand end portion of the shaft 883 is secured an arm 899 and to the inner sleeve (at its right hand end portion) is secured a two armed lever 901, 902.

The left-hand end portion of the outer sleeve 885 has secured to it a bevel gear segment 903 (Fig. 3) while the left-hand end portion of the shaft 883 has secured to it a bevel gear segment 905 (see also Fig. 43). Meshing with the segments 903, 905 respectively are bevel gear segments 907, 909 formed on opposite ends of a bar 911 (Fig. 3) secured to the housing 873. The arrangement thus provides a differential device such that movement of the joystick in directions extending purely forwards or rearwards in the machine rotates the shaft 883, inner sleeve 881 and outer sleeve 885 equal amounts in the same direction, while purely transverse movement of the joystick does not move the inner sleeve 881 but rotates the outer sleeve 885 and shaft 883 in opposite directions but to equal extents. Excess movement of the joystick is prevented by engagement of the tube 853 with the edges of an aperture formed in a plate 856 (Fig. 46) secured to upper end portions of the castings 893, 895. A rubber cover 838 surrounding part of the joystick and upper portions of the casting 893, 895 guards against the entry of foreign matter into the mechanism within the casting.

The arm 897 (Fig. 47) has connected thereto, by means of a pivot stud 913, one end portion of a link 915, the other end portion of which is pivotally connected, by means of a pivot stud 917, with an arm 919 of a bell crank lever having also a pair of parallel arms 921 (see also Fig. 46). The arms 921 are connected by means of pivot pins 923 to lower end portions of the links 753 coupled to the bell crank levers 733, 735 carrying the sleeve 721 forming with virtual fulcrum for the triangular member 657 associated with the side grippers at the left-hand side of the machine. Similarly the arm 899 is pivotally connected, by means of a pivot stud 925, a link 927, a pivot stud 929, a bell-crank lever 931, 933, and pivot pins 935, with the links 753 connected with the bell-crank levers carrying the sleeve 721 forming the virtual fulcrum for the triangular member 657 associated with the side grippers at the right-hand side of the machine. The bell-crank levers 919, 921 and 931, 933 are freely pivoted on fulcrum pins 937 supported in arms 1131 and 1132 respectively, these arms extending rearwardly and downwardly from a swinging bracket 1109, the arms 1132 being parallel to the arms 1131 and of equal length.

The swinging bracket 1109 extends across the machine and opposite end portions are rotatably supported in coaxial pins 1111 secured in arms 1113 extending (parallel to each other) from a cross-shaft 1115 with which they are integrally formed. Opposite end portions of the cross-shaft 1115 are secured in ears 1117 extending more or less forwardly from segments 1119 mounted on studs 1121, the studs being carried by brackets 1123 secured to the base casting 1 at opposite sides of the machine. The arms 1113 are pinned to the ears 1117 by means of dowel pins 1125 in such a manner that the centers of the pins 1111 lie displaced from the centers of the studs 1121. Rotation of the segments about the studs 1121 will therefore carry the pins 1111 around the studs 1121 to adjust the position of the axis about which the swinging bracket 1109 swings. This adjustment is provided for use in setting up the mechanism just above described, the purpose of the parts just above described being referred to hereinafter. The segments 1119 are held in the desired adjusted positions about the common axis of the studs 1121 by means of clamping bolts 1127 extending through arcuate slots 1129 (formed in the segments concentrically with the axis of the studs 1121) into the brackets 1123. The swinging bracket 1109 is provided with another arm 1107 extending parallel to the arms 1131, 1132 therefrom and this arm is pivotally connected by means of a pin, coaxial with the pins 937, to an upper end portion of a connecting rod 1103 the other end portion of which is pivotally connected to the arm 901.

It will be appreciated that on movement of the joystick 851 the sleeves 721 associated with the triangular members 657 at opposite sides of the machine may be moved in the appropriate directions and to the required extents to vary the leverage of the systems through which the side gripper "updraw" springs 681 act on the grippers to which they are respectively coupled. The swivel block 877 is provided with an arm 939 (Figs. 43 and 46) extending downwardly through an opening in the housing 873 and having a boss 940 at its lower end. In a forwardly and rearwardly extending bore in the boss 940 is mounted a spring-pressed plunger 941. The plunger 941 has a pointed head arranged to engage a V-shaped groove 943 in a plate 945 (secured to a lower end portion of the back plate 875 of the housing 873) when the joystick 851 is in a central position (considered in a direction extending widthwise of the machine). When the joystick 851 is displaced towards one side or other of the machine the head on the plunger 941 rides out of the groove 943.

The swivel block 877 has clamped thereto an arm 947 (Figs. 43 and 46) extending downward and rearward and having its rearward end portion bifurcated (see Fig. 45) to receive a pair of staggered pawls 949 freely pivoted on a pin 951 carried by the arm 947. Also carried on the pin 951 is an upwardly extending pawl-releasing lever 953 having a transverse pin 955 secured therein and extending through bores (of somewhat greater diameter than that of the pin) in the pawls 949. To an upper end portion of the lever 953 is pivoted, by means of a stud 957, a rearward end portion of a horizontal rod 959 (Fig. 43), a forward end portion of which is rounded and is received in a cup-shaped recess in a downwardly extending arm 961 of a bell crank lever pivoted on a transverse pin 963 carried between lugs extending rearwardly from the back plate 875 of the housing 873. The bell crank lever just referred to also has a forwardly extending arm 965 in a cup-shaped recess in a forward end portion of which is received a rounded lower end portion of the rod 869. A spring 967 connected between a hook on the lever 953 and a hook carried by the arm 947 urges the lever 953 clockwise about the pin 951 (as seen from the left hand side of the machine, Fig. 43) to maintain the forward end of the rod 959 in the recess in the arm 961.

The pawls 949 are urged into engagement with teeth in a rearwardly facing arcuate surface of a rack 971 by means of springs 973 connected between pins on the pawls and hooks on the arm 947. The rack is secured, at a lower end portion thereof, to a left-hand end portion of shaft 975 (Fig. 45) extending transversely of the machine through alined bores in the castings 893 and 1 and having pinned, to a right-hand end portion thereof, an arm 977 connected, by means of a pivot stud 979, with a forward end portion of a connecting rod 981. A rearward end portion of this rod is pivotally connected, by means of a stud 983 (Fig. 37), with a downwardly extending arm 985 of a bell crank lever pivoted on a cross shaft 987 (coaxial with the cross shaft 1336) and having a rearwardly extending arm 989 (see also Fig. 13). The cross shaft 987 is carried in the bearing bracket 597, and the arm 989 is provided with a stud on which is freely rotatable a cam roll 991 riding in a cam track (not shown of the cam 995 secured to the cam shaft. At the commencement of the first stage of a cycle of operations of the machine the pawls 949 are held clear of the teeth on the rack 971 under the action of the cam track just above referred to on the roll 991, but before the end of the first stage of the cycle of operations the rack is moved into engagement with the pawls.

When it is desired to move the joystick 851 at the end of the first stage of the cycle of operations of the machine, depression of the knob 863 acts (through the rod 959 and associated parts) to release the pawls from the teeth of the rack. After the operator has moved the joystick 851 to effect any desired adjustment he may wish to make to the pulling action of the side grippers, the pawls 949 serve, by reengagement with teeth of the rack 971 to hold the swivel block 877 and the sleeve 881 in the desired position against the reaction of the updraw springs 681. The timing of the cam-operated movement of the rack 971 is represented by the line O—O in the cam timing chart shown in Figs. 77 and 78, the portion a—b representing the movement of the rack into engagement with the pawls while the portion c—d represents the movement of the rack 971 away from the pawls by the action of the appropriate cam track on the roll 991 towards the end of the second stage of a cycle of operations of the machine to enable the joystick to be centralized from its displaced position (if it has been displaced during the pause following the first stage of the machine cycle forwards or rearwards in the machine) by means hereinafter described.

The purpose of providing the bell crank levers 919, 921 and 931, 933 (Fig. 46) in the linkages between the arms 897, 899 and the bell crank levers 733, 735, and the purpose of the arm 901 and the parts connected thereto will now be explained. It will be appreciated that displacement of the arms 897 and 899 from their centralized positions in which they are shown in Fig. 47 in opposite directions by appropriate movement of the joystick 851, laterally of the machine, will displace the virtual fulcra of the triangular members 657 at opposite sides of the machine in opposite directions so that the leverage through which one pair of "updraw" springs 681 acts on the upper at one side of the shoe increases while that through which the other pair of "updraw" springs acts on the upper at the other side of the shoe decreases. Assuming, for example, that the joystick 851 is moved towards the left hand side of the machine, the reaction due to the updraw springs on the virtual fulcrum of the triangular member 657 at the left-hand side of the machine will therefore increase with increased displacement of the arm 897 in an anticlockwise direction (as seen in Fig. 47) while the corresponding reaction at the other side of the machine will decrease with increased displacement of the arm 899 in a clockwise direction. Were the links 753 connected directly to the arms 897, 899 (instead of being connected thereto via the bell crank levers 919, 921 and 931, 933 and additional links 915 and 927) resistance to movement of the joystick 851 from a central position towards one side or other of the machine would increase fairly rapidly with displacement of the joystick. With the linkage shown in Fig. 47, however, due to the angular relationship of the arms 921 and 933 with the arms 919 and 931 respectively, as the arm 921 swings in a clockwise direction to cause the reaction due to the updraw springs on the fulcrum for the triangular member at the left-hand side of the machine (and hence on the link 753) to increase the line of action of the reaction in the link 753 at the left hand side of the machine approaches the axis of the fulcrum pin 937 carrying the bell crank lever 919, 921. Similarly, the arm 933 at the other side of the machine is swung in an anticlockwise direction carrying the line of action of the reaction in the corresponding rod 753 away from the axis of the fulcrum pin 937 carrying the bell crank lever 931, 933. The net result is to maintain a much more nearly constant reaction in the links 915, 927 connected to the arms 897, 899, thus facilitating displacement of the joystick 851 towards one side of the machine or the other.

If the fulcrum pins 937 for the bell crank levers 919, 921 and 931, 933 were fixed to the machine frame instead of being carried by the swinging bracket 1109, displacement of the joystick 851 in a forward or rearward direction would cause both bell crank levers to rotate about their fulcrum pins in the same direction away from the positions shown in Fig. 47 thus upsetting, to some extent at least, the disposition of the parts required to give the desired effect above referred to should it be necessary (after moving the joystick 851 forwardly or rearwardly as just referred to) to displace the joystick towards one side of the machine or the other. With the arrangement provided in the illustrative machine forward or rearward displacement of the joystick 851 results, through the arm 901 and link 1103, in movement of the swinging bracket 1109 carrying the fulcrum pins 937 for the bell crank levers 919, 921 and 931, 933 in such a direction as to maintain substantially the desired position of the bell crank levers about their fulcrum pins 937 irrespective of the forward or rearward displacement of the joystick 851. The facility for adjusting the position of the segments 1119 about the axes of the studs 1121 hereinbefore referred to is provided in order that, in setting up the machine, the desired position of the bell-crank levers 919, 921 and 931, 933 to give the result above referred to may be readily obtained. For automatically centralizing the joystick 851, during the second stage of a cycle of operations of the machine, the following mechanism is provided. Secured to the gear segments 903, 905 are downwardly extending arms 997 (see Fig. 44, which shows the parts in displaced positions), lower end portions of which are pivotally connected, by means of studs 999, to forward end portions of links 1001. Rearward end portions of the links 1001 are pivotally connected, by means of studs 1003, with lower end portions of dowardly extending arms 1005 (see also Fig. 45) of bell crank levers also provided with rearwardly extending arms 1013. The bell crank levers are pivotally mounted on headed studs 1007 carried in upper end portions of arms 1009 freely rotatable about a shaft 1011 secured in the bores in the box-like casting 893, 895. The arms 1013 of the bell crank levers carry studs 1015 on which are carried blocks 1017. The blocks 1017 are received in arcuate tracks 1019 formed between arcuate ribs 1021 on members 1023 and arcuate rear faces of members 1025 pivotally connected with the members 1023 by means of pivot studs 1027. Springs 1029 received in bores in the members 1025 engage ribs 1031 on the members 1023 and cause the blocks 1017 to be frictionally gripped under light pressure in the tracks 1019. The members 1023 are pinned to a shaft 1033 (Fig. 45) journaled in a bracket 1035 secured to an inner rear wall of the casting 893. The right hand one of the members 1023 (as seen from the front of the machine) is secured, at its lower end, by means of a portion 1037 of the stud 1027 (at the right hand side as seen from the front of the machine) to a lower end portion of an arm 1039 spaced laterally from the member 1023 and secured to a shaft 1041. The shaft 1041 is mounted, coaxially with the shaft 1033, in a bearing brush 1043 in the casting 893 and extends through an aperture in the side of the casting 1. The right-hand end portion of the shaft 1041 has pinned to it an arm 1045, to an upper end portion of which is pivotally connected (by means of a stud 1047) a forward end portion of a rod 1049. A rearward end portion of the rod 1049 (Fig. 37) is connected, by means of a stud 1051, to one arm 1053 of a bell-crank lever having a second arm 1055. The lever 1053, 1055 is fulcrumed on the cross shaft 987 and the arm 1055 carries a stud 1057 on which is a cam roll 1059 (Fig. 12). The cam roll 1059 rides in a cam track 1061 in the cam 995 (Fig. 1).

To upper end portions of the members 1025 toggle links 1063 (Figs. 44 and 45) are pivotally connected by means of pins 1065 extending through slots 1066 in the toggle links; the links 1063 being also pivotally connected, by pins 1067, to arms 1069 pivoted on studs 1071 carried by the members 1023. The arms 1069 have tails 1073 formed integrally therewith. The tails are arranged to engage, at times as will be hereinafter explained, stops provided by upper stop screws 1075 and lower stop screws 1077. The stop screws 1075 and 1077 associated with the left hand members 1023, 1025 (as seen from the front of the machine) are carried by a bracket 1079 secured to the bracket 1035, while those associated with the right-hand members 1023, 1025 are secured in upper and lower walls respectively of the casting 893.

Prior to the initiation of a cycle of operation of the machine the parts just above described occupy positions shown in Fig. 43. Towards the end of the first stage of the cycle (see the portion a—b of the line P—P in Fig. 78) the members 1023, 1025 are swung, under the control of the appropriate cam track, anticlockwise about the axis of the shaft 1033 to positions in which the arcuate tracks 1019 are concentric with the studs 1007 carrying the bell crank levers 1005, 1013 (see Fig. 44). Towards the end of this movement of the members 1023, 1025 the tails 1073 of the arms 1069 engage the upper stop screws 1075 and the toggles formed by the arms 1069 and links 1063 are broken upwardly to swing the members 1025 slightly clockwise with respect to the members 1023 against the action of the springs 1029 thus freeing the blocks 1017 in the tracks 1019. At the conclusion of the first stage of the cycle of operations the operator may displace the joystick, thus swinging the bell crank levers 1005, 1013 about their pivot studs 1007 and causing the blocks 1017 to move along the arcuate tracks 1019 to positions dependent upon the extent and direction of movement of the joystick. Fig. 44 shows the parts just above referred to in displaced positions (as when the joystick has been displaced towards the right of the machine, the arms 1013 having been displaced from their normal positions in opposite directions but to equal extents). It will be understood that such movement of the arm 1013 displaces the blocks 1017 along the tracks 1019. The rack 971 will have been moved during the first stage of the cycle into position to be engaged by the pawls 949 to hold the joystick in its displaced position, movement of the rack into such position being represented by the portion a—b of the line O—O in Fig. 78.

During the second stage of the cycle of operations of the machine, after the grippers have released the upper materials, and the rack has been moved to free the pawls 949 (see the portion c—d of the line O—O in Fig. 78), the members 1023, 1025 are swung (clockwise as seen in Fig. 44) back towards their initial positions (see the portion c—d of the line P—P in Fig. 78). During an early portion of this movement the tails 1073 of the arms 1069 are moved out of engagement with the upper stop screws 1075 and the springs 1029 urge the members 1025 anticlockwise about the pivots 1027 to grip the blocks 1017 in the tracks 1019. As the members 1023, 1025 continue their movement, the bell crank levers 1005, 1013 are therefore displaced (the arms 1009 supporting the bell crank levers being swung about the shaft 1011) and this displacement of the bell crank levers is effective, through the links 1001, to swing the arms 997 in appropriate directions to return the joystick to its initial undisplaced, or centralized position. As the members 1023, 1025 approach the end of their clockwise movement the tails 1073 of the arms 1069 engage the lower stop screws 1077 and the toggles formed by the arms 1069 and links 1063 are broken rearwardly to cause the members 1025 to be moved slightly relatively to the members 1023 again freeing the blocks 1017 for return movement along the tracks 1019 to their initial positions. For thus returning the blocks each of the arms 1009 is provided with a pin 1081 (Figs. 43 and 44) located between the ends of the arm. Each pin 1081 is received in parallel slots 1082 in a bifurcated rear end portion of a plunger 1083, the rear end portion embracing the arm 1009. Each plunger 1083 is slidably received in a tubular member 1085 and has a threaded front end portion which extends, beyond the front end of the member 1085, through a bore in a bushing 1097 threaded into a bracket 1087 secured within the box-like casting 893, 895, and is retained therein by means of a nut and a locknut threaded onto its front end portion, the nut abutting against a front plane face of a washer 1099 having a part-spherical rearward face received in a part-spherical seating in the front end of the bushing 1097. A compression spring 1089 (Fig. 43) surrounds a mid-portion of each plunger 1083 between a shoulder on the plunger and a shoulder formed in the member 1085. The front end portion of each member 1085 has a part-spherical seating to receive a part-spherical rearward surface formed on a head 1091 on the bushing 1097. The rear end portion of each member 1085 has parallel ears 1093 extending rearwardly and lying outside the bifurcated portion of the plunger 1083. The ears 1093 are provided with slots 1095 into which the pin 1081 also extends.

The arrangement is such that, when the arms 1009 are in their initial positions (shown in Fig. 43) the washers 1099 behind the nuts on the front end of the plungers 1083 are in engagement with front ends of the bushings 1097 while the front end portions of the members 1085 are seated against the heads 1091 of the bushings 1097. If now, during the centralizing of the joystick, one of the arms 1009 is (for example) swung clockwise as seen in Fig. 44 while the other is swung anticlockwise (as will occur if the joystick has been displaced towards one side of the machine or the other so displacing one of the blocks 1017 upwardly and the other downwardly along the arcuate tracks 1019), the clockwise swinging of one of the arms 1009 will, through engagement of its pin 1081 with the front end of the slot 1082 of the plunger 1083 associated therewith, move that plunger forward relatively to its tubular member 1085 so as to compress the spring 1089. The anticlockwise swinging of the other arm 1009 will, through engagement of the pin 1081 with the rearward end of the slot 1095 in the tubular member 1085 associated therewith, move that tubular member rearward relatively to its plunger 1083, thus compressing the associated spring 1089. Therefore, when the blocks 1017 are freed for movement along the arcuate tracks 1019, towards the end of the second stage of the cycle of operations of the machine, the compressed springs 1089 will react to return the displaced plunger and tubular members respectively associated with the two arms 1009 to their initial positions, whereby the arms 1009 themselves will be returned to their initial positions, this, in turn, swinging the bell crank levers 1005, 1013 back to the positions shown in Fig. 43. The arrangement is such that this return movement of the bell crank levers to their initial positions does not, when the various parts capable of adjustment are correctly adjusted, again displace the joystick away from its centralized position. It will be noted from Figs. 43 and 45 that, when the blocks 1017 are in their initial positions their pivot studs 1015 are coaxial with the shaft 1033 carrying the members 1023 so that, when these members are swung anticlockwise during the first stage of the cycle of operations of the machine above described, no displacement of the joystick results.

Means is provided for positively lifting the side grippers against the action of the "updraw" springs should the operator desire, in extreme cases, to do so in order to facilitate adjustment of the upper on the last during the pause between the first and second stage of a cycle of operations of the machine. For this purpose the arm 902 of the lever 901, 902 extends upwardly and is pivotally connected, by means of a pivot stud 1133 with a forward end portion of a composite connecting rod 1135 (Fig. 46) the overall length of which may be adjusted for setting up purposes by means of a turnbuckle (not shown). A rearward end portion of the rod 1135 (Figs. 37 and 39) is pivotally connected, by means of a stud 1139, with a center portion of a link 1141. The link 1141 is pivoted at its lower end portion by means of a pin 1143 with forward end portions of parallel links 1145. The links 1145 are pivotally connected at their rearward end portions by means of a pin 1147 to an arm 1149 of a bell crank lever having a second arm 1151. The arms 1149, 1151 are connected by a sleeve portion 1150 by which the lever is fulcrumed on a shaft 1153 carried by lugs 1155 extending forwardly from the bearing bracket 597. An upper end portion of the link 1141 is connected by a pivot pin 1157 to an arm 1159 of a bell crank lever having a second arm 1161. The arms 1159, 1161 are spaced apart widthwise of the machine, being connected by a sleeve portion 1160 by which the bell crank lever is fulcrumed on a shaft 1163 carried between a forwardly extending lug 1165 and a bracket 1166 on the bearing bracket 597.

The arm 1151 extends rearwardly and is bifurcated to receive a lower end portion of an upwardly extending latch member 1167 which is pivoted to the arm 1151 by a pin 1169. The upper end portion of the latch member 1167 has a rearwardly directed projection 1171 arranged to hook over a flat on a stud 1173 carried by the lower end portions of the plates 653 associated with the side gripper actuating mechanism at the left hand side of the machine (Fig. 39). A tension spring 1175 extending between a pin in the latch member 1167 and a hook on the bearing bracket 597 urges the latch member rearwardly.

The arm 1161 of the bell crank lever 1159, 1161 has similarly pivoted thereto a latch member 1177 having a forwardly directed portion 1179 arranged to hook over a flat on a stud 1181 carried by the lower end portions of the plates 653 associated with the side gripper actuating mechanism at the right-hand side of the machine. A spring 1183 connected between a pin carried by a depending tail 1185 of the latch member 1177 and a hook on the bearing bracket 597 urges the latch member 1177 forwardly. Push rods 1193 extend forwardly and rearwardly through bores in the bearing bracket 597 and engage rearward faces of the latch member 1167 and the tail 1185 of the latch member 1177 respectively. Rearward ends of the push rods are engaged by setscrews carried by downwardly extending arms 1195 secured (one toward each side of the machine) on a transverse shaft 1197 journaled in lugs 1199 extending rearwardly from the bearing bracket 597. Also secured to the shaft 1197 is an arm 1201 pivotally connected, by means of a pin 1203, to a lower end portion of a connecting rod 1205 an upper end portion of which is pivotally connected to a stud on a cam lever 2195 hereinafter referred to for operating the side clamping devices. During the second stage of a cycle of operations of the machine the cam lever 2195 is effective to rock the arms 1195 counterclockwise (Fig. 37) and push the rods 1193 forward to move the hooked portions of the latch members 1167 and 1177 from over the studs 1173 and 1181 respectively. Such movement of the latch members allows movements of the side grippers to take place in an unhindered manner during the second stage of operations of the machine.

At the commencement of a cycle of operations of the machine the parts are in the positions in which they are shown in Fig. 37 with the upper end portions of the latch members 1167, 1177 lying over the flats on the studs 1173, 1181 respectively. During the pulling of the upper by the side grippers during the first stage of the cycle of operations of the machine the plates 653 descend a short distance as hereinbefore described carrying the flats on the studs 1173, 1181 somewhat away from the under faces of the upper end portions of the latch members 1167, 1177. If the operator pulls forwardly on the joystick 851 during the pause between the first and second stages of the cycle of operations of the machine, the bell crank levers 733, 735 carrying the virtual fulcra for the triangular members are swung anticlockwise, as seen in Fig. 37, thus relieving the load on the side grippers to some extent. Forward movement of the joystick also causes the latch members 1167, 1177 to move downward and if the movement exceeds a certain amount the latch members will engage the studs 1173, 1181 and thereafter additional forward movement of the joystick will lower the plates 653, swinging the triangular members anticlockwise as seen in Fig. 37 against the action of the springs 681, and will, through the connections between the plates 653 and the ball-ended studs 437, rock the levers 397, 399 (Fig. 52) clockwise to lift the side grippers relatively to their carriers 375.

Having lifted the side grippers the operator may effect adjustments of the positions of the upper on the last. For example he may shorten the toe cap by causing the toe gripper to take a new purchase on the upper (by manipulation of the handle) and, by operation of another joystick hereinafter referred to, moving the side grippers lengthwise of the last toward the toe end thereof. Alternatively he may, for example, move the joystick 851 obliquely rearwardly and toward one side of the machine thereby allowing the grippers at one side of the machine to take up the strain on the upper while the grippers at the other side remain elevated, further movement of the joystick rearwardly then causing these grippers also to take the strain on the upper. During the second stage of the cycle of operations of the machine the latch members 1167, 1177 are moved from over the studs 1173, 1181 (as the clamping devices move in to engage the shoe, see the portion a—b of the line Q—Q of the cam timing chart shown in Figs. 77 and 78, thus allowing the plates 653 to move upwards (to the limit of their movement as hereinbefore referred to) in an unhindered manner on release of the upper margin by the side grippers (such release being represented by the portion c—d of the line H—H of the cam timing chart) despite the fact that, if the operator has moved the joystick 851 forwardly in adjusting the upper at the end of the first stage of the cycle of operations of the machine, one or other or both of the latch members 1167, 1177 may be lowered from the position(s) shown in Fig. 37.

When the joystick 851 is centralized toward the end of the second stage of the cycle of operations of the machine (see the portion c—d of the line P—P of the cam timing chart) the latch members are restored to their initial heightwise positions shown in Fig. 37. During the return movement of the latch members the springs 1175, 1183 cause the latch members to take up their initial positions with upper end portions extending over the studs 1173, 1181.

(c) Adjustment lengthwise of the shoe

For initially positioning the side gripper units S1 and S2 in directions extending lengthwise of a shoe supported by the shoe support the following mechanism is provided.

To upper end portions of the arms 839 of the bell crank levers 837, 839 (Figs. 37 and 42) associated with the side gripper units S1 and S2 at opposite sides of the machine are pivoted, by means of studs 1207, depending links 1209. At spaced locations along the links 1209 are pivotally connected, by means of studs 1211 and 1213 respectively, rear end portions of connecting rods 1215 and 1217. Forward end portions of the rods 1215 are pivotally connected, by means of pins 1219, to upper end portions of arms 1221 (see Figs. 16 and 42) extending upwardly from opposite end portions of a sleeve member 1223 rotatably mounted on a shaft 1225 journaled, at the left-hand side of the machine, in the bracket 1947 supported on the base casting 1 and, at the right-hand side of the machine, in a sleeve 1247. The sleeve 1247 is journaled in a stem portion 1228 of a shell member 1230. The sleeve member 1223 has a third arm 1227 (extending rearwardly) (Fig. 42) to which is secured, by means of a spacing member (not shown) an arm 1231 of a two-armed lever 1231, 1233. Through a radial bore in the arm 1233 is threaded a stem portion of a handle 1235. Received on an upper end of the stem portion of the handle is a clamping member 1237 arranged to engage an arcuate surface 1238 on a bracket 1981 secured to the base casting 1. The lever 1231, 1233 is freely rotatable on the stem portion 1228 of the shell member 1230, and the stem portion 1228 is clamped in a bore in the bracket 1981.

The forward end portions of the rods 1217 at opposite sides of the machine are pivoted, by means of studs 1239, to arms 1241, 1243. The arm 1241 is clamped to a left-hand end portion of the shaft 1225 and the arm 1243 is clamped to a left hand end portion of the sleeve 1247. Right-hand end portions of the shaft 1225 and sleeve 1247 are connected to bevel gear segments 1248 and 1250 respectively, the segments forming part of a differential device 1245 which is controlled by a joystick 1249, the arrangment being generally similar to the differential device and joystick described in United States Patent No. 2,552,793, referred to above, it being appreciated that the sleeve 1247 and shell member 1230 correspond to the parts referred to by the reference numerals 431 and 461 respectively in said patent. The segments 1248 and 1250 mesh with a bevel gear 1252 secured to a cradle 1254 carrying a stem 1256 on which is slidably received a joystick handle 1258. The handle is normally urged downwardly relatively to the stem 1256 (by means of a spring 1260 received between a screw 1262 in the end of the stem 1256 and a shoulder in a bore in the handle receiving the stem) thus causing a flange 1264 on the handle to enter an aperture in the shell member 1230 and thus to hold the joystick against movement. The cradle 1254 is pivotally supported on pins (not shown) extending forwardly and rearwardly from a block 1268 freely mounted on an end portion of the shaft 1225.

When it is desired to set the lengthwise position of the side gripper units S1 and S2 with respect to the sides of the last within an upper supported by the machine, the handle 1235 is rotated to unclamp the clamping member 1237 from the arcuate surface 1238 and the handle is then swung upwardly or downwardly about the axis of the shaft 1225 thereby rotating the sleeve member 1223 and the arms 1221 in one direction or the other about the shaft. Such rotation of the arms 1221 swings the links 1209 (through the rods 1215) about the studs 1213 (held stationary at this time by the rods 1217 connecting the links to the arms associated with the joystick controlled differential device 1245). The swinging of the links 1209 about the studs 1213 causes the bell crank levers 837, 839 (and, through the action of the links 845, the bell crank levers 833, 419) to swing about their pivots thus moving the side gripper units bodily lengthwise of the last in a direction depending upon the direction of movement of the handle 1235. After this adjustment has been effected the handle 1235 will be rotated to clamp the member 1237 again against the surface 1238 to retain the handle in its adjusted position, thereby fixing the positions of the pivot studs 1211.

If now, after the completion of the first stage of the cycle of operations of the machine, the operator desires to adjust the position of the opposite ends of the toe cap line of the upper lengthwise of the last e. g., to move the toe cap line bodily lengthwise of the last, or to effect "tip-straightening" adjustments, he will lift the handle 1258 against the action of the spring 1260 to lift the flange 1264 clear of the aperture in the shell member 1230 and he will then move the joystick 1249 in the desired direction and to the appropriate extent so as to impart swinging movements of appropriate extents and directions to the arms 1241, 1243 and, via the rods 1217, to the links 1209 which then swing about the axes of the studs 1211. Such swinging movements of the links 1209 thereby impart movements to the bell crank levers 837, 839 of appropriate extents and in appropriate directions to move the side grippers lengthwise of the last in the desired manner. For example, movement of the joystick 1249 in a direction extending purely forward or rearward in the machine will impart equal movements to the side gripper units in the same directions lengthwise of the shoe at opposite sides thereof, while movement of the joystick in a direction extending purely widthwise of the machine will impart movements to the side gripper units to equal extents but in opposite directions lengthwise of the shoe at opposite sides thereof. Movement of the joystick in a direction intermediate the two directions referred to will (as may readily be understood from a reference to said United States Patent No. 2,552,793) impart unequal movements (in extent and/or direction) to the side gripper units at the opposite sides of the shoe.

During the second stage of the cycle of operations of the machine the joystick 1249 is arranged to be returned to its initial, centralized, position by the following mechanism. The pivot studs 1213 at each side of the machine extend outwardly beyond the rods 1217 and these outwardly projecting portions have rotatably mounted thereon rolls 1251 (Fig. 42), retained on the studs by nuts and washers. Formed at end portions of arms 1253 (one at each side of the machine) are centralizing or collecting members 1257 (Fig. 38). Each member 1257 has walls providing inclined portions 1259 leading to a space defined between parallel portions 1261 of the walls. The distance between the portions 1261 is commensurate with the diameter of the rolls 1251. The arms 1253 are secured on the shaft 1263 hereinbefore referred to.

It will be recalled that this shaft 1263 is rocked under the control of the cam track acting on the roll 609 carried by the arm 603 to impart upper-pulling movements to the side grippers. The arrangement is such that, during the upper-pulling movements of the grippers (represented by the portion *a—b* of the line K—K of the cam timing chart, Figs. 77 and 78) the collecting members 1257 are swung anticlockwise as seen in Fig. 38 to free the rolls 1251 so as to permit the operator to effect "tip-straightening" adjustments by the joystick 1249 at the conclusion of the first stage of the cycle of operations of the machine. When, during the second stage of the cycle of operations, the lever 601, 603, 1271 is swung anticlockwise as seen in Fig. 37 (over a period of time represented by the portion *c—d* of the line K—K of the cam timing chart) to restore the side grippers to their initial positions heightwise of the shoe, the centralizing members 1257 are swung clockwise so that, assuming the joystick 1249 has been displaced from its central position, one or other of the inclined portions 1259 of the walls of each of the centralizing members engages the associated roll 1251 and returns the side grippers to their present positions lengthwise of the last and thereby also centralizes the joystick 1249.

MAIN TOE GRIPPER AND ITS ACTUATING MECHANISM

The toe gripper and its actuating mechanism will now be described with reference particularly to Figs. 30 to 36 and to the cam timing chart shown in Fig. 77 in which the line C—C shows the timing of mechanism for causing the toe end gripper to seize and release the upper materials, the line D—D shows the timing of mechanism for causing the toe end gripper to exert a pull on the upper materials and, later, to return to its initial position and the line E—E represents the timing of movements of the toe end gripper (considered in a direction extending lengthwise of the shoe) toward or from an out-of-the-way position which it occupies while the toe end tackling device is inserting a tack into the work.

The toe end gripper 13 and toe end wiper 25 are supported by means of a pair of brackets 1381 (shown in broken lines in Fig. 30) mounted, in spaced relation considered in a direction extending widthwise of the machine, on the column 5, while the toe tackling device (hereinafter described) for fastening the pulled over upper at the toe end of the shoe is supported on one of the brackets 1381.

Extending transversely through bores in the brackets 1381 are upper and lower shafts 1387 and 1389 respectively. A toe gripper carrier 1391 (provided by a plate-like member which is roughly triangular in outline as seen from the side of the machine) has secured to it a transverse pin 1393 (see Fig. 31) by means of which it is supported by a bifurcated link 1395 journaled on the shaft 1387. The carrier 1391 is provided with an opening 1397 through which extends the shaft 1387 and a boss of the link 1395. A link 1399 (Fig. 30) secured to the shaft 1389 has a bifurcated portion which embraces a rearward portion of the triangular carrier 1391 (see also Figs. 35 and 36), a pin 1401 serving pivotally to connect the link 1399 to the carrier 1391. An imaginary line joining the centers of the shaft 1389 and pin 1401 lies parallel to a similar line joining the centers of the shaft 1387 and pin 1393. The link 1399 also supports a pin 1403 on which is pivotally mounted a lever having three arms 1405, 1407, 1409 all the arms being bifurcated. The link 1399 lies between the limbs of the bifurcated arm 1405. The arms 1407 and 1409 are connected to means hereinafter described. Formed in an upper portion of the carrier 1391 is a guideway 1411 (Figs. 31 and 32) of inverted T-shape, the guideway extending rearwardly and upwardly (considered from the front of the machine.

The toe gripper comprises an upper jaw 1413 and a lower jaw 1415. The lower jaw is secured to an outer slide 1417 which is slidably mounted in the guideway 1411 in the carrier 1391 while the upper jaw is secured to an inner slide 1419 slidably mounted in a guideway 1421 in the outer slide 1417 (see Fig. 32). The outer slide 1417 has a lug 1423 depending therefrom into a recess in the carrier 1391 below a forward part of the guideway 1411. A compression spring 1427 received in a bore 1429 in the carrier 1391 engages the lug 1423 and urges the slide 1417 forwardly and downwardly in the guideway 1411 to a position determined by engagement of a forward face of the lug 1423 with a block 1431 secured to the carrier 1391. The jaw 1415 has a curved face, the face 17 hereinbefore referred to, which, when an upper on a last is presented to the machine, engages the toe end of the last thereby to position the work, in a direction extending lengthwise of the shoe, in the machine (see Fig. 30). The jaws have upper-gripping surfaces which lie substantially in horizontal planes and closing and opening of the gripper is effected by rectilinear movements imparted to the upper jaw to move it towards or away from the lower jaw, the jaws being at least substantially parallel to each other.

For imparting closing and opening movements to the upper jaw the following mechanism is provided. A stud 1433 pivotally connects a rear end portion of the inner slide 1419 with upper end portions of a pair of links 1435 (one at each side of the slide). Lower end portions of the links are connected, by means of pins 1437, with arms 1439 of a pair of bell crank levers fulcrumed on the shaft 1387 and having other arms 1441 connected, by means of a stud 1443 (Fig. 33) to a forward end portion of a toggle link 1445 (Fig. 30). The link 1445 is pivotally connected at its other end portion, by means of a pin 1447, to one end portion of a second toggle link 1449. The opposite end portion of the link 1449 is pivotally connected, by means of a pin 1451, to a bifurcated arm 1453 of a bell-crank lever having another arm 1455. The arms of the bell crank lever are spaced apart widthwise of the machine and are connected together by means of a yoke 1457, the bell crank lever being freely fulcrumed on a transverse shaft 1459 carried in bearings in the column 5. The arm 1455 is pivotally connected to an upper end portion of a link 1461, a lower end portion of which is coupled, by means of a stud 1463, to one arm 1465 of a bell-crank lever which is freely fulcrumed on a transverse shaft 1467 carried in bores in the intermediate casting 3.

A second arm 1469 of the bell-crank lever just referred to carries a cam roll 1471 which rides in a cam track formed in a cam 995 (Fig. 13) secured to the main cam shaft 233 of the machine.

Also freely pivoted on the pin 1447 is a head portion 1477 (Fig. 30) of a pin 1479 which is received in a lower end portion of a sleeve 1480. The sleeve is surrounded by a compression spring 1481. A lower end of the spring engages the head portion 1477 of the pin 1479 while an upper end of the spring engages a head portion 1483 of a pin 1485 extending into the opposite end portion of the sleeve 1480. The head portion 1483 is mounted on a transversely extending stud 1487 carried by an arm 1489 secured to a shaft 1491 journaled in the right-hand side one of the brackets 1381. Also secured to the shaft 1491 at the right-hand side of the machine is an arm 1493 provided with a hand knob 1495 (see also Fig. 4) and a spring-pressed detent 1497 which engages teeth of a rack segment 1499 secured to the right-hand side bracket 1381. The rack segment serves to hold the arm 1489 in adjusted position, movement of the arm being effective to adjust the force of the spring 1481 on the toggle links 1445 and hence the grip of the toe gripper on the work. A pin 1501 extending laterally from the toggle link 1449 serves, by engagement with a tail 1503 on the link 1445, to prevent the toggle formed by the links 1445, 1449 from assuming a straightened condition or from breaking in a downward direction.

When the bell-crank lever 1465, 1469 is swung anticlockwise (as seen in Fig. 30) under the action of the appropriate cam track of the cam 995 (see the portion a–b of the line C—C of the cam timing chart, Fig. 77) the bell-crank levers 1453, 1455 and 1439, 1441 are swung clockwise to cause the jaw 1413 to move towards the jaw 1415 to grip upper materials therebetween. When the movement of the jaw 1413 is resisted by engagement with the work, supported by the work-engaging face of the jaw 1415, the toggle formed by the links 1445, 1449 assumes a more broken position against the action of the spring 1481 which determines the grip of the gripper on the upper materials. With the arrangement just above described the force with which the toe gripper grips the work is rendered at least substantially independent of the thickness of the material gripped between the jaws for, although when the jaws grip thicker material, the spring 1481 is loaded up to a somewhat greater extent than when thinner material is gripped between the jaws, the construction and arrangement is such that change in the angle between the toggle links 1445, 1449 resulting from the change in thickness of the material is such as to cancel out, at the gripper jaws, at least substantially any effect of the differences in the loading of the spring 1481. When, later, the bell crank lever 1465, 1469 is swung clockwise (as seen in Fig. 30) under the control of the cam track (see the portion c–d of the line C—C, Fig. 77) the jaw 1413 is positively moved away from the jaw 1415 (on engagement of the pin 1501 with the tail 1503) and, on continued movement of the bell crank lever last referred to in this direction, a block 1505 (Fig. 31) on the slide 1419 engages a lug 1507 on the slide 1417 and moves that slide and the lower jaw upwardly and rearwardly to move the gripper out of the way of the toe tacking device as will hereinafter appear (see the portion a–b of the line E—E of the cam timing chart, Fig. 77).

While the gripper is gripping the upper it is moved to tension the upper by mechanism which causes the links 1395 and 1399 to swing (anticlockwise as seen in Fig. 30) about the shafts 1387 and 1389. The gripping of the upper by the jaws of the toe gripper is effected by mechanism (above described) which is independent of the mechanism, now to be described, for moving the toe gripper to pull the upper and the action of these mechanisms is so timed as to ensure that the jaws take a good grip on the materials before the pulling action commences. A more certain action of the gripper can thus readily be ensured than is the case in many conventional pulling over machines in which one mechanism is provided for closing the jaws and effecting pulling action of the gripper. Furthermore the linkage supporting the gripper causes the gripper to move, in pulling the upper, in a path which is curved (see the dotted arrow in Fig. 31) such a path providing a good direction of pull on the upper and enabling the jaws of the toe gripper to occupy an initial position close up against the last. From an inspection of Fig. 31 it will be appreciated that the toe gripper closing links 1435 lie parallel to the links 1395 and to an imaginary line joining the centers of the pin 1401 (Figs. 30 and 35) and the shaft 1389 and that the length of the links 1435 is effectively the same as that of the links 1395 and as the distance between the centers of the pin 1401 and the shaft 1389. Hence, as the links 1395 and 1399 swing to move the toe gripper to pull the upper, the grip of the gripper jaws on the upper materials is left undisturbed.

For causing the links 1395 and 1399 to swing to impart upper-pulling movements to the toe gripper the arm 1407 of the three-armed lever 1405, 1407, 1409 is pivotally connected, by means of a stud 1509 (see particularly Fig. 35) with an upper end portion of a link 1511 a lower end portion of which is pivotally connected, by means of a stud 1513 (Fig. 30), to one arm 1517 of a bell-crank lever having a second arm 1519. The bell-crank lever 1517, 1519 is fulcrumed on the shaft 1467 and the arm 1519 carries a cam roll 1521 running in a cam-track (not shown) formed in a cam 231 (Fig. 13).

The bifurcated arm 1405 is pivoted by means of pins 1525 (see particularly Figs. 35 and 36) to lower end portions of rods 1527 (one at each side of the arm 1405) which are slidably received in sleeves 1529 (Fig. 30) and have flanges 1531 formed therein. Compression springs 1537 surround the sleeves 1529 and abut, at their lower ends, against the flanges 1531 and, at their other ends, against heads 1533 on rods 1535, secured in the sleeves 1529. The heads 1533 are pivotally connected, by means of a pin 1539, to an upper end portion of an arm 1541 secured to a shaft 1543 journaled in the column 5. An end portion of the shaft 1543 projecting beyond the right-hand side of the column has secured to it an arm 1545 having a part-spherical socket 1547 for a ball 1549 threaded onto a threaded portion of a rod 1551. The ball is retained against rotation with the rod by means of a pin-an-slot connection between the ball and its socket 1547. The rod 1551 extends forwardly and rearwardly through openings in the socket 1547. At its rear end the rod has formed thereon a second ball portion (not shown) received within a socket (not shown) formed on the column 5 and retained therein by means of a cap (also not shown). At its forward end the rod is provided with a hand wheel 1561 (Fig. 4) by which the rod may be rotated. Rotation of the rod in one direction will cause the ball 1549 to move along the threaded portion of the rod towards the rear of the rod and the arm 1541, 1545 will be swung (clockwise as seen in Fig. 30) to effect an increase in the loading of the springs 1537. Rotation of the rod 1551 in the opposite direction will cause the ball 1549 to travel forwardly along the rod and allow the springs 1537 to expand, thus reducing the loading of the springs. As will appear shortly, the loading of the springs 1537 determines the amount of tension imparted to the upper by the toe gripper.

The springs 1537 tend to rotate the three-armed lever 1405, 1407, 1409 clockwise relatively to the carrier 1391 but such movement is limited by engagement of a lug 1563 on the carrier with an upper edge face of the arm 1407. After the toe gripper has gripped the upper, anticlockwise movement of the bell crank lever 1517, 1519 (as seen in Fig. 30) under the control of the appropriate cam track (see the portion a—b of the line D—D in Fig. 77) will move the link 1511 downwardly and rearwardly and this movement will be transmitted to the carrier 1391. As the gripper movement is opposed by the upper material the springs 1537 will yield (at a time corresponding to some point between the points a and b of the line D—D, Fig. 77) allowing the three-armed lever 1405, 1407, 1409, on continued movement of the link 1511, to swing anticlockwise about the pivot pin 1403, thus allowing relative movement to occur between the link 1511 and the gripper carrier 1391, the pull on the upper being determined by the loading of the springs 1537 as above referred to, and, due to the particular linkage arrangement employed, being at least substantially independent of the "tightness" of the upper materials. In this connection, it will be appreciated that, although with a relatively "tight" upper the springs 1537 will become loaded up to a greater extent than they will in the case of a relatively "loose" upper, the change in the angle between parts of the linkage system is such as to cancel, at least substantially, the change in loading of the springs.

After the toe gripper has moved, under power, to tension the upper, the operator may wish to cause the toe gripper to release the upper and then to regrip the upper to modify the pulling action of the gripper on the upper, this adjustment being effected in a pause between the first and second stages of a cycle of operations of the machine. For this purpose there is provided a hand lever 1565 formed as one arm of a bell-crank lever having a second arm 1567, the bell-crank lever being fulcrumed on a shaft 1569 carried by the column 5 (Fig. 30).

Pinned to the arm 1567 (to fulcrum about the shaft 1569 therewith) is an arm 1571 an upper end portion of which is pivotally connected, by means of a stud 1573, to a rearward end portion of a link 1575. A forward end portion of this link is pivoted, by means of a stud 1577, to the arm 1409 of the three-armed lever 1405, 1407, 1409.

For causing the toe gripper to open, the hand lever is provided with an auxiliary lever 1579 pivoted on the hand lever by means of a pin 1581. The lever 1579 has integrally formed therewith an arm 1583 connected, by means of a pivot pin 1585, to an upper end of a rod 1587 which is threaded, at its lower end, into a block 1589 pivoted by means of a pivot pin 1591, to one arm 1593 of a lever having a second arm 1595. The lever 1593, 1595 is pivoted on a pin 1597 carried by a lug on the hand lever 1565. A compression spring 1599 surrounding the rod 1587 between the block 1589 and a lug 1601 on the hand lever (through which lug the rod 1587 extends) normally urges the lever 1579 away from the hand lever 1565 to an extent determined by engagement of a lug 1615 on the lever 1579 with a stop screw 1617 in the hand lever 1565. The arm 1595 of the two-armed lever 1593, 1595 is pivotally connected, by means of a stud 1605, with a lower end portion of a link 1607 having a slot 1609 (Fig. 31) in an upper end portion thereof. Extending transversely through the slot is a stud 1611 carried by a lug 1613 on one of the bell-crank levers 1439, 1441. When the upper jaw 1413 is moved towards the lower jaw 1415 to grip the work the stud 1611 is carried towards the upper end of the slot 1609. By gripping the auxiliary lever 1579 and the hand lever 1565 the lever 1579 may be swung clockwise as seen in Fig. 30 to cause the link 1607 to be moved (through the rod 1587 and lever 1593, 1595) downwardly and rearwardly. The upper end of the slot 1609 engages the stud 1611 and, as the link 1607 continues to move, rocks the bell-crank levers 1439, 1441 anticlockwise (as seen in Fig. 31) causing the toggle 1445, 1449 to assume a more broken condition against the action of the spring 1481 and causing the upper jaw to move away from the lower jaw to release the upper. In use the operator will, if he considers it necessary to ease the pulling action of the toe gripper, pull forward on the auxiliary lever 1579 to move the hand lever 1565 so as to cause the toe gripper to move upwardly. If he deems it necessary to cause the gripper actually to release the upper he will squeeze the hand lever and the auxiliary lever together to open the jaws of the gripper, the actual forward pull that he is then exerting on the auxiliary lever 1579 reducing the squeezing effort necessary to open the jaws. On release of the auxiliary lever the toe gripper is caused to grip the upper again. If he wishes to increase the pulling action of the toe gripper the operator may push rearwardly on the hand lever 1565.

The parts associated with the pulling movement of the toe gripper are so arranged that during the pulling movement of the toe gripper the hand lever 1565 partakes of but little movement and at the end of the pulling action occupies a substantially constant position irrespective of the amount of movement imparted to the toe gripper. Such an arrangement is likely to be a convenience to the operator and also avoids the risk of the hand lever striking the operator during the operation of the machine.

The wiper 25 is provided to wipe the margin of the upper at the toe end of the shoe beneath the insole on the last after the upper has been tensioned by the toe gripper and as the upper is released by the gripper during the second stage of the cycle of operations of the machine. The wiper is secured by screws 1620 to a member 1621 (see Fig. 31) pivotally mounted, by means of a pin 1623, on a carrier 1625 which is pivoted on a stud 1627 extending between bifurcated portions of an arm 1629. The arm 1629 is secured, by a stud 1631 (see also Fig. 33), to an arm 1633 of a bell crank lever having a second arm 1635 (Fig. 31). The bell-crank lever is fulcrumed on a shaft 1637 carried between the brackets 1381. The arm 1635 is pivotally connected, by means of a pin 1639, to one end portion of a rod 1641, the other end portion of which is pivotally connected, by means of a pin 1643 (Fig. 30) to a lever 1645 freely fulcrumed on a boss on the bell-crank lever 1517, 1519. A plunger 1647 backed by a spring 1649 in a bore in a lug 1651 on the arm 1517 urges the lever 1645, anticlockwise as seen in Fig. 30, about its fulcrum relatively to the bell-crank lever 1517, 1519 and normally holds an abutment 1653 on the lever 1645 in engagement with a block 1655 pivoted on a pin 1656 carried by the arm 1519. The pin 1623 is supported by one end portion of a link 1657 (Fig. 31), the other end portion of which is pivoted on a pin 1659 (Fig. 30) carried by a casting 1661 (shown in chain lines in Fig. 30) secured to, and projecting forwardly from, the brackets 1381.

A plunger 1663 (Fig. 31) extends through a bore in the carrier 1625 and engages a face 1665 on the member 1621. The plunger has a flange 1667 which is normally urged into engagement with a shoulder in the bore in the carrier 1625 by means of a spring 1669 surrounding a stem portion of the plunger and engaging, at one end, the flange 1667, and at the other end, a plug 1673 threaded into the said bore. The stem portion of the plunger extends through a bore in the plug and is engaged by a stop screw 1675 carried in an arm 1677 of a two-armed lever having a second arm 1679. The two-armed lever is pivoted on a stud 1681 secured in the carrier 1625. A pin 1683 extending transversely from the arm 1679 limits at times anticlockwise movement of the lever 1677, 1679 by engagement with a face 1685 on the carrier. A leaf spring 1686 secured to the member 1621 and extending over the front face of the carrier 1625 maintains the wiper in contact with the lower end of the plunger 1663. The arm 1679 has a rounded end portion which engages, at times, a cam face 1687 on a plate 1689 secured to the inner slide 1419 carrying the upper jaw 1413 of the toe gripper.

When the toe gripper has gripped the upper and moves heightwise of the shoe away from the shoe bottom to tension the upper the cam face 1687 moves away from the end of the arm 1679. During the second stage of the cycle of operations of the machine, as the gripper releases the upper (see the portion c—d of the line C—C, Fig. 77), the wiper is carried forwardly beneath the shoe wiping the margin of the upper against the shoe bottom, the spring 1669 allowing the wiper to yield to a limited extent (the limit being determined by engagement of the pin 1683 with the surface 1685). The wiper serves to maintain the toe portion of the upper in tensioned condition and in position for the tacking operation as will hereinafter appear. The path of movement followed by the wiper is determined by the linkage system supporting the wiper, the wiper being caused to dip somewhat to position it in the desired upper-wiping position as it moves forward beneath the shoe bottom, it being appreciated that initially the wiper lies above the level of the insole (considered in a direction extending heightwise of the shoe) as is shown in Fig. 30 in which the insole and last (toe portion only) are indicated in dotted lines. The forward movement of the wiper is derived from the lever 1645 which, in turn, is actuated as a result of movement of the bell-crank lever 1517, 1519 controlling the tensioning movement of the gripper.

Since it is not desired to allow the wiper to move forwardly substantially until the gripper releases the upper, there is provided a latching arrangement for holding the arm 1633 against movement until the desired time, anticlockwise movement of the lever 1517, 1519 that occurs to cause the gripper to move to tension the upper resulting in the loading up of the spring 1649 (Fig. 30). When the latching arrangement releases the arm 1633 for movement, the spring 1649 expands and moves the lever 1645 anticlockwise to bring the abutment 1653 into engagement with the block 1655 again, and this movement, through the rod 1641 and lever 1633, 1635, causes the wiper to perform its wiping operation on the upper as the toe gripper releases the upper materials. On release of the upper materials the toe gripper is moved upwardly and rearwardly relatively to the toe gripper carrier 1391 (see the portion a—b of the line E—E, Fig. 77) and the carrier 1391 and gripper are moved downwardly and rearwardly under the action of the springs 1537 on the three-armed lever 1405, 1407, 1409 (which is thereby swung clockwise about the pivot 1509 until the arm 1407 engages the lug 1563 on the carrier 1391). During the subsequent return movements of the toe gripper and the toe wiper to their initial positions, which movements take place toward the end of the second stage of the cycle of operations of the machine under the control of the cam tracks in which the rolls 1521 and 1471 run (see the portions c—d of the lines D—D and E—E in Fig. 77), the cam face 1687 engages the arm 1679 and through the action of the plunger 1663 raises the wiper somewhat to ensure that it clears the gripper jaws as they move forwardly and upwardly to their initial positions.

The latching arrangement for holding the arm 1633 against movement until the toe gripper releases the upper during the second stage of the cycle of operations of the machine will now be described. Formed on an intermediate portion of the arm 1629 is a depending lug 1691 (see Figs. 31, 33 and 34) to which is keyed and secured a plate 1693 having an arcuate guideway 1695 therein. Slidably mounted in this guideway is a block 1697 which is urged along the guideway (towards the left as seen in Fig. 31, downwardly as seen in Fig. 34) by means of a spring 1699 received between the block and an upstanding face 1700 on the plate 1693. The block 1697 is prevented from moving out of the guideway 1698 under the action of the spring 1699 by engagement of the block with a pin 1703 in the plate 1693.

The pin 1443 connecting the arm 1441 and the toggle link 1445 of the toe gripper closing mechanism has a head 1705 thereon which head is provided with a stop face 1707. When the toe gripper is being closed the arm 1441 carries the stop face 1707 into engagement with a stop face 1709 on the block 1697 which block is then moved along the guideway 1695 against the action of the spring 1699. The fact that the faces 1707, 1709 are in engagement prevents any substantial swinging movement of the arm 1633, the amount permitted being limited by engagement of the block 1697 with a face 1711 on the head 1705 of the pin 1443. When the gripper jaws are subsequently opened the arm 1441 swings (anticlockwise as seen in Fig. 31) to carry the faces 1707 and 1711 out of engagement with the block 1697 (movement of the block being arrested by the pin 1703 as above referred to). The arm 1633 then swings clockwise (as seen in Fig. 31) under the action of the spring 1649 on the lever 1645 and the wiper is moved in to wipe the upper margin beneath the insole. In order to ensure that the wiper does not move in should the operator open the gripper jaws by means of the hand lever 1565 and auxiliary lever 1579 in the pause between the first and second stages of the cycle of operations of the machine, an auxiliary latch is provided. This auxiliary latch comprises a plate 1713 carried on the pin 1451 and having a slot 1715 in which is received a portion of the pin 1443 immediately beside the head 1705 thereon (see Fig. 33). The plate 1713 has secured to it a latch member 1717 (see particularly Fig. 34) having a lug 1719 thereon. When the lever 1453, 1455 is swung clockwise (as seen in Fig. 31) to close the toe gripper, the lug 1719 moves into engagement with a face 1710 (Fig. 34) on a stop member 1701 secured to the plate 1693. Only when the toe gripper is opened under the action of the cam track 1473 does the lug 1719 move out of engagement with the face 1710 to allow the arm 1633 to move, thereby causing the wiper to move and so to perform its wiping operation. It will be understood that, if the operator moves the hand lever 1565 to open the jaws of the toe gripper during the pause between the first and second stages of the cycle of operations of the machine, the pivot pin 1451 remains stationary, the opening of the jaws resulting from the toggle 1445, 1449 moving to a more broken condition. Hence, although the face 1707 on the head of the pin 1443 moves away from the face 1709 on the block 1697 (and the face 1711 on the head of the pin moves away from under the block 1697), the lug 1719 remains in engagement with the face 1710 preventing any substantial movement of the arm 1633 and hence of the wiper.

AUXILIARY TOE GRIPPERS

The construction and mode of operation of the auxiliary toe grippers 29 will be described with reference particularly to Figs. 28 and 29 and to the cam timing chart shown in Figs. 77 and 78 in which the line A—A represents the timing of the closing and opening of the auxiliary gripper jaws and the line B—B represents the timing of the upper-pulling and the return movements of the auxiliary grippers.

The auxiliary toe grippers 29 are caused, prior to the operation of the toe gripper and side grippers, to seize the margin of the upper materials at localities adjacent to the toe gripper location, but at opposite sides thereof, and to impart a preliminary forward draft to the upper, at the same time introducing a portion of the margin lying between the jaws of the two auxiliary grippers to the then open jaws of the toe gripper. The purpose of the auxiliary toe grippers is substantially that of the auxiliary grippers described in United States Letters Patent No. 2,609,552, granted on September 9, 1952 on an application filed in my name, but the construction of the grippers and their operating means is somewhat different from that of the grippers and operating means described in the last-mentioned specification.

Each of the auxiliary grippers comprises a lower jaw 1791 and an upper jaw 1793 pivoted for swinging movement relatively to the lower jaw on a pin 1795 (Fig. 28). The lower jaws 1791 of the two grippers are secured to lower end portions of separate levers 1797, spaced apart widthwise of the machine and pivotally mounted on a shaft 1799 carried in transversely extending bores in the casting 1661 (Fig. 29). Pivotally mounted on each of the levers 1797, by means of a pin 1801, is a pair of triangular plates 1803, spaced apart widthwise of the machine, and receiving between them a lower end portion of a link 1805 (which is pivotally connected to the plates by means of a stud 1807). Also received between the plates 1803 is a trunnion block 1809 pivotally connected with the plates by means of trunnion pins 1811. The block 1809 has a bore extending transversely to the pins 1811 for the reception of a gripper-closing rod 1813 pivotally connected with the associated upper jaw 1793 by means of a stud 1815. A compression spring 1817 is received between nuts 1819 on a threaded portion of the rod 1813 and the trunnion block 1809. Other nuts 1821 on a rearward end portion of the rod 1813 limit movement of the rod through the trunnion block under the action of the spring 1817. The position and movement of the lower jaws of the grippers are controlled by separate links 1823 forward end portions of which are pivotally connected to the levers 1797 by the pins 1801. Rearward end portions of the links 1823 are pivotally connected, by means of pins 1825, to upper end portions of arms 1827 of two-armed levers having other arms 1853 hereinafter referred to.

For swinging the upper jaws relatively to the lower jaws to effect upper gripping and releasing action of the auxiliary grippers the following mechanism is provided. Upper end portions of the links 1805 are connected, by means of pivot pins 1829, with bifurcated forward end portions of arms 1831 extending from a hub 1833 carrying a third arm 1835. The hub 1833 is mounted on a trasverse shaft 1837 supported in the brackets 1381. The arm 1835 is pivotally connected, by means of a stud 1839, with an upper end portion of a connecting rod 1841, a lower end portion of which is connected, by means of a stud 1843, to an arm 1845 of a lever having a second arm 1847. This lever is fulcrumed on a shaft 1871 carried by the intermediate casting 3. The arm 1847 carries a cam roll 1849 riding in a cam track (not shown) formed in a cam 1852 secured to the cam shaft 233 (Figs. 12 and 13).

The two-armed levers 1827, 1853 are pivoted, by means of pins 1855, on arms 1857 extending upwardly and forwardly from a hub member 1854 from which another arm 1859 extends substantially rearwardly. The hub member 1854 is carried on a transverse shaft 1861 journaled in bearings on the column 5. The arm 1859 is pivotally connected, by means of a stud 1863, to an upper end portion of a rod 1865, a lower end portion of which is pivotally connected, by means of a stud 1867, to an arm 1869 secured on the shaft 1871 above referred to and a second arm 1873 is secured to the shaft and carries a cam roll 1875 running in the same cam track as does the roll 1849 above referred to.

The arms 1853 extend downward behind the hub member 1854 and lower end portions of the arms are connected, by means of pins 1879, to rearward end portions of separate tension springs 1881. Forward end portions of these springs are connected to hooks on the column 5. Each arm 1853 has a trunnion block 1883 pivotally connected thereto and a rod 1884 extends through the trunnion block and has a threaded end portion received in a block 1886 pivotally mounted on an arm 1885. Between the trunnion block 1883 and a knob 1888 on the other end of the rod 1884 is a compression spring 1890. The rod 1884 is held in adjusted position in the block 1886 by means of a lock nut 1892. The arms 1885 are secured on the shaft 1459 above referred to. Also secured to the shaft 1459 is a hand lever 1889 (see also Fig. 2) which may be held in any one of a number of positions by latch means, the arrangement just described providing spring-tension adjusting means for determining the amount of pull exerted by the auxiliary toe pincers on the upper as will hereinafter appear.

When the cam shaft 233 is rotated the appropriate cam track causes the lever 1845, 1847 to rotate anticlockwise (as seen in Fig. 28) thereby rotating the arms 1831 anticlockwise also to straighten the toggle formed by the plates 1803 and the rods 1813, thus yieldingly closing the auxiliary grippers on the upper margin (see the portion a—b of the line A—A in Fig. 77). As the cam shaft continues to rotate the cam track acting on the roll 1875 causes the lever 1873, 1869 to rock anticlockwise (as seen in Fig. 28) thereby rocking the arms 1859, 1857 and the hub member 1854 anticlockwise also. Such movement of the arms 1857 carries the pivot pins 1855 substantially rearwardly and since the springs 1881 and 1890 together tend to hold the rearward end portions of the arms 1853 of the levers 1827, 1853 in positions determined by engagement of studs 1903 carried by the arms 1853 with stop members hereinafter described, the links 1823 are also moved rearwardly to cause the auxiliary toe grippers to tension the upper substantially lengthwise of the shoe as above referred to (see the portion a—b of the line B—B, Fig. 77). The springs 1881 and 1890 may yield during the pulling action of the auxiliary grippers to allow the pins 1855 to continue to move rearwardly their given amount without undue tension being applied to the upper, such tension being determined by the setting of the hand lever 1889 which adjusts the loading of the springs 1890. The fact that each of the auxiliary toe grippers has its own tension-controlling spring and linkage system enables the two grippers to move to different extents if necessary. For latching the hand lever 1889 in a chosen one of its possible positions of adjustment there is provided a latching arm 1891 pivotally mounted on a pin 1893 carried by the hand lever 1889. The arm 1891 is formed integrally with a hand grip 1895 and has an end portion in the form of a tooth 1896 arranged to engage in any one of a series of notches 1897 formed in a plate 1899 secured to the left-hand one of the brackets 1381. A tension spring 1901 connected between the arm 1891 and the hand lever 1889 serves to maintain the latching arm in engagement with the chosen one of the notches 1897.

The stop members with which the studs 1903 on the arms 1853 engage are provided by discs 1905 secured eccentrically on the shaft 1861. Also secured to this shaft is a hand lever 1907 which may be held in a desired adjusted position by means of a spring-pressed detent 1908 in the hand lever engaging a chosen one of a plurality of notches 1910 in an arcuate member 1912 secured to the column 5. The hand lever 1907 is provided with a hand knob 1914 (see also Fig. 2).

It will be appreciated that the position in which the hand lever 1907 is held determines the initial position of the levers 1827, 1853 about the pivot pins 1855 and hence adjustably determines the positions of the auxiliary toe grippers in directions extending fore and aft in the machine. Such an adjustment provides the operator with means for setting the position of these grippers in this direction in relation to the last in accordance with the degree of fullness or scantiness of the upper materials and also allows him, by adjusting the position of the hand lever 1907 into a fully anticlockwise position (as seen in Fig. 28) determined by engagement of the hand lever with a lug 1916 on the arcuate member 1912, to move the auxiliary toe grippers to retracted positions in which they do not seize the upper, should, for any reason, he wish to dispense with their use.

The auxiliary toe grippers are caused to release their grip on the upper (under the control of the cam track on the roll 1849) as soon as the main toe gripper has gripped the upper (see the portion c—d of the line A—A (Fig. 77) and the portion a—b of the line C—C, showing the closing movement of the main toe gripper). For this purpose the cam track causes the arms 1845, 1847 to swing further in an anticlockwise direction (as seen in Fig. 28) thus breaking the toggle formed by the plates 1803 and the rods 1813 in the opposite direction to that in which they are initially broken. On release of the upper the auxiliary toe grippers are swung rearwardly to out-of-the-way positions by the action of the loaded springs 1881, 1890, swinging the two-armed levers 1853, 1827 anticlockwise until the studs 1903 again engage the discs 1905, such movement being augmented by the action of the cam track on the roll 1875 (see the portion c—d of the line B—B in Fig. 77). The auxiliary toe grippers are restored to their normal open condition and to their initial positions (toward the end of the second stage of the cycle of operations of the machine) by the action of the cam track on the rolls 1849 and 1875 (see the portions e—f, g—h of the lines A—A and B—B in Fig. 77).

SHOE SUPPORT

The shoe support 7 hereinbefore referred to will now be described in greater detail.

The toeward shoe-bottom-engaging element 9 is formed by an upstanding portion (having an upper serrated insole-engaging face) of a member 1909 (see particularly Fig. 24) which is supported on a bar 1911 (as a rearward end thereof) in a manner so as to be readily removable therefrom in order that it may be replaced by another member of different size. With this end in view a supporting pin 1913 secured in the bar is slidably received in a bore in the member 1909 while a locating pin 1915 pressed within a bore in the bar is also engageable in a bore in a foot 1917 on the member 1909.

The shoe-bottom-engaging elements 11 are formed by upstanding portions (also having upper serrated work-engaging faces) of a member 1919 (Fig. 25) which is removably carried by a rearward end portion of a slide 1921 by means of pins 1923 and 1925 (Fig. 26). The bar 1911 is supported in a guideway 1913 in the slide 1921 which can be moved relatively to the bar in a direction extending lengthwise of a shoe positioned in the machine to vary the spacing between the element 9 and the elements 11 as hereinbefore referred to.

A forward end portion of the bar 1911 is guided for movement in a direction extending lengthwise of a shoe supported in the machine by ribs 1927 (Fig. 17) extending upwardly from a bracket 1929 which is secured to a pair of side brackets 1931 bolted upon the base casting 1. Near its forward end the bar 1911 is provided with a trunnion pin 1928 (see also Fig. 24) end portions of which are received in small blocks 1930 which are slidably received in guideways 1932 formed in the ribs 1927 and extending lengthwise thereof.

The slide 1921 is guided for movements extending lengthwise of a shoe positioned in the machine, by means of lugs 1920 depending from the rearward end portion of the slide engaging machined surfaces 1922 (Fig. 15) on a portion 1977 of the bracket 1929. A pin 1933 connects depending lugs 1935 (see particularly Fig. 26) on a forward end portion of the slide 1921 with a rearward end portion of a link 1937 which is provided with bosses 1938 (Fig. 17). The link 1937 extends forwardly, downwardly and towards the left of the machine (as seen from the front) and its forward end portion is connected, by means of a pin 1939, with an arm 1941 secured to one end portion of a shaft 1943. Surrounding the shaft 1943 is a sleeve 1945 (Fig. 27) the sleeve being journaled in bores in alined boss-like portions 1946 (Figs. 16 and 23) of a bracket 1947 also secured to the base casting 1. To the other end portion of the shaft 1943 is secured a hand lever 1949 (see also Figs. 26 and 27). By means of this hand lever the operator may rotate the shaft 1943 relatively to the sleeve 1945 and, since the latter is connected (by connections hereinafter described) with the bar 1911, such movement of the shaft will effect adjustment of the position of the shoe-bottom-engaging elements 11, in a direction extending lengthwise of a shoe, with respect to the toeward element 9. The hand lever 1949 may be held in one of a plurality of possible positions of adjustment (relatively to the sleeve 1945) by means of a latching device comprising a pin 1951, slidable in a transverse bore in the hand lever 1949, which pin is arranged to enter one of a plurality of holes 1953 in a segment 1955 secured to the left-hand end portion of the sleeve 1945. The pin 1951 is carried by a latch-controlling lever 1957 pivoted on a pin 1959 carried between transversely extending lugs 1960 on the hand lever 1949. A compression spring 1962 (see particularly Fig. 27) between the lever 1957 and the hand lever 1949 normally serves to retain the pin 1951 in a chosen one of the holes 1953. Received within a transversely extending bore in a bracket 1981, hereinafter referred to in connection with a joystick 1249, is a shaft 1983 (Figs. 16 and 23). The shaft 1983 is coaxial with the sleeve 1945. Inner end portions of the shaft 1983 and the sleeve 1945 are spaced apart widthwise of the machine and have secured to them forwardly and inwardly extending arms 1985 (Figs. 16 and 24), the arms being connected together by a pin 1987. The arms 1985 form parts of bell-crank levers also having forwardly extending arms 1989 which are pivotally connected, by pins 1991, to a stirrup 1993 which is also connected, by means of a pivot pin 1995, to a bifurcated forward end portion of the bar 1911 carrying the toe end shoe-bottom-engaging element 9.

Rotation of the sleeve 1945 under the control of a hand lever 1961 is permitted to a limited extent and such rotation of the sleeve will also rotate the shaft 1943 (through the action of the latching device just above referred to) and will thus effect movement of the shoe-bottom-engaging elements 9 and 11 together in directions extending toewardly or heelwardly of a shoe supported in the machine. This arrangement provides a means of adjusting the position of the insole (which is the shoe bottom member engaged by the elements 9 and 11) relatively to the last bottom in a direction extending lengthwise thereof, assuming that the insole is loose and is not tacked to the last bottom. The hand-lever 1961 is pivotally connected, by means of a pin 1963, on an arm 1965 secured to the sleeve 1945 at a locality between the boss-like portions 1946 of the bracket 1947. The arm 1965 is urged toward a central position by means of a pair of opposed spring-pressed plungers 1967 received in bores in the bracket 1947 and arranged to engage the arm at upper and lower sides thereof. The hand lever 1961 is arranged to latch the arm 1965 in this centralized position by reason of a spring 1969 urging the hand lever in an anticlockwise direction (as seen from above, Fig. 25) about the pivot pin 1963 to cause a recess 1971 in the hand lever to embrace a pin 1973 carried by the bracket 1947. When it is desired to adjust the position of the insole lengthwise of a shoe on the last bottom the hand lever 1961 is moved slightly to the left (as seen from the front of the machine to force the recess 1971 from the pin 1973 when the hand lever may be moved upwards or downwards (against the action of the springs behind the plungers 1967) to rotate the sleeve 1945 and the shaft 1943 together to move the shoe-bottom-engaging elements in directions extending lengthwise of the last.

Engaging the under side of the bar 1911 is a spring-pressed plunger 1975 (Fig. 15) which is received in a bore in the rearwardly extending portion 1977 of the bracket 1929. This plunger normally urges the bar 1911, and with it the slide 1921, upwards to an extent limited by engagement of steel plate 1974 carried by the slide 1921 with a setscrew 1976 secured in a cover plate 1978 which bridges the slide 1921 and is secured to the bracket 1929 at each side of the slide 1921. On presenting a shoe to the machine the operator may depress the shoe on its shoe-bottom-engaging elements 9 and 11 downwards slightly to facilitate the introduction of the marginal portions of the upper materials between the open jaws of the side grippers.

HEEL REST

The heel rest 27 (see particularly Figs. 15, 16, 18 and 19) is arranged to be moved yieldingly into engagement with the heel end of the shoe being operated upon by the machine during the first stage of the cycle of operations of the machine while the side grippers are moving inwardly to be located by engagement with the sides of the last prior to performing their pulling operation on the upper materials, and the heel rest is then locked in position against forward movement (i. e., towards the operator) to assist in clamping the shoe in position for the inwiping of marginal portions of the upper materials beneath the insole and for subsequent tacking of those portions to the insole. The heel rest is yieldingly moved into engagement with the shoe and is subsequently retracted therefrom under the control of that cam track of the cam 231 which controls the movements of the side gripper units inward and outward with respect to the sides of the toe portion of the last, the line G—G in Fig. 77 representing the timing of movements of the cam follower roll in the cam track.

The heel rest comprises two plate-like members 1999 which are disposed in a V-shaped fashion (as seen from above, Fig. 18). The members 1999 are mounted in a yoke member 2001 by means of a pin 2003 extending heightwise of the heel rest and the members may partake of limited swinging movement about the pin. The yoke member is mounted on transverse pivot pins 2005 secured in opposite side arms 2006 of a cradle 2007. The angular position of the yoke member relatively to the cradle 2007 may be adjusted (about the axes of the pins 2005) to a limited extent. The yoke member is arranged to be clamped in adjusted position by means of a clamping bolt 2009 (Fig. 15), threaded into one side of the yoke member and extending through an arcuate slot 2011

(concentric with the pins 2005) formed in one of the side arms of the cradle. The cradle is carried, by means of hollow pivot pins 2013, on upper end portions of parallel links 2015, lower end portions of which are pivotally mounted on pivot pins 2017 secured in a bracket 2019. The bracket has a forwardly and upwardly extending portion 2021 on which is provided a face 2023 against which bears a rounded head portion of a thrust pin 2025 extending forwardly and downwardly from a lug 2027 formed on the cradle 2007. This arrangement takes the thrust of the work against the heel rest which would otherwise impose a torque on the pivot pins 2013 and the links 2015. As the heel rest engages the heel end portion of the shoe it is free to move widthwise of the shoe to centralize itself with respect to the heel end portion of the shoe, by the links 2015 swinging about the pivot pins 2017. This allows the heel-engaging faces of both the members 1999 to be brought into engagement with the shoe and, until pressure is brought to bear upon both of said faces, the heel rest is not locked against further sideways movement. This is achieved by means of the following arrangement.

In pressing engagement with lugs 2029 on the members 1999 are rearward headed end portions of rods 2031 slidably received in alined bores in the cradle 2007, the pivot pins 2005, and in the pivot pins 2013. A forward end portion of the left-hand one of the rods 2031 (as seen from the front of the machine) is threaded into a transverse bore in a pin 2033 (Fig. 18) pivotally received in a bore of a locking member 2035, the rod 2031 extending through a bore (of somewhat greater diameter than that of the rod) formed in the locking member transverse to the axis of the pin 2033. A lock nut 2037 secures the pin 2033 in adjusted position on the rod 2031. A forward end portion of the right-hand one of the rods 2031 is threaded into a pivot pin 2041 and secured in adjusted position therein by means of a lock nut 2039 in similar manner. The pivot pin 2041 is received in a bore of a headed pin 2043 slidably received in a bore extending lengthwise of the locking member 2035. The member 2035 is provided with closely spaced rack teeth 2045 on its forward face. A second locking member 2047 provided with rack teeth 2049 on rearward and forward faces thereof has a depending stem portion 2050 which is received in a bore extending downwardly and rearwardly through a boss 2052 formed on the portion 2021 of the bracket 2019. A pin 2054, which extends transversely through bores in the boss 2052 and an oversize bore in the stem portion 2050, serves to retain the locking member 2047 in position but allows it to pivot slightly about the axis of the stem portion 2050 on engagement with the locking member 2035. A tension spring 2051 connected between the locking member 2035 and the cradle 2007 normally holds the locking member 2035 in a rearward position with the rack teeth 2045 just clear of the rack teeth 2049 on the rear face of the locking member 2047. The position of the locking member 2035 with respect to the rods 2031 is so adjusted that, until both of the rods have been moved forward as a result of contact of both of the plate-like members 1999 with the heel end portion of the shoe, the opposed teeth on the locking members 2035 and 2047 do not inter-engage to lock the heel rest against sideways movement. Consequently, if, as the heel rest is moved into engagement with the shoe, only one of the members 1999 contacts the shoe, the heel rest is free to be displaced sideways in the appropriate direction (the links 2015 pivoting about the pins 2017) until pressure is brought to bear on both the members 1999 causing them to pivot about the pin 2003 to displace both of the rods 2031 forwardly. Such movement of the rods moves the locking member 2035 into locking engagement with the locking member 2047. When the teeth on the near face of the member 2047 become worn the member may be reversed (on removal of the pin 2054) so that the teeth on what was its forward face may cooperate with the teeth of the member 2035. For centralizing the heel rest in a direction considered widthwise of a shoe after the heel rest has disengaged the shoe towards the end of second stage of a cycle of operations of the machine, centralizing plungers 2053 (Figs. 18 and 19) backed up by a relatively light spring 2055 are provided in a bore in the lug 2027 of the cradle 2007, the plungers being arranged to engage arcuate faces on bearing members 2057 secured to the links 2015.

The bracket 2019 as seen from the left-hand side of the machine (Fig. 15) is somewhat C-shaped to provide clearance for the sleeve member 1223 when the heel rest is in its most forward position. The bracket 2019 is slidably mounted, for movement in directions extending lengthwise of a shoe positioned in the machine, on a carrier 2063, ribs 2061 on the bracket being received in guideways 2062 (Fig. 17) in the carrier. The bracket may be held in any one of a number of positions on the carrier 2063 by means of a latch 2065 (Fig. 15) engaging one or other of a set of teeth 2067 formed on an under face of the bracket. The latch 2065 is secured to a transverse shaft 2069 journaled in alined bores in the carrier 2063 and having a hand lever 2071 secured thereon by means of which the latch may be released from the teeth 2067. A spring 2073 connected between a pin on the hand lever 2071 and a pin on the left-hand one of a pair of links 2083 hereinafer referred to holds the latch 2065 in latching position. The component of force, due to the weight of the bracket 2019 and the parts carried thereon, tending to move the bracket forward and downward is nearly balanced by means of a coiled spring (not shown) received in a housing 2077 (Fig. 16) on the carrier 2063 and connected with the bracket by means of a chain 2079. The arrangement for adjusting the position of the bracket 2019 on the carrier as above described provides a coarse adjusting means for adjusting the initial position of the heel rest in a direction extending lengthwise of a shoe presented to the machine. The carrier 2063 is pivotally mounted, by means of pins 2081, 2082, on a linkage system including forward links 2083 and rearward links 2085 (Fig. 15). The links 2083 are pivotally supported upon inner end portions of the sleeve 1945 and shaft 1983 (Fig. 23). The links 2085 are pivotally supported on pivot pins 2087 carried by the bracket 1929 (Fig. 15). For imparting movement to the carrier 2063 lengthwise of a shoe, a left-hand end portion of the shaft 1327 has secured to it a forwardly extending arm 2091, a forward end portion of which is pivotally connected, by means of a pin 2093 (see also Fig. 16), to one end portion of a connecting link 2095. The opposite end portion of the link 2095 is provided with a slot 2096 (Fig. 15) through which extends a pin 2097 carried by a bifurcated forward end portion of a compensating lever 2099. The lever 2099 is fulcrumed, at a locality between its ends, upon a stud 2101 (Fig. 23) carried by lug 2103 extending upwards from a crosspiece 2105 (Fig. 15). The crosspiece is secured to upper end portions of a pair of rods 2107 secured, at their lower end portions, to a dashpot device hereinafter referred to.

A rearward end portion of the compensating lever 2099 is connected, by means of a pivot stud 2111, with one arm 2113 of a bell-crank lever having a second arm 2115 (Fig. 16). The bell-crank lever 2113, 2115 is fulcrumed upon a reduced end portion of the shaft 1983 (see also Fig. 23) and the arm 2115 is pivotally connected, by means of the pin 2081, to the carrier 2063. Initially the axis of the stud 2101, on which the compensating lever 2099 is fulcrumed, is coaxial with the axes of the shaft 1983 and sleeve 1945 (see Fig. 23), such position being determined by engagement of the stud 2082 at the left-hand side of the machine with a stop member 2084 secured to the bracket 1929 (Fig. 15).

A rearward end portion of a two-armed lever 2098 extends beneath the pin 2097 while a forward end portion of this lever is connected to one end of a tension spring 2100 the other end of which is anchored to the base casting. The lever 2098 is fulcrumed between its ends on a pin 2102 carried by a bracket 2104 secured to the base casting 1. Under the action of the spring 2100 the lever 2098 causes the pin 2097 normally to engage the upper end of the slot 2096 and when the shaft 1327 is rocked in an anticlockwise direction (see Fig. 15) to cause the side gripper units to move inwards to locate the side grippers against the sides of the toe portion of the last as hereinbefore described the spring swings the lever 2098 clockwise to a limit determined by engagement of the forward end portion of the lever with a stop screw 2106 (Fig. 16) carried by the bracket 2104 and in so moving causes the heel rest to move into engagement with the heel end of the shoe (holding the toe end of the last firmly against the surface 17 of the toe gripper) in a manner shortly to be described. After the side grippers have engaged the last and the shaft 1327 rocks slightly clockwise to move the side grippers a measured distance outwardly away from the last as hereinbefore described the link 2095 moves relatively to the pin 2097, as is permitted by the slot 2096, without disturbing the locking of the heel rest against the shoe.

The dashpot device above referred to forms an oil lock associated with the heel rest and will now be described. The dashpot device comprises a casing 2109 to which lower end portions (of reduced diameter) of the rods 2107 are secured by means of nuts 2094, the upper end of the casing abutting against shoulders formed on the rods. In the casing is formed a cylinder 2119 (Fig. 20) which receives a piston 2121 which is threaded onto a flanged member 2123 having a stem portion 2124 by means of which it is secured to a cross-piece 2125. The cross-piece is provided with turned end portions 2126 (Fig. 16) by means of which it is pivotally mounted in plates 2128. The plates 2128 are secured to a bracket 2243 secured to the base casting 1. The piston is provided with a sealing washer 2127 (Fig. 20) secured to the piston by means of a bolt 2129 through which extends a passageway 2131 communicating with a recess 2133 formed in the piston. A ball valve 2135 is urged, by a compression spring 2137 received between the member 2123 and a thimble 2136 engaging the valve 2135, against a valve seating at the upper end of the recess 2133 to cut off communication between the recess and a chamber 2139 in the piston. Extending through an axially disposed bore in the member 2123 is a valve-operating rod 2143, a lower end portion of which is seated in the thimble 2136. The cylinder 2119 communicates, via a passage 2145, with a compartment 2147 in the casing 2109 and the piston has two ports 2149 through which communication is established between the passage 2145 and the chamber 2139 in the piston. The casing is provided with a filler 2151. Leading downward from the compartment 2147 is a passage 2165 in a lower portion of which is threaded a member 2167 providing a seating for a ball valve 2169. A passage 2179 extends through the member 2167 and communicates with the passage 2165. The ball valve 2169 is normally held against its seating to close the passage 2179 by a spring 2171 which is supported by a screw 2173 closing the lower end of a compartment 2175. Leading from the compartment 2175 to the cylinder 2119, below the piston 2121, is a passageway 2177. The upper end of the valve-operating rod 2143 is engaged by one arm 2155 of a lever having a second arm 2157 (Fig. 15). The lever 2155, 2157 is pivoted on a pin 2159 carried in bosses 2130 (Fig. 16) formed on the plates 2128 and the arm 2157 has adjustably received therein a stop screw 2161. The stop screw 2161 is arranged to be engaged at times (as will be hereinafter described) by a spring-pressed plunger 2163 (Fig. 15) carried by a lug secured on the arm 591.

When the lever 1339 (Figs. 12 and 37) is operated by means of the cam 231 to cause the side grippers to move in towards the last, the arm 2091 is swung anticlockwise as seen in Fig. 15, to raise the link 2095 and thereby to allow the spring 2100, through the lever 2098, to cause the compensating lever 2099 and the bell-crank lever 2113, 2115 to swing together, also anticlockwise, about the axis of the stud 2101, the stud 2101 being held stationary at the time (with its axis coaxial with the axes of the sleeve 1945 and the shaft 1983 as hereinbefore referred to) by the action of the dashpot device, the ball valve 2135 being held closed by the spring 2137 and the ball valve 2169 being held seated against its seating by the spring 2171. The anticlockwise movement of the bell-crank lever 2113, 2115 moves the heel rest into engagement with the heel portion of the shoe and the heel rest is automatically centralized with respect to the shoe as hereinbefore described. After the heel rest has engaged the shoe, movement of the heel rest lengthwise of the shoe is arrested and with it the anticlockwise movement of the bell-crank lever 2113, 2115 and, on continued movement of the arm 2091 in an anticlockwise direction, the upthrust on the rods 2107 causes the spring 2137 (Fig. 20) to yield allowing the ball valve 2135 to rise. This permits oil to flow from the cylinder 2119 below the piston through the passageway 2131, recess 2133, chamber 2139 and ports 2149, and the casing 2109 to move upwards relatively to the piston 2121. The rods 2107 supporting the pivot stud 2101 for the compensating lever are thus allowed to move upwards as the compensating lever pivots about the stud 2111. It will thus be appreciated that it is the spring 2137 which determines the force with which the heel rest is thrust against the shoe and this force is independent of the size of shoe being operated upon, the amount of relative movement between the lever 2099 and the lever 2113, 2115 varying with shoes of different lengths. As the arm 591 (see also Fig. 37) completes its anticlockwise movement during the pulling action of the side grippers the plunger 2163 engages the stop screw 2161 and swings the lever 2155, 2157 clockwise, depressing the valve-operating rod 2143 positively to cause the valve 2135 to be seated. Further passage of oil from the cylinder 2119 through the piston is thus prevented and the stud 2101 is held against movement, the heavy spring 2100 then holding the heel rest and the shoe against forward movement, the valve 2169 preventing escape of oil from beneath the piston 2121.

During the return movement of the arm 2091 the upper end of the slot 2096 engages the pin 2097. The compensating lever 2099 and the lever 2113, 2115 swing clockwise together to return the heel rest to its initial forward position determined by engagement of the pins 2082 with the stop 2084 and, on the heel rest reaching that position, relative movement between the levers just referred to takes place (as the arm 2091 completes its clockwise movement) to restore the stud 2101 to its initial position. Such movement of the stud 2101 is permitted by reason of the cylinder 2119 moving downwards relatively to the piston 2121, oil escaping past the valve 2169 into the cylinder 2119 beneath the piston. The final heightwise position of the cylinder and the rods 2107 is determined by engagement of shoulders on the rods with the upper face of the crosspiece 2125 (Fig. 16) and in this position the stud 2101 is coaxial with the shaft 1983 as above referred to. When the arm 591 swings clockwise during return movements of the side grippers in the second stage of the cycle of operations of the machine, the plunger 2163 is carried out of engagement with the stop screw 2161 thus freeing the valve-operating rod 2143 ready for the operation of the machine on the next shoe.

SIDE CLAMPING DEVICES

The side clamping devices 21 comprise clamping members 2181 (Fig. 17) which are carried by a pair of arms 2185 (one at each side of the machine). The clamping members 2181 comprise pads of rubber carried on plates 2183 which are provided with ball-ended portions 2184. The portions 2184 are retained in socket members 2711 with capacity for limited swivelling movement. The members 2711 are secured within bores in end portions of the arms 2185 by means of screws 2713. The swivelling of the clamping members is restrained frictionally by means of plungers 2715 received within bores in the members 2711 and backed by springs 2717 received within the bores just referred to. The arms 2185 are splined onto shafts 2187, the splines on the shafts also serving to connect the shafts with sleeves 2189 so as to cause the shafts to rotate with the sleeves while permitting axial movement of the shafts relatively to the sleeves. This arrangement allows the clamping devices 21 to be adjusted in directions extending lengthwise of the shoe with the side grippers as will be hereinafter described.

The sleeves 2189 are journaled in bores in the brackets 1931 above referred to, flanges 2191 (Fig. 15) on upper end portions of the sleeves and arms 2193 clamped to lower end portions of the sleeves serving to prevent endwise movement of the sleeves relatively to the brackets 1931. The arms 2193 are connected with means for moving the clamping devices yieldably into engagement with the shoe and for locking the devices in such position to sustain the shoe firmly against movement during the action of the wiping devices 23 and 25 on the upper margins while the tacks are inserted to secure the margins of the pulled-over upper to the insole. In engaging the shoe the final portions of the movements of the side clamping devices take place in directions which are at least substantially normal to the portions of the shoe surfaces engaged thereby (see Fig. 17) thus avoiding chafing of the upper material or tendency to bunch the material inwardly from the sides of the work. Such clamping arrangements are likely to provide for very efficient clamping of the upper materials against the last and afford good support for the work against the impact of the fastening inserting mechanism.

For moving the clamping devices into engagement with the shoe there is provided a cam lever 2195 fulcrumed on the shaft 1467 (see Fig. 12) and provided with a cam roll 2197 riding in a cam track (not shown) in the cam 1852. The cam lever 2195 is pivotally connected, by means of a pin 2201, to a rearward end portion of a link 2203, a forward end portion of which is pivotally connected, by means of a stud 2205 (see Fig. 15), with an arm 2207 secured to a shaft 2209. The shaft is journaled in transverse bores in the base casting 1 and has secured to it two other arms 2211 for operating the side clamping devices at opposite sides of the shoe.

The arms 2211 have flats 2213 formed on them which engage plungers 2215 extending from housings 2217, the plungers being backed by compression springs 2219 retained within the housing by means of screws 2719. By means of the screws 2719 the degree of compression of the springs 2219 may be adjusted. Locknuts 2721 are provided for securing the screws in adjusted position. The housings are secured to arms 2221 of bell-crank levers freely mounted on the shaft 2209. The arms 2221 are bifurcated and provide segmental portions in each of which a series of peripherally spaced teeth 2223 is formed. The bell-crank levers have other arms 2225 (see also Fig. 22) carrying pins 2227 on which trunnions 2229 are pivoted. The trunnions carry other pins 2231 to which end portions of links 2233 are pivoted, other end portions of the links being pivotally connected, by means of pins 2235, to other trunnions 2237 connected, by pivot pins 2239, to the arms 2193.

When the cam lever 2195 is rocked (under the action of the appropriate cam track, the timing of the movement of the lever 2195 being represented by the line Q—Q in the cam timing chart, Figs. 77 and 78) anticlockwise (as seen in Fig. 12) the arms 2211 are rocked in a similar direction and, through the spring-pressed plungers 2215, this movement is yieldably transmitted to the bell-crank levers 2221, 2225. Movement of the bell-crank levers is effective, through the connections with the arms 2185, to move the side clamping members into engagement with the sides of the shoe. Such movement of the clamping devices occurs shortly after the commencement of the second stage of a cycle of operations of the machine (see the portion a—b of the line Q—Q in Figs. 77 and 78). The pressure of such engagement is determined by the setting of the springs 2219 for, after movement of the clamping devices is resisted (at a time represented by the point c on the line Q—Q, Figs. 77 and 78, for example, the actual position of the point c being dependent on the size of the shoe being operated upon), the arms 2211 move relatively to the arms 2221 (compressing the springs 2219) until movement of the cam lever 2195 in its anticlockwise direction is terminated.

As such relative movement between the arms 2211 and 2221 takes place, pawls 2241 are allowed to move into engagement with the teeth 2223 to lock the side clamping members in engagement with the shoe. The pawls 2241 (three for each segmental portion of the arms 2221) are in the form of plungers received within bores in the bracket 2243 and are urged outwardly by springs 2245 (see particularly Fig. 21) in the bores.

The pawls are provided with wedge-shaped end portions, inclined faces 2246 (Fig. 15) of which are arranged, when permitted to do so, to cooperate with inclined faces 2248 of the teeth 2223 on the segmental portions of the arms 2221. In order to maintain the wedge faces of the pawls in proper relation to the faces 2248 the plungers forming the pawls and the bores in which they are received are of rectangular cross section. Additional support for the operative end portions of the pawls is provided by means of L-shaped plates 2250 secured to the bracket 2243, and provided with apertures through which the end portions of the pawls may extend.

For controlling the pawls 2241 blades 2247 are provided, the blades being located between the segmental portions of the arms 2221 (one for each arm). The blades 2247 are secured to members 2252 pivotally connected, by means of pins 2249, with the arms 2225 (see also Fig. 22) and also, by means of pin-and-slot connections 2251 (Fig. 15), to arms 2253 formed integrally with the arm 2211. In the initial positions of the parts curved peripheral portions 2255 of the blades lie just outside the outer end of the teeth 2223 and, by engagement with the ends of the pawls 2241, hold the pawls out of engagement with the teeth 2223 (as shown in Fig. 15).

When the arms 2211 and 2253 swing, anticlockwise, relatively to the arms 2221 on engagement of the side clamping devices with the shoe, the blades 2247 may swing clockwise lowering the peripheral portions 2255 with respect to the teeth 2223 to allow the pawls to be moved by the action of the springs 2245 into engagement with the teeth. The pawls are staggered with relation to the teeth 2223 (and each group of three pawls in a set of six at one side of the machine is staggered slightly with relation to the other group) so that a fine measure of control of the locking of the clamping devices is obtained, at least one of each set of six pawls finding its way between the teeth 2223 of the segments on the arms 2221, so that its face 2246 comes into firm engagement with the corresponding face 2248, others of the pawls yieldingly engaging end faces of the teeth 2223. At a time corresponding to the point b on the line Q—Q, Figs. 77 and 78, the clamping devices will be fully locked in shoe-clamping position.

Toward the end of the second stage of a cycle of operations of the machine, after the tacks have been inserted to secure marginal portions of the upper to the insole, the arms 2211 and 2253 are swung (under the action of the appropriate cam track) clockwise (as seen in Fig. 15) relatively to the arms 2221 (as the springs 2219 backing up the plungers 2215 expand) thereby causing the blades 2247 to swing anticlockwise to lift the pawls 2241 out of engagement with the teeth 2223. Stop pins 2257 carried by the arms 2253 then engage the arms 2225 and thereafter, as the arms 2211 and 2253 continue their clockwise movement, the arms 2221 move with them to move the side clamping devices away from their shoe-engaging positions back to their initial positions. The portion d—e of the line Q—Q in Figs. 77 and 78 shows the timing of the return movement of the arms 2211 and 2253 to their initial positions.

For automatically positioning the side clamping devices in directions extending lengthwise of the shoe, on adjustment of the side grippers in these directions, the following arrangement is provided. Slidably received in guideways 2260, Fig. 17, (extending lengthwise of a shoe presented to the machine) in the brackets 1931 are slides 2259, the direction of movement of the slides being parallel to the axes of the shafts 2187 and sleeves 2189, which axes extend lengthwise of a shoe positioned in the machine. The slides 2259 are provided with pivot pins 2261 (Fig. 15) by means of which they are connected with end portions of links 2263, other end portions of which are connected, by means of pins 2265 (Figs. 37 and 37A), with lugs 2273 on the links 429 associated with the side grippers.

The slides 2259 are provided with plate-like head portions 2267 which, as seen from the ends of the slides, are rectangular in outline and extend into close-fitting grooves 2269 in the bosses of the clamp arms 2185. When the side grippers are adjusted in directions extending lengthwise of the last either by adjustment of the handle 1235 (Figs. 15 and 18) prior to the commencement of a cycle of operations of the machine or by means of the joystick 1249 during the pause between the first and second stages of the cycle of operations, when the operator effects so-called "tip-straightening" adjustments (if required) on the tensioned upper as hereinbefore described, the links 429 rock about the pin 431 on which they are carried. Such movement of the links 429 is transmitted, through the links 2263, to the slides 2259 which are thereby moved endwise in their guideways. By reason of the fact that the head portions of the slides are received in the grooves 2269 in the bosses of the clamp arms 2185 the latter are moved in a direction extending lengthwise of the shoe in the same direction as the side grippers and to an extent substantially equal to the extent of such movement of the side grippers. Thus, the clamping devices remain in substantially the same positional relationship (considered in directions extending lengthwise of a shoe) with the side grippers even when the latter are, for any reason, moved lengthwise of the shoe. Since, as has been hereinbefore referred to, the side wipers are carried by the carriers for the side grippers as are also the side tacking devices, positioning of the side grippers in directions extending lengthwise of the shoe also positions the side tacking devices and wipers in those directions. The positional relationship between the clamping devices and the side tacking devices and wipers is thus maintained, providing for equally effective clamping of the shoe at the sides thereof irrespective of the positions occupied by the side gripping, tacking and wiping units considered in said directions extending lengthwise of the shoe.

TACK-INSERTING MEANS

The machine is provided with five tacking devices, viz. a toe tacking device 19 arranged to drive a single tack at the toe end of the shoe, a pair of side tacking devices 20, 20 arranged to drive a pair of tacks at opposite sides of the shoe and a second pair of side tacking devices 20, 20 arranged to drive single tacks at opposite sides of the shoe at locations more heelwardly of the shoe. These tacking devices are all generally similar in construction and operation.

Each tacking device comprises a tacker body 2281 (Figs. 60, 61, 62 and 71) having cylindrical end portions 2283, 2284 connected by means of a part-cylindrical wall portion 2286. The axes of the opposite end portions 2283, 2284 are in alinement and these end portions are received in coaxial bores in bearings 2285, 2288 formed on the side gripper carriers 375 (Fig. 60) in the case of the side tacking devices and in bearings 2287 (Fig. 71) formed on the left-hand one (as seen from the front of the machine) of the brackets 1381 supporting the toe end gripper 13. Extending through the portions 2283, 2284 of the tacker bodies 2281 are alined bores 2305, 2306 respectively (Figs. 61 and 62), the axes of which bores are inclined at an angle of some 6° to the axes of the portions 2283, 2284. The positions of the tacker bodies 2281 (lengthwise thereof) with relation to the bearings 2285, 2288 in the case of the side tacking devices or the bearings 2287 in the case of the toe tacking device is determined by means of blocks 2289 carried on pins 2291 eccentrically formed on headed stems 2293. The blocks 2289 are received within peripherally disposed slots 2295 in the tacker bodies while the stems 2293 are received in bores in split lugs 2297 formed on the carriers 375, in the case of the side tacking devices, or on the bracket 1381 carrying the toe tacking device. By rotating the stems 2293 in the lugs 2297 the tacker bodies may be moved (in directions extending lengthwise of the tacker bodies) relatively to their supporting bearings for a purpose hereinafter referred to. The stems 2293 may be clamped in adjusted position by means of clamping bolts 2299, endwise movement of the stems in the lugs 2297 being prevented (when the clamping bolts are slackened) by means of studs 2301 in the lugs engaging peripheral grooves 2303 in the stems.

Rotatably mounted in the bores 2305, 2306 in the end portions 2283, 2284 of the tacker bodies are sleeve members 2307, endwise movement of the sleeve members relatively to the tacker bodies being prevented by means of retaining members 2309, bolted to the lower end portions 2284 of the tacker bodies, engaging peripheral grooves 2311 in flange portions 2313 of the sleeve members. Threaded into axial bores in the flange portions 2313 are housings 2315 having inwardly directed flanges 2317 forming bearings for valve stems 2319. Each valve stem has a threaded end portion which carries a nut 2321 and a locknut 2323. The nuts 2321 are fluted to provide passageways 2327 therethrough, the peripheral portions of the nuts between these passageways 2327 bearing (when in the position shown in Fig. 61) against inner walls of bushings 2325 slidably received in enlarged end portions of the axial bores in the housings 2315, and, at a later stage in the machine cycle (Fig. 62), against the inner wall of the housing 2315. This arrangement provides bearings for the threaded end portions of the valve stems. Passages 2329 extend through end portions of the bushings 2325. Springs 2331 received between the end portions of the bushings 2325 and threaded caps 2333 in the ends of the bores in the housings urge the bushes 2325 and the valve stems 2319 in directions to cause ball valves 2335 supported by head portions 2337 of the valve stems to be seated against valve seatings 2339 so as to close passageways 2341 therethrough. The valve seatings 2339 are threaded into axial bores in stem portions 2343 formed integrally with cylinders 2345, the stem portions 2343 being slidable endwise in the sleeve members 2307.

Received between enlarged end portions of the housings 2315 and the flanged portions 2313 of the sleeve members 2307 are blocks 2347 having passages 2349 therein, the passages 2349 being alined with a recess 2350 peripherally disposed around the housings 2315 leading to ports 2351. Flexible tubes 2352 threaded into the passages 2349 in the blocks supply air under pressure at the appropriate stage in the cycle of operations from compressing devices hereinafter referred to, to the tacking devices to actuate the latter. The construction is such that the housings 2315 may pivot relatively to the blocks 2347 during movement of the tacking devices from tack-receiving positions to tack-driving positions as hereinafter described, thereby preventing undue flexing of the tubes. Sealing washers 2348 are received between the blocks 2347 and the housings 2315 and between the blocks and the flanged portions 2313 of the sleeve members 2307 to avoid escape of air therebetween. Surrounding the cylinders 2345 and threaded thereon are housings 2353 terminating in tacker nozzle portions 2355. Inner bores 2357 and 2359 of the housings 2353 and the cylinders 2345 respectively are coaxial and of equal diameter. Slidably received within these bores are pistons 2361 to which tack drivers 2363 are secured. The toe tacking device and the most heelward pair of the side tacking devices are provided with one driver each (Fig. 61) but the other pair of side tacking devices are each provided with two drivers for driving a pair of tacks (Fig. 64).

The drivers are secured in bores in the pistons by means of screws 2365 which engage recesses 2367 in the drivers. Access to the screws 2365 is provided through apertures 2369 (Figs. 60 and 63) in the housings 2353 (when the pistons are in their raised positions). Any of the pistons may be held in such positions by the operator passing a pin or a screw driver through a lower end portion of the appropriate one of the apertures 2369 into a bore 2373 in the piston. For restraining the pistons against turning in the bores 2357 and 2359 keys 2375 (Fig. 64) in the pistons are received in keyways 2377 in the housings 2353. Secured to bosses 2354 on the housings 2353 (Fig. 61) are stop rods 2379 which extend through bores 2381 in the upper end portions 2283 of the tacker bodies, the axes of the bores 2381 being parallel to the axes of the bores 2305.

Fiber washers 2383 are supported on nuts 2385 threaded onto threaded end portions of the rods 2379, the nuts being held in adjusted position on the rods by means of locknuts 2387. The washers 2383, by engagement with the upper end portions 2283 of the tacker bodies, limit movement of the stems 2343, and the parts carried thereby, outwardly with respect to the sleeve members 2307 as will be hereinafter referred to. The drivers 2363 are slidably received in tack passages 2389 in the nozzle portions 2355 of the housings 2353. For controlling the shanks of tacks as they are being driven into the work there is provided for each of the tacking devices a number of tack-controlling fingers 2391, the fingers being retained by means of housings 2401 hereinafter described. The tacking devices employing single drivers each have three fingers symmetrically arranged around the nozzle (Fig. 69) while each of the tack passages of the tacking devices employing a pair of drivers has a pair of tack-controlling fingers (Fig. 63) associated with it. The construction and operation of these fingers will be described in greater detail hereinafter but here it will be sufficient to say that, during the tack-driving operations, end portions 2392 of the fingers yieldingly engage the shanks of the tacks to ensure that the tacks are driven squarely into the work.

Provision is made for loading the nozzle portions 2355 with tacks during each operation of the machine and the means for doing this will be hereinafter described, the tacking devices being moved from tack-receiving positions to tack-driving positions and, after the tacks have been driven, back to tack-receiving positions by rotation of the tacker bodies through some 90° relatively to their supports. Due to the fact that the axes of the alined bores 2305, 2306 are inclined with respect to the axes about which the tacker bodies are rotated such rotation causes the nozzle portions 2355 to be moved through an arc of a circle as is indicated by the dashed line A in Fig. 69. Assuming that the tack passages in the nozzle portions have been provided with tacks and the tacking devices have been moved to tack-driving positions, air under pressure is admitted via the tubes 2352, passages 2349, recesses 2350, and ports 2351, into the compartments formed inside the housings 2315, thence via passageways 2396 formed by flutings in the valve stems into the spaces 2395 in the sleeve members 2307 between the valve seatings 2339 and the flanged portions 2317 of the housings 2315. Since the ball valves 2335 are seated against their seatings 2315 by the action of the springs 2331 as above referred to such admission of air raises the stems 2343 and the parts supported thereby into tack-driving positions, the valves 2335 being retained in their seated positions during such movement by reason of the fact that compressed air is also admitted to the spaces beneath the nuts 2321. It should be observed that a straight portion B of the dashed line in Fig. 69 represents axial movement of the tacker nozzle portion towards the shoe under the influence of compressed air as just described.

As the stems 2343 and the parts supported thereby approach the limit of their outward movement relatively to the sleeve members 2307 (determined by engagement of the washers 2383 with the upper end portions 2283 of the tacker bodies) to position the tacker nozzles in tack driving positions with respect to the shoe bottom (it being appreciated that, by rotation of the stems 2293 in the lugs 2297, the tacker bodies may be so positioned that, when the washers 2383 engage the portions 2283 as just above referred to, the tacker nozzle portions may be located in engagement with the work so that the tacks are driven fully home as in McKay work or are located short of the work so that the tacks, when driven, are left upstanding somewhat as in welted work) the nuts 2321 on the valve stems 2319 engage the flanged portions 2317 and cause the valves to be unseated. Air then flows, via the passageways 2341 and alined passageways 2396 in the stem portions 2343, to the cylinders 2345 thereby raising the pistons 2361 to cause the tacks to be inserted into the work by the drivers 2363, upward movement of the pistons being cushioned by the engagement of fiber washers 2380 on the pistons with the housings 2353 (see Figs. 62 and 63). Latching means is provided in association with each tacking device to take the downward thrust on the cylinders 2345 during the actual tack-driving operation and these latching means will be hereinafter described. After the tack-driving movements of the pistons 2361, the tacker bodies are caused to rotate back towards their tack-receiving positions and, in the case of the side tacking devices, an early portion of this movement is used to cause the latching means just referred to associated with those devices to release the cylinders 2345 for their return movements lengthwise of the tacker bodies which latter movements are effected by means shortly to be described, while the suction due to the exhausting of the air from the cylinders 2345 returns the tack-driving pistons 2361 to their initial positions in the cylinders. In the case of the toe tacking device the latching means associated therewith is released by an arrangement hereinafter described. For returning the cylinders 2345 as just above referred to in the case of the side tacking devices levers 2356 (Fig. 60) are provided, end portions 2358 of which levers are arranged to engage the bosses 2354 on the housings 2353. The levers 2356 are pivoted on studs 2360 secured in lugs 2362 on plates 2364 secured (one at each side of the two gripper units) to the U-shaped members 403 by means of bolts 2366. Tension springs 2397, extending between the levers 2356 and the carriers 375, tend to rotate the levers in directions to return the housings 2353 and associated parts to their initial positions, but in order to ensure that such return movements are effected at the desired time, cam members 2370 are provided on levers 2533 which as will be later described control the rotative movements of the tacker bodies in their bearings. Should the springs not have returned the housings and the parts associated therewith effectively, the cam members 2370, by engagement with rolls 2372 carried on the levers 2356, swing the levers in directions (clockwise as seen in Fig. 60) to effect such return movements.

In the case of the toe tacking device, a tension spring 2384 (Figs. 67 and 68) is provided between the tacker body and the housing 2353 of that tacking device for returning the housing and the parts associated therewith to their initial positions. Assurance of such return is provided for by an arm 2374 (Fig. 71) secured to the link 1395 (Fig. 31) associated with the toe gripper, the arm being arranged to engage an abutment 2376 (Fig. 71) secured to housing 2353 of the toe tacking device, when the toe gripper returns to its initial position towards the end of the second stage of the cycle of operations of the machine.

For moving the nozzle portions of the tacking devices from tack-receiving positions to tack-driving positions and vice versa by rotation of the tacker bodies as above referred to the following mechanism is provided. For rotating the tacker body associated with the toe tacking device a lever 2403 (Fig. 71) is rotatable on the shaft 1459 hereinbefore referred to, the lever 2403 being connected for rotation with the lever 1453, 1455 (Fig. 30). Pivotally mounted on a fulcrum stud 2407 carried by the lever 2403 are a pair of plates 2409 spaced apart widthwise of the machine and lying one at either side of the lever 2403. The plates, being pivoted on the studs 2407 at localities between their ends, form a two-armed lever, opposite end portions of the plates being connected together by a pin 2411 and a screw 2413 respectively. A spring 2415 connected between the pin 2411 and a hook carried by the lever 2403 urges the plates 2409 clockwise about the pivot stud 2407 to a position determined by engagement of the plates with lugs 2417 formed on the lever 2403. The screw 2413 carries a ball 2419 between the plates 2409, the ball forming a bearing for a cup-shaped recess in one end portion of a link 2421. The other end portion of the link 2421 is received between the limbs of a bifurcated head portion of a swivel pin 2423, the head portion of the latter being pivotally connected to the link by a pin 2425 and the swivel pin being journaled in a bore in a bracket 2427 secured to the tacker body 2281. The swivel pin is retained in the bracket 2427 by means of a collar 2429 on the pin.

The tack-receiving position of the tacker nozzle portion of the toe tacking device is defined by engagement of the housing 2353 with a stop screw 2431 (carried by a bracket 2433 which, in turn, is carried by the left-hand side bracket 1381) when the tacker nozzle portion is brought to this position by swinging of the lever 2403 in the appropriate direction. After engagement of the housing 2353 with the stop screw 2431, the spring 2415 may yield as the lever 2403 completes its movement. When the tacker nozzle portion is in tack-receiving position the tack-controlling fingers 2391 are in such positions (as will hereinafter be more fully described) that the end portions 2392 thereof do not cover the tack passage in the nozzle, and this tack passage is then in alinement with a tack-delivery passage in a bushing 2435 (supported in a bracket 2437 hereinafter referred to) through which passage a tack is delivered to the tacker nozzle portion in inverted position by means hereinafter described.

After the nozzle portion has been supplied with a tack, at an appropriate time in the cycle of operations of the machine the lever 2403 is swung clockwise (as seen in Fig. 71) to move the tacker nozzle portion to tack-driving position. The lever 2403 is swung on rotation of the shaft 1459 through the action of the cam lever 1465, 1469 (Fig. 30) which effects closing and opening of the jaws of the toe gripper. The arrangement is such that, as will be seen from a reference to the timing chart shown in Figs. 77 and 78, as the toe and gripper jaws are closed (represented by the portion a—b of line C—C of the timing chart) the tacking device is moved (from an intermediate position which it occupies at the end of a cycle of operations of the machine) to tack-receiving position (represented by the portion a—b of line F—F of the timing chart) and that as the jaws of the gripper are opened (represented by the portion c—d of the line C—C of the timing chart) and the toe pincer is moved back to its out of the way position (represented by the portion a—b of the line E—E of the timing chart) the tacking device is moved to tack-driving position (this movement being represented by the position c—d of the line F—F). Towards the end of the second stage of the cycle of operations of the machine, as the toe gripper is moved forwardly towards its initial position (see the portion c—d of the line E—E of the timing chart) the toe tacking device is rotated partially towards its tack-receiving position (this movement being represented by the portion e—f of the line F—F of the timing chart).

For rotating the tacker bodies 2281 of the side tacking devices links 2421 (Fig. 60) are connected to the tacker bodies by means of pins 2426, swivel pins 2424 and bosses 2428 formed on the tacker bodies 2281, the arrangement being generally similar to that employed for rotating the toe end tacker body. The links 2421 are connected, by ball joints, to plates 2430 pivotally mounted on levers 2533 rotatably mounted on hubs 2534 secured to the shafts 503 at localities outside the carriers 375. Spring-pressed plungers 2536 received in bores in the levers 2533 engage in notches 2538 in the hubs 2534 and normally cause the levers to rotate with the shafts 503. Should, however, the tacking devices meet with any undue obstruction during their movement from their tack-driving positions the plungers may climb up wedge faces 2540 of the notches thus disconnecting the levers from the shafts 503. The plates 2430 are connected to springs 2432 anchored to hooks in the levers 2533 and serve a similar purpose to the plates 2409 associated with the toe tacking device. The arrangement is such that the side tacking devices are moved from tack-receiving positions (in which the tacking device shown in Fig. 60 is shown) to tack-driving positions as the side grippers move away from the work after releasing the upper (as will be observed by comparing the portions a—b of the lines L—L and R—R on the cam timing chart shown in Figs. 77 and 78). The side tacking devices are returned to tack-receiving positions as the side grippers are returned towards their initial positions (see the portions c—d of the lines L—L and R—R above referred to). It will be appreciated that the arrangement of the levers 2533, plates 2430, and links 2421 is such that, during the initial swinging movement of the levers 2533 that occurs as the shafts 503 rotate (anticlockwise as shown in Fig. 60) during the closing and opening movements of the side gripping jaws (see the portions a—b and c—d of the line H—H shown in Fig. 77) the side tacking devices remain in tack-receiving positions, but as the shafts 503 complete their rotation in the same direction to move the side gripper outward the tacking devices are moved to tack inserting positions.

The tack-controlling fingers 2391 associated with the toe tacking device (and the side tacking devices having only one driver) and means for controlling these fingers will now be described. An outer wall of the nozzle portion 2355 of each of these tacking devices has three slots 2441 (one of which is seen in Fig. 70) formed lengthwise therein for the reception of portions of the fingers 2391. The housing 2401 is secured to the nozzle portion 2355 by means of screws 2443 (see also Figs. 61 and 71) and has an inwardly directed flange 2445 with a rounded inner surface 2447 (see particularly Fig. 70). Opposite the surface 2447 lies an inclined end wall 2449 of each slot 2441. The fingers 2391 are shaped as shown in Fig. 70 and are provided with curved mid portions 2451, which are adapted, when the fingers are in tack-controlling positions, to rest against the inner surface 2447 and the under side of the flange 2445, it being appreciated that Fig. 70 shows the fingers in tack-receiving position. Base portions 2453 of the fingers 2391 are rounded to form bearing surfaces which are received in complementarily curved recesses 2455 equally spaced around a sleeve member 2457 slidably mounted on the nozzle portion 2355. A compression spring 2459 received between a shoulder 2461 on the nozzle portion and a flange 2460 on the sleeve member 2457 normally urges the latter lengthwise of the nozzle portion to hold the portions 2451 of the fingers against the surface 2447 of the flange 2445. The fingers are thus supported in positions yieldably to engage the shank of a tack as it is being driven, the fingers being made of spring steel so that they may flex as the tack is driven.

Considering, for ease of reference, the single driver tacking device associated with the side gripper unit shown in Fig. 60 (it being appreciated that the toe tacking device is generally similar to it), as the tack nozzle portion is swung to tack-receiving position as hereinbefore described, the sleeve member 2457 is moved in a direction away from the outer end of the nozzle portion (i. e., against the action of the spring 2459) as a result of engagement of a cam roll 2463 (Fig. 61) rotatably mounted on a stud 2465 (see Fig. 70) extending outwardly from the sleeve member 2457 through a slot 2467 in the housing 2401, with a cam surface 2469 formed on a member 2471. The member 2471 is secured to a bracket 2482 hereinafter referred to. Such movement of the sleeve member 2457 moves the portions 2451 of the fingers away from the flange 2445 and the fingers are so shaped that the end portions 2392 may move along a conical end wall 2473 of the nozzle portion without exerting any substantial pressure thereagainst, thus minimizing wear of the tack-controlling inner surfaces of the portions 2392 of the fingers. Such movement of the fingers thus leaves exposed the tack-receiving passage 2389 in the nozzle portion 2355.

In the case of the side tacking devices having a pair of drivers the two fingers at each side of each nozzle portion have a common base portion 2454 seated in a sleeve member 2456 slidably mounted on the nozzle portion and backed up by a compression spring 2458 (Fig. 63). The spring 2458 normally urges the sleeve member and the fingers carried thereby lengthwise of the associated nozzle portion to hold mid portions 2460 of the fingers against pins 2462 carried by housings 2464 of these tacking devices. The pins 2462 take the place of the rounded inner surfaces 2447. The sleeve members 2456 are provided with cam rolls 2463 (Fig. 64) for actuating them as in the case of the other tacking devices.

In the case of the toe tacking device the roll 2463 on the housing 2401 is engaged by a cam surface 2470 (Fig. 71) formed on a member 2472 which is secured to the bracket 2437. The bracket 2437 is secured to the left-hand bracket 1381 by means of bolts 2475 extending through slots 2477 in the bracket 2437. The slots permit the bracket 2437 to be adjusted (on slackening the bolts 2475) in directions extending generally lengthwise of the tacking device to allow the tacking device to be adjusted toward or away from the work (considering the tacking device as being in tack-driving position) as hereinbefore referred to. The bracket 2437 has a bore through which extends an adjusting screw 2481 carrying a knurled knob 2483 by which it may be rotated. The screw is threaded into a threaded boss 2484 in the bracket 1381 and a compression spring 2485 is received in the bore in the bracket 2437 between a shoulder therein and the boss 2484. In the case of the tacking devices associated with the side gripper units S₁ and S₂ the brackets 2482, carrying the members 2471, are secured, by bolts 2366 extending through slots 2368 in the brackets 2482, to the plates 2364 carried by the U-shaped members 403. For adjusting the brackets 2482 relatively to the plates 2364 headed adjusting screws 2481 as in the case of the toe tacking device are provided, the screws 2481 associated with the side tacking devices being threaded into the lugs 2362 projecting from the plates 2364.

One purpose of providing the facility for adjustment of the brackets 2437 and 2482 as just referred to is to enable the bushing 2435 and blocks 2388 to be correctly located with respect to the tacking devices irrespective as to whether these are so positioned (by rotating the stems 2293 in the lugs 2297 as hereinbefore referred to) with respect to the level of the shoe bottom that the tacks are driven fully home (as for McKay work) or are left upstanding (as for welt work).

The tack-delivery passage in the bushing 2435 (from which passage tacks are delivered to the nozzle portion of the toe tacking device) is eccentrically formed in the bushing and the latter is threaded into a bore in the bracket 2437 and provided with a knurled head 2489 by means of which it may be rotated in the bracket 2437, such rotation being effective, in conjunction with the provision for locating the tacker nozzle by means of the stop screw 2431, to aline the passage in the bushing 2435 with the passage 2389 in the nozzle portion of the tacking device when the latter is in tack-receiving position. The bushing 2435 is retained in adjusted position by means of a setscrew 2499.

In the case of the side tacking devices the tacks are delivered to passages 2386 in blocks 2388 (the blocks associated with the tacking device having two drivers being provided with two passages 2386 as is seen in Fig. 64). The blocks 2388 are secured to the brackets 2482 by means of bolts 2390 extending through slots 2392 in the brackets, the slots permitting adjustment of the blocks, along "dove-tailed" guideways 2396 in the bracket, in directions extending toward or away from the side portions of a shoe when in positions to be operated upon. Such adjustment is effective, in conjunction with adjustment of the tacker nozzle in directions extending substantially lengthwise of the shoe (which latter adjustments are effected by means of setscrews 2394 threaded into arms 2398 of the brackets 2482 and engaging the housings 2353) to aline the tack passages in the nozzle portions of the tacking devices with the passages 2386.

For latching the nozzle portions of the side tacking devices in tacking positions to sustain the nozzle portions against reactions set up as the tacks are driven, latching devices now to be described are provided.

The latching devices comprise latch members 2535 (see Figs. 65 and 66) pivoted on studs 2537 carried by the tacker bodies. The latch members are arranged to engage notches 2542 in the stop rods 2379 (see also Fig. 61) and are urged into these notches (the latter are alined with the ends of the latch members when the nozzle portions are in tack-inserting positions) by means of torsion springs 2539 surrounding the studs 2537 and anchored to the latch members and in the tacker bodies. Formed on the latch members are abutments 2541 arranged to engage cam faces 2543 on cam plates 2545 secured to the carriers 375. The arrangement is such that during an initial portion of the rotation of the tacker bodies from tack-inserting position (i. e., from the position shown in Fig. 65 to that shown in Fig. 66) the cam faces 2543, by engagement with the abutments 2541, cam the latch members out of the notches 2542 and allow the stem portions 2343 and parts carried thereby to be returned to their initial positions.

The means for latching the toe tacking device in tack-driving position during the driving of a tack is generally similar to the latching means associated with the side tacking device and comprises a latch member 2544 pivoted on a stud 2546 carried by the tacker body (Figs. 67 and 68). The latch member is provided with a detent 2547 which is arranged to engage in the notch 2542 in the rod 2379 of the toe tacking device under the action of a tension spring 2549 connected between pins on the detent 2547 and the tacker body. For releasing the latching member from the notch in the rod an arm 2550 is provided on a rod 2552 journaled in a bracket 2554 secured to the bearing 2287 (Fig. 71). The arm 2550 is arranged to be swung (anticlockwise as seen in Fig. 67) to engage a tail portion of the latching member and to remove the detent from the notch in the rod 2379. For swinging the arm 2550, the rod 2552 has secured to it another arm 2556 connected by a ball joint to a link 2574 which in turn is connected to an arm 2684 secured to an actuating member 2671 (Fig. 74) hereinafter referred to. The arm 2684 just referred to is arranged to swing the arm 2550 to release its latching member after the tack has been driven, the spring 2384 thereupon returning the tacker nozzle portion to its lowered position, whereupon the tacker body is swung round towards its tack-receiving position as hereinbefore described. By adjusting the orientation of the hubs 2534 (Fig. 60) (in the case of the side tacking device) and the lever 2403 (Fig. 71) (in the case of the toe tacking device) relatively to the shafts 503 and 1459 respectively, the operator may determine the distance from the edge of the shoe at which the tacks are driven into the work by the tacking devices, it being understood that following any such adjustment it will be necessary to adjust the positions of the tack and delivery passages as above described.

For supplying air under pressure to the tacking devices to actuate them the following arrangement is provided. A pair of air cylinders 2551 (Figs. 72 and 73) are provided, one at each side of the machine, and each cylinder comprises a cylinder wall 2553, a cylinder head 2555, and a lower end cap 2557 which constitutes an oil bath hereinafter referred to. The portions of each of the cylinders are bolted together by means of three tie rods 2559 (Fig. 75), and a tie member in the form of a tube 2561 (see also Fig. 76). The cylinders are pivotally mounted on the base casting 1 in a manner which will be hereinafter described.

Slidably received within each cylinder is a piston 2563 (Figs. 72 and 73) made up of a central disc 2565, upper and lower cup washers 2567 and 2569 and upper and lower spreader members 2571, 2573 for the washers, these parts being clamped together by means of clamping members 2568, 2570 on an upper end portion of a piston rod 2575, the member 2568 being threaded onto the piston rod and the member 2570 being urged against a shoulder on the piston rod. A lock nut 2572 secures the member 2568 against rotation. On downward movement of the piston 2563 depending portions 2564 on the members 2570 splash into the oil in the oil bath and effect lubrication of the cylinder walls. Lower end portions of the piston rods 2575 are mounted on crank pins 2577 carried by crank plates 2579 secured to opposite ends of the cam shaft 233 (the timing of movements of the pistons being represented by the line S—B in Fig. 78). Formed in the cylinder heads 2555 are pasasges 2581 (Fig. 72) leading to pressure control valves, indicated generally by reference character 2583, and passages 2585 leading to valves, indicated generally by reference character 2587, hereinafter described. Also formed in the cylinder heads 2555 are passages 2589 (Fig. 73) leading to valves, indicated generally by refernce character 2591, for controlling the admission of air to the tacking devices.

Each valve 2583 comprises a ball 2593 (see also Fig. 75) which is normally seated on a valve seating formed in a sleeve 2595 threaded into a bore in the cylinder head. The valve is seated (to close a passage 2597 through the sleeve communicating with the passageway 2581) by the action of a spring 2599 acting on the valve ball through a plunger 2601 slidably received in an inner end portion of a pressure-adjusting screw 2603 which backs up the compression spring 2599 in the usual manner, the screw 2603 being threaded into an axial bore in the valve sleeve 2595. The screw 2603 is provided with a lock nut 2605 for maintaining it in adjusted position. When the pressure of air in the cylinders 2551 exceeds a certain amount, dependent upon the setting of the screws 2603 the valves 2593 open and air escapes via ports 2607, passages 2608 in the cylinder heads and the tubes 2561. The tubes 2561 communicate at their lower ends with the oil bath in the lower end cap 2557. The oil bath communicates via a passage 2558 with a filler 2560 open to the atmosphere (Fig. 72).

Each valve 2591 comprises a housing 2609 received in a bore 2621 in the cylinder head 2555 providing a seating for a ball valve 2611. The valve 2611 is urged into seated position, in which it closes a passage 2613 communicating with the pasasge 2589, by means of a compression spring 2615 backing up a plunger 2617 engaging the ball valve. The plunger is slidably received in a screw 2619 threaded into the cylinder head 2555 and closing the end of the bore 2621 and backing up the spring 2615. A port 2623 through the housing 2609 communicates with the bore 2621 and the latter communicates with passages 2625, 2627 leading to tubes 2629, 2631 by which air is supplied to the tacking devices. The valve 2611 is controlled by means of a plunger 2633 engaging the ball valve at a locality diametrically opposed to the point of engagement of the plunger 2617. A head portion of the plunger 2633 is slidably received in the passage 2613 and is provided with a frusto-conical end portion 2635. An operating member 2637 is slidably mounted in a bore 2639 extending heightwise of the cylinder head and has a rod 2641 freely passing through an axial bore in the member. The member 2637 has a peripheral groove 2643 (Fig. 73), with beveled edges, into which the frusto-conical end portion of the plunger 2633 may enter when the member 2637 is in a lowered position. Under such circumstances the ball valve 2611 is seated by the spring 2615. The operating member 2637 is raised as a result of engagement therewith by an abutment 2645 threaded into the upper end portion of the piston rod 2575 as the latter approaches the upper limit of its compression stroke during which air in the cylinder is compressed to a pressure determined by the setting of the pressure control valve 2583. The rod 2641 extends downwardly through coaxial bores in the abutment 2645 and the piston rod 2575 and has a head 2647 formed on its lower end. An upper end portion of the rod has threaded thereon a nut 2649 and a lock nut 2651. The opening of the valve 2611 admits air to the tacking devices the nozzle portions of which are thereby raised to tack-inserting positions (see the portion a—b of the line T—T in Fig. 78) following which the drivers are actuated to drive the tacks (this movement being represented by the portion c—d of the line U—U). While the piston is performing the major portion of its downward movement, the operating member 2637 is maintained in its raised position (as shown in Figs. 72 and 73) by means of a spring-pressed ball 2653 engaging a recess 2655 in the member, the piston moving relatively to the rod 2641. During this time the valves 2591 remain open so that the tacking devices remain in communication with the cylinders for a purpose hereinafter described. As the pistons approach the lower limit of their stroke they engage the heads 2647 on the rods 2641 and pull the latter and the members 2637 down with them until the grooves 2643 in the members are alined with the frusto-conical end portions 2635 of the plungers 2633. The springs 2615 then close the valves 2611 to cut off communication between the tacking devices and the cylinders.

Each valve 2587 (Figs. 72 and 75) comprises a sleeve 2657 threaded into a bore 2659 in the cylinder head 2555 and having a bore 2661 extending through it. A ball valve 2663 is urged towards a position in which it closes the inner end of the bore 2661 by means of a spring 2665 received in a reduced end portion of the bore 2659 and backing up a thimble 2667 engaging the ball valve 2663. Slidably mounted in the bore 2661 is a plunger 2669 having an inner end portion 2671 of reduced diameter. The plunger 2669 extends somewhat beyond the outer end of the bore in the sleeve 2657 and is there engaged by a setscrew 2670 carried by the actuating member 2671, referred to above, which is connected to means hereinafter described for actuating the valve 2663. The valves 2663 are arranged to be opened just as the pistons pass their top dead center thus allowing compressed air in the tacking devices to expand, the air being exhausted through ports 2673 (see particularly Fig. 75) in the sleeves 2657 leading via passages 2674 in the cylinder heads and pipes 2675 (Figs. 1 and 2) to air filters 2677 in the base of the machine, through which filters the cylinders are caused to "breathe." After the pistons have completed part of their downward stroke and the pressure of air in the system has been reduced approximately to atmospheric, the valves 2663 are allowed to close, under the action of the springs 2665 (the opening and closing of the valves 2663 just referred to being indicated by the portions e—f and g—h of the line V—V in the timing chart shown in Figs. 77 and 78). At the end of the cycle of operations of the machine the pistons 2563 have completed some one half of their downward stroke. After the valves 2663 have closed as above referred to, the valves 2611 are still open and remain open during an initial portion of the succeeding cycle of operations of the machine, the valves 2611 being closed at a time approximately represented by the point a on the line S—S of the timing chart shown in Figs. 77 and 78. The suction effect that occurs after the valves 2663 have closed and while the valves 2611 remain open is used to ensure that the tack-driving pistons 2361 are returned to their initial positions relatively to their cylinders, and this is represented by the portions e—f and a—b of the line U—U on the timing chart. After the valves 2611 have been closed the valves 2663 are again opened while the pistons 2563 complete their downward stroke and air is drawn into the cylinders 2551 via the air filters 2677 (the opening and closing of the valves 2663 at this time being represented by the portions a—b and c—d of the line V—V on the timing chart). The pistons 2563 then commence their compression stroke which takes place partly in the latter part of the first stage of the cycle of operations of the machine and being completed during the second stage of the cycle of operations.

The means for operating the actuating members 2671 for the valves 2587 comprises bell crank levers having arms 2683, 2685 (Figs. 72 and 74) pivotally mounted on the intermediate casting 3 by means of pins 2687. The bell crank levers are connected for movement together (but in opposite senses to cause both valves to be opened simultaneously) by means of a rod 2689, the rod being pivotally connected by a pin 2691 to the arm 2683 of the left-hand bell-crank lever and by a pin 2693 to the arm 2685 of the right-hand bell-crank lever. The arm 2685 of the left-hand bell-crank lever is pivotally connected by means of a pin 2694 to an upper end portion of a link 2695, a lower end portion of which is pivotally connected, by means of a pin 2697 (see also Fig. 12) to one arm 2699, of a two-armed lever 2699, 2701. This lever is pivoted on the shaft 1871 and its arm 2701 carries a cam roll 2703 which engages a peripheral cam track formed on the cam 995.

The sleeves 2657 and 2595 are axially alined and are carried in bearing blocks 2681 secured to the base casting 1. The cylinders 2551 may therefore pivot about the axes of the sleeves 2657 and 2595 on rotation of the crank plates 2579 connected to the piston rods 2575.

TACK-DELIVERY PARTS

The tack receptacle 31 (Fig. 2) and tack-separating device 33 are of a kind well known per se, the receptacle being oscillated back and forth about its axis to supply each of a plurality of raceways with a stream of tacks.

Individual tacks are separated from the remainder in the raceways by a reciprocating separator of the separator device 33, movement of the separator being effected from movement of the tack receptacle. The separated tacks are blown along the tubes 35 by a puff of air delivered at the appropriate time from a piston type pump 2731 also of a kind known per se. For operating the piston of the pump 2731 and for imparting movement to the tack receptacle and separator the following mechanism is provided. An eccentric 2735 (Fig. 12) mounted on the cam shaft 233 is connected by a pivot pin 2737, to one arm 2739 of a lever having a second arm 2741. The lever 2739, 2741 is fulcrumed upon the shaft 1871. Pivotally connected to the arm 2741, by means of a pin 2745, is a lower end portion of a composite rod 2747. An upper end portion of the rod 2747 (Fig. 2) carries a rack 2751 which engages with a pinion (not shown) on a shaft to which is connected the tack receptacle 31 and which serves, on rotation of the cam shaft, to rock the tack receptacle back and forth and to move the tack separator to effect separation of the endmost tacks in the raceways.

The arm 2741 also has pivotally connected thereto (by means of a pin 2753) a lower end portion of a rod 2755 an upper end portion of which is provided with a hook 2757 which engages over a lug 2759 associated with the piston 2733 of the pump 2731. On downward movement of the rod 2755 a cam face 2761 on the upper end portion of the rod engages a screw 2763 carried by the cylinder of the pump and urges the upper end portion of the rod 2755 rearwardly to free the hook 2757 from the lug 2759. The piston 2733 is then released to the action of a spring 2765 which urges the piston upwardly to expel air under pressure from the cylinder, via a tube 2767 to blow the separated tacks from the separating device 33 along the tack delivery tubes 35 to the tacker nozzles which, at this time, will be in tack receiving positions. When the rod 2755 rises again the hook 2757 engages over the lug 2759 once again under the action of a leaf spring 2760 ready to pull down the piston 2733 (against the action of the spring 2765) and thereby to draw air into the cylinder. The timing is such that the tacks are separated towards the end of the second stage of the cycle of operations (see the portion b—c of the line W—W of the cam timing chart Figs. 77 and 78) ready for delivery to the tacking devices during the first stage of the subsequent cycle of operations of the machine at a time corresponding to the point a of the line W—W just above referred to.

TIP LINE GAGE

For assisting the operator in positioning the "tip-lines" of shoes successively operated upon by the machines there is provided a "tip-line" gage 2785 (see particularly Fig. 71).

This gage comprises a finger 2787 of spring steel guided, for movements in a direction extending lengthwise of the finger, in a bracket 2789 having a rearward end portion, secured on a short shaft 2791 carried in a bearing in one end portion of an arm 2793. The other end portion of the arm 2793 is bifurcated and mounted on the pin 1659 carried by the casting 1661. Upper and lower surfaces of the finger 2787 are engaged by rollers 2795 and 2797 respectively, the roller 2795 being journaled in bores in the bracket 2789 and being knurled to provide good frictional contact with the upper face of the finger 2787. An outer end of the spindle of the roller 2795 is provided with a knurled knob 2799 by means of which it may be rotated to adjust the position of the finger, lengthwise thereof, and the bracket 2789. The roller 2797 is carried in a block 2801 supported on a forward end portion of a flat spring 2803 the other end portion of which is secured to the bracket 2789. The spring, through the roller 2797, presses the finger upwardly against the roller 2795.

The shaft 2791 has secured to it a gear segment 2805 which is engaged by a second gear segment 2807, this segment being carried by one arm 2809, of a two-armed lever 2809, 2811 pivoted between its ends on the pin 1659. A tension spring 2813 extending between a hook on the casting 1661 and a lug 2815 secured to the arm 2809 urges the lever 2809, 2811 in a clockwise direction about the pin 1659 and hence the bracket 2789 carrying the finger 2787 is urged anticlockwise into the position shown in Fig. 71. Such position is determined by engagement of an abutment 2817, on the casting 1651, with the lug 2815 on the arm 2809. A cable 2821 connects the outer end of the arm 2811 with a treadle 2823 (Figs. 1 and 3) pivotally mounted in the base of the machine, the cable passing over or around a number of pulleys, one of which (2822) is shown in Fig. 46, supported on the machine frame.

When the treadle 2823 is depressed the bracket 2789 is swung clockwise about the axis of the shaft 2791 to carry an end portion 2825 of thhe finger 2787 into engagement with the toe cap of the shoe being operated upon. During this movement the arms 2793 may swing (anticlockwise as shown in Fig. 71) about the pin 1659 to carry a portion 2827 of the bracket 2789 into engagement with the toe end of the shoe, the distance of the portion 2825 of the finger from the portion 2827 of the bracket being set to correspond with the desired length of the toe cap. On release of the treadle 2823 the gage returns to its position shown in Fig. 71, under the action of the spring 2813.

LUBRICATION

For lubricating various portions of the machine there is provided a lubricating device 2831 (Fig. 2) which may be of any suitable type but preferably is generally similar to that described in a copending application for United States Letters Patent Serial No. 429,070, filed May 11, 1954, in the name of William A. Barker. The device is secured to the rear of the column 5 and supplies oil via tubes 2833 upper end portions of which are clamped in a clamping device 2835 also secured to the column 5. An actuating arm of the lubricating device is arranged to be engaged by an abutment carried by the rod 2747 for oscillating the tack receptacle and operating the tack separating device hereinbefore referred to. In view of the description of the lubricating device contained in the mentioned application, no detailed description will be given herein but the device is such that on each reciprocation of the rod 2747 a shaft of the lubricating device is rotated through a relatively small part of a revolution and each complete rotation of this shaft is effective to transfer oil from a sump of the device to the tubes 2833.

SUMMARY OF SETTING UP PROCEDURE AND OPERATION OF THE MACHINE

In preparing the machine for operation on a shoe (usually a run of work) the operator may rapidly make such adjustments as may be necessary to the machine as follows:

(a) Coarse adjustment of the initial position of the heel rest 27 (in a direction extending lengthwise of a shoe supported by the shoe support) relatively to its carrier 2063 to suit the initial position of the heel rest to the length of the shoe operated upon, the latch 2065 serving to retain the heel rest in adjusted position relatively to the carrier 2063 as hereinbefore described;

(b) The positions occupied by the side grippers considered in a direction extending lengthwise of the shoe may be adjusted by moving the side gripper units lengthwise of the shoe by means of the handle 1235 as hereinbefore described;

(c) Adjustment of the initial separation of the side grippers, i. e., by movement of the side gripper units in directions extending widthwise of the shoe by means of the hand wheel 1313 as hereinbefore described;

(d) The tension of the "updraw" springs 681 (determining the pull applied by the side grippers to the upper) may be adjusted by rotation of the handwheel 713;

(e) The separation of the shoe-bottom-engaging elements 9 and 11 in a direction extending lengthwise of a shoe may be adjusted by means of the hand lever 1949 in accordance with the size of shoe to be operated upon;

(f) The initial position of the auxiliary toe grippers 29 with respect to the main toe gripper 13 (considered in directions extending forwardly and rearwardly in the machine) in accordance with the "scantiness" or "fullness" of the upper materials may be determined by adjustment of the hand lever 1907 as hereinbefore described;

(g) The strength of the grip to be exerted by the main toe gripper 13 on the upper materials may be determined by adjusting the position of the arm 1493 by means of the hand knob 1495; and (h) The pull to be exerted on the upper by the toe gripper 13 may be adjusted by rotation in the appropriate direction of the hand wheel 1561.

Any or all of these "initial" settings that may be required may be made quickly and easily by the operator, the various hand levers or knobs being readily accessible to him and easy to operate.

In addition to the above adjustments it may be necessary to adjust the tacking devices either to drive the tacks fully home into the work (as for McKay type shoes) or to have the tacks upstanding somewhat (as for welted work). A change from operation on work of one type to work of another type may also involve the replacement of one set of wipers 23, 25 by another set of somewhat different size or shape, detachment of the wipers being effected by removal of the screws 1620, 1740 securing the wipers to their respective carriers.

Adjustment of the tacking devices to suit them to operate on McKay work after operating on welt work or vice versa involves not only a repositioning of the tacker bodies towards or away from the shoe bottom (by adjustably rotating the screws 2293, carrying the eccentrically mounted pins 2291, in the lugs 2297 as hereinbefore referred to) but also a corresponding repositioning of the brackets 2437 and 2482 carrying the bushing 2435 and blocks 2388 through passages in which tacks are delivered to the tacking devices. The repositioning of the brackets 2437 and 2482 is effected by slackening the bolts 2475 and bolts 2366 and rotating the adjusting screws 2481 in the appropriate direction, after which the bolts 2437 and 2482 are again tightened. Adjustment of the tacking devices as just referred to may also involve re-alinement of the tack delivering passages in the bushing 2435 and blocks 2388 with the tack passages in the tacker nozzle portions as hereinbefore described. The tack receptacle 31 will, of course, need to be supplied with tacks of length appropriate to the type of work in hand.

Having satisfied himself that the machine is appropriately adapted to operate on a particular run of work, the operator will present a shoe (comprising, at this stage, an upper, complete with an appropriate counter and toe puff, loosely assembled on a last, together with an insole which may be either tacked to the last bottom or may be loosely held thereagainst by the operator) to the machine, the operator positioning the last with its toe end in engagement with the face 17 on the toe gripper jaw 1415 and the last lying more or less centrally with respect to the side grippers (although the positioning of the work widthwise is not very critical since the side gripper units move in to engage opposite side portions of the last, and will thus position the work widthwise, during the operation of the machine as hereinbefore referred to). In presenting the shoe to the machine the operator will cause the upper materials in the vicinity of the toe end of the shoe overlie the jaws 1791 of the auxiliary toe grippers 29, having adjusted, if need be, the position of these auxiliary grippers forwardly or rearwardly in the machine (by means of the hand lever 1907) depending on whether the upper materials are "scant" or "full." The operator will hold the work in position with the insole against the shoe-bottom-engaging elements 9 and 11 and will then depress the treadle 261 to initiate the first stage of a power-operated cycle of operations of the machine.

During the early portion of the first stage of the cycle of operations of the machine the auxiliary toe grippers will close on the upper materials (see the portion a—b of the line A—A, Fig. 77) and will impart a forward draft to the upper (see the portion a—b of the line B—B, of Fig. 77) taking out some of the "looseness" of the upper along the sides thereof, pulling the upper snugly about the heel end of the last and positioning the margin of the upper at the toe end between the jaws of the main toe gripper as hereinbefore referred to.

While the auxiliary toe grippers are closing on the upper the side gripper units S1 and S2 commence to move in, widthwise of the machine, to cause the inner jaws of the side grippers to engage the last at the sides of the toe, and thereby to "square" the units to the sides of the last as hereinbefore described, the units then moving away from the last a definite small distance to free the grippers from actual engagement with the last. The side grippers are thus positioned in the correct positions for pulling the upper and the tacking devices associated with the side grippers are also positioned ready for the tack-inserting operation during a latter portion of the cycle of operations of the machine. If the machine is operating on a shoe in which the insole is not attached to the last bottom, the widthwise movement of the side grippers just referred to, by engagement with the edges of the insole, centralizes the forepart thereof widthwise with respect to the last bottom. Should the insole need to be moved lengthwise of the last, this may be effected by movement of the shoe-bottom-engaging elements 9 and 11 together by appropriate actuation of the hand lever 1961. During the inward movement of the side gripper units toward the last, the heel rest is moved into engagement with the heel end of the work under the action of the spring 2100 (it being understood that the actual pressure of the heel rest against the work at this stage is determined by the spring 2137 backing up the valve 2135 on the dashpot device associated with the heel rest) and holds the last up against the face 17 on the lower jaw of the main toe gripper against any tendency for the side grippers, in engaging the sides of the toe portion of the last (particularly in the case of pointed toes), to wedge the shoe heelwardly.

After the side gripper units have been located with respect to the last the toe gripper and the side grippers grip the upper and are then moved to tension the upper in the manner hereinbefore described (see the portions a—b of the lines C—C, H—H, D—D and K—K of the cam timing chart, Fig. 77), the auxiliary toe grippers releasing the upper and moving further rearwardly when the upper has been gripped by the main toe gripper (see the portions c—d of lines A—A and B—B of Fig. 77).

Toward the end of the pulling action of the grippers the heel rest is more or less locked against movement forwardly and downwardly following engagement of the plunger 2163 with the setscrew 2161 as hereinbefore referred to, any tendency to such movement as a result of pressure on the shoe by the toe wiper being resisted by the strong spring 2100.

At the end of the first stage of the cycle of operations of the machine (corresponding to the 180° points on the lines shown on the cam timing charts in Figs. 77 and 78) the toe and side grippers are hanging onto the upper with pulls determined by the settings of the tension adjusting devices for the springs 1537 and 681 respectively and the operator is then given an opportunity of making any necessary adjustments to the pulling action of these grippers as he may deem fit. For example, he may ease off the pulling action of the toe gripper by forward pressure on the hand lever 1565 and may cause the toe gripper to release the upper and to take a fresh grip by actuating the auxiliary lever 1579 in conjunction with the hand lever 1565. He may straighten the toe cap line or move it lengthwise of the shoe by appropriate actuation of the joystick 1249 (bringing the tip line gage 2785 into operative position by depression of the treadle 2823 if he desires to use this gage in determining the correct position to be occupied by the tip line). In addition the operator may adjust the pulling action of the side grippers by appropriate movement of the joystick 851 either to increase or decrease the tension applied by the side grippers at opposite sides of the toe to equal or unequal extents or even positively to lift the side grippers prior to moving the upper bodily across the last by sideways displacement of the joystick 851 all as hereinbefore referred to.

From what has been said hereinbefore with regard to the construction and arrangement of the various mechanisms it will be appreciated that any of these adjustments that may be required may be made quickly and easily by the operator.

Following initiation of the second stage of the cycle of operations of the machine the wipers are moved in beneath the margin of the upper as the grippers release their hold on the margin and the wipers hold the margin in position against the shoe bottom while the tacks are driven by the tacking device, the various instrumentalities of the machine then being returned to their initial positions by the time the second stage of the cycle of operations is concluded.

Having thus described my invention, what I claim as new and desire to secure by Letters Patent of the United States is:

1. In a machine for shaping uppers over lasts, a support for a last with an upper assembled thereon, a toe gripper for seizing the toe end of the upper and for pulling the upper to stretch it over the last, during a cycle of power operations of the machine, and additional power operated upper gripping means located adjacent to said toe gripper and operable at the beginning of the operating cycle to grip the upper and to exert a pull thereon for preliminarily tensioning the upper and for positioning the upper relatively to the toe gripper, prior to the operation of the toe gripper to seize and to pull the upper.

2. In a machine for shaping uppers over lasts, a support for a last with an upper assembled thereon, a toe gripper for seizing the toe end of the upper and for pulling the upper to stretch it over the last, during a cycle of power operations of the machine, and a pair of additional power operated upper gripping means located, respectively, one on each side of the toe gripper and operable at the beginning of the operating cycle to grip the upper and to exert a pull thereon for preliminarily tensioning the upper and for positioning the upper relatively to the toe gripper, prior to the operation of the toe gripper to seize and to pull the upper.

3. In a machine for shaping uppers over lasts, a support for a last with an upper assembled thereon, a toe gripper for seizing the toe end of the upper and for pulling the upper to stretch it over the last, during a cycle of power operations of the machine, additional power operated upper gripping means located adjacent to said toe gripper and operable at the beginning of the operating cycle to grip the upper and to exert a pull thereon for preliminarily tensioning the upper and for positioning the upper relatively to the toe gripper, prior to the operation of the toe gripper to seize and to pull the upper, and means for causing said additional upper gripping means to release the upper at a predetermined time in the operating cycle after the upper has been seized by the toe gripper.

4. In a machine for shaping uppers over lasts, a support for a last with an upper assembled thereon, a toe gripper for seizing the toe end of the upper and for pulling the upper to stretch it over the last, during a cycle of power operations of the machine, a pair of additional power operated upper gripping means located, respectively, one on each side of the toe gripper and operable at the beginning of the operating cycle to grip the upper and to exert a pull thereon for preliminarily tensioning the upper and for positioning the upper relatively to the toe gripper, prior to the operation of the toe gripper to seize and to pull the upper, and means for causing said additional upper gripping means to release the upper at a predetermined time in the operating cycle after the upper has been seized by the toe gripper.

5. In a machine for shaping uppers over lasts, a support for a last with an upper assembled thereon, a toe gripper for seizing the toe end of the upper and for pulling the upper to stretch it over the last, during a cycle of power operations of the machine, additional power operated upper gripping means located adjacent to said toe gripper and operable at the beginning of the operating cycle to grip the upper and to exert a pull thereon for preliminarily tensioning the upper and for positioning the upper relatively to the toe gripper, prior to the operation of the toe gripper to seize and to pull the upper, and means for causing said additional upper gripping means to release the upper and to move lengthwise of the last away from the toe gripper at a predetermined time in the operating cycle after the upper has been seized by the toe gripper.

6. In a machine for shaping uppers over lasts, a support for a last with an upper assembled thereon, a toe gripper for seizing the toe and of the upper and for pulling the upper to stretch it over the last, during a cycle of power operations of the machine, a pair of additional power operated upper gripping means located respectively, one on each side of the toe gripper and operable at the beginning of the operating cycle to grip the upper and to exert a pull thereon for preliminarily tensioning the upper and for positioning the upper relatively to the toe gripper, prior to the operation of the toe gripper to seize and to pull the upper, and means for causing said additional upper gripping means to release the upper and to move lengthwise of the last away from the toe gripper at a predetermined time in the operating cycle after the upper has been seized by the toe gripper.

7. In a machine for shaping uppers over lasts, a support for a last with an upper assembled thereon, a toe gripper for seizing the toe end of the upper and for pulling the upper to stretch it over the last, during a cycle of power operations of the machine, and additional power operated upper gripping means located adjacent to said toe gripper and operable at the beginning of the operating cycle to grip the upper and to exert a pull thereon for preliminarily tensioning the upper and for positioning the upper relatively to the toe gripper, prior to the operation of the toe gripper to seize and to pull the upper, and operator controlled means for selectively moving said additional upper gripping means to a location in which it operates idly without gripping or pulling the upper.

8. In a machine for shaping uppers over lasts, a support for a last with an upper assembled thereon, a toe gripper for seizing the toe end of the upper and for pulling the upper to stretch it over the last, during a cycle of power operations of the machine, a pair of additional power operated upper gripping means located, respectively, one on each side of the toe gripper and operable at the beginning of the operating cycle to grip the upper and to exert a pull thereon for preliminarily tensioning the upper and for positioning the upper relatively to the toe gripper, prior to the operation of the toe gripper to seize and to pull the upper, and operator controlled means for selectively moving said additional upper gripping means to locations in which they operate idly without gripping or pulling the upper.

9. In a machine for shaping uppers over lasts, a support for a last with an upper assembled thereon, a gripper for seizing the upper and movable heightwise of a last on the support to stretch the upper over the last, a carrier for the gripper mounted for movement generally heightwise of the last, a power operated cam for effecting movement of said carrier, and means for connecting said cam to the carrier including a lever pivotally mounted, between its opposite ends, on the carrier and connected at one end to said cam, means for positively limiting rotation of said lever, relatively to the carrier, in one direction, and yieldable means arranged to resist rotation of said lever relatively to the carrier in the opposite direction and thereby to cause the power operated cam to move said carrier and the gripper yieldingly during the stretching of the upper over the last.

10. In a machine for shaping uppers over lasts, a support for a last with an upper assembled thereon, a gripper for seizing the upper and movable heightwise of a last on the support to stretch the upper over the last, a carrier for the gripper mounted for movement generally heightwise of the last, a power operated cam for effecting movement of said carrier, and means for connecting said cam to the carrier including a lever pivotally mounted, between its opposite ends, on the carrier, and connected at one end to said cam, means for positively limiting rotation of said lever, relatively to the carrier, in one direction, and a spring arranged to resist rotation of said lever relatively to the carrier in the opposite direction and thereby to cause the power operated cam to move said carrier and the gripper yieldingly during the stretching of the upper over the last.

11. In a machine for shaping uppers over lasts, a support for a last with an upper assembled thereon, a gripper for seizing the upper and movable heightwise of a last on the support to stretch the upper over the last, a carrier for the gripper mounted for movement generally heightwise of the last, a power operated cam for effecting movement of said carrier, and means for connecting said cam to the carrier including a lever pivotally mounted, between its opposite ends, on the carrier and connected at one end to said cam, means for positively limiting rotation of said lever, relatively to the carrier, in one direction, and a spring connected to the other end of the lever and arranged to resist rotation of said lever relatively to the carrier in the opposite direction and thereby to cause the power operated cam to move said carrier and the gripper yieldingly during the stretching of the upper over the last.

12. In a machine for shaping uppers over lasts, a support for a last with an upper assembled thereon, a gripper for seizing the upper and movable heightwise of a last on the support to stretch the upper over the last, a carrier for the gripper mounted for movement generally heightwise of the last, a power operated cam for effecting movement of said carrier, and means for connecting said cam to the carrier including a lever pivotally mounted, between its opposite ends, on the carrier and connected at one end to said cam, means for positively limiting rotation of said lever, relatively to the carrier, in one direction, and a spring connected to the other end of said lever and arranged to resist rotation of said lever relatively to the carrier in the opposite direction and thereby to cause the power operated cam to move said carrier and the gripper yieldingly during the stretching of the upper over the last, said spring being so disposed, relatively to said lever, that the force exerted on the lever by the spring increases as the lever is rotated relatively to the carrier in response to resistance to movement of the gripper during the stretching of the upper over the last.

13. In a machine for shaping uppers over lasts, a support for a last with an upper assembled thereon, a gripper for seizing the upper to pull it over the last, and mechanism for imparting movement to the gripper relatively to the last including a spring for causing the gripper to apply a yielding pull on the upper and a fluid operated measuring device for controlling the action of said spring.

14. In a machine for shaping uppers over lasts, a support for a last with an upper assembled thereon, a pair of grippers for seizing the upper at different locations on the opposite sides of the last to pull it over the last, and mechanism for imparting movement to each of said grippers relatively to a last on the support including a spring for causing the gripper to apply a yielding pull on the upper and a fluid operated measuring device for controlling the action of said spring.

15. In a machine for shaping uppers over lasts, a support for a last with an upper assembled thereon, a gripper for seizing the upper to pull it over the last, and mechanism for imparting movement to the gripper relatively to a last on the support including a gripper operating lever connected at one end to the gripper and having a fulcrum, a power operated cam having a predetermined operating stroke connected to said fulcrum, a differential lever having a fulcrum connected to the other end of said operating lever, a spring connected to one end of the differential lever, and a fluid operated measuring device connected to the other end of said differential lever for controlling the action of said spring.

16. In a machine for shaping uppers over lasts, a support for a last with an upper assembled thereon, a pair of grippers for seizing the upper at different locations on the opposite sides of the last to pull it over the last, and mechanism for imparting movements to each of said grippers relatively to a last on the support including a gripper operating lever connected at one end to the gripper and having a fulcrum, a power-operated cam having a predetermined operating stroke connected to said fulcrum, a differential lever having a fulcrum connected to the other end of said operating lever, a spring connected to one end of the differential lever, and a fluid operated measuring device connected to the other end of said differential lever for controlling the action of said spring.

17. In a machine for shaping uppers over lasts, a support for a last with an upper assembled thereon, a gripper for seizing the upper to pull it over the last, and mechanism for imparting movement to the gripper relatively to a last on the support including a gripper operating lever connected at one end to the gripper and having a fulcrum, a power operated cam having a predetermined operating stroke connected to said fulcrum, a differential lever having a fulcrum connected to the other end of said operating lever, a spring connected to one end of the differential lever, a fluid dashpot having a piston connected to the other end of the differential lever, a valve associated with said piston, a spring for normally closing said valve to prevent movement of said piston and of said other end of the differential lever, and means for intermittently opening said valve during the operation of said cam to control the action of said spring on the gripper.

18. In a machine for shaping uppers over lasts, a support for a last with an upper assembled thereon, a pair of grippers for seizing the upper at different locations on the opposite sides of the last to pull it over the last, and mechanisms for imparting movement to each of said grippers relatively to a last on the support including a gripper operating lever connected at one end to the gripper and having a fulcrum, a power operated cam having a predetermined stroke connected to said fulcrum, a differential lever having a fulcrum connected to the other end of said operating lever, a spring connected to one end of the differential lever, a fluid operated dashpot having a piston connected to the other end of the differential lever, a valve associated with said piston, a spring for normally closing said valve to prevent movement of said piston and of said other end of the differential lever, and means for intermittently opening said valve during the operation of said cam to control the action of said spring on the gripper.

19. In a machine for shaping uppers over lasts, a support for a last with an upper assembled thereon, a gripper for seizing the upper to pull it over the last, and mechanism for imparting movement to the gripper relatively to a last on the support including a gripper operating lever connected at one end to the gripper and having a fulcrum, a power operated cam having a predetermined operating stroke connected to said fulcrum, a differential lever having a fulcrum connected to the other end of said operating lever, a spring connected to one end of the differential lever, a fluid-operated dashpot having a piston connected to the other end of the differential lever, a valve associated with said piston, a spring for normally closing said valve to prevent movement of said piston and of said other end of the differential lever, and means operable in response to movement of the differential lever for intermittently opening said valve during the operation of said cam to control the action of said spring on the gripper.

20. In a machine for shaping uppers over lasts, a support for a last with an upper assembled thereon, a pair of grippers for seizing the upper at different locations on the opposite sides of the last to pull it over the last, and mechanisms for imparting movement to each of said grippers relatively to a last on the support including a gripper operating lever connected at one end to the gripper and having a fulcrum, a power operated cam having a predetermined operating stroke connected to said fulcrum, a differential lever having a fulcrum connected to the other end of said operating lever, a spring connected to one end of the differential lever, a fluid operated dashpot having a piston connected to the other end of the differential lever, a valve associated with said piston, a spring for normally closing said valve to prevent movement of said piston and of said other end of the differential lever, and means operable in response to movement of the differential lever for intermittently opening said valve during the operation of said cam to control the action of said cam on the gripper.

21. In a machine for shaping uppers over lasts, a support for a last with an upper assembled thereon, a gripper for seizing the upper to pull it over the last, and mechanism for imparting movement to the gripper relatively to a last on the support including a gripper operating lever connected at one end to the gripper and having a fulcrum, a power operated cam having a predetermined operating stroke connected to said fulcrum, a differential lever having a fulcrum connected to the other end of said operating lever, a spring connected to one end of the differential lever, a fluid operated dashpot having a piston connected to the other end of the differential lever, a valve associated with said piston, a spring for normally closing said valve to prevent movement of said piston and of said other end of the differential lever, means operable in response to movement of the differential lever for intermittently opening said valve during the operation of said cam to control the action of said spring on the gripper, and means actuated by said cam for rendering said valve operating means inoperative near the end of the operating stroke of the cam.

22. In a machine for shaping uppers over lasts, a support for a last with an upper assembled thereon, a pair of grippers for seizing the upper at different locations on the opposite sides of the last to pull it over the last, and mechanism for imparting movement to each of said grippers relatively to a last on the support including a gripper operating lever connected at one end to the gripper and having a fulcrum, a power operated cam having a predetermined operating stroke connected to said fulcrum, a differential lever having a fulcrum connected to the other end of said operating lever, a spring connected to one end of the differential lever, a fluid operated dashpot having a piston connected to the other end of the differential lever, a valve associated with said piston, a spring for normally closing said valve to prevent movement of said piston and of said other end of the differential lever, means operable in response to movements of the differential lever for intermittently opening said valve during the operation of said cam to control the action of said spring on the gripper, and means actuated by said cam for rendering said valve opening means inoperative near the end of the operating stroke of the cam.

23. In a machine for shaping uppers over lasts, a support for a last with an upper assembled thereon, a pair of grippers for seizing the upper in different locations at the opposite sides of the last and movable heightwise of the last to stretch the upper over the last, during a cycle of power operations of the machine, each of said grippers having an outer jaw and an inner jaw and being so located, prior to the beginning of an operating cycle, that its outer jaw is spaced laterally from the side of a last on the support, and means operable at the beginning of each operating cycle, before the jaws of said grippers are closed to seize the upper, for first moving said grippers to positions in which their respective outer jaws are in contact with the last, at the opposite sides thereof, and for thereafter withdrawing said grippers to positions in which their respective outer jaws are spaced predetermined distances from the opposite sides of the last.

24. In a machine for shaping uppers over lasts, a support for a last with an upper assembled thereon, a pair of grippers for seizing the upper in different locations at the opposite sides of the last and movable heightwise of the last to stretch the upper over the last, during a cycle of power operations of the machine, each of said grippers having an outer jaw and an inner jaw and being so located, prior to the beginning of an operating cycle, that its outer jaw is spaced laterally from the side of a last on the support, and means including a friction device associated with each gripper and operable at the beginning of each operating cycle, before the jaws of said grippers are closed to seize the upper, for moving said grippers to positions in which their respective outer jaws are in contact with the sides of the last.

25. In a machine for shaping uppers over lasts, a support for a last with an upper assembled thereon, a pair of grippers for seizing the upper in different locations at the opposite sides of the last and movable heightwise of the last to stretch the upper over the last, during a cycle of power operations of the machine, each of said grippers having an outer jaw and an inner jaw and being so located, prior to the beginning of an operating cycle, that its outer jaw is spaced laterally from the side of a last on the support, and means including a friction device associated with each gripper and operable at the beginning of each operating cycle, before the jaws of said gripper are closed to seize the upper, for first moving said grippers to positions in which their respective outer jaws are in contact with the last, at the opposite sides thereof, and for thereafter withdrawing said grippers to positions in which their respective outer jaws are spaced predetermined distances from the opposite sides of the last.

26. In a machine for shaping uppers over lasts, a support for a last with an upper assembled thereon, a pair of grippers for seizing the upper in different locations at the opposite sides of the last and movable heightwise of the last to stretch the upper over the last, during a cycle of power operations of the machine, each of said grippers having an outer jaw and an inner jaw and being so located, prior to the beginning of an operating cycle, that its outer jaw is spaced laterally from the side of a last on the support, and means including a friction device and a threaded member operable at the beginning of each operating cycle, before the jaws of said grippers are closed to seize the upper, for moving said grippers to positions in which their respective outer jaws are in contact with the sides of the last.

27. In a machine for shaping uppers over lasts, a support for a last with an upper assembled thereon, a pair of grippers for seizing the upper in different locations at the opposite sides of the last and movable heightwise of the last to stretch the upper over the last, during a cycle of power operations of the machine, each of said grippers having an outer jaw and an inner jaw and being so located, prior to the beginning of an operating cycle, that its outer jaw is spaced laterally from the side of a last on the support, and means including a friction device and a threaded member operable at the beginning of each operating cycle, before the jaws of said grippers are closed to seize the upper, for first moving said grippers to positions in which their respective outer jaws are in contact with the last, at the opposite sides thereof, and for thereafter withdrawing said grippers to positions in which their respective outer jaws are spaced predetermined distances from the opposite sides of the last.

28. In a machine for shaping uppers over lasts, a support for a last with an upper assembled thereon, a pair of grippers for seizing the upper on each of the opposite sides of the last and movable heightwise of the last to stretch the upper over the last, during a cycle of power operations of the machine, a support for each of said pairs of grippers mounted for rectilinear movement toward and away from a last on the support and for pivotal movement about an axis extending generally heightwise of the last and substantially midway between the two grippers of the pair, each of said grippers having an outer jaw and an inner jaw being so located, prior to the beginning of an operating cycle, that its outer jaw is spaced from the side of a last on the support, and means operable at the beginning of each operating cycle, before the jaws of the grippers are closed to seize the upper, to effect movement of said gripper supports to carry the pairs of grippers into positions in which their respective outer jaws are in contact with the last, on the opposite sides thereof.

29. In a machine for shaping uppers over lasts, a support for a last with an upper assembled thereon, a pair of grippers for seizing the upper on each of the opposite sides of the last and movable heightwise of the last to stretch the upper over the last, during a cycle of power operations of the machine, a support for each of said pairs of grippers mounted for rectilinear movement toward and away from a last on the support and for pivotal movement about an axis extending generally heightwise of the last and substantially midway between the two grippers of the pair, each of said grippers having an outer jaw and an inner jaw being so located, prior to the beginning of an operating cycle, that its outer jaw is spaced from the side of a last on the support, and means operable at the beginning of each operating cycle, before the jaws of the grippers are closed to seize the upper, to effect movement of said gripper supports first to carry the pairs of grippers into positions in which their respective outer jaws are in contact with the last, on the opposite sides thereof, and thereafter to withdraw said grippers to positions in which their respective outer jaws are spaced predetermined distances from the sides of the last.

30. In a machine for shaping uppers over lasts, a support for a last with an upper assembled thereon, a pair of grippers for seizing the upper on each of the opposite sides of the last and movable heightwise of the last to stretch the upper over the last, during a cycle of power operations of the machine, a support for each of said pairs of grippers mounted for rectilinear movement toward and away from a last on the support and for pivotal movement about an axis extending generally heightwise of the last and substantially midway between the two grippers of the pair, each of said grippers having an outer jaw and an inner jaw being so located, prior to the beginning of an operating cycle, that its outer jaw is spaced from the side of a last on the support, and means including a friction device associated with each of said gripper supports and operable at the beginning of each operating cycle, before the jaws of the grippers are closed to seize the upper, to effect movement of said gripper supports to carry the pairs of grippers into positions in which their respective outer jaws are in contact with the last, on the opposite sides thereof.

31. In a machine for shaping uppers over lasts, a support for a last with an upper assembled thereon, a pair of grippers for seizing the upper on each of the opposite sides of the last and movable heightwise of the last to stretch the upper over the last, during a cycle of power operations of the machine, a support for each of said pairs of grippers mounted for rectilinear movement toward and away from a last on the support and for pivotal movement about an axis extending generally heightwise of the last and substantially midway between the two grippers of the pair, each of said grippers having an outer jaw and an inner jaw being so located, prior to the beginning of an operating cycle, that its outer jaw is spaced from the side of a last on the support, and means including a friction device associated with each of said gripper supports and operable at the beginning of each operating cycle, before the jaws of the grippers are closed to seize the upper, to effect movement of said gripper supports first to carry the pairs of grippers into positions in which their respective outer jaws are in contact with the last, on the opposite sides thereof, and thereafter to withdraw said grippers to positions in which their respective outer jaws are spaced predetermined distances from the sides of the last.

32. In a machine for shaping uppers over lasts, a support for a last with an upper assembled thereon, a pair of grippers for seizing the upper on each of the opposite sides of the last and movable heightwise of the last to stretch the upper over the last, during a cycle of power operations of the machine, a support for each of said pairs of grippers mounted for rectilinear movement toward and away from a last on the support and for pivotal movement about an axis extending generally heightwise of the last and substantially midway between the two grippers of the pair, each of said grippers having an outer jaw and an inner jaw being so located, prior to the beginning of an operating cycle, that its outer jaw is spaced from the side of a last on the support, and means including a friction device and a threaded member associated with each of said gripper supports and operable at the beginning of each operating cycle, before the jaws of the grippers are closed to seize the upper, to effect movement of said gripper supports to carry the pairs of grippers into positions in which their respective outer jaws are in contact with the last, on the opposite sides thereof.

33. In a machine for shaping uppers over lasts, a support for a last with an upper assembled thereon, a pair of grippers for seizing the upper on each of the opposite sides of the last and movable heightwise of the last to stretch the upper over the last, during a cycle of power operations of the machine, a support for each of said pairs of grippers mounted for rectilinear movement toward and away from a last on the support and for pivotal movement about an axis extending generally heightwise of the last and substantially midway between the two grippers of the pair, each of said grippers having an outer jaw and an inner jaw being so located, prior to the beginning of an operating cycle, that its outer jaw is spaced from the side of a last on the support, and means including a friction device and a threaded member associated with each of said gripper supports and operable at the beginning of each operating cycle, before the jaws of the grippers are closed to seize the upper, to effect movement of said gripper supports first to carry the pairs of grippers into positions in which their respective outer jaws are in contact with the last, on the opposite sides thereof, and thereafter to withdraw said grippers to positions in which their respective outer jaws are spaced predetermined distances from the sides of the last.

34. In a machine for shaping uppers over lasts, a support for a last with an upper assembled thereon, a pair of grippers for seizing the upper in different locations at the opposite sides of the last movable in directions heightwise of the last to stretch the upper over the last, during a cycle of power operations of the machine, a fastener inserting nozzle associated with each of said grippers, a movable carrier for supporting each of said grippers and its associated fastener inserting nozzle, each of said grippers including an inner jaw and an outer jaw and being so located, prior to the beginning of an operating cycle, that its outer jaw is spaced laterally from the side of a last on the support, and each of said fastener inserting nozzles being mounted on its carrier for movement relatively thereto of a predetermined extent, in a direction extending laterally of the last, from a fastener receiving position to a fastener inserting position, and means operable at the beginning of each operating cycle, before the jaws of said gripper are closed to seize the upper and prior to movement of said fastener inserting nozzles to their fastener inserting positions, for effecting movement of said carriers to carry the grippers to positions in which the outer jaws of said grippers are in contact with the last at the opposite sides thereof.

35. In a machine for shaping uppers over lasts, a support for a last with an upper assembled thereon, a pair of grippers for seizing the upper in different locations at the opposite sides of the last movable in directions heightwise of the last to stretch the upper over the last, during a cycle of power operations of the machine, a fastener inserting nozzle associated with each of said grippers, a movable carrier for supporting each of said grippers and its associated fastener inserting nozzle, each of said grippers including an inner jaw and an outer jaw and being so located, prior to the beginning of an operating cycle, that its outer jaw is spaced laterally from the side of a last on the support, and each of said fastener inserting nozzles being mounted on its carrier for movement relatively thereto of a predetermined extent, in a direction extending laterally of the last, from a fastener receiving position to a fastener inserting position, and means operable at the beginning of each operating cycle, before the jaws of said grippers are closed to seize the upper and prior to movement of said fastener inserting nozzles to their fastener inserting positions, for effecting movement of said carriers first to carry the grippers to positions in which their respective outer jaws are in contact with the last, on the opposite sides thereof and thereafter to withdraw the grippers to positions in which their respective outer jaws are spaced predetermined distances from the sides of the last.

36. In a machine for shaping uppers over lasts, a support for a last with an upper assembled thereon, a pair of grippers for seizing the upper in different locations at the opposite sides of the last moveable in directions heightwise of the last to stretch the upper over the last, during a cycle of power operations of the machine, a fastener inserting nozzle associated with each of said grippers, a movable carrier for supporting each of said grippers and its associated fastener inserting nozzle, each of said grippers including an inner jaw and an outer jaw and being so located, prior to the beginning of an operating cycle, that its outer jaw is spaced laterally from the side of a last on the support, and each of said fastener inserting nozzles being mounted on its carrier for movement relatively thereto of a predetermined extent, in a direction extending laterally of the last, from a fastener receiving position to a fastener inserting position, and means including a friction device associated with each of said gripper carriers and operable at the beginning of each operating cycle, before the jaws of said grippers are closed to seize the upper and prior to movement of said fastener inserting nozzles to their fastener inserting positions for effecting movement of said carriers to carry the grippers to positions in which the outer jaws of said grippers are in contact with the last at the opposite sides thereof.

37. In a machine for shaping uppers over lasts, a support for a last with an upper assembled thereon, a pair of grippers for seizing the upper in different locations at the opposite sides of the last movable in directions heightwise of the last to stretch the upper over the last, during a cycle of power operations of the machine, a fastener inserting nozzle associated with each of said grippers, a movable carrier for supporting each of said grippers and its associated fastener inserting nozzle, each of said grippers including an inner jaw and an outer jaw and being so located, prior to the beginning of an operating cycle, that its outer jaw is spaced laterally from the side of a last on the support, and each of said fastener inserting nozzles being mounted on its carrier for movement relatively thereto of a predetermined extent, in a direction extending laterally of the last, from a fastener receiving position to a fastener inserting position, and means including a friction device associated with each of said gripper carriers and operable at the beginning of each operating cycle, before the jaws of said grippers are closed to seize the upper and prior to movement of said fastener inserting nozzles to their fastener inserting positions, for effecting movement of said carriers first to carry the grippers to positions in which their respective outer jaws are in contact with the last, on the opposite sides thereof, and thereafter to withdraw the grippers to positions in which their respective outer jaws are spaced predetermined distances from the sides of the last.

38. In a machine for shaping uppers over lasts, a support for a last with an upper assembled thereon, a pair of grippers for seizing the upper in different locations at the opposite sides of the last movable in directions heightwise of the last to stretch the upper over the last, during a cycle of power operations of the machine, a fastener inserting nozzle associated with each of said grippers, a movable carrier for supporting each of said grippers and its associated fastener inserting nozzle, each of said grippers including an inner jaw and an outer jaw and being so located, prior to the beginning of an operating cycle, that its outer jaw is spaced laterally from the side of a last on the support, and each of said fastener inserting nozzles being mounted on its carrier for movement relatively thereto of a predetermined extent, in a direction extending laterally of the last, from a fastener receiving position to a fastener inserting position, and means including a friction device and a threaded member associated with each of said gripper carriers and operable at the beginning of each operating cycle, before the jaws of said grippers are closed to seize the upper and prior to movement of said fastener inserting nozzles to their fastener inserting positions, for effecting movement of said carriers to carry the grippers to positions in which the outer jaws of said grippers are in contact with the last at the opposite sides thereof.

39. In a machine for shaping uppers over lasts, a support for a last with an upper assembled thereon, a pair of grippers for seizing the upper in different locations at the opposite sides of the last movable in directions heightwise of the last to stretch the upper over the last, during a cycle of power operations of the machine, a fastener inserting nozzle associated with each of said grippers, a movable carrier for supporting each of said grippers and its associated fastener inserting nozzle, each of said grippers including an inner jaw and an outer jaw and being so located, prior to the beginning of an operating cycle, that its outer jaw is spaced laterally from the side of a last on the support, and each of said fastener inserting nozzles being mounted on its carrier for movement relatively thereto of a predetermined extent, in a direction extending laterally of the last, from a fastener receiving position to a fastener inserting position, and means including a friction device and a threaded member associated with each of said gripper carriers and operable at the beginning of each operating cycle, before the jaws of said grippers are closed to seize the upper and prior to movement of said fastener inserting nozzles to their fastener inserting positions, for effecting movement of said carriers first to carry the gripper to positions in which their respective outer jaws are in contact with the last, on the opposite sides thereof, and thereafter to withdraw the grippers to positions in which their respective outer jaws are spaced predetermined distances from the sides of the last.

40. In a machine for shaping uppers over lasts, a support for a last with an upper assembled thereon, a pair of grippers for seizing the upper on each of the opposite sides of the last and movable heightwise of the last to stretch the upper over the last, during a cycle of power operations of the machine, a fastener inserting nozzle associated with each of said grippers, a carrier for supporting each one of the pairs of grippers and the fastener inserting nozzles associated with said pair of grippers, said carrier being mounted for rectilinear movement toward and away from a last on the support and for pivotal movement about an axis extending generally heightwise of the last and substantially midway between the two grippers of the pair of grippers on the carrier, each of said grippers having an outer jaw and an inner jaw and being so located, prior to the beginning of an operating cycle, that the outer jaw is spaced from the side of a last on the support, and each of said fastener inserting nozzles being mounted on its carrier for movement relatively thereto of a predetermined extent, in a direction extending laterally of the last, from a fastener receiving position to a fastener inserting position, and means operable at the beginning of each operating cycle, before the jaws of said gripper are closed to seize the upper and prior to movement of said fastener inserting nozzles to their fastener inserting positions, for effecting movement of said carriers to carry the grippers to positions in which the outer jaws of said grippers are in contact with the last at the opposite sides thereof.

41. In a machine for shaping uppers over lasts, a support for a last with an upper assembled thereon, a pair of grippers for seizing the upper on each of the opposite sides of the last and movable heightwise of the last to stretch the upper over the last, during a cycle of power operations of the machine, a fastener inserting nozzle associated with each of said grippers, a carrier for supporting each one of the pairs of grippers and the fastener inserting nozzles associated with said pair of grippers, said carrier being mounted for rectilinear movement toward and away from a last on the support and for pivotal movement about an axis extending generally heightwise of the last and substantially midway between the two grippers of the pair of grippers on the carrier, each of said grippers having an outer jaw and an inner jaw and being so located, prior to the beginning of an operating cycle, that the outer jaw is spaced from the side of a last on the support, and each of said fastener inserting nozzles being mounted on its carrier for movement relatively thereto of a predetermined extent, in a direction extending laterally of the last, from a fastener receiving position to a fastener inserting position, and means operable at the beginning of each operating cycle, before the jaws of said grippers are closed to seize the upper and prior to movement of said fastener inserting nozzles to their fastener inserting positions, for effecting movement of said carriers first to carry the grippers to positions in which their respective outer jaws are in contact with the last, on the opposite sides thereof and thereafter to withdraw the grippers to positions in which their respective outer jaws are spaced predetermined distances from the sides of the last.

42. In a machine for shaping uppers over lasts, a support for a last with an upper assembled thereon, a pair of grippers for seizing the upper on each of the opposite sides of the last and movable heightwise of the last to stretch the upper over the last, during a cycle of power operations of the machine, a fastener inserting nozzle associated with each of said grippers, a carrier for supporting each one of the pairs of grippers and the fastener inserting nozzles associated with said pair of grippers, said carrier being mounted for rectilinear movement toward and away from a last on the support and for pivotal movement about an axis extending generally heightwise of the last and substantially midway between the two grippers of the pair of grippers on the carrier, each of said grippers having an outer jaw and an inner jaw and being so located, prior to the beginning of an operating cycle, that the outer jaw is spaced from the side of a last on the support, and each of said fastener inserting nozzles being mounted on its carrier for movement relatively thereto of a predetermined extent, in a direction extending laterally of the last, from a fastener receiving position to a fastener inserting position, and means including a friction device associated with each of said gripper carriers and operable at the beginning of each operating cycle, before the jaws of said grippers are closed to seize the upper and prior to movement of said fastener inserting nozzles to their fastener inserting positions for effecting movement of said carriers to carry the grippers to positions in which the outer jaws of said grippers are in contact with the last at the opposite sides thereof.

43. In a machine for shaping uppers over lasts, a support for a last with an upper assembled thereon, a pair of grippers for seizing the upper on each of the opposite sides of the last and movable heightwise of the last to stretch the upper over the last, during a cycle of power operations of the machine, a fastener inserting nozzle associated with each of said grippers, a carrier for supporting each one of the pairs of grippers and the fastener inserting nozzles associated with said pair of grippers, said carrier being mounted for rectilinear movement toward and away from a last on the support and for pivotal movement about an axis extending generally heightwise of the last and substantially midway between the two grippers of the pair of grippers on the carrier, each of said grippers having an outer jaw and an inner jaw and being so located, prior to the beginning of an operating cycle, that the outer jaw is spaced from the side of a last on the support, and each of said fastener inserting nozzles being mounted on its carrier for movement relatively thereto of a predetermined extent, in a direction extending laterally of the last, from a fastener receiving position to a fastener inserting position, and means including a friction device associated with each of said gripper carriers and operable at the beginning of each operating cycle, before the jaws of said grippers are closed to seize the upper and prior to movement of said fastener inserting nozzles to their fastener inserting positions, for effecting movement of said carriers first to carry the grippers to positions in which their respective outer jaws are in contact with the last, on the opposite sides thereof, and thereafter to withdraw the grippers to positions in which their respective outer jaws are spaced predetermined distances from the sides of the last.

44. In a machine for shaping uppers over lasts, a support for a last with an upper assembled thereon, a pair of grippers for seizing the upper on each of the opposite sides of the last and movable heightwise of the last to stretch the upper over the last, during a cycle of power operations of the machine, a fastener inserting nozzle associated with each of said grippers, a carrier for supporting each one of the pairs of grippers and the fastener inserting nozzles associated with said pair of grippers, said carrier being mounted for rectilinear movement toward and away from a last on the support and for pivotal movement about an axis extending generally heightwise of the last and substantially midway between the two grippers of the pair of grippers on the carrier, each of said grippers having an outer jaw and an inner jaw and being so located, prior to the beginning of an operating cycle, that the outer jaw is spaced from the side of a last on the support, and each of said fastener inserting nozzles being mounted on its carrier for movement relatively thereto of a predetermined extent, in a direction extending laterally of the last, from a fastener receiving position to a fastener inserting position, and means including a friction device and a threaded member associated with each of said gripper carriers and operable at the beginning of each operating cycle, before the jaws of said grippers are closed to seize the upper and prior to movement of said fastener inserting nozzles to their fastener inserting positions, for effecting movement of said carriers to carry the grippers to positions in which the outer jaws of said grippers are in contact with the last at the opposite sides thereof.

45. In a machine for shaping uppers over lasts, a support for a last with an upper assembled thereon, a pair of gripper for seizing the upper on each of the opposite sides of the last and movable heightwise of the last to stretch the upper over the last, during a cycle of power operations of the machine, a fastener inserting nozzle associated with each of said grippers, a carrier for supporting each one of the pairs of grippers and the fastener inserting nozzles associated with said pair of grippers, said carrier being mounted for rectilinear movement toward and away from a last on the support and for pivotal movement about an axis extending generally heightwise of the last and substantially midway between the two grippers of the pair of grippers on the carrier, each of said grippers having an outer jaw and an inner jaw and being so located, prior to the beginning of an operating cycle, that the outer jaw is spaced from the side of a last on the support, and each of said fastener inserting nozzles being mounted on its carrier for movement relatively thereto of a predetermined extent, in a direction extending laterally of the last, from a fastener receiving position to a fastener inserting position, and means including a friction device and a threaded member associated with each of said gripper carriers and operable at the beginning of each operating cycle, before the jaws of said grippers are closed to seize the upper and prior to movement of said fastener inserting nozzles to their fastener inserting positions, for effecting movement of said carriers first to carry the gripper to positions in which their respective outer jaws are in contact with the last, on the opposite sides thereof, and thereafter to withdraw the grippers to positions in which their respective outer jaws are spaced predetermined distances from the sides of the last.

46. In a machine for shaping uppers over lasts, a support for a last with an upper assembled thereon, a pair of grippers for seizing the upper on each of the opposite sides of the last and movable heightwise of the last to stretch the upper over the last, during a cycle of power operations of the machine, a carrier for supporting each one of the pairs of grippers mounted for rectilinear movement toward and away from a last on the support and for pivotal movement about an axis extending generally heightwise of the last and substantially midway between the two grippers of the pair, each of said grippers having an outer jaw and an inner jaw and being so located, prior to the beginning of an operating cycle, that the outer jaw is spaced from the side of the last, means operable at the beginning of each operating cycle, before the jaws of said grippers are closed to seize the upper, for effecting movements of said carriers to carry the grippers to positions in which their outer jaws are in contact with the last on the opposite sides thereof, whereby the carriers are swung about their respective pivotal axes to angular positions determined by said grippers and the last, and means operable thereafter to maintain the carriers in the positions to which they have thus been swung, during the heightwise movement of the grippers to stretch the upper over the last.

47. In a machine for shaping uppers over lasts, a support for a last with an upper assembled thereon, a pair of grippers for seizing the upper on each of the opposite sides of the last and movable heightwise of the last to stretch the upper over the last, during a cycle of power operations of the machine, a carrier for supporting each one of the pairs of grippers mounted for rectilinear movement toward and away from a last on the support and for pivotal movement about an axis extending generally heightwise of the last and substantially midway between the two grippers of the pair, each of said grippers having an outer jaw and an inner jaw and being so located, prior to the beginning of an operating cycle, that the outer jaw is spaced from the side of the last, means operable at the beginning of each operating cycle, before the jaws of said grippers are closed to seize the upper, for effecting movements of said carriers to carry the grippers to position in which their outer jaws are in contact with the last, on the opposite sides thereof, whereby the carriers are swung about their respective pivotal axes to angular positions determined by said grippers and the last, and means including a friction device operable thereafter to maintain the carriers in the positions to which they have thus been swung, during the heightwise movement of the grippers to stretch the upper over the last.

48. In a machine for shaping uppers over lasts, a support for a last with an upper assembled thereon, a pair of grippers for seizing the upper on each of the opposite sides of the last and movable heightwise of the last to stretch the upper over the last, during a cycle of power operations of the machine, a carrier for supporting each one of the pairs of grippers mounted for rectilinear movement toward and away from a last on the support and for pivotal movement about an axis extending generally heightwise of the last and substantially midway between the two grippers of the pair, each of said grippers having an outer jaw and an inner jaw and being so located, prior to the beginning of an operating cycle, that the outer jaw is spaced from the side of the last, means operable at the beginning of each operating cycle, before the jaws of said grippers are closed to seize the upper, for effecting movements of said carriers first to carry the grippers to positions in which their outer jaws are in contact with the last on the opposite sides thereof whereby the carriers are swung about their respective pivotal axes to angular positions determined by said grippers and the last, and thereafter to withdraw the grippers to positions in which their respective outer jaws are spaced predetermined distances from the sides of the last, and means operable thereafter to maintain the carriers in the positions to which they have thus been swung, during the heightwise movement of the grippers to stretch the upper over the last.

49. In a machine for shaping uppers over lasts, a support for a last with an upper assembled thereon, a pair of grippers for seizing the upper on each of the opposite sides of the last and movable heightwise of the last to stretch the upper over the last, during a cycle of power operations of the machine, a carrier for supporting each one of the pairs of grippers mounted for rectilinear movement toward and away from a last on the support and for pivotal movement about an axis extending generally heightwise of the last and substantially midway between the two grippers of the pair, each of said grippers having an outer jaw and an inner jaw and being so located, prior to the beginning of an operating cycle, that the outer jaw is spaced from the side of the last, means operable at the beginning of each operating cycle, before the jaws of said grippers are closed to seize the upper, for effecting movements of said carriers first to carry the grippers to positions in which their outer jaws are in contact with the last on the opposite sides thereof, whereby the carriers are swung about their respective pivotal axes to angular positions determined by said grippers and the last, and thereafter to withdraw the grippers to positions in which their respective outer jaws are spaced predetermined distances from the sides of the last, and means including a friction device operable thereafter to maintain the carriers in the positions to which they have thus been swung, during heightwise movement of the grippers to stretch the upper over the last.

50. In a machine for shaping uppers over lasts, a support for a last with an upper assembled thereon, a pair of grippers for seizing the upper on each of the opposite sides of the last and movable heightwise of the last to stretch the upper over the last, during a cycle of power operations of the machine, a fastener inserting nozzle associated with each of said grippers, a carrier for supporting each one of the pairs of grippers and the fastener inserting nozzles associated with said pair of grippers, said carriers being mounted for rectilinear movement toward and away from a last on the support and for pivotal movement about an axis extending generally heightwise of the last and substantially midway between the two grippers of the pair, each of said grippers having an outer jaw and an inner jaw and being so located, prior to the beginning of an operating cycle, that the outer jaw is spaced from the side of the last, each of said fastener inserting nozzles being mounted on its carrier for movement, relatively thereto, of a predetermined extent in a direction extending laterally of the last, from a fastener receiving position to a fastener inserting position, means operable at the beginning of each operating cycle, before the jaws of said grippers are closed to seize the upper and prior to movement of the fastener inserting nozzles to their fastener inserting positions, for effecting movements of said carriers to carry the grippers to positions in which their outer jaws are in contact with the last, on the opposite sides thereof, whereby the carriers are swung about their respective pivotal axes to angular positions determined by said grippers and the last, and means operable thereafter to maintain the carriers in the positions to which they have thus been swung, during heightwise movement of the grippers to stretch the upper over the last and the driving of fastenings through said fastener inserting nozzles.

51. In a machine for shaping uppers over lasts, a support for a last with an upper assembled thereon, a pair of grippers for seizing the upper on each of the opposite sides of the last and movable heightwise of the last to stretch the upper over the last, during a cycle of power operations of the machine, a fastener inserting nozzle associated with each of said grippers, a carrier for supporting each one of the pairs of grippers and the fastener inserting nozzles associated with said pair of grippers, said carriers being mounted for rectilinear movement toward and away from a last on the support and for pivotal movement about an axis extending generally heightwise of the last and substantially midway between the two grippers of the pair, each of said grippers having an outer jaw and an inner jaw and being so located, prior to the beginning of an operating cycle, that the outer jaw is spaced from the side of the last, each of said fastener inserting nozzles being mounted on its carrier for movement, relatively thereto, of a predetermined extent in a direction extending laterally of the last, from a fastener receiving position to a fastener inserting position, means operable at the beginning of each operating cycle, before the jaws of said grippers are closed to seize the upper and prior to movement of the fastener inserting nozzles to their fastener inserting positions, for effecting movements of said carriers to carry the grippers to positions in which their outer jaws are in contact with the last, on the opposite sides thereof, whereby the carriers are swung about their respective pivotal axes to angular positions determined by said grippers and the last, and means including a friction device operable thereafter to maintain the carriers in the positions to which they have thus been swung, during heightwise movement of the grippers to stretch the upper over the last and the driving of fastenings through said fastener inserting nozzles.

52. In a machine for shaping uppers over lasts, a support for a last with an upper assembled thereon, a pair of grippers for seizing the upper on each of the opposite sides of the last and movable heightwise of the last to stretch the upper over the last, during a cycle of power operations of the machine, a fastener inserting nozzle associated with each of said grippers, a carrier for supporting each one of the pairs of grippers and the fastener inserting nozzles associated with said pair of grippers, said carriers being mounted for rectilinear movement toward and away from a last on the support and for pivotal movement about an axis extending generally heightwise of the last and substantially midway between the two grippers of the pair, each of said grippers having an outer jaw and an inner jaw and being so located, prior to the beginning of an operating cycle, that the outer jaw is spaced from the side of the last, each of said fastener inserting nozzles being mounted on its carrier for movement, relatively thereto, of a predetermined extent in a direction extending laterally of the last, from a fastener receiving position to a fastener inserting position, means operable at the beginning of each operating cycle, before the jaws of said grippers are closed to seize the upper and prior to movement of the fastener inserting nozzles to their fastener inserting positions, for effecting movements of said carriers first to carry the grippers to positions in which their outer jaws are in contact with the last on the opposite sides thereof, whereby the carriers are swung about their respective pivotal axes to angular positions determined by said grippers and the last, and thereafter to withdraw the grippers to positions in which their respective outer jaws are spaced predetermined distances from the sides of the last, and means operable thereafter to maintain the carriers in the positions to which they have thus been swung, during heightwise movement of the grippers to stretch the upper over the last and the driving of fastenings through said fastener inserting nozzles.

53. In a machine for shaping uppers over lasts, a support for a last with an upper assembled thereon, a pair of grippers for seizing the upper on each of the opposite sides of the last and movable heightwise of the last to stretch the upper over the last, during a cycle of power operations of the machine, a fastener inserting nozzle associated with each of said grippers, a carrier for supporting each one of the pairs of grippers and the fastener inserting nozzles associated with said pair of grippers, said carriers being mounted for rectilinear movement toward and away from a last on the support and for pivotal movement about an axis extending generally heightwise of the last and substantially midway between the two grippers of the pair, each of said grippers having an outer jaw and an inner jaw and being so located, prior to the beginning of an operating cycle, that the outer jaw is spaced from the side of the last, each of said fastener inserting nozzles being mounted on its carrier for movement, relatively thereto, of a predetermined extent in a direction extending laterally of the last, from a fastener receiving position to a fastener inserting position, means operable at the beginning of each operating cycle, before the jaws of said grippers are closed to seize the upper and prior to movement of the fastener inserting nozzles to their fastener inserting positions, for effecting movements of said carriers first to carry the grippers to positions in which their outer jaws are in contact with the last on the opposite sides thereof, whereby the carriers are swung about their respective pivotal axes to angular positions determined by said grippers and the last, and thereafter to withdraw the grippers to positions in which their respective outer jaws are spaced predetermined distances from the sides of the last, and means including a friction device operable thereafter to maintain the carriers in the positions to which they have thus been swung, during heightwise movement of the grippers to stretch the upper over the last and the driving of fastenings through said fastener inserting nozzles.

54. In a machine for shaping uppers over lasts, a support for a last with an upper assembled thereon, a pair of grippers for seizing the upper on each of the opposite sides of the last and movable heightwise of the last to stretch the upper over the last, during a cycle of power operations of the machine, a carrier for supporting each one of the pairs of grippers mounted for rectilinear movement toward and away from a last on the support and for pivotal movement about an axis extending generally heightwise of the last and substantially midway between the two grippers of the pair, each of said grippers having an outer jaw and an inner jaw and being so located, prior to the beginning of an operating cycle, that the outer jaw is spaced from the side of the last, means operable at the beginning of each operating cycle, before the jaws of said grippers are closed to seize the upper, for effecting movements of said carriers to carry the grippers to positions in which their outer jaws are in contact with the last, on the opposite sides thereof, whereby the carriers are swung about their respective pivotal axes to angular positions determined by said grippers and the last, and means operable thereafter and before the completion of the operating cycle to return said carriers to their initial angular positions.

55. In a machine for shaping uppers over lasts, a support for a last with an upper assembled thereon, a pair of grippers for seizing the upper on each of the opposite sides of the last and movable heightwise of the last to stretch the upper over the last, during a cycle of power operations of the machine, a carrier for supporting each one of the pairs of grippers mounted for rectilinear movement toward and away from a last on the support and for pivotal movement about an axis extending generally heightwise of the last and substantially midway between the two grippers of the pair, each of said grippers having an outer jaw and an inner jaw and being so located, prior to the beginning of an operating cycle, that the outer jaw is spaced from the side of the last, means operable at the beginning of each operating cycle, before the jaws of said grippers are closed to seize the upper, for effecting movements of said carriers first to carry the grippers to positions in which their outer jaws are in contact with the last on the opposite sides thereof, whereby the carriers are swung about their respective pivotal axes to angular positions determined by said grippers and the last, and thereafter to withdraw the grippers to positions in which their respective outer jaws are spaced predetermined distances from the sides of the last, and means operable thereafter and before the completion of the operating cycle to return said carriers to their initial angular positions.

56. In a machine for shaping uppers over lasts, a support for a last with an upper assembled thereon, a pair of grippers for seizing the upper on each of the opposite sides of the last and movable heightwise of the last to stretch the upper over the last, during a cycle of power operations of the machine, a fastener inserting nozzle associated with each said grippers, a carrier for supporting each one of the pairs of grippers and the fastener inserting nozzles associated with said pair of grippers, said carriers being mounted for rectilinear movement toward and away from a last on the support and for pivotal movement about an axis extending generally heightwise of the last and substantially midway between the two grippers of the pair, each of said grippers having an outer jaw and an inner jaw and being so located, prior to the beginning of an operating cycle, that the outer jaw is spaced from the side of the last, each of said fastener inserting nozzles being mounted on its carrier for movement, relatively thereto, of a predetermined extent in a direction extending laterally of the last, from a fastener receiving position to a fastener inserting position, means operable at the beginning of each operating cycle, before the jaws of said grippers are closed to seize the upper and prior to movement of the fastener inserting nozzles to their fastener inserting positions, for effecting movements of said carriers to carry the grippers to positions in which their outer jaws are in contact with the last, on the opposite sides thereof, whereby the carriers are swung about their respective pivotal axes to angular positions determined by said grippers and the last, and means operable thereafter and before the completion of the operating cycle to return said carriers to their initial angular positions.

57. In a machine for shaping uppers over lasts, a support for a last with an upper assembled thereon, a pair of grippers for seizing the upper on each of the opposite sides of the last and movable heightwise of the last to stretch the upper over the last, during a cycle of power operations of the machine, a fastener inserting nozzle associated with each of said grippers, a carrier for supporting each one of the pairs of grippers and the fastener inserting nozzles associated with said pair of grippers, said carriers being mounted for rectilinear movement toward and away from a last on the support and for pivotal movement about an axis extending generally heightwise of the last and substantially midway between the two grippers of the pair, each of said grippers having an outer jaw and an inner jaw and being so located, prior to the beginning of an operating cycle, that the outer jaw is spaced from the side of the last, each of said fastener inserting nozzles being mounted on its carrier for movement, relatively thereto, of a predetermined extent in a direction extending laterally of the last, from a fastener receiving position to a fastener inserting position, means operable at the beginning of each operating cycle, before the jaws of said grippers are closed to seize the upper and prior to movement of the fastener inserting nozzles to their fastener inserting positions, for effecting movements of said carriers first to carry the grippers to positions in which their outer jaws are in contact with the last on the opposite sides thereof, whereby the carriers are swung about their respective pivotal axes to angular positions determined by said grippers and the last, and thereafter to withdraw the grippers to positions in which their respective outer jaws are spaced predetermined distances from the sides of the last, and means operable thereafter and before the completion of the operating cycle to return said carriers to their initial angular positions.

58. In a machine for shaping uppers over lasts, a gripper carrier, a pair of grippers for pulling an upper over a last, each of said grippers including a pair of jaws and a supporting member, said supporting members being mounted for independent movement relatively to the carrier, and means for mounting said gripper jaws on the supporting members for pivotal movement about an axis substantially perpendicular to the direction of movement of its associated supporting member and to the marginal edge of the bottom of the last.

59. In a machine for shaping uppers over lasts, a gripper carrier, a pair of grippers associated with said carrier and adapted to seize adjacent portions of an upper, means for effecting movement of the carrier heightwise of a last to cause said grippers to pull the upper over the last, means for yieldingly moving said grippers relatively to the carrier in response to such heightwise movement of the carrier, each of said grippers including a pair of jaws and a supporting member, and means for mounting each pair of gripper jaws on its supporting member for pivotal movement about an axis susbtantially perpendicular to the direction of movement of the carrier and to the marginal edge of the last.

60. In a machine for shaping uppers over lasts, a gripper carrier, a gripper associated with said carrier and adapted to seize a portion of an upper, means for effecting movement of the carrier heightwise of a last to cause said gripper to pull the upper over the last, means for yieldingly moving said gripper relatively to the carrier in response to such heightwise movement of the carrier, said gripper including a pair of jaws and a supporting member, and means for mounting said pair of gripper jaws on its supporting member for pivotal movement about an axis substantially perpendicular to the direction of movement of the carrier and to the marginal edge of the last.

61. In a machine for shaping uppers over lasts, a support for a last with an upper assembled thereon, a pair of grippers for seizing the upper in different locations at the opposite sides of the last and movable heightwise of the last to stretch the upper over the last, during a cycle of power operations of the machine, a carrier for each of the grippers, means for supporting each gripper on its carrier, said carrier being mounted for movement to position said grippers in locations adjacent to the opposite sides of the last, means for causing said grippers first to seize the upper, then to move heightwise of the last to stretch the upper over the last, and finally to release the upper, and means for effecting movements of said gripper supporting means, relatively to their associated carriers, in directions to withdraw the grippers outwardly from the sides of the last, after the grippers have released the upper.

62. In a machine for shaping uppers over lasts, a support for a last with an upper assembled thereon, a pair of grippers for seizing the upper in different locations at the opposite sides of the last and movable heightwise of a last on the support to stretch the upper over the last, during a cycle of power operations of the machine, a carrier for each of the grippers, a support for movably mounting each gripper on its carrier, each of said grippers including an inner jaw and an outer jaw and each of said carriers being mounted for movement, relatively to the support for the last, to carry its associated gripper into an operative position in which its outer jaw is located closely adjacent to one side of the last, means for operating said grippers first to cause their jaws to close and seize the upper, then to effect movement of the grippers heightwise of the last to stretch the upper over the last, and finally to cause their jaws to open and release the upper, and means for effecting movements of said gripper supports, relatively to their associated carriers, in directions to withdraw the grippers outwardly from the sides of the last, after the gripper jaws have been opened to release the upper.

63. In a machine for shaping uppers over lasts, a support for a last with an upper assembled thereon, a pair of grippers for seizing the upper on each of the opposite sides of the last and movable heightwise of a last on the support to stretch the upper over the last, during a cycle of power operations of the machine, a supporting means for each of the grippers, means for operating said grippers to cause them first to seize the upper, then to move heightwise of the last to stretch the upper over the last, and finally to release the upper, and means for effecting movement of the gripper supporting means in directions to withdraw the grippers outwardly away from the last, after the grippers have released the upper.

64. In a machine for shaping uppers over lasts, a support for a last with an upper assembled thereon, a pair of grippers for seizing the upper on each of the opposite sides of the last and movable heightwise of a last on the support to stretch the upper over the last, during a cycle of power operations of the machine, a carrier for the pair of grippers on each side of the last, means for supporting the grippers of each pair on its carrier, said carriers being mounted for movement to position the grippers associated therewith in locations adjacent to one side of the last, means for causing said grippers first to seize the upper, then to move heightwise of the last to stretch the upper over the last and finally to release the upper, and means for effecting movements of said gripper supporting means, relatively to their associated carriers, in directions to withdraw the grippers outwardly from the sides of the last, after the grippers have released the upper.

65. In a machine for shaping uppers over lasts, a support for a last with an upper assembled thereon, a pair of grippers for seizing the upper on each of the opposite sides of the last and movable heightwise of a last on the support to stretch the upper over the last, during a cycle of power operations of the machine, a carrier for the pair of grippers on each side of the last, a support for movably mounting the grippers of each pair on its associated carrier, each of said grippers including an inner jaw and an outer jaw and each of said carriers being mounted for movement, relatively to the support for the last, to carry its associated grippers into an operative position in which their outer jaws are located closely adjacent to one side of the last, means for operating said grippers first to cause their jaws to close and seize the upper, then to effect movement of the grippers heightwise of the last to stretch the upper over the last, and finally to cause their jaws to open and release the upper, and means for effecting movements of said gripper supports, relatively to their associated carriers, in directions to withdraw the grippers outwardly from the sides of the last, after the gripper jaws have been opened to release the upper.

66. In a machine for shaping uppers over lasts, a gripper having jaws for seizing the upper and movable to apply a tensioning pull on the upper for stretching it over the last, a wiper mounted for movement to wipe the lasting margin of the tensioned upper inwardly over the bottom of an insole on the last, gripper operating mechanism including means for closing the jaws of the gripper to seize the upper and for thereafter opening the gripper jaws to release the upper and separate means for moving the gripper in a direction to pull the upper after the gripper jaws have been closed, and means for effecting movement of the wiper operable in response to the opening of the gripper jaws by said gripper operating mechanism to release the upper.

67. In a machine for shaping uppers over lasts, a gripper having jaws for seizing the upper and movable to apply a tensioning pull on the upper for stretching it over the last, a wiper mounted for movement to wipe the lasting margin of the tensioned upper inwardly over the bottom of an insole on the last, gripper operating mechanism including means for closing the jaws of the gripper to seize the upper and for thereafter opening the gripper jaws to release the upper and separate means for moving the gripper in a direction to apply a pull on the upper after the gripper jaws have been closed, means for effecting movement of the wiper including a spring arranged to be compressed during the movement of said gripper to pull the upper, and means for rendering said spring effective to move the wiper in response to the opening of the gripper jaws by said gripper operating mechanism to release the upper.

68. In a machine for shaping uppers over lasts, a gripper having jaws for seizing the upper and movable to apply a tensioning pull on the upper for stretching it over the last, a wiper mounted for movement to wipe the lasting margin of the tensioned upper inwardly over the bottom of an insole on the last, gripper operating mechanism including means for closing the jaws of the gripper to seize the upper and for thereafter opening the gripper jaws to release the upper and separate means for moving the gripper in a direction to apply a pull on the upper after the gripper jaws have been closed, means for effecting movement of the wiper including a spring arranged to be compressed during the movement of said gripper to pull the upper, a latch for holding said wiper against movement as said spring is compressed, and means for causing said latch to release the wiper to the action of said spring in response to the opening of the gripper jaws by said gripper operating mechanism to release the upper.

69. In a machine for shaping uppers over lasts, a gripper having jaws for seizing the upper and movable to apply a tensioning pull on the upper for stretching it over the last, a wiper mounted for movement to wipe the lasting margin of the tensioned upper inwardly over the bottom of an insole on the last, gripper operating mechanism including a power operated cam for closing the jaws of the gripper to seize the upper and for thereafter opening the gripper jaws to release the upper and a separate power operated cam for moving the gripper in a direction to apply a pull on the upper after the gripper jaws have been closed, means for effecting movement of the wiper operable in response to the opening of said gripper jaws by the gripper operating mechanism to release the upper, manually operable means for opening the jaws of the gripper, and means for preventing movement of the wiper when the gripper jaws are opened by said manually operable means.

70. In a machine for shaping uppers over lasts, a gripper having jaws for seizing the upper and movable to apply a tensioning pull on the upper for stretching it over the last, a wiper mounted for movement to wipe the lasting margin of the tensioned upper inwardly over the bottom of an insole on the last, gripper operating mechanism including a power operated cam for closing the jaws of the gripper to seize the upper and for thereafter opening the gripper jaws to release the upper and a separate power operated cam for moving the gripper in a direction to apply a pull on the upper after the gripper jaws have been closed, means for effecting movement of the wiper including a spring arranged to be compressed during the movement of said gripper to pull the upper, means for rendering said spring effective to move the wiper in response to the opening of the gripper jaws by said gripper operating mechanism to release the upper, manually operable means for opening the jaws of said gripper, and means for preventing movement of the wiper by said spring when the gripper jaws are opened by said manually operable means.

71. In a machine for shaping uppers over lasts, a gripper having jaws for seizing the upper and movable to apply a tensioning pull on the upper for stretching it over the last, a wiper mounted for movement to wipe the lasting margin of the tensioned upper inwardly over the bottom of an insole on the last, gripper operating means including a power operated cam for closing the jaws of the gripper to seize the upper and for thereafter opening the gripper jaws to release the upper, and a separate power operated cam for moving the gripper in a direction to apply a pull on the upper after the gripper jaws have been closed, means for effecting movement of the wiper including a spring arranged to be compressed during the movement of said gripper to pull the upper, a latch for holding said wiper against movement as said spring is compressed, means for causing said latch to release the wiper to the action of said spring in response to the opening of the gripper jaws by said gripper operating mechanism to release the upper, manually operable means for opening the jaws of the gripper, and an additional latch for preventing movement of the wiper by said spring when the gripper jaws are opened by said manually operable means.

72. In a machine for shaping uppers over lasts, a support for a last with an upper assembled thereon, means for tensioning the upper to shape it over the last, means for securing the lasting margin of the upper in lasted position after it has thus been tensioned, a pair of members movable toward the last for clamping the upper against the last at the opposite sides thereof, power-operated means including a cam and yieldable connections for moving said members into positions for clamping the upper yieldingly against the last, and means for positively holding said members in clamping position during the operation of said securing means.

73. In a machine for shaping uppers over lasts, a support for a last with an upper assembled thereon, means for tensioning the upper to shape it over the last, means for securing the lasting margin of the upper in lasted position after it has thus been tensioned, a pair of members movable toward the last for clamping the upper against the last at the opposite sides thereof, power-operated means including a cam and yieldable connections for moving said members into positions for clamping the upper yieldingly against the last, and pawl-and-ratchet mechanisms for positively holding said members in clamping position during the operation of said securing means.

74. In a machine for shaping uppers over lasts, a support for a last with an upper assembled thereon, a pair of grippers adapted first to seize the lasting margin of the upper in different locations on the opposite sides of the last, then to move heightwise of the last for applying a tensioning pull on the upper to shape it over the last, and finally to release the lasting margin of the upper, a pair of fastener inserting devices for securing the lasting margin of the upper in lasted position at the opposite sides of the last after said lasting margin has been released by said grippers, a pair of upper clamping members mounted for movement relatively to a last on the support, means including yieldable connections for moving said clamping members into positions for clamping the tensioned upper yieldingly against the last prior to the release of the lasting margin of the upper by said grippers, and means for positively holding said clamping members in clamping position during the operation of said fastener inserting devices.

75. In a machine for shaping uppers over lasts, a support for a last with an upper assembled thereon, a pair of grippers adapted first to seize the lasting margin of the upper in different locations on the opposite sides of the last, then to move heightwise of the last for applying a tensioning pull on the upper to shape it over the last, and finally to release the lasting margin of the upper, a pair of fastener inserting devices for securing the lasting margin of the upper in lasted position at the opposite sides of the last after said lasting margin has been released by said grippers, a pair of upper clamping members mounted for movement relatively to a last on the support, power-operated means including a cam and yieldable connections for moving said clamping members into positions for clamping the tensioned upper yieldingly against the last prior to the release of the lasting margin of the upper by said grippers, and means for positively holding said clamping members in clamping position during the operation of said fastener inserting devices.

76. In a machine for shaping uppers over lasts, a support for a last with an upper assembled thereon, a pair of grippers adapted first to seize the lasting margin of the upper in different locations on the opposite sides of the last, then to move heightwise of the last for applying a tensioning pull on the upper to shape it over the last, and finally to release the lasting margin of the upper, a pair of fastener inserting devices for securing the lasting margin of the upper in lasted position at the opposite sides of the last after said lasting margin has been released by said grippers, a pair of upper clamping members mounted for movement relatively to a last on the support, means including yieldable connections for moving said clamping members into positions for clamping the tensioned upper yieldingly against the last prior to the release of the lasting margin of the upper by said grippers, and pawl-and-ratchet mechanisms for positively holding said clamping members in clamping position during the operation of said fastener inserting devices.

77. In a machine for shaping uppers over lasts, a support for a last with an upper assembled thereon, a pair of grippers adapted first to seize the lasting margin of the upper in different locations on the opposite sides of the last, then to move heightwise of the last for applying a tensioning pull on the upper to shape it over the last, and finally to release the lasting margin of the upper, a pair of fastener inserting devices for securing the lasting margin of the upper in lasted position at the opposite sides of the last after said lasting margin has been released by said grippers, a pair of upper clamping members mounted for movement relatively to a last on the support, power-operated means including a cam and yieldable connections for moving said clamping members into positions for clamping the tensioned upper yieldingly against the last prior to the release of the lasting margin of the upper by said grippers, and pawl-and-ratchet mechanisms for positively holding said clamping members in clamping position during the operation of said fastener inserting devices.

78. In a machine for shaping uppers over lasts, a support for a last with an upper assembled thereon, a gripper for seizing the upper and movable heightwise relatively to said support to tension the upper over the last, a carrier for said gripper, a fastener inserting device mounted on said carrier for movement from a fastener receiving position to a fastener driving position, mechanical means for effecting an initial portion of the movement of said fastener inserting device to fastener driving position, and fluid pressure operated means for completing said movement.

79. In a machine for shaping uppers over lasts, a support for a last with an upper assembled thereon, a gripper for seizing the upper and movable heightwise relatively to said support to tension the upper over the last, a carrier for said gripper, a fastener inserting device mounted on said carrier for arcuate and rectilinear movement from a fastener receiving position to a fastener driving position, mechanical means for effecting the arcuate portion of the movement of said fastener inserting device, and fluid pressure operated means for effecting the rectilinear portion of said movement.

80. In a machine for shaping uppers over lasts, a support for a last with an upper assembled thereon, a gripper for seizing the upper and movable heightwise relatively to said support to tension the upper over the last, a carrier for said gripper, a fastener inserting device including a fastener receiving nozzle and a driver for driving the fastener through said nozzle, said fastener inserting device being mounted on said gripper carrier for movement from a fastener receiving position in which said nozzle is displaced laterally and heightwise from a shoe on the support to a fastener inserting position in which said nozzle is located closely adjacent to the bottom of the shoe, mechanical means for effecting an initial portion of movement of said fastener inserting device, and fluid pressure operated means for completing the movement of said fastener inserting device.

81. In a machine for shaping uppers over lasts, a support for a last with an upper assembled thereon, a gripper for seizing the upper and movable heightwise relatively to said support to tension the upper over the last, a carrier for said gripper, a fastener inserting device including a fastener receiving nozzle and a driver for driving the fastener through said nozzle, said fastener inserting device being mounted on said gripper carrier for movement along a path having an arcuate portion and a rectilinear portion from a fastener receiving position in which said nozzle is displaced laterally and heightwise from a shoe on the support to a fastener inserting position in which said nozzle is located closely adjacent to the bottom of the shoe, mechanical means for effecting movement of said fastener inserting device along the arcuate portion of said path, and fluid pressure operated means for effecting movement of said fastener inserting device along the rectilinear portion of said path.

82. In a machine for shaping uppers over lasts a support for a last with an upper assembled thereon, a gripper for seizing the upper and movable heightwise relatively to said support to tension the upper over the last, a carrier for said gripper, a fastener inserting device mounted on said carrier for movement from a fastener receiving position to a fastener inserting position, means for effecting movement of said fastener inserting device from said fastener receiving position to said fastener inserting position, and means for releasably holding said fastener inserting device in said fastener inserting position.

83. In a machine for shaping uppers over lasts, a support for a last with an upper assembled thereon, a gripper for seizing the upper and movable heightwise relatively to said support to tension the upper over the last, a carrier for said gripper, a fastener inserting device mounted on said carrier for movement from a fastener receiving position to a fastener inserting position, means for effecting movement of said fastener inserting device from said fastener receiving position to said fastener inserting position, and latch means for releasably holding said fastener inserting device in said fastener inserting position.

84. In a machine for shaping uppers over lasts, a support for a last with an upper assembled thereon, a gripper for seizing the upper and movable heightwise relatively to said support to tension the upper over the last, a carrier for said gripper, a fastener inserting device including a fastener receiving nozzle and a fluid pressure operated driver for driving the fastener through said nozzle, said fastener inserting device being mounted on said gripper carrier for movement from a fastener receiving position to a fastener inserting position, mechanical means for effecting an initial portion of said movement, and fluid pressure means for completing said movement and for thereafter operating said driver.

85. In a machine for shaping uppers over lasts, a support for a last with an upper assembled thereon, a gripper for seizing the upper and movable heightwise relatively to said support to tension the upper over the last, a carrier for said gripper, a fastener inserting device including a fastener receiving nozzle and a fluid pressure operated driver for driving the fastener through said nozzle, said fastener inserting device being mounted on said gripper carrier for movement from a fastener receiving position to a fastener inserting position along a path having an arcuate portion and a rectilinear portion, mechanical means for effecting movement of said fastener inserting device along the arcuate portion of said path, and fluid pressure means for effecting movement of said fastener inserting device along the rectilinear portion of said path and for thereafter operating said driver.

86. In a machine for shaping uppers over lasts having grippers for tensioning an uper to stretch it over a last, wipers for laying the marginal portions of the upper inwardly over the bottom of the last, and means for inserting fastenings to secure the upper to the last, power means for operating said grippers, wipers and fastener inserting means including a cam shaft, a source of power, and clutch mechanism for selectively connecting said source of power to the cam shaft, a manually operable member for rotating said cam shaft, said manually operable member being normally disconnected from the cam shaft and movable to an operative position in which it is connected to said cam shaft, and means associated with said clutch mechanism for preventing movement of said manually operable member to its operative position when the cam shaft is connected to said source of power by the clutch mechanism.

87. In a machine for shaping uppers over lasts having grippers for tensioning an upper to stretch it over a last, wipers for laying the marginal portions of the upper inwardly over the bottom of the last, and means for inserting fastenings to secure the upper to the last, power means for operating said grippers, wipers and fastener inserting means including a cam shaft, a source of power, clutch mechanism for selectively connecting said source of power to the cam shaft, a manually operable member for rotating said cam shaft, said manually operable member being normally disconnected from the cam shaft and movable to an operative position in which it is connected to the cam shaft, and means for preventing the operation of said clutch mechanism to connect the power source to the cam shaft when said manually operable member is moved to its operative position.

88. In a machine for shaping uppers over lasts having grippers for tensioning an upper to stretch it over a last, wipers for laying the marginal portions of the upper inwardly over the bottom of the last, and means for inserting fastenings to secure the upper to the last, power means for operating said grippers, wipers and fastener inserting means including a cam shaft, a source of power, clutch mechanism including gearing for connecting the source of power to the cam shaft to drive said cam shaft selectively in either direction, a manually operable member for rotating said cam shaft, said manually operable member being normally disconnected from the cam shaft and movable to an operative position in which it is connected to the cam shaft, and means associated with the clutch mechanism for preventing movement of said manually operable member to its operative position when said power source is connected to said cam shaft to drive it in either direction.

89. In a machine for shaping uppers over lasts having grippers for tensioning an upper to stretch it over a last, wipers for laying the marginal portions of the upper inwardly over the bottom of the last, and means for inserting fastenings to secure the upper to the last, power means for operating said grippers, wipers and fastener inserting means including a cam shaft, a source of power, clutch mechanism including gearing for connecting the source of power to the cam shaft to drive said cam shaft selectively in either direction, a manually operable member for rotating said cam shaft, said manually operable member being normally disconnected from the cam shaft and movable to an operative position in which it is connected to the cam shaft, and means for preventing operation of said clutch mechanism to connect the power source to the cam shaft for driving the shaft in either direction, when said manually operable member is moved to its operative position.

90. In a machine for shaping uppers over lasts having grippers for tensioning an upper to stretch it over a last, wipers for laying the marginal portions of the upper inwardly over the bottom of the last, and means for inserting fastenings to secure the upper to the last, power means for operating said grippers, wipers and fastener inserting means including a cam shaft, a source of power, drive mechanism including a clutch for connecting the power source to said cam shaft, a brake for stopping the cam shaft, and control means for first releasing the brake and for then engaging said clutch to connect the power source to the cam shaft, a manually operable member for rotating said cam shaft, said manually operable member being normally disconnected from the cam shaft and movable to an operative position in which it is connected to the cam shaft, and means associated with said drive mechanism for preventing movement of said manually operable member to its operative position when said brake is released and said clutch is engaged to cause the source of power to be connected to said cam shaft.

91. In a machine for shaping uppers over lasts having grippers for tensioning an upper to stretch it over a last, wipers for laying the marginal portions of the upper inwardly over the bottom of the last, and means for inserting fastenings to secure the upper to the last, power means for operating said grippers, wipers and fastener inserting means including a cam shaft, a source of power, drive mechanism including a clutch for connecting the power source to said cam shaft, a brake for stopping the cam shaft, and control means for first releasing the brake and for then engaging said clutch to connect the power source to the cam shaft, a manually operable member for rotating said cam shaft, said manually operable member being normally disconnected from said cam shaft and movable to an operative position in which it is connected to the cam shaft, and means for preventing operation of said control means to cause said clutch to connect the power source to said cam shaft when said manually operable member is moved to its operative position, said last-named means being adapted to permit the operation of said control means to release said brake so that the cam shaft may be rotated by said manually operable member.

References Cited in the file of this patent

UNITED STATES PATENTS

| | | |
|---|---|---|
| 671,356 | Stirckler | Apr. 2, 1901 |
| 1,710,729 | Gouldbourn et al. | Apr. 30, 1929 |
| 1,721,736 | Jorgensen | July 23, 1929 |
| 2,614,275 | Jorgensen | Oct. 21, 1952 |

FOREIGN PATENTS

| | | |
|---|---|---|
| 17,581 | Great Britain | of 1887 |